(12) United States Patent
Watanabe

(10) Patent No.: US 9,985,959 B2
(45) Date of Patent: *May 29, 2018

(54) ELECTRONIC APPLIANCE, NETWORK UNIT OF ELECTRONIC APPLIANCES, NETWORK OF ELECTRONIC APPLIANCES, AND CHIP IDENTIFICATION METHOD

(71) Applicant: Hiroshi Watanabe, Kanagawa-ken (JP)

(72) Inventor: Hiroshi Watanabe, Kanagawa-ken (JP)

(*) Notice: Subject to any disclaimer, the term of this patent is extended or adjusted under 35 U.S.C. 154(b) by 130 days.

This patent is subject to a terminal disclaimer.

(21) Appl. No.: 15/147,984

(22) Filed: May 6, 2016

(65) Prior Publication Data

US 2016/0330191 A1  Nov. 10, 2016

(30) Foreign Application Priority Data

May 10, 2015  (JP) .................... 2015-096123

(51) Int. Cl.
| | |
|---|---|
| H04L 9/32 | (2006.01) |
| H04L 29/06 | (2006.01) |
| H01L 23/528 | (2006.01) |
| H01L 29/861 | (2006.01) |
| H01L 23/522 | (2006.01) |
| H01L 21/768 | (2006.01) |

(Continued)

(52) U.S. Cl.
CPC ...... *H04L 63/083* (2013.01); *H01L 21/76816* (2013.01); *H01L 21/76834* (2013.01); *H01L 21/76877* (2013.01); *H01L 23/528* (2013.01); *H01L 23/5226* (2013.01); *H01L 23/576* (2013.01); *H01L 29/861* (2013.01); *H04L 9/3278* (2013.01); *H04L 63/0876* (2013.01); *H04L 63/1441* (2013.01); *G06F 21/73* (2013.01); *G06F 2221/2129* (2013.01)

(58) Field of Classification Search
CPC .......... H04L 9/32; H04L 9/3278; G06F 21/44
See application file for complete search history.

(56) References Cited

U.S. PATENT DOCUMENTS

| | | | |
|---|---|---|---|
| 8,028,924 B2 | 10/2011 | Anderson et al. | |
| 2010/0127822 A1* | 5/2010 | Devadas ............... | H04L 9/3278 340/5.8 |

(Continued)

OTHER PUBLICATIONS

Robert Aitken, Vikas Chandra, James Myers, Bal Sandhu, Lician Shifren and Greg Yeric, Device and technology implications of the Internet of Things, Digest of Technical Papers—Symposium on VLSI Technology, Jun. 9-12, 2014, 4 pages, IEEE, US.

(Continued)

*Primary Examiner* — Izunna Okeke
(74) *Attorney, Agent, or Firm* — Alan D. Kamrath; Kamrath IP Lawfirm, P.A.

(57) ABSTRACT

Technology prevents the peripheral devices from being taken over, to suppress the remote-attack on the network of electronic devices by applying the physical chip identification devices to the network. To realize this, a plurality of electronic appliances composing the network is divided into peripheral devices and stem servers that manage the registration information of the peripheral devices. The stem servers may be under the central control, whereas the peripheral devices hold the physical chip identification devices. By managing the peripheral devices in the level of a device like this, the security of the entire network is effectively improved.

25 Claims, 114 Drawing Sheets

(51) Int. Cl.
  *H01L 23/00*   (2006.01)
  *G06F 21/73*   (2013.01)

(56) References Cited

U.S. PATENT DOCUMENTS

2010/0257357 A1\* 10/2010 McClain ................. G06F 21/43
    713/155
2011/0062240 A1  3/2011 Anderson et al.
2015/0101037 A1\* 4/2015 Yang ....................... G06F 21/44
    726/16

OTHER PUBLICATIONS

G. Edward Suh and Srinivas Devadas, Physical Unclonable Functions for Device Authentication and Secret Key Generation, DAC '07 Proceedings of the 44th Annual Design Automation Conference, Jun. 2007, 6 pages, San Diego, CA, US.

The Nikkei News, "Power Plants in Iran Encountered New Cyber Attacks—reported by Media in U.S. and U.K.", online newspaper, May 5, 2016, 4 pages (including 1 page English translation), www.nikkei.com.

The Nikkei News, "When a Charger or a Mouse Becomes an Enemy of Personal Computer—reported by Nishimoto Itsuro", online newspaper, May 5, 2016, 4 pages (including 1 page English translation), www.nikkei.com.

\* cited by examiner address    000 001 010 011 100 101 110 111    xxxxx save the correspondence address in buffer identification cell: □ □ □ □ □ □ □ □ ...... □ examples of data: "1" "1" "0" "1" "X" "0" "0" "1" ........ "0"

dispose it ⇒ examples of data: "1" "1" "0" "1" "0" "0" "1" ........ "0"

FIG. 84

ELECTRONIC APPLIANCE, NETWORK UNIT OF ELECTRONIC APPLIANCES, NETWORK OF ELECTRONIC APPLIANCES, AND CHIP IDENTIFICATION METHOD

CROSS REFERENCE TO RELATED APPLICATIONS

The application claims the benefit of Japan application serial No. 2015-096123, filed on May 10, 2015, and the subject matter of which is incorporated herein by reference.

BACKGROUND OF THE INVENTION

1. Field of the Invention

The present invention generally relates to a method of physical chip identification to be used in chip-to-chip communication and network.

2. Description of the Related Art

The progress of information and communication industry has been rapid since the beginning of the 21st century. More recently, the vast market is being made. Everything, such as home electronic appliances, houses, and cars besides information terminals, is connected to network. That is, Internet of Things (IoT) does not belong to any existing market. As for the internet of everything (IoE) which may be an advanced version of IoT, the social structure itself is on the verge of being changed.

By means of technology, IoT can be regarded as a communication technology among semiconductor chips that are the smallest elements (nodes). However, the number of nodes is more than a couple of trillions to several ten trillions (Trillion Nodes), which makes IoT differ from the existing network technology. Regarding the world population as seven billion, there are several hundreds to a thousand chips per person in average. Those chips store not only personal information but also systems to control appliances around the person. It may be practically impossible for all persons to finely-appropriately manage those chips. Moreover, the computer resource is insufficient to manage the several trillion chips, even while trained experts manage the network. Even granted that such a management system may be developed in the future, it may be a difficult problem who should operate that management system responsibly. It may not be preferable that a private company carries on the management of the entire chip all over the world. It may be undesirable and unrealistic that the task of management is handled by artificial intelligent which is smarter than a human being.

Which kind of problem may occur if nothing is able to control such a huge network? It may be understandable if we suppose that auto-driving cars having a large capacity Li-ion battery are hacked. Plenty of auto-driving cars under remote-control move unmanned to the attacking target (shopping centers, large underground car parks, terminal stations . . . ). A huge amount of the Li-ion battery is collected at the attacking target, while the power control systems of the Li-ion battery are hijacked. It might become possible to trigger off a big explosion of the Li-ion battery owing to the malfunction on purpose. A big explosion might occur in the car park of a shopping center suddenly. Alternately, the traffic control system of the high speed railway would be hijacked, and, then, frontal impacts might occur. Likewise, the control systems of nuclear reactors or the air traffic might be hijacked. We are in the opposite side of the same coin with those risks.

It would be too hasty to conclude that the networks of such important facilities are safe, because they are protected by very powerful firewalls (or isolated physically). In reality, Iran's nuclear facility was attacked by malware called STUXNET and then suffered serious damages. (For example, Non-Patent Literature 1: http://www.nikkei.com/article/DGXNASFK2602G_W2A221C1000000/).

It is known that there are many potential infection routes of STUXNET, among which mobile terminals or USB data travelers are most promising. STUXNET may wait, for several months, for the opportunity to invade the targeted system, once it is released in the internet. Even while the targeted system is protected by a very powerful firewall, STUXNET may invade into USB data travelers or mobile terminals and then wait until those USB data travelers or mobile terminals are connected to the targeted system inside the firewall. After connected, STUXNET opens the back-door, hijacks the PLC (programmable logic controller), and then begins with the remote-control. Thus, one thousand or more centrifuges in Iran's nuclear facility were rapidly accelerated, rapidly decelerated repeatedly, and then were destroyed. If the system is physically isolated, then STUXNET itself may destroy the centrifuges.

Although those centrifuges are disconnected from the outside network, it was necessary to periodically connect to mobile terminals that the maker of those centrifuges carries for maintenance. If they were connected to the outside network, then such an operation would not be necessary. In addition, STUXNET will do nothing but lurk anywhere that is not the attacking target. Therefore, it is hard for any anti-virus to detect STUXNET.

It might be supposed that the STUXNET attack on Iran's nuclear facility retards the nuclear development of Iran to avoid the air raid of Israel on Iran. Once the way of STUXNET attack is found, it might be regarded that the countermeasure to the STUXNET attack is possible. However, the state of feeling terror is that the code of STUXNET was stolen by hackers and then flowed out. In 2014, a new type of computer virus, which has a similar property to STUXNET, is reported. (For example, Non-Patent Literature 2: http://www.nikkei.com/article/DGXMZO79858560Y4A111C1000000/).

This malware, called BadUSB, hijacks the firmware to control USB devices instead of PLC which is a control program of industrial equipment. The USB devices have identification because they are connected and then used. This identification is involved in the firmware. The firmware is a program saved in a chip and to control the chip. BadUSB steals the identification of USB devices and then does nothing on anything to which this USB device is connected. For example, BadUSB may not infect a personal computer but may hijack a mouse or keyboard connected to the personal computer for controlling the personal computer. Thus, a hacker on the other side of the globe may be able to remote-control other's computers. It should be noted that an anti-virus computer software protecting a personal computer cannot detect anything that BadUSB has done, because BadUSB does not infect the personal computer.

In IoT/IoE, the smallest element of communication (node) is a control chip of an appliance. The control software (firmware) is stored in the control chip. This firmware holds each identification code to authenticate each chip. The new attack to remote-control auto-driving cars, mentioned above, is analogical to the attack by BadUSB and STUXNET, since they steal the identification code of the peripheral devices for the remote control.

It may be possible that a few hacker's group causes the synchronized terrorist attacks like September 11 in the future. It may be unable to prevent such a new thread with the conventional anti-terrorism policy and the existing cyber security technologies.

The mainstream of the cybersecurity technology is the central control by software. The recognition level of the security technology varies widely by persons. Thus, it may be impossible to make every end user appropriately carry on the professional management of the network. The security may be vulnerable unless a person appropriately manages the network, even while 999 persons appropriately manage it. It is accordingly preferable that the supervisors having been sufficiently trained may manage the security via the network using sufficiently reliable software. That is, the central control is the control via the network with software.

However, the number of nodes may be more than a trillion in the IoT/IoE business model, which may make the central control difficult. In addition, if the identification code of only a node is taken over, then the entire system (e.g., auto-driving cars, air-traffic control system and so forth) may be vulnerable. Since the network is controlled by software, the identification code is used to control the network. This is an essential limitation of the central control.

Due to the above considerations, the present invention is therefore to provide a local management of identification of nodes without software.

SUMMARY OF THE INVENTION

The present invention adopts the following method in order to solve the above-mentioned problems. In an embodiment of the invention, a network unit of electronic appliances includes a stem server and a plurality of peripheral devices connected to the stem server. The stem server includes at least one passcode and at least one list of a plurality of registration codes. Each list is associated to a respective one of the at least one passcode. Each of the plurality of registration codes of one list associating to one passcode corresponds to a respective one of the plurality of peripheral devices connecting to the stem server. Each of the plurality of registration codes is generated in response to a respective one of the at least one passcode using physical randomness of a respective one of the plurality of peripheral devices in correspondence to the passcode. The plurality of registration codes is stored in the stem server in advance in correspondence to the passcode. Each of the plurality of peripheral devices includes a plurality of components. At least one of the plurality of components is a chip including at least one chip identification device. The chip identification devices of the plurality of peripheral devices are different from each other. The chip identification device sends a different output signal to the stem server. The output signal is generated using physical randomness of the chip identification device according to the respective one of the at least one passcode received from the stem server. The stem server compares the output signal with the list of the plurality of registration codes, and then determines the validity of the peripheral device. The chip identification device includes a plurality of identification cells. The plurality of identification cells is semiconductor device cells which are made simultaneously in a same manufacturing process with the at least one chip. Each of the at least one chip includes at least one module area. The plurality of identification cells is distributed in one or more of the at least one module area. An address of each of the plurality of identification cells is defined by a first plurality of word lines and a first plurality of bit lines. The first plurality of word lines and the first plurality of bit lines form the one or more of the at least one module area. Each of the plurality of identification cells electrically outputs at least a first value and a second value in response to a predetermined electrical input, and includes at least two terminals. If an electric current flowing between the at least two terminals with regard to a read voltage of the predetermined electrical input has a higher value than a value of a first threshold current, then the first value is regarded as being output. If the electric current has a lower value than a value of a second threshold current, then the second value is regarded as being output. The value of the first threshold current is higher than the value of the second threshold current. If the electric current has a value higher than the value of the second threshold current and lower than the value of the first threshold current, then a third value is regarded as being output. The address of each of the plurality of identification cells outputting the third value is stored in a part of an inner memory of the peripheral device.

In another embodiment of the invention, a network of electronic appliances includes a plurality of network units of electronic appliances having a first network unit and a plurality of second network units. The first network unit is connected to at least one of the plurality of second network units in a topology. Each of the plurality of network units includes a stem server and a plurality of peripheral devices connected to the stem server. In the first network unit, the stem server includes at least one passcode and at least one list of a plurality of registration codes. Each list is associated to a respective one of the at least one passcode. Each of the plurality of registration codes of one list associating to one passcode corresponds to a respective one of the plurality of peripheral devices connecting to the stem server. In the first network unit, each of the plurality of registration codes is generated in response to a respective one of the at least one passcode using physical randomness of a respective one of the plurality of peripheral devices in correspondence to the passcode. The plurality of registration codes is stored in the stem server in advance in correspondence to the passcode. In the first network unit, each of the plurality of peripheral devices includes a plurality of components. At least one of the plurality of components is a chip including at least one chip identification device. The chip identification devices of the plurality of peripheral devices are different from each other. In the first network unit, the chip identification device sends a different output signal to the stem server. The output signal is generated using physical randomness of the chip identification device according to the respective one of the at least one passcode received from the stem server. In the first network unit, the stem server compares the output signal with the list of the plurality of registration codes, and then determines the validity of the peripheral device. In the first network unit, the chip identification device includes a plurality of identification cells, and the plurality of identification cells is semiconductor device cells which are made simultaneously in a same manufacturing process with the at least one chip. In the first network unit, each of the at least one chip includes at least one module area, and the plurality of identification cells is distributed in one or more of the at least one module area. In the first network unit, an address of each of the plurality of identification cells is defined by a first plurality of word lines and a first plurality of bit lines. The first plurality of word lines and the first plurality of bit lines form the one or more of the at least one module area. In the first network unit, each of the plurality of identification cells electrically outputs at least a first value and a second value in response to a predetermined electrical input, and includes at least two terminals. In the first network unit, if an electric current flowing between the at least two terminals with regard to a read voltage of the predetermined electrical input has a higher value than a value of a first threshold current, then the first value is regarded as being output. If the electric current has a lower value than a value of a second threshold current, then the second value is regarded as being output. In the first network unit, the value of the first threshold current is higher than the value of the second threshold current. In the first network unit, if the electric current has a value higher than the value of the second threshold current and lower than the value of the first threshold current, then a third value is regarded as being output. In the first network unit, the address of each of the plurality of identification cells outputting the third value is stored in a part of an inner memory of the peripheral device.

The present invention may propose a new chip identification the method, and can then reduce the risk that the chip identification is manipulated by stealing the identification codes.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 84 illustrates an example of the correspondence between address and data of the identification cell.

Figure 1:
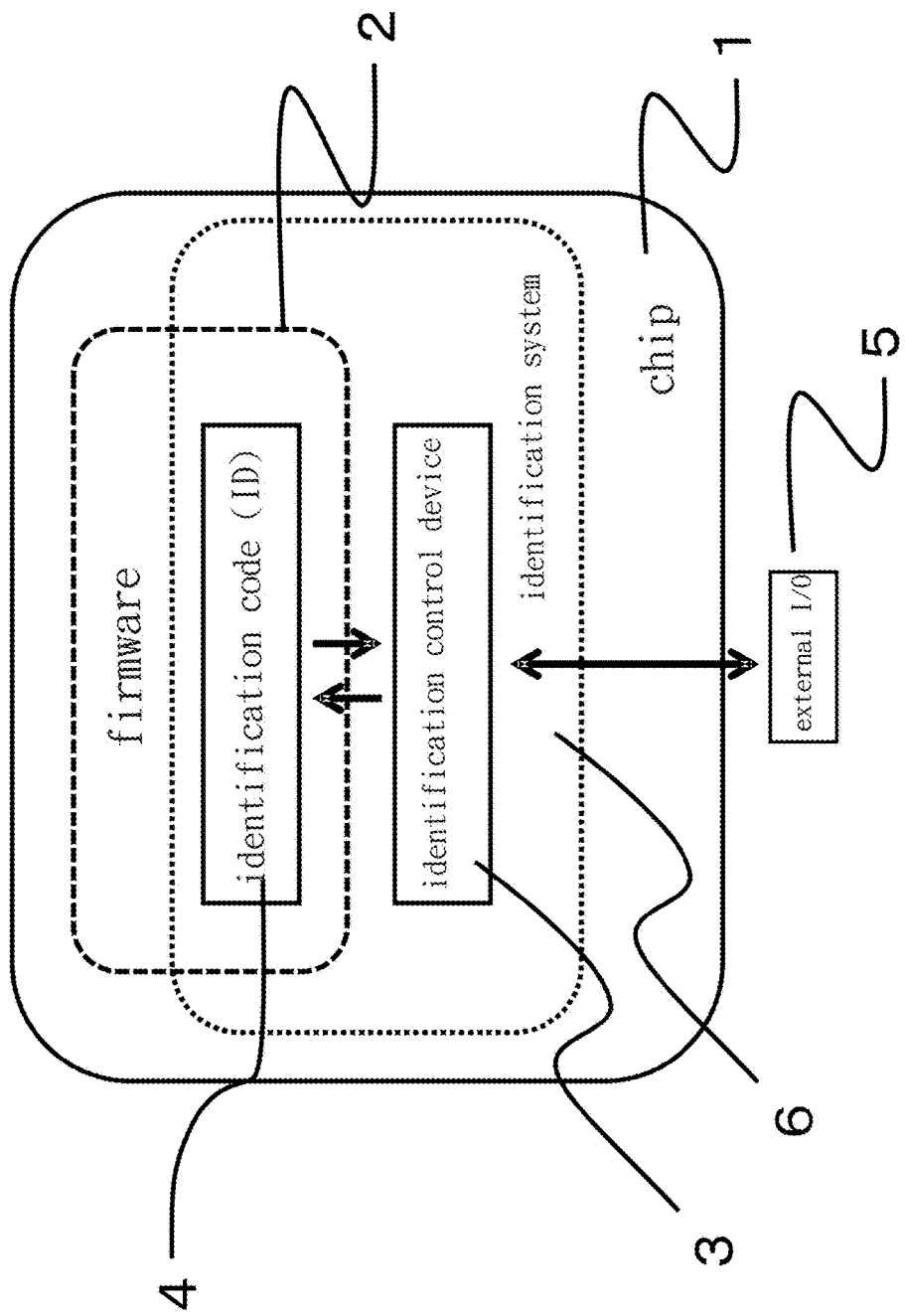
FIG. 1 illustrates an example of a chip having a conventional identification system.

In the various figures of the drawings, the same numerals designate the same or similar parts. Furthermore, when the terms "first", "second", "third", "fourth", "fifth", "sixth", "top", "bottom" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

FIG. 1 is an illustration explaining a typical chip identification system of the prior art. The identification control device 3 realizing the function of a chip 1 is permitted to read an identification code (ID) 4 involved in firmware 2 at convenience. For example, the identification control device 3 in the chip 1 refers to the identification code 4 in response to an external I/O 5, and thus appeals that the chip 1 is a certificated peripheral device. However, this is the appeal and not the proof. As mentioned above, it is because another chip can take the place of the chip 1 by stealing the identification code 4 of the chip 1.

Figure 2:
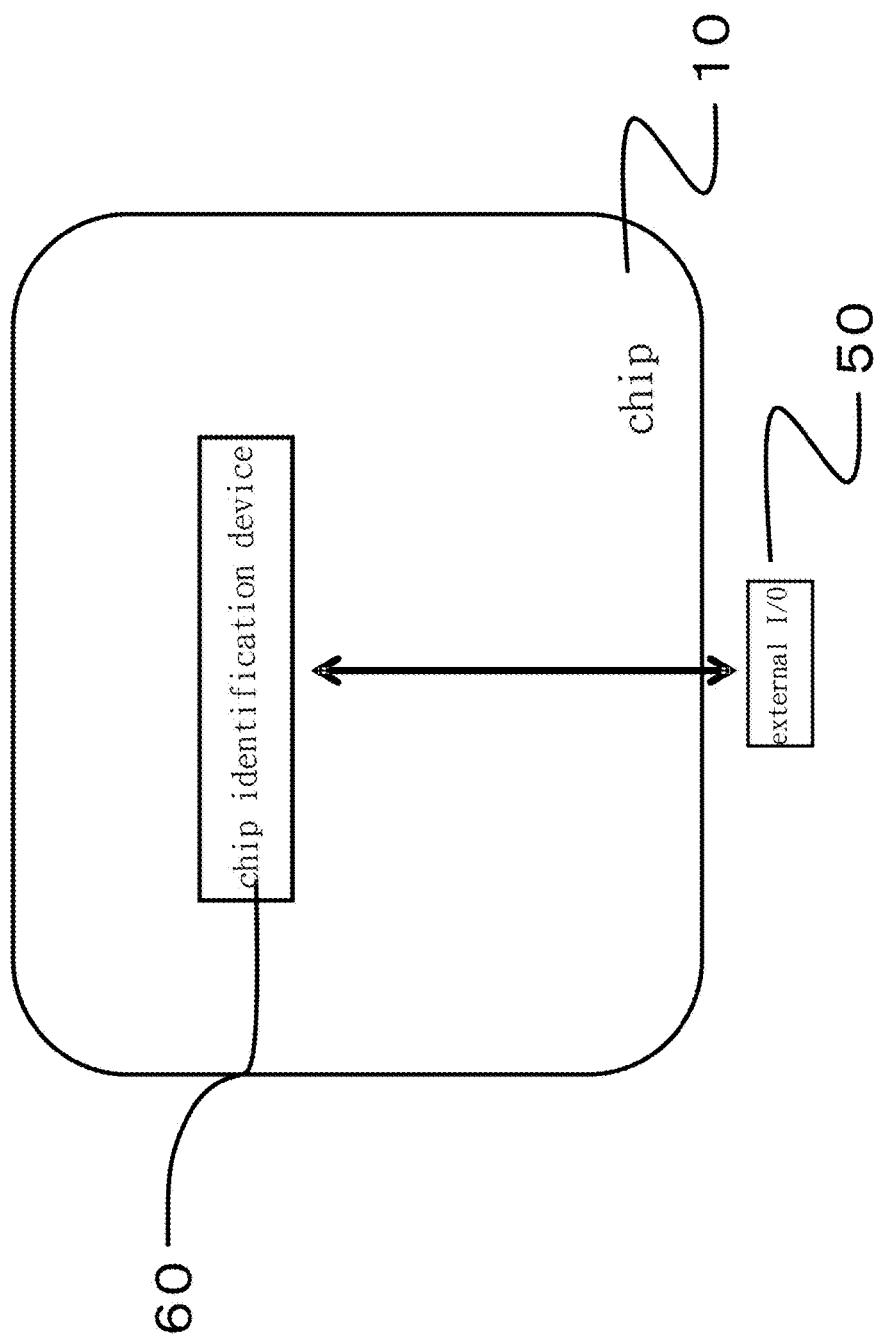
FIG. 2 illustrates an example of a chip having the chip identification device of the present invention.

As illustrated in FIG. 2, the identification system 6, comprising the identification code 4 and the identification control device 3, is replaced by a chip identification device 60 in the present invention. The chip identification device 60 generates an output every time when receiving the call (input signal) from the external I/O 50. The generated output signal is made by using physical randomness. Moreover, a different output signal is generated by a different input signal.

Figure 3:
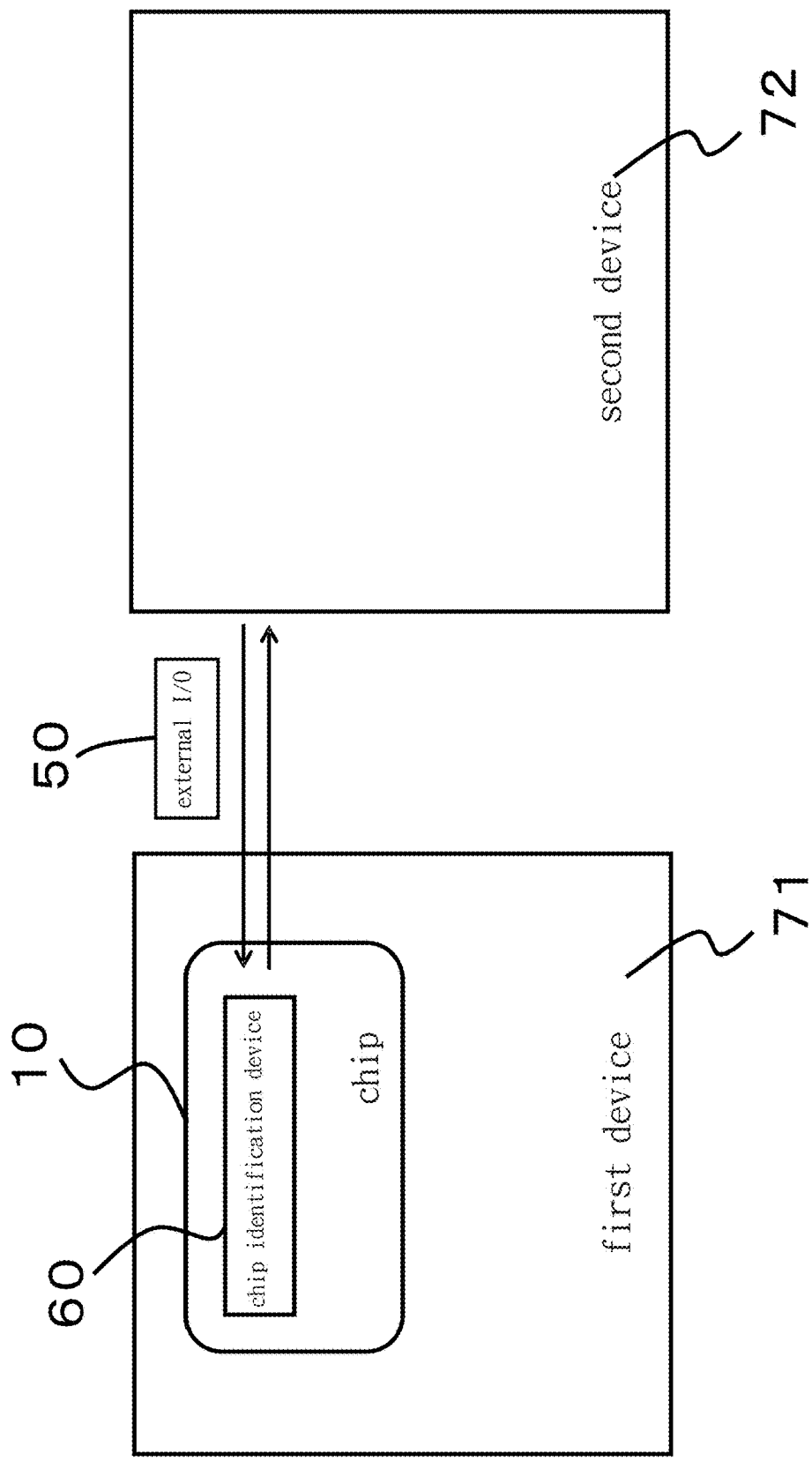
FIG. 3 illustrates an example of the method to connect devices involving the chip equipped with the chip identification device of the present invention.

Refer to the case that, as illustrated in FIG. 3, a first device 71 involving a chip 10 having the chip identification 60 exchanges data (communicates) with a second device 72 via an external I/O 50.

Figure 4:
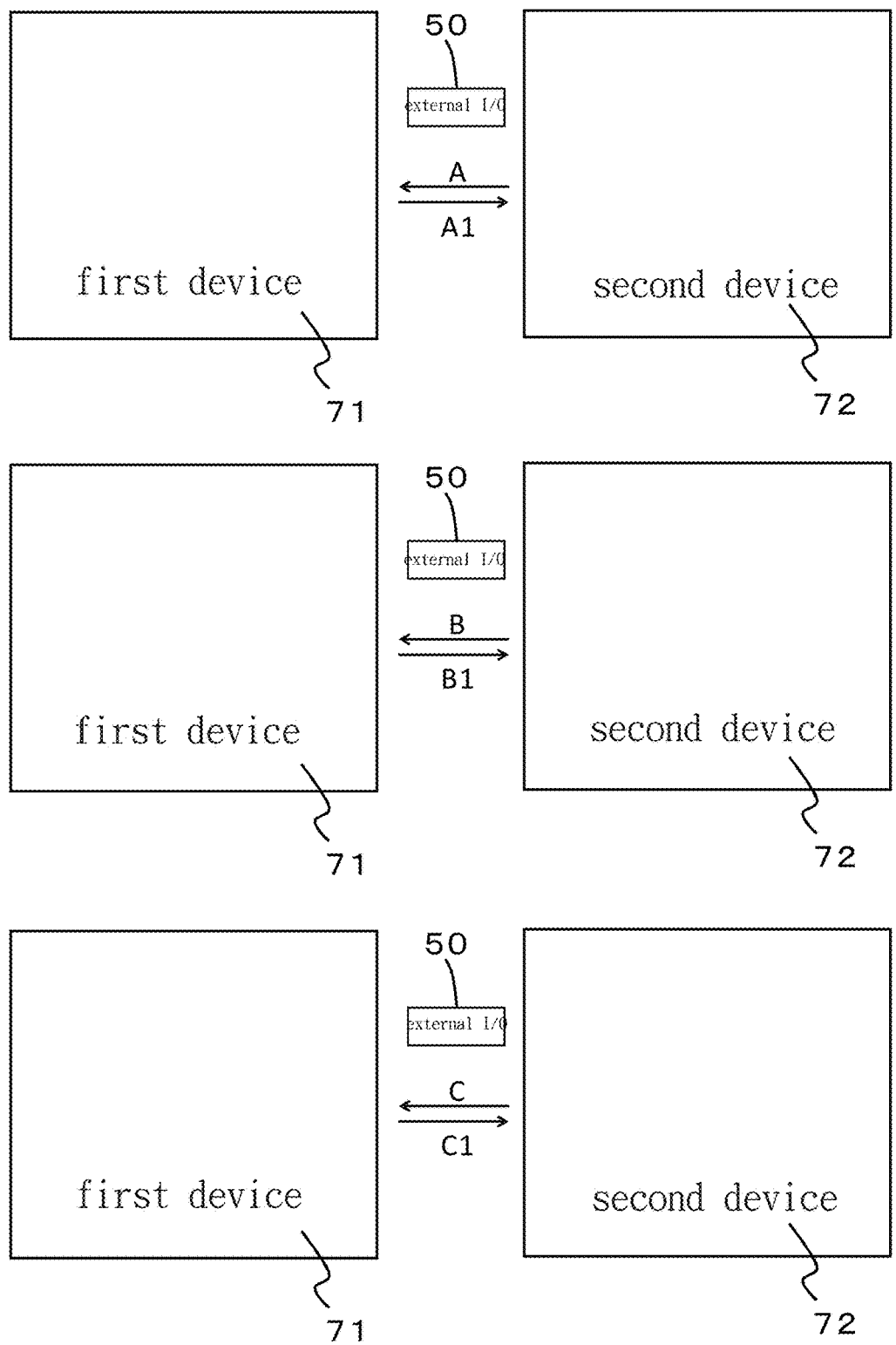
FIG. 4 illustrates an example of communication to exchange signals via external I/O.
Figure 5:
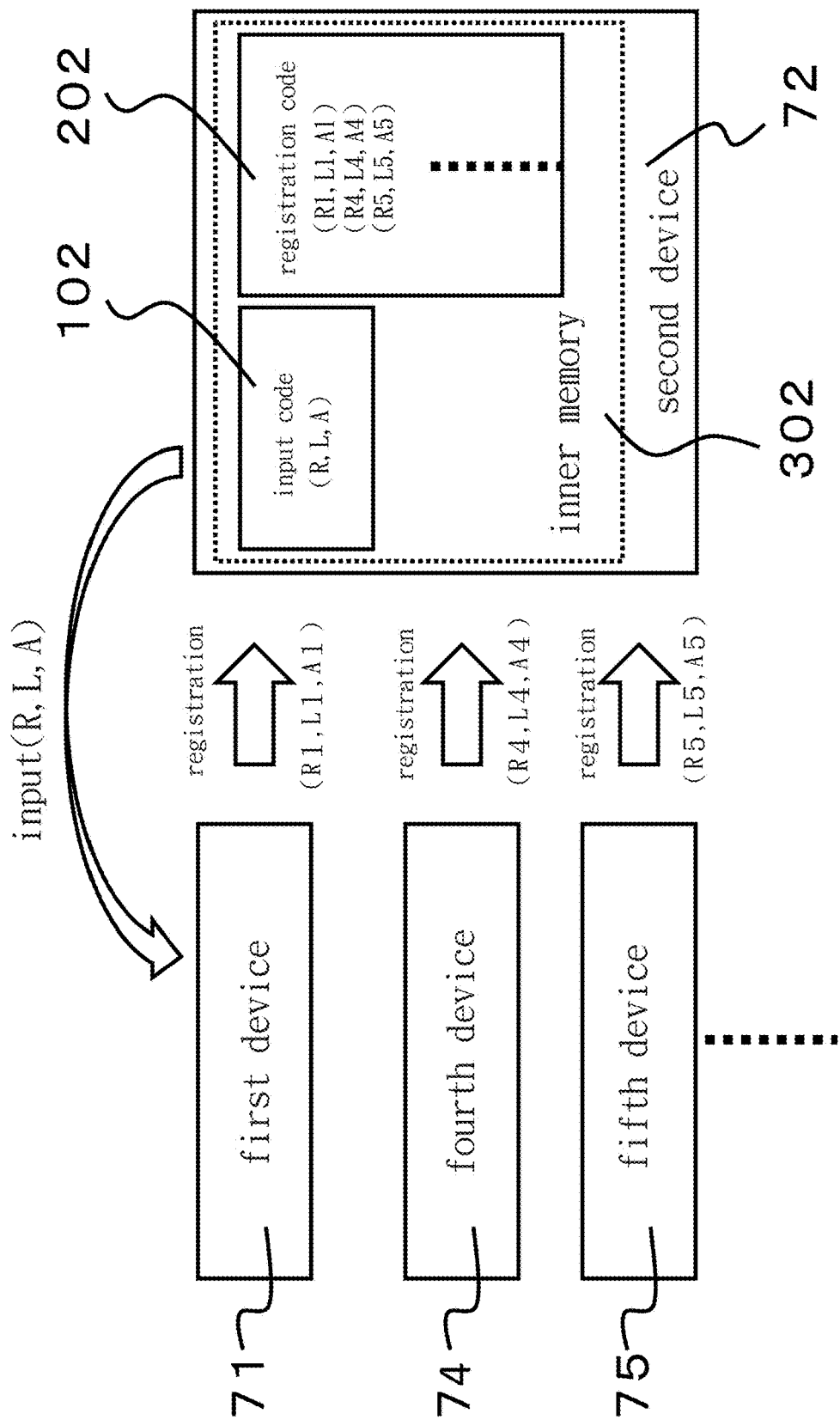
FIG. 5 illustrates an example of the method to register devices involving the chip equipped with the chip identification device of the present invention into the device connected to the chip identification device of the present invention.

As illustrated in FIG. 4, in order to recognize the first device 71 connected to the second device 72 with a certain method, the second device 72 gives signal A, signal B, signal C, . . . to the chip identification device 60 involved in the first device 71 as input code via the external I/O 50. The chip identification device 60 returns signal A1, signal B1, signal C1 . . . to the second device 72 via external I/O 50, respectively. Here note, the second device 72 regards the first device 71 as a device returning the output signal A1 in reply to the input signal A output signal B1 in reply to the input signal B, the output signal C1 in reply to the input signal C, etc. The communication series is, in this event, expressed as A, B, C . . . A1, B1, C1, etc. Alternately, in another event, the second device 72 regards the first device 71 as a device returning the output signal F1 in reply to the input signal F, the output signal A1 in reply to the input signal A output signal K1 in reply to the input signal K, etc. The communication series is thus expressed as F, A, K . . . F1, A1, K1, etc. However, it is not necessary to perform such a communication in reply to any possible input signal. Since the pattern of the input signal is limitless, it makes nonsense to perform such a communication in reply to any possible input signal. Moreover, since the number of the input patterns is limitlessly large, it may be useful to connect a limitless number of devices to the second device 72 via the network. In other words, at the first time that the first device is connected to the second device, the second device registers the first device. It is preferable that this registration is performed by a regular user of the second device or a person authorized by a regular user of the second device. For example, as illustrated in FIG. 5, the input code 102 (R, L, A), which is voluntarily selected at the registration, and the pattern of the output signal (R1, L1, A1) returned from the first device are stored by an inner memory 302 of the second device. Thus, the communication series is expressed as (R, L, A: R1, L1, A1). More concretely, since the number of devices that can be connected to the second device is limitless, it may be preferable to fix the input code 102. In this event, (R1, L1, A1) is regarded as the communication series corresponding to the first device instead of (R, L, A: R1, L1, A1). In the example of FIG. 5, the first device 71, the fourth device 74, and the fifth device 75 are registered to the second device 72. For example, in reply to the input code (R, L, A), the fourth device returns the output code (R4, L4, A4) to the second device 72. In reply to the input code (R, L, A), the fifth device returns the output code (R5, L5, A5) to the second device 72.

Figure 6:
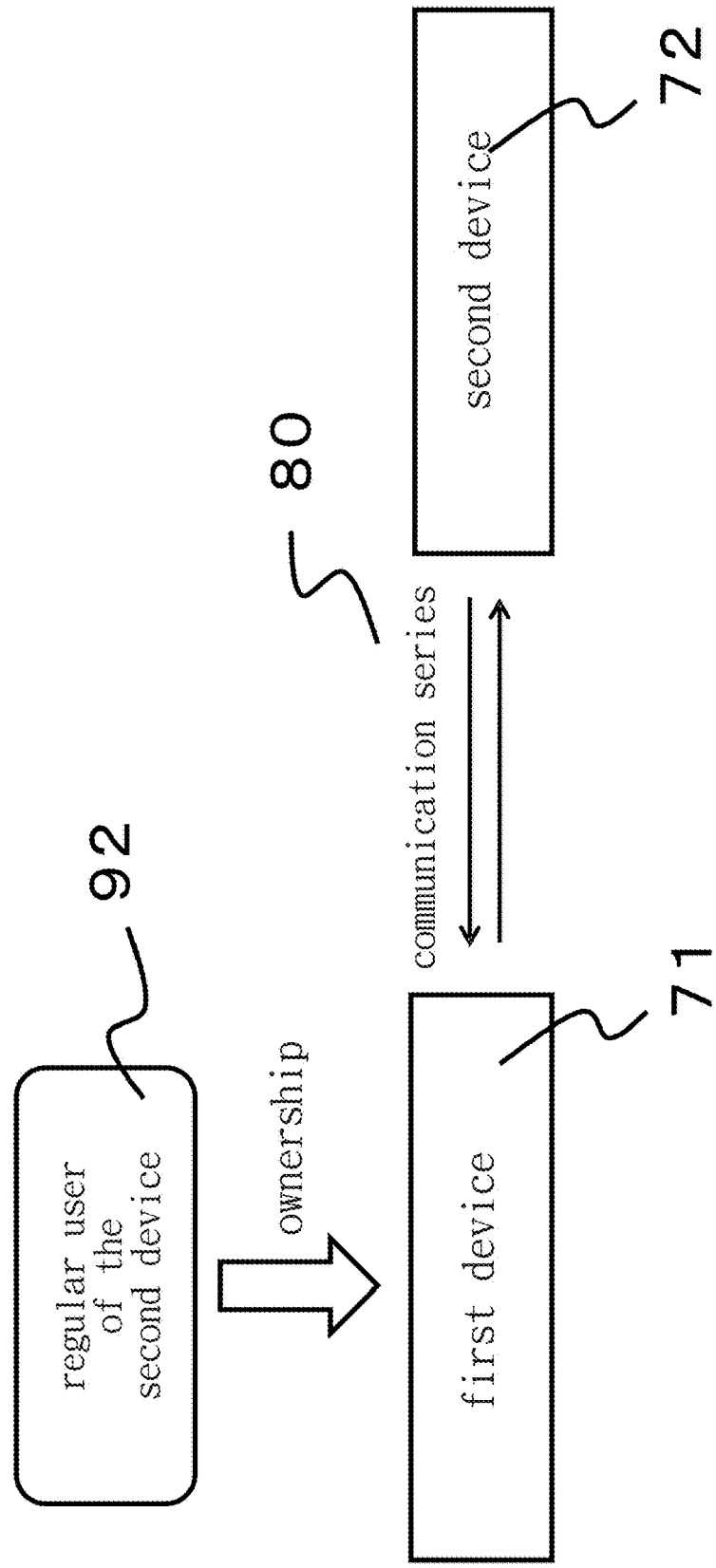
FIG. 6 illustrates an example of the method that a regular user uses a chip having the chip identification device of the present invention in the network.

In the example of FIG. 6, it is explained that a regular user 92 of the second device operates the second device 72 with the first device 71. The first device 71 and the second device 72 communicate with each other (connected) via the communication series 80, and then cooperate with each other for what the regular user 92 of the second device 72 aims to do. Here note that the regular user 92 of the second device 72 does not commit the communication series 80. If he commits the communication series 80, the management and the control of the second device 72 are made complicated, and, then, the usability of the IoT/IoE is substantially degraded. More concretely, when the second device 72 is connected to some external device via the network, the second device 72 may send input code 102 (R, L, A) to this external device. The second device 72 may check if the output code retuned from the external device coincides with one of registration codes 202, (R1, L1, A1), (R4, L4, A4), (R5, L5, A5). . . .

Figure 7:
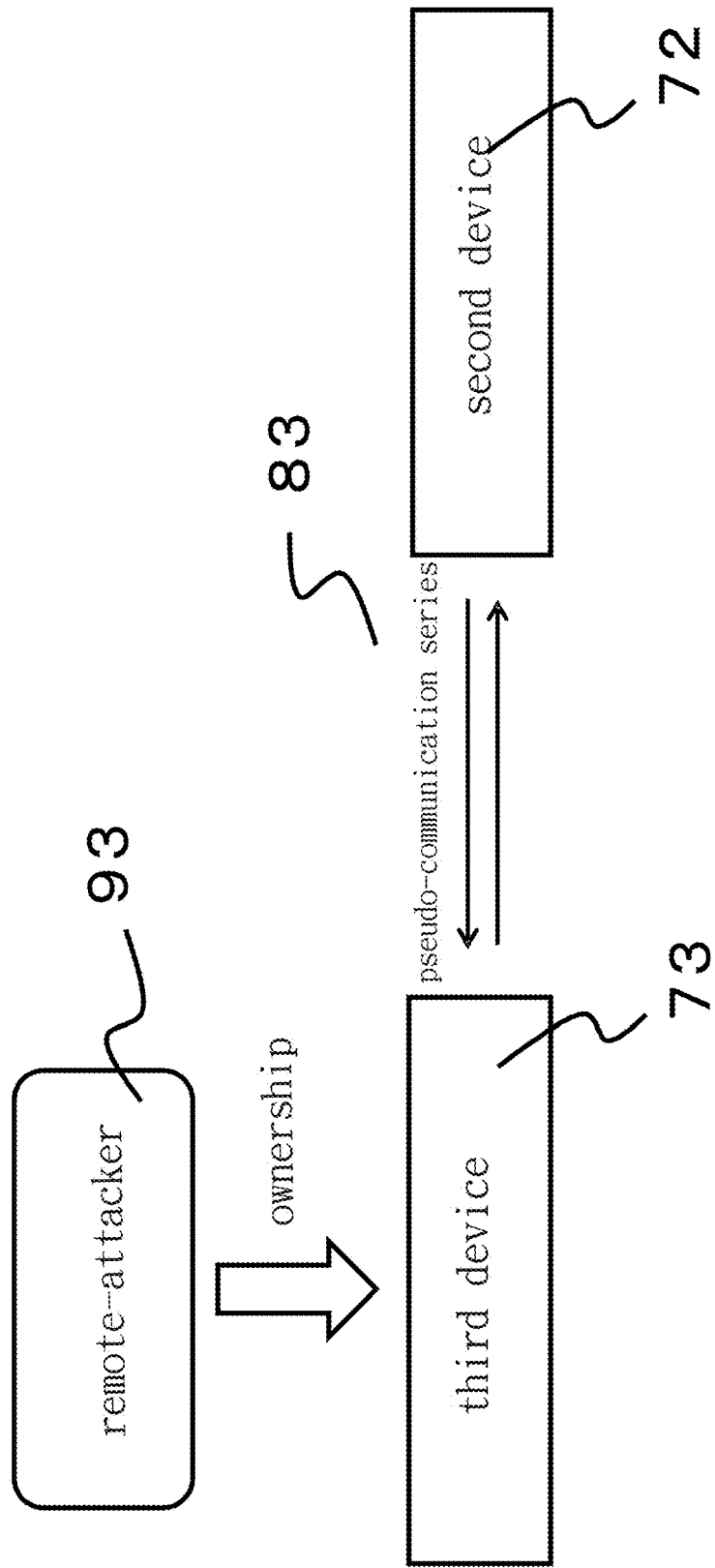
FIG. 7 illustrates an example of the method that a remote-attacker connects to the network irregularly.

As illustrated in FIG. 7, consider that the remote-attacker 93 replaces the first device 71 with the third device 73 that the remote-attacker 93 owns. The third device 73 must perfectly imitate the communication series 80 without using the chip identification device 60 embedded in the first device 71. It may be validated that if it is possible. If it is impossible, it may be concluded that the chip identification of the method of the present invention can defend the takeover of the devices. As the prerequisite, it is assumed that the remote-attacker 93 (who tries to replace the first device 71 with the third device 73) cannot take the first device 71 in his hand. This is a natural condition in IoT/IoE. That is, the takeover in IoT/IoE should be performed by the remote-control. The aim of the remote-attacker 93 is to remote-control the second device 72 using the third device 73 that owns in his hand. To pick up the first device 71 in his hand, he must go the place where there is the first device 71, regularly connected to the second device 72, and then take it over in secret. This means that the remote-attack is incomplete on the network. That is, it is impossible to remote-control the second device without being noticed by the user of the second device. When the third device 73 and the second device 72 are connected via the network, the second device gives the input signal (R, L, A . . .) to the third device 73 via the network, in order to recognize the third device 73 via the network. Suppose that the third device 73 returns the output signal (R3, L3, A3 . . .) to the second device 72 via the network, in this way, the pseudo-communication series 83 (R, L, A . . . :R3, L3, A3 . . .) is formed. That is, the remote-attacker 93 must be required to make the pseudo-communication series 83 perfectly coincident with the regular communication series 80, in this event, (R, L, A; R1, L1, A1). Here note, the series (R, L, A: R3, L3, A3), comprising the input code 102 (R, L, A) and the return (R3, L3, A3), are an example of the pseudo-communication series 83. If (R3, L3, A3) is coincident with (R1, L1, A1), then the remote-attacker 93 can replace the first device 71 with the third device 73 and can then succeed in the remote-attack. According to the example of FIG. 5, the remote-attacker 93 may make (R3, L3, A3) coincident with one of the registration codes 202 stored in the inner memory 302 of the second device 72.

In this way, it can be recognized that there are basically two methods of remote-attack. The first method is to steal the input code 102 and at least one of the registration codes, which are stored in the inner memory 302 of the second device 72. For example, suppose that the remote-attacker 93 succeeds in stealing the (R4, L4, A4) among the registration codes 202 and the input code 102 (R, L, A). In this event, the remote-attacker 93 may be able to remote-control the second device 72 illegally by replacing the fourth device 74 with the third device 73 that he owns. In a similar manner, suppose that the remote-attacker 93 succeeds in stealing (R1, L1, A1) among the registration code 202 and the input code 102 (R, L, A). In this event, the remote-attacker 93 may be able to remote-control the second device 72 illegally by replacing the first device 71 with the third device 73 that he owns. To protect the system from such a remote-attack, the system manager must strictly protect the inner memory 302 of the second device 72. In this way, it may be preferable that the devices, like the second device 72, having an inner memory in which input codes and registration codes are stored are always and strictly protected by trained experts with advance security technologies. Accordingly, the second device 72 is placed in the center of the network, plays a central role, and is under the central control by the security supervisor. The first method of the auto-attack is thus prevented. However, in the case that the number of devices connected to the network is more than a trillion, it may be actually impossible to strictly protect and manage the entire devices even while protecting the second device 72.

This clarifies the limitation of the central control. Then, the remote-attacker 93 may attack the devices which are connected to the second device 72 and are out of the central control, such as the first device 71, the fourth device 74, the fifth device 75 . . . in the example of FIG. 5. This is the second method of the remote-attack. However, the first device 71 does not store the pairs of the input code 102 and the registration code 202 (communication series 80) in the inner memory 302, even while they are stored as the identification code 4 in the inner memory in the prior art of FIG. 1. Similarly, other peripheral devices connected to the second device 72, such as the fourth device 74, the fifth device 75 and so on, do not store the communication series. Those peripheral devices (e.g., the first device 71, the fourth device 74, and the fifth device 75 . . . in the example of FIG. 5) involve chips having different chip identification devices, respectively.

Figure 8:
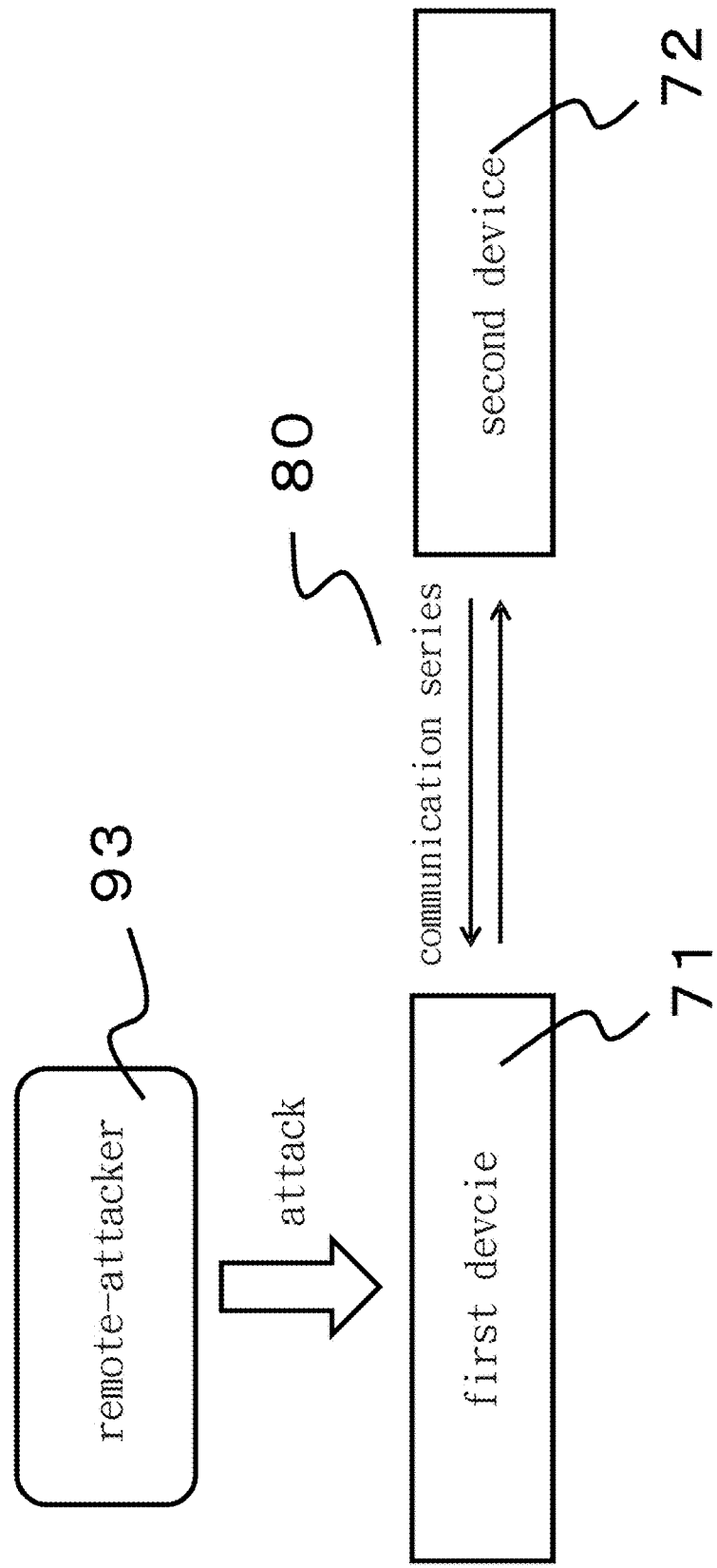
FIG. 8 illustrates an example of the method that a remote-attacker attacks the regular device.

Consider that the remote-attacker 93 attacks the first device 71, as illustrated in FIG. 8. First, the remote-attacker 93 tries to illegally access the inner memory of the first device 71 and then to steal the information related to the registration codes and the input codes (communication series 80). However, this attack must fail because the first device does not store such information. Next, the remote-attacker 93 may input a properly selected signal (X, Y, Z) to the first device 71, and may then receive (X1, Y1, Z1). If (X, Y, Z) different from the input code 102 (R, L, A) used by the second device 72. Then, the return (X1, Y1, Z1) must be different from the registration code 202 (R1, L1, A1). In this way, the second method of the remote-attack also fails. The problem here is that the signal set (X, Y, Z) properly selected by the remote-attacker 93 accidentally coincides with the input code 102 (R, L, A) stored in the inner memory 302 of the second device 72. To prevent such an accident, it is necessary that the number of the elements of input signal is large enough, and, in addition, the stored input signals must be non-disclosed to any others than the supervisor of the second device 72. Such information should be protected by the supervisor of the second device 72. Moreover, it may be often changed. If such a change is made, it is necessary that the devices connected to the second device 72 are re-registered. To reduce the frequency of such a change, the number of the elements of input codes should be as large as possible. In this way, the input codes play a role of passcode.

It is preferable that this input code is commonly used for inspecting the authentication ID to various peripheral devices. In this event, different input codes are not necessary to access different peripheral devices. Accordingly, the input code explained below may be called a "common passcode". Thus, the stem server holds at least one common passcode.

In the case that the second device 72 is a computer (personal computer, etc.), the first device 71, the fourth device 74, and the fifth device 75, which are connected to the second device 72, are peripheral devices to be used by connecting them to the computer. For example, they are a mouse, a keyboard, a microphone, and so on. As mentioned above, the substance of the computer should be protected responsibly by the supervisor with the advanced anti-virus software. The invention aims at preventing the peripherals (a mouse, a keyboard, a microphone, and so on) from being illegally replaced (hijacked), thus protecting the substance of the computer. In this way, it is possible to protect the peripherals that cannot be protected by the anti-virus software aiming to protect the substance of the computer.

Figure 9:
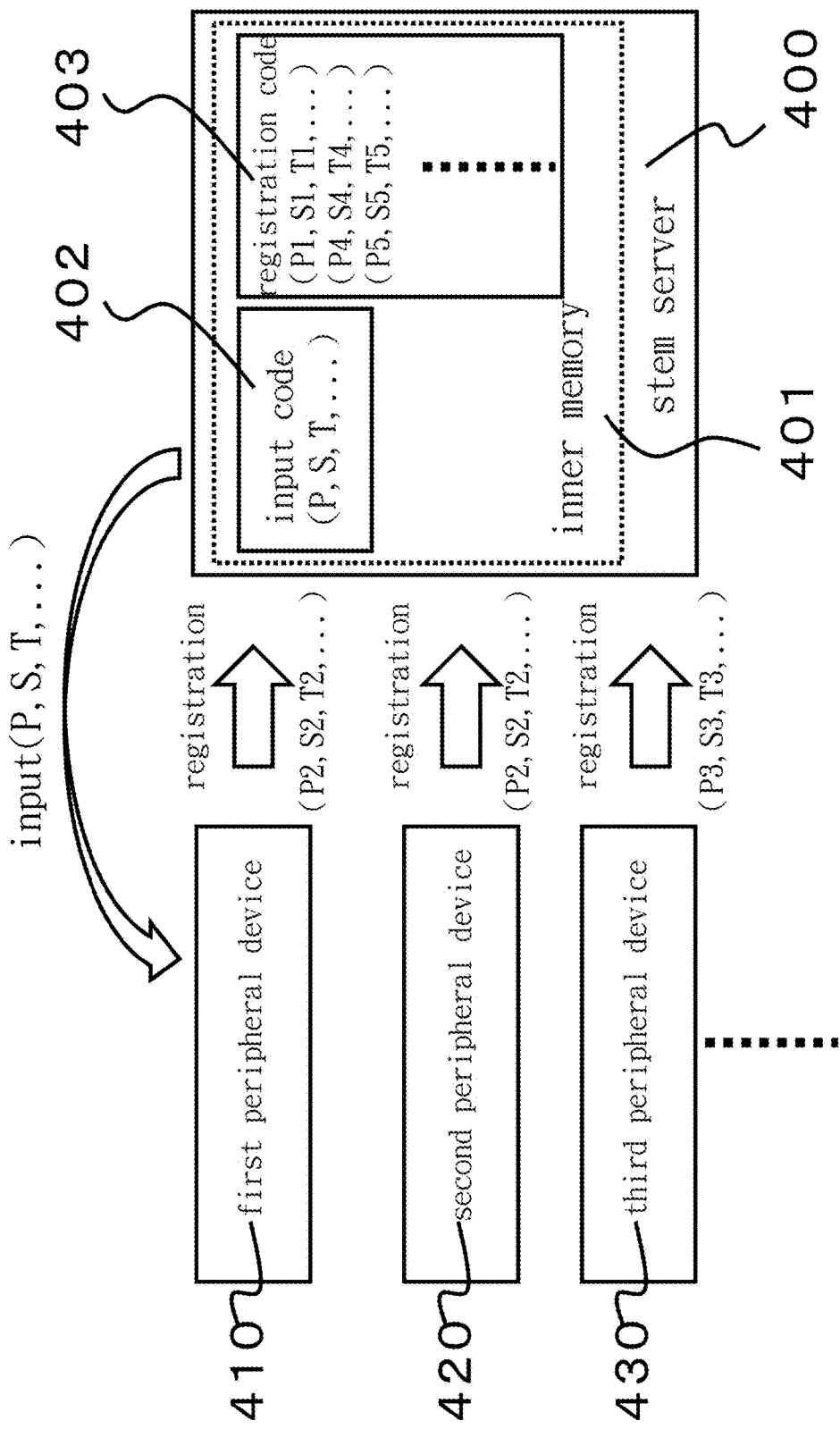
FIG. 9 illustrates an example of the method to connect peripheral devices having the chip identification device of the present invention to a stem server.

In the case that the second device 72 is a stem server playing a central role of the network service, the first device 71, the fourth device 74, and the fifth device 75, which are connected to the stem server, may be regarded as peripheral devices with respect to the stem server. FIG. 9 illustrates an example in which a first peripheral device 410, a second peripheral device 420, and a third peripheral device 420 are connected to a sole stem server 400 via the network. For example, the first peripheral device 410, the second peripheral device 420, and the third peripheral device 430 may be the terminals of the end users using this network service. For example, they may be smart phones, tablets, computational terminals, or remote-controllers of smart home appliances, operation panels of auto-driving cars, or other wearable terminals. As mentioned above, it is postulated that the stem server is protected responsibly by trained experts with the advanced security software. The invention aims at preventing the illegal access to the stem server with the illegal replacement of the end users' terminals (smart phones, tablets, computation terminals, other wearable terminals, and so on), that is, hijack. In this way, we can protect the entire system from the attack via a limitlessly large number of information terminals in the network, which cannot be protected even by trained experts with the advanced security software.

In the case that the second device 72 is a data center playing a central role of a cloud sensing service, the first device 71, the fourth device 74, and the fifth device 75 may be regarded as sensors to collect data to be required by this data center. There are a limitless number of sensors delivered in a large area. Accordingly, it may be actually impossible to protect all of them from the remote-attack with the central control. Examples of those sensors are GPSs, virus monitors, thermometers, earthquake recorders, socket-type devices of visible light communication, biosensors, every kind of smart meters, and so on. As mentioned above, it may be postulated that the data center is protected responsibly by trained experts with the advanced security software. The invention aims at preventing the illegal access to the data center by replacing the sensors (hijack). In this way, we can protect the limitless number of sensors used in cloud sensing from the remote-attack, which cannot be protected by trained experts with advanced security software.

It is noted as a feature of the present invention that the peripheral devices (e.g., the first peripheral device 410, the second peripheral device 420, and the third peripheral device 430) out of the central control do not store input codes like the common passcode and registration codes. Like this, it is characteristic that the network is divided into a "stem server" in which the data necessary to authentication communication (e.g., common passcode and/or registration codes) is stored, and the "peripheral devices" in which the authentication data is not stored. In addition, the "stem server" in which data necessary to authentication communication (e.g., common passcode and/or registration codes) is stored is under the central control and "peripheral devices" in which those authentication data is not stored have the chip identification devices of the present invention, respectively.

Figure 10:
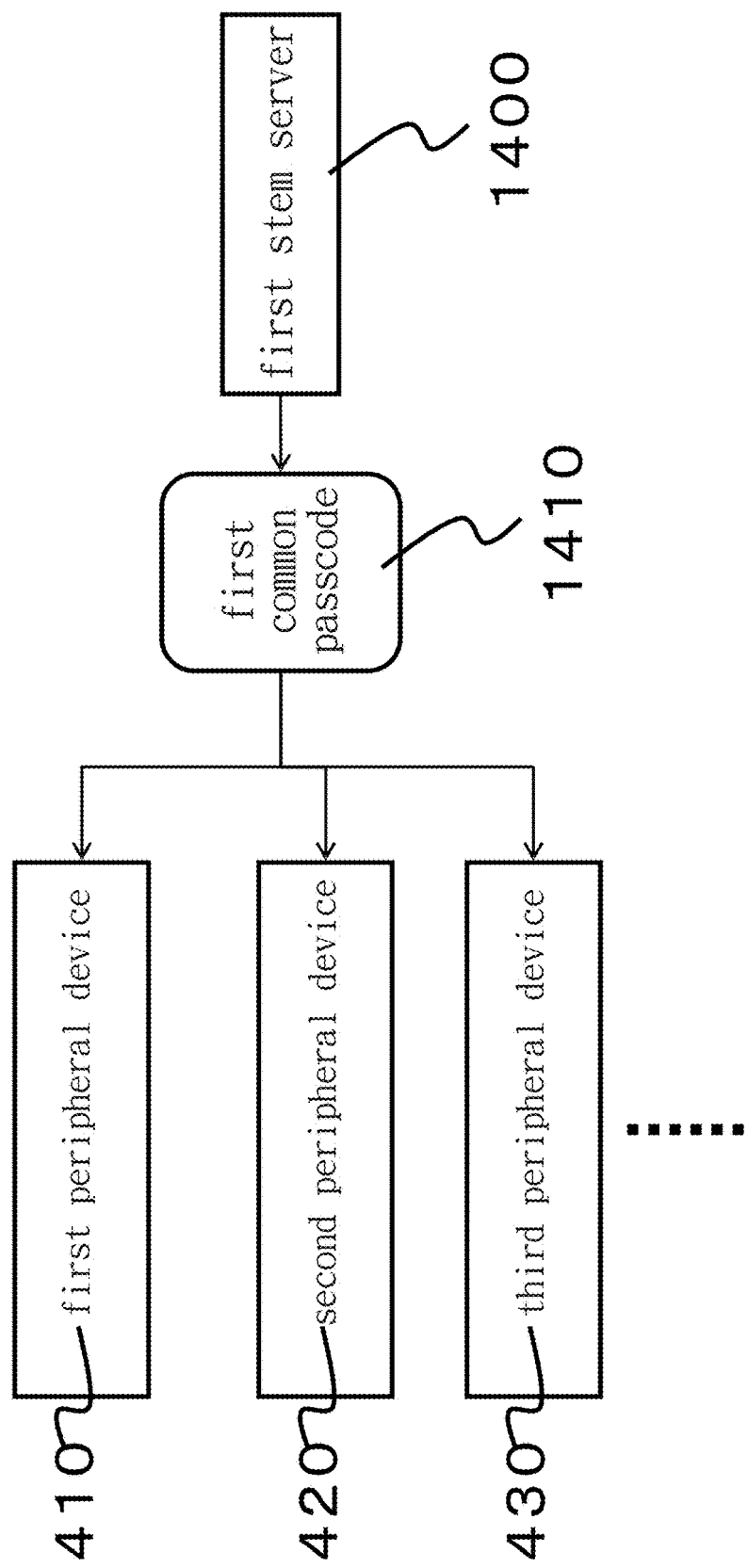
FIG. 10 illustrates an example of the method that the stem server sends a common passcode to peripheral devices equipped with the chip having the chip identification device of the present invention.
Figure 11:
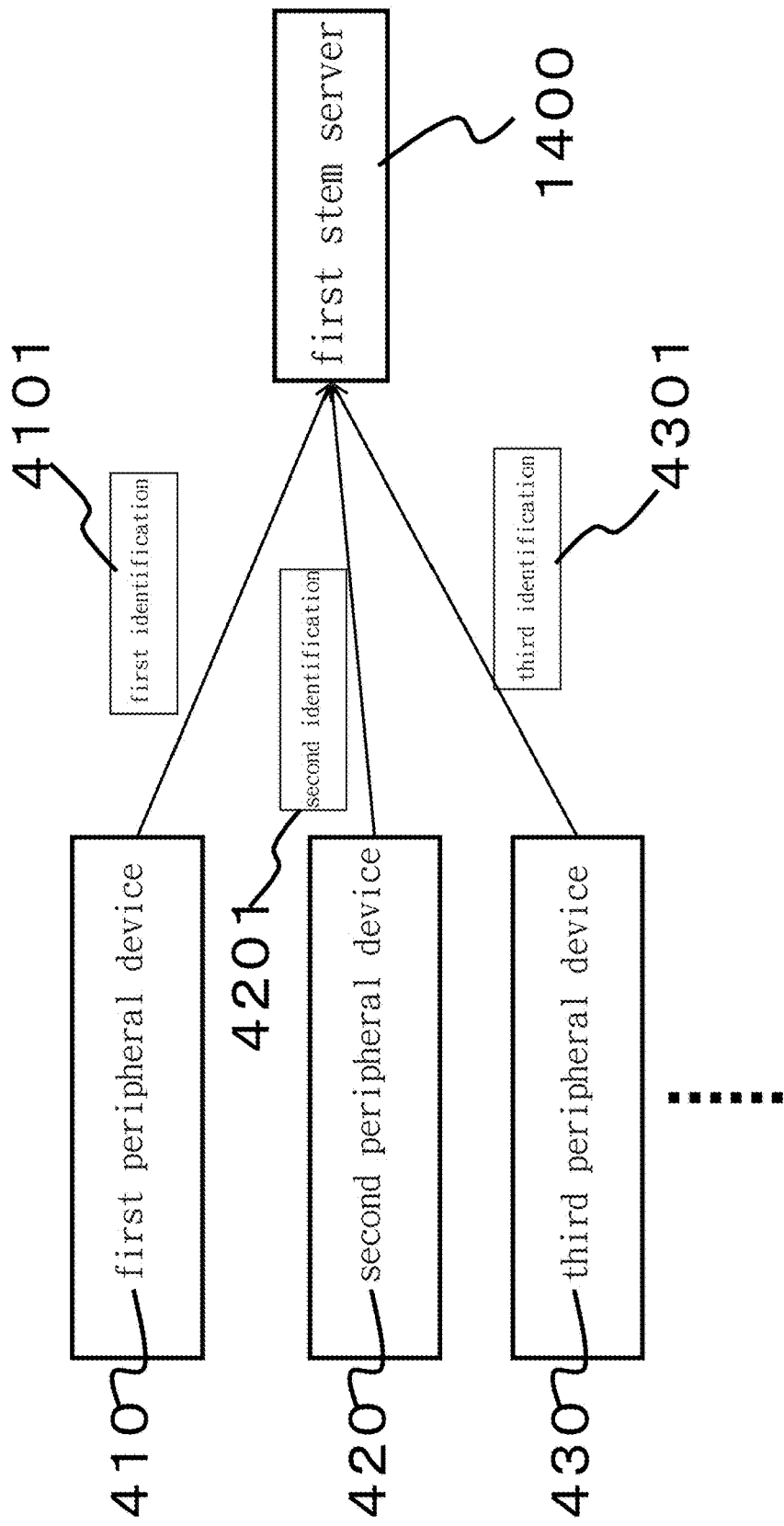
FIG. 11 illustrates an example of the method that the peripheral devices equipped with the chip having the chip identification device of the present invention sending identification codes to the stem server.
Figure 12:
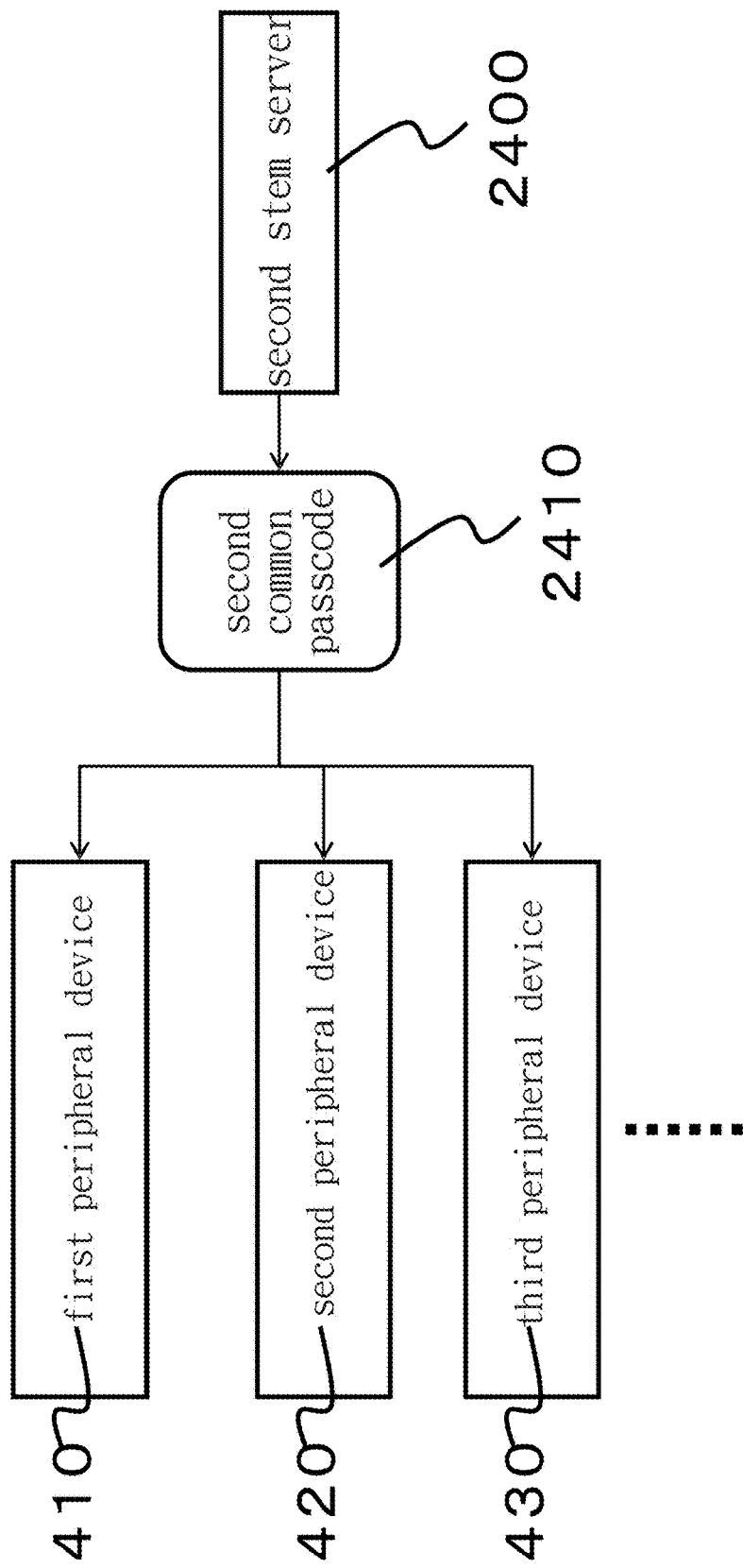
FIG. 12 illustrates an example of the method that the stem server sends a common passcode to the peripheral devices equipped with the chip having the chip identification device of the present invention.
Figure 13:
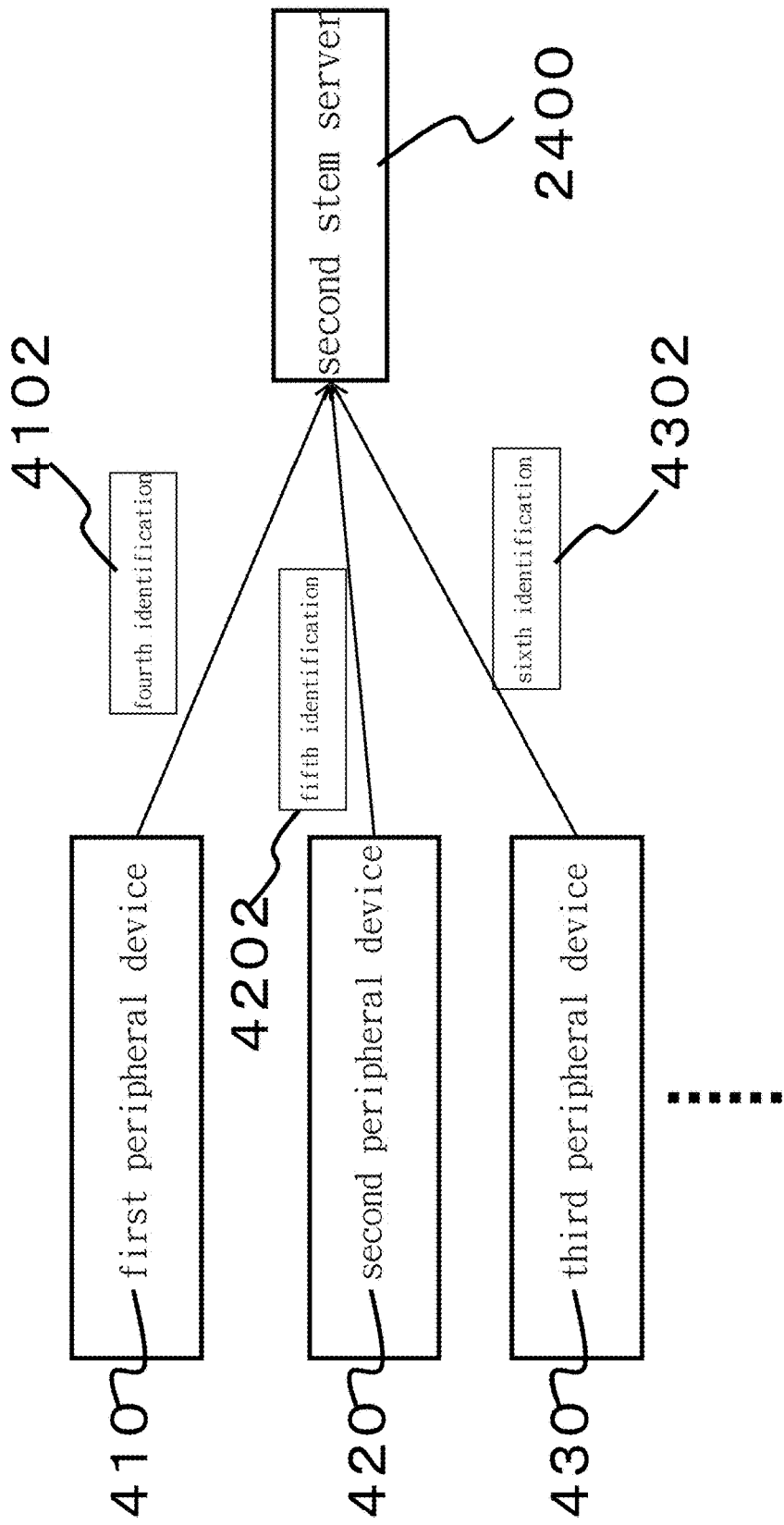
FIG. 13 illustrates an example of the method that the peripheral devices equipped with the chip having the chip identification device of the present invention sending identification codes to the stem server.

As illustrated in FIG. 10, at least one common passcode may be stored in the first stem server 1400, and then sent to peripheral devices when validating those peripheral devices. For example, the first stem server 1400 may send the first common passcode 1410 to the first peripheral device 410, the second peripheral device 420, and the third peripheral device 430. Those peripheral devices may regard the first stem server 1400 as "who sends the first common passcode 1410 to us". As illustrated in FIG. 11, with regard to the input of this first common passcode 1410, the first peripheral 410, the second peripheral device 420, and the third peripheral 430 may return the first identification 4101, the second identification 4201, and the third identification 4301 to the first stem server 1400, respectively. The first stem server 1400 may regard the first peripheral device 410, the second peripheral device 420, and the third peripheral device 430 as "who returns the first identification 4101, the second identification 4201, and the third identification 4301 with regard to the first common passcode 1410". In a similar way, as illustrated in FIG. 12, the second stem server 2400 may send the second common passcode 2410 to the first peripheral device 410, the second peripheral device 420, and the third peripheral device 430. Those peripheral devices may regard the second stem server 2400 as "who sends the second common passcode 2410 to us". As illustrated in FIG. 13, with regard to the input of this second common passcode 2410, the first peripheral 410, the second peripheral device 420, and the third peripheral 430 may return the fourth identification 4102, the fifth identification 4202, and the sixth identification 4302 to the second stem server 2400, respectively. The second stem server 2400 may regard the first peripheral device 410, the second peripheral device 420, and the third peripheral device 430 as "who returns the fourth identification 4102, the fifth identification 4202, and the sixth identification 4302 with regard to the second common passcode 2410". It is needless to say that the first common passcode 1410 and the second common passcode 2410 are different. Any two of the first identification 4101, the second identification 4201, the third identification 4301, the fourth identification 4102, the fifth identification 4202, and the sixth identification 4302 are different. In addition, it may be possible that the first stem server 1400 uses another passcode. This may be useful to improve the security control.

Figure 14:
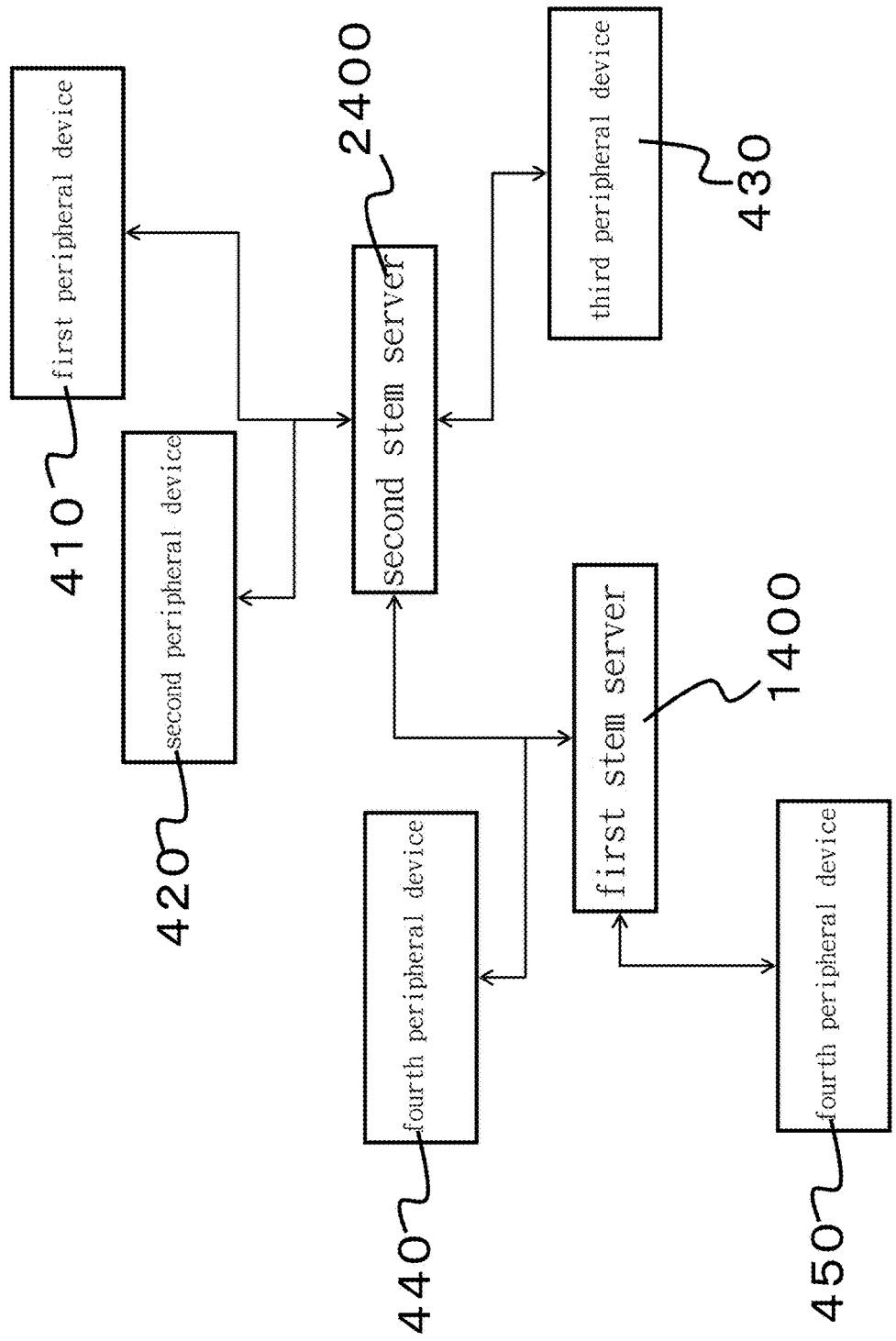
FIG. 14 illustrates an example of the network comprising a plurality of stem servers and a plurality of peripheral devices equipped with the chips having the chip identification devices of the present invention, with the network divided into a first network unit and a second network unit connected to each other in a topology, and with the topology comprising a stem server of the first network unit connecting to a stem server of the second network unit.

In an actual network, the number of peripheral devices is limitlessly large, and the number of stem servers may be more than one. For example, FIG. 14 illustrates an example of a network comprising two stem servers (the first stem server 1400 and the second stem server 2400) and five peripheral devices (the first peripheral device 410, the second peripheral device 420, the third peripheral device 430, the fourth peripheral device 440, and the fifth peripheral device 450). This network is divided into two network units (a first network unit and a second network unit) connected in a topology; one comprises the first stem server 1400 which is the center of the first network unit, the fourth peripheral device 440, and the fifth peripheral device; the other comprises the second stem server 2400 which is the center of the second network unit, the first peripheral device 410, the second peripheral device 420, and the third peripheral device 430. These network units are connected in the topology only between the first stem server 1400 and the second stem server 2400. Moreover, the fourth peripheral device 440 and the fifth peripheral device 450 are connected only to the first stem server 1400, while the first peripheral device 410, the second peripheral device 420, and the third peripheral device 430 are connected only to the second stem server 2400. The connection used here means the authentication connection in which electronic appliances are connected to each other by the above mentioned authentication operation, and different from the connection in a simple manner. From now on, to discuss about the network of electronic appliances, unless otherwise specifically noted, the term of connection is used as communication connection. Moreover, (communication) connection in this meaning involves the connection among devices (modules or chips) in a packaged system. A characteristic of the present invention is that the stem servers can be connected to each other, while any peripheral device cannot be connected to another peripheral device in the network comprising a plurality of stem servers and a plurality of peripheral devices. This is attributable to that peripheral devices out of central control do not store input data such as the common passcode and/or registration codes. Instead, peripheral devices can be indirectly connected to each other via the stem servers. For example, the first peripheral device 410 and the second peripheral device 420 can be indirectly connected to each other via the second stem server 2400. The fourth peripheral device 440 and the fifth peripheral device 450 can be indirectly connected to each other via the first stem server 1400. The third peripheral device 430 and the fourth peripheral device 440 can be indirectly connected to each other via the first stem server 1400 and the second stem server 2400. In this way, the present invention enables the resource of the central control to be concentrated on the stem servers.

As a concrete example of FIG. 14, there may be auto-driving cars and smart houses. For example, the network unit comprising the first stem server 1400, the fourth peripheral device 440, and the fifth peripheral device 450 may be a set of components to compose an auto-driving car. At the same moment, the network unit comprising the second stem server 2400, the first peripheral device 410, the second peripheral device 420, and the third peripheral device 430 may be a set of components to compose a smart house. In the case that the battery of the auto-driving car supplements the battery of the smart house at the time of disaster, for example, a sensor (e.g., the fourth peripheral device 440) is involved into the auto-driving car to monitor the battery status of the smart house. In this way, the fourth peripheral device 440 can be connected to both of the first stem server 1400 and the second stem server 2400.

Figure 15:
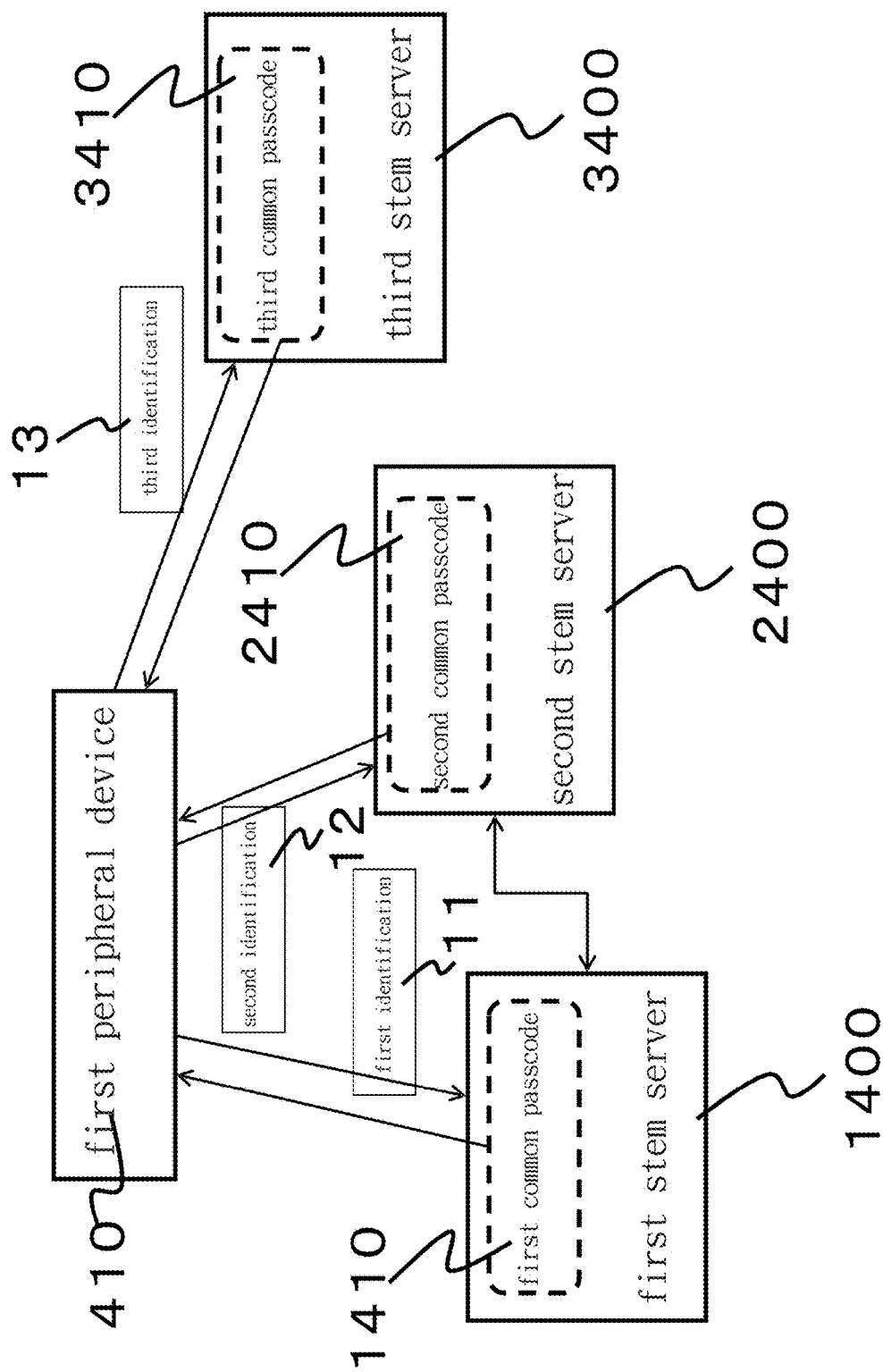
FIG. 15 illustrates an example in which the topology comprises at least one of the plurality of peripheral devices of the first network unit, with each of the at least one of the plurality of peripheral devices of the first network unit connecting to one or more of the stem servers of the second network units, respectively.

As illustrated in FIG. 15, it may be acceptable that the topology is a peripheral device (e.g., the first peripheral device 410) connected to a plurality of stem servers (e.g., the first stem server 1400, the second stem server 2400, and the third stem server 3400) in the network related to the present invention. This network is divided into three network units (a first network units and two second network units) connected in the topology. Among them, for example, the first stem server 1400 and the second stem server 2400 are directly connected, while neither the first stem server 1400 nor the second stem server 2400 is directly connected to the third stem server 3400. It is noted here that none proves that the third stem server 3400 is not a remote-attacker. Thereby, it is important not to store data related to authentication (common passcode and/or registration codes) in the first peripheral device 410. For example, the first peripheral device 410 is registered to the first stem server 1400 at the first time. Then, the first stem server 1400 is able to control the subsequent registration that the first peripheral device 410 will be registered by another stem server after the first registration. It is because the external I/O (e.g., the external I/O controlling circuit 980 in FIG. 80) of the first peripheral device 410 may send the received entire signals to the first stem server 1400. In this way, the first stem server 1400 may be able to monitor the entire inputs to the first peripheral device 410. Here, if the code equivalent to the first passcode 1410 is found, the emergency treatment may be made. For example, the first stem server 1400 terminates the connection to the first peripheral device 410, that is, excludes the first peripheral device 410. Alternately, the first peripheral device 410 is used only to monitor the operation of the remote-attacker. In the case that the second stem server 2400 registers the first peripheral device 410 after the first registration of the first stem server 1400, the second stem server 2400, in advance, may apply the permission of the registration of the first peripheral device 410 to the first stem server 1400. To do this, it is necessary that the first stem server 1400 and the second stem server 2400 are directly connected. If the first stem server 1400 permits the second stem server 2400 to register the first peripheral device 410, the first peripheral device 410 may receive the second common passcode 2410 and then return the second identification 12 to the second stem server 2400. In this way, the second stem server 2400 may register the first peripheral device 410. After that, the second stem server 2400 and the first peripheral device 410 can be connected without the permission of the first stem server 1400. Next, for the third stem server 3400 to connect the first peripheral device 410, the first stem server 1400, or the first stem server 1400 and the second stem server 2400, in advance, may be required to permit the first peripheral device 410 to receive the third common passcode 3410. In this way, the first stem server 1400, or the first stem server 1400 and the second stem server 2400, holds the authority to control the connection between the third stem server 3400 and the first peripheral device 410. In the case that an unauthorized input code is input to the first peripheral device 410, they may refuse the connection or control the connection. The execution of this authority may be made or managed by the supervisor of the first stem server 1400 or the supervisors of the first stem server 1400 and the second stem server 2400.

The first stem server 1400 holds the first common passcode 1410, the second stem server 2400 holds the second common passcode 2410, and the third stem server 3400 holds the third common passcode 3410. That is, the first peripheral device 410 regards the first stem server 1400 as "who inputs the first common passcode 1410", the second stem server 2400 as "who inputs the second common passcode 2410", and the third stem server 3400 as "who inputs the third common passcode 3410". With regard to those inputs, the first stem server 1400 regards the first peripheral device 410 as "who returns the first identification 11", the second stem server 2400 regards the first peripheral device 410 as "who returns the identification 12", and the third stem server 3400 regards the first peripheral device 410 as "who returns the identification 13". It should be noted here that the data related to the authentication of the communication (common passcodes, identification code returned in reply to common passcode, and so on) is stored in the stem server rather than in peripheral devices. The chip identification device of the present invention is adopted to the peripheral devices.

Subsequently, the requirements that the chip identification of the present invention should satisfy is described below.

Figure 16:
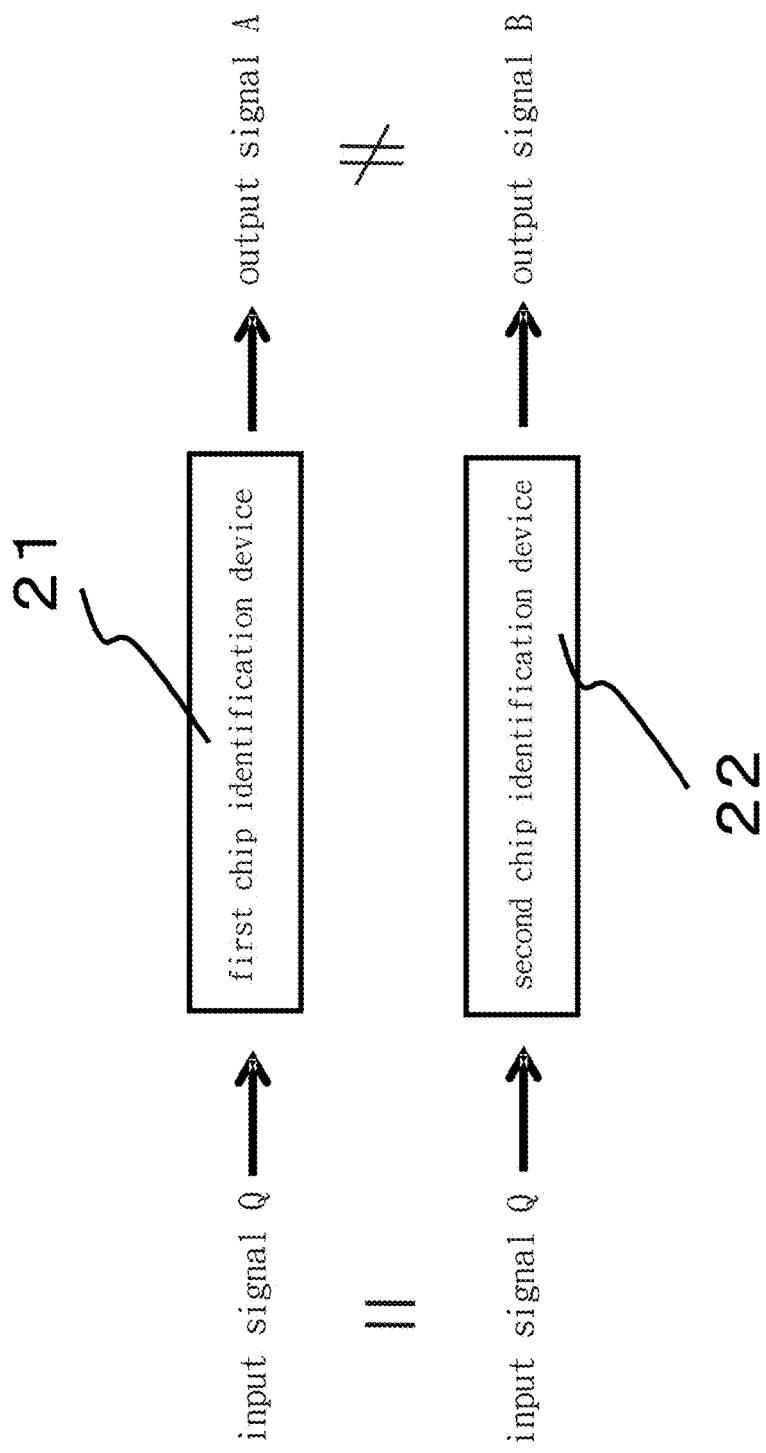
FIG. 16 illustrates an example of the property of output independence which the chip identification device of the present invention should satisfy.

First, the same input signal (Q) is input to two different chip identification devices (21 and 22), as illustrated in FIG. 16. The first chip identification device 21 outputs the output signal A, and the second chip identification device 22 outputs the output signal B. In this event, the output signal A and the output signal B are different. The output signals, thus, may be different as long as the chip identification devices are different, even while the input signal is the same. This feature is necessary to the examples of using the common passcode (FIG. 10-FIG. 13). Even though the same input signal is input to two different chip identification devices, the output signals to be output from those different chip identification devices should be different. For example, as illustrated in FIG. 10, the first common passcode 1410 is input to the first peripheral device 410, the second peripheral device 420, and the third peripheral device 430, which may embed different chip identification devices, respectively. The output signals to be output from those peripheral devices, as illustrated in FIG. 11, are the first identification 4101, the second identification 4201, and the third identification 4301, respectively. It is noted here that any two among the first identification 4101, the second identification 4201 and the third identification 4301 are different from each other. FIG. 12 and FIG. 13 are explained in a similar manner.

Figure 17:
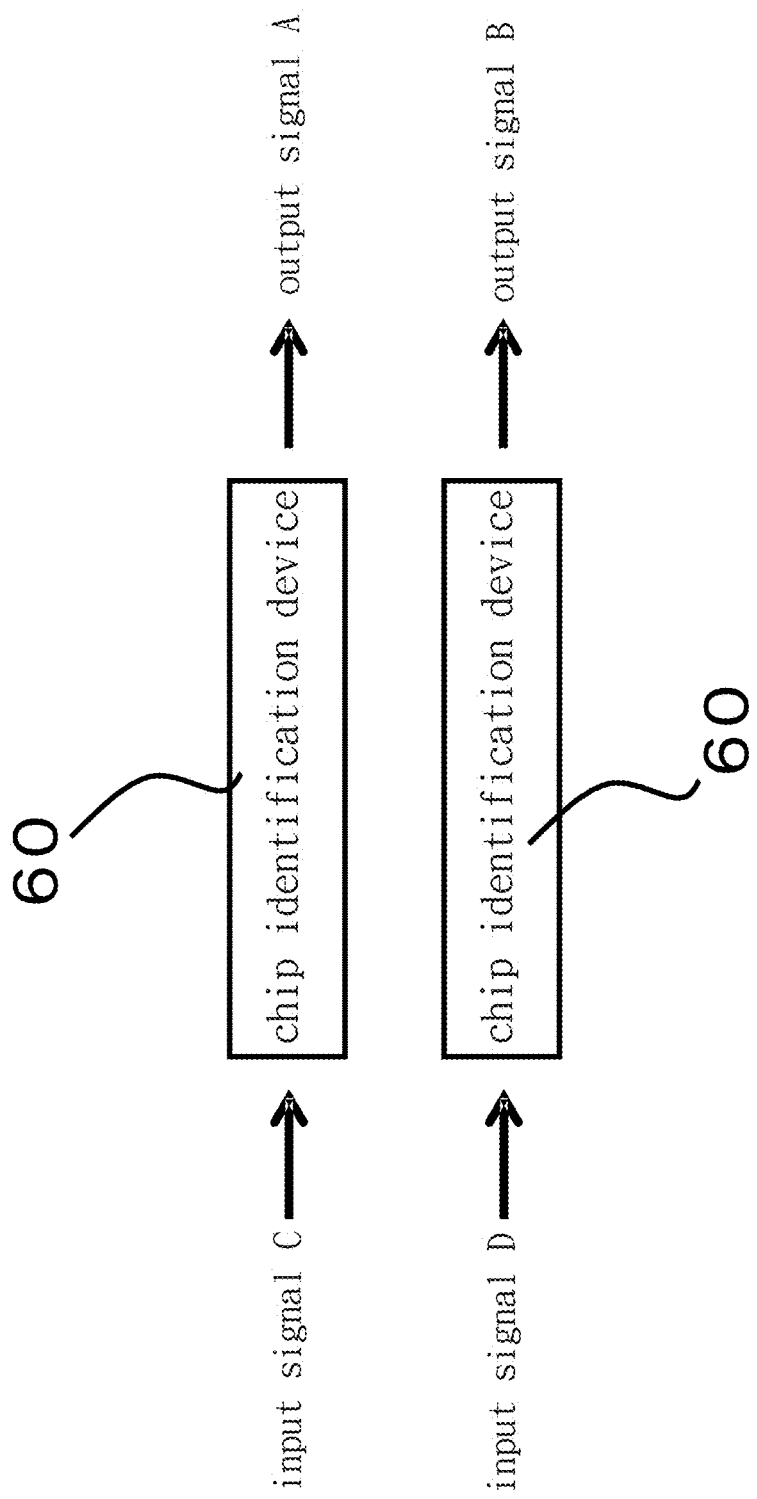
FIG. 17 illustrates an example of the property of input independence which the chip identification device of the present invention should satisfy.

On the contrary, if different input signals are input to a same chip identification device, then the outputs are different with regard to the input signals. For example, as illustrated in FIG. 17, if the input signal C is input to the chip identification device 60, then the output signal A is output. If the input signal D is input to the chip identification device 60, then the output signal B is output. It is noted here that the output signals A and B are different as long as the input signals C and D are different. This feature is necessary, as illustrated in FIG. 15, in order that different stem servers input different passcodes to a same peripheral device, respectively, and then receive different identifications, respectively, as output signals from the said peripheral device. More concretely, the first stem server 1400 inputs the first common passcode 1410 to the first peripheral device 410, and then the first peripheral device 410 outputs the first identification 11 to the first stem server 1400. The second stem server 2400 inputs the second common passcode 2410 to the first peripheral device 410, and then the first peripheral device 410 outputs the second identification 12 to the second stem server 2400. The third stem server 3400 inputs the third common passcode 3410 to the first peripheral device 410, and then the first peripheral device 410 outputs the third identification 13 to the third stem server 3400. It is not necessary to say that any two of the above identifications 11, 12, and 13 are different from each other.

That is, FIG. 14 is an example of network structures satisfying both the properties: the input independency and output independency. Actually, the number of stem servers may be more than two, and the number of peripheral devices may be more than five. FIG. 14 is a simplest example and not more.

Figure 18:
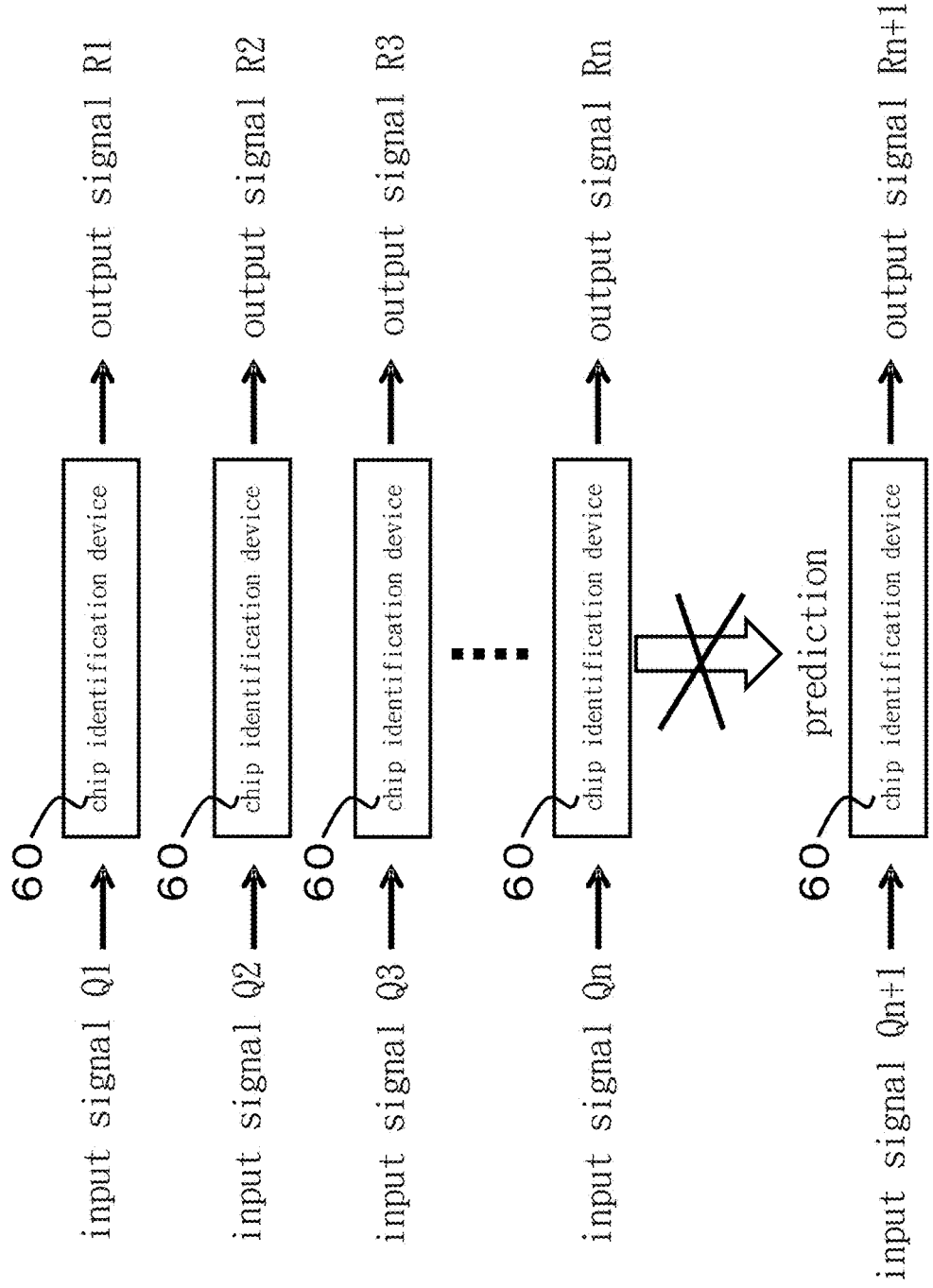
FIG. 18 illustrates an example of the property of output unpredictability which the chip identification device of the present invention should satisfy.

As illustrated in FIG. 18, suppose it is known that n output signals R1 to Rn are obtained with respect to n input signals Q1 to Qn, respectively, when those input signals are input to a same chip identification device 60. In this event, it is impossible to predict the output signal Rn+1 to be obtained by giving the same chip identification device 60 the input signal Qn+1 that is different from any of n input signals Q1 to Qn from the set of (Q1, R1), (Q2, R2), . . . , (Qn, Rn), without giving this Qn+1 to the same chip identification device 60, wherein n is assumed to be an integer larger than 1. If the chip identification device 60 generates an output with a certain algorithm (in other words, if the chip identification device 60 outputs identification by software), then this requirement can be hardly satisfied. It is therefore necessary that the chip identification device 60 generates an output signal using physical randomness.

Figure 19:
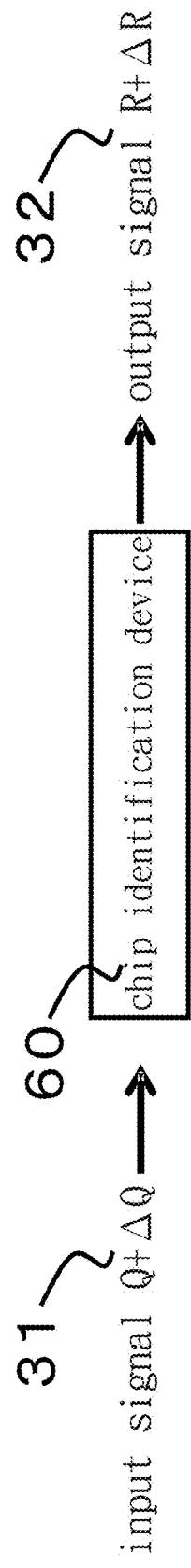
FIG. 19 illustrates an example of the property of input-output reliability which the chip identification device of the present invention should satisfy.

As illustrated in FIG. 19, actually, the input signal error 31 ($\Delta Q$) comes with the input signal Q owing to uncontrollable noise related to the controlling circuit to control the input signal Q. In reply to the input signal error 31 ($\Delta Q$) and uncontrollable noise related to the controlling circuit to control the output signal, the output signal R comes with the output signal error 32 ($\Delta R$). It may be thus assumed that the absolute value of the difference between two different input signals (e.g., Q1 and Q2) is larger than the absolute value of the maximum of the input signal error 31 ($\Delta Q$). It may be required that the absolute value of the difference between R1 and R2, which is output signals respectively from the input signals Q1 and Q2, must be larger than the absolute value of the output signal error 32 ($\Delta R$).

The chip identification of the method related to the present invention must satisfy all of the above-mentioned properties, namely, the output independence, the input independence, the output unpredictability, and the input-output reliability.

In order to improve the existing network before the present invention such that the existing network satisfies all requirements of the present invention, the existing peripheral devices connected to the stem servers may be replaced by the peripheral devices having the chip identification devices of the present invention. Here, it is necessary to inspect whether or not this replacement is certainly made. Alternately, it is necessary to inspect whether or not the chips without the chip identification device of the present invention are irregularly used in the network. The inspection described here may be carried out as a part of periodical test of the stem servers. Moreover, it may be preferable to carry out this inspection at the registration of the peripheral devices.

One of the most effective methods to this inspection is to actually remote-attack peripheral devices to be examined with the use of a stem server under the central control. In the case that a chip composing the peripheral device to be examined does not involve the chip identification device of the present invention, it must store the correspondence table of the input code 42 and the registration codes 43 (See FIG. 20) in its inner memory. However, such codes are not stored in the inner memory of the chip having the chip identification device of the present invention. In the network of the present invention, only stem servers may regularly store such a code correspondence table shown in FIG. 20. It is the set of the input code 402 and the registration code 403, as shown in Fig.9. The input code 402 in FIG. 9 corresponds to the input code 42 in FIG. 20, while the registration code 403 corresponds to the registration code 43 in FIG. 20.

Figure 21:
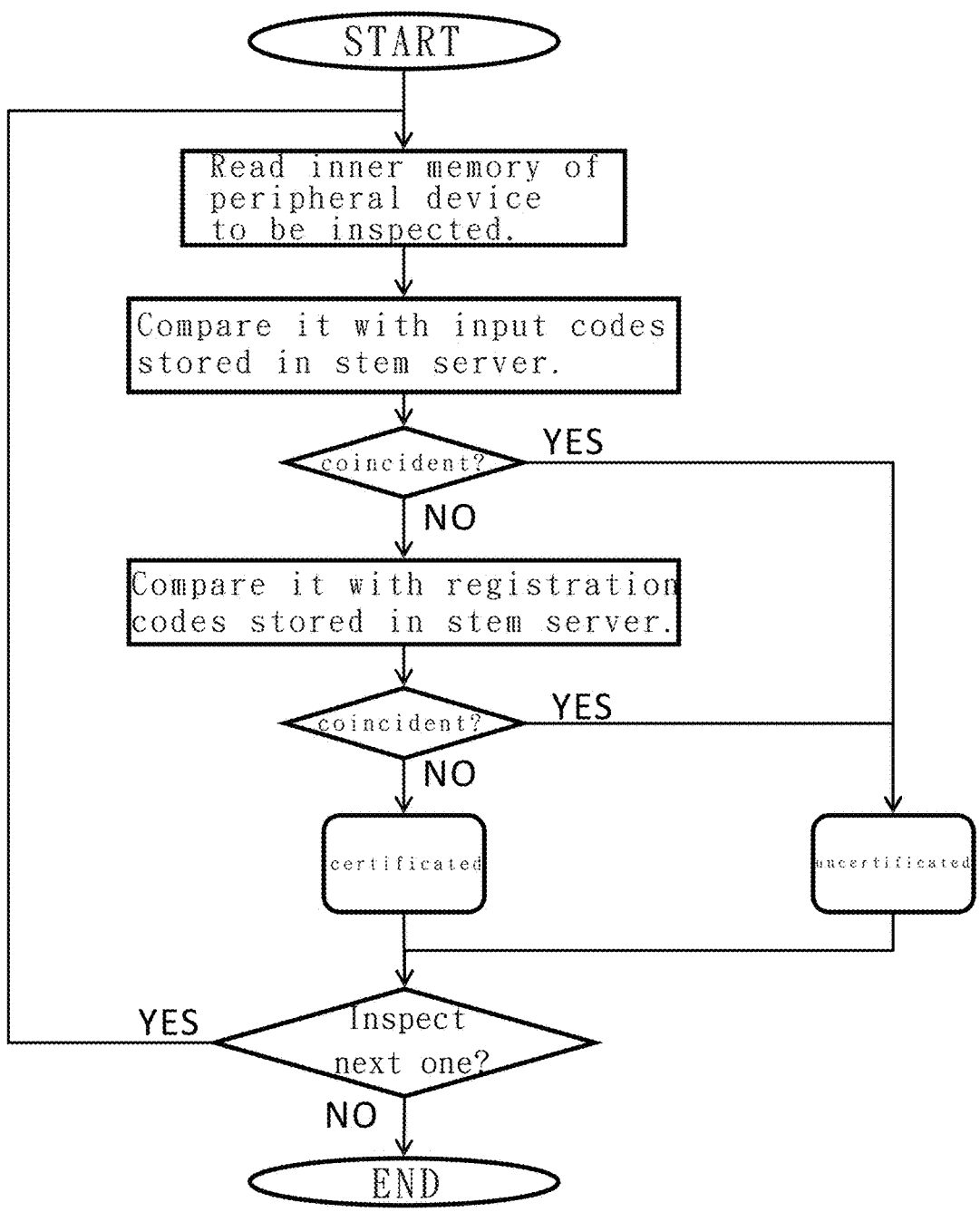
FIG. 21 illustrates an example of the operation procedure to inspect the validity of the peripheral devices.

The concrete procedure of the examination process is explained by using FIG. 21. First, the examination process starts with the step to find a peripheral device to be examined. Next, the inner memory of the peripheral device to be examined may be read. Then, it may be checked if a part of the codes read here is equivalent to at least one of the input codes stored in the stem server. If not, it may be further checked if a part of the codes read here is equivalent to at least one of the registered codes stored in the stem server. If not, then the examined peripheral device may be regarded as being certificated. Subsequently, the examination process looks for a next peripheral device to be examined. If all peripheral devices have been examined, the examination process may go to the end. If a peripheral device having not been examined is found, the inner memory of this peripheral device may be read. The subsequent procedures may be similar.

In this way, the entire devices composing the network adopting the chip identification the method of the present invention is divided, for example as illustrated in FIG. 14, into the group of stem servers (e.g., 1400, 2400) maintained and managed by trained security experts and the group of peripheral devices (e.g., 410, 420, 430, 440, and 450) which those security experts may not manage. It may be noted here that any two of those peripheral devices cannot be connected to each other, and each of those peripheral devices can be connected only to stem servers. Thus, the network unit comprising a stem server and a plurality of peripheral devices connected directly to the stem server is formed. A stem server can be connected to another stem server voluntarily, while two of the peripheral devices can be connected indirectly to each other via the stem servers. Thus, a network unit can be connected to another network unit. FIG. 14 is an example where two network units are associated with each other via connection of the stem server of one network unit and the stem server of another network unit. Actually, it is also possible to form networks having more stem servers and more network units. Moreover, the connection of electronic appliances on the network means the authentication connection in which those electronic appliances authenticate each other by the above-mentioned authentication operation.

Each peripheral device has each chip identification device. Any two of those chip identification devices are different from each other. As illustrated in FIG. 10 and FIG. 12, the stem servers (1400, 2400) hold specific common passcodes, respectively. Each common passcode (1410 or 2410) output by each stem server is strictly stored in the inner memory of the stem server as an input code (e.g., 402), as illustrated in FIG. 9. As illustrated in FIG. 11 and FIG. 13, the peripheral devices (410, 420, and 430) to which the common passcodes (1410, 2410) are input may output to the stem servers (1400, 2400) specific identifications (4101, 4201, and 4301) and (4102, 4202, and 4302), respectively. Any two of identifications to be returned here are different from each other. Accordingly, as illustrated in FIG. 16, it may require the chip identification device of the present invention, which is embedded to the peripheral devices, to satisfy the property of output independence. As illustrated in FIG. 9, a stem server may respectively compare the output signals returned from peripheral devices with the registration codes (e.g., 403) strictly stored in the inner memory 401 of the stem server 400 with regard to the input code (e.g., 402) as necessary As illustrated in FIG. 15, it may be approved that a peripheral device is connected to a plurality of stem servers. In this event, one peripheral device (e.g., 410) may be input with a plurality of common passcodes (e.g., 1410, 2410, and 3410) and may need to output different identifications (e.g., 11, 12, and 13) with regard to the plurality of common passcodes, respectively. Accordingly, the chip identification device of the present invention, which is embedded into the peripheral devices, as illustrated in FIG. 17, may need to satisfy the property of input independence.

Figure 20:
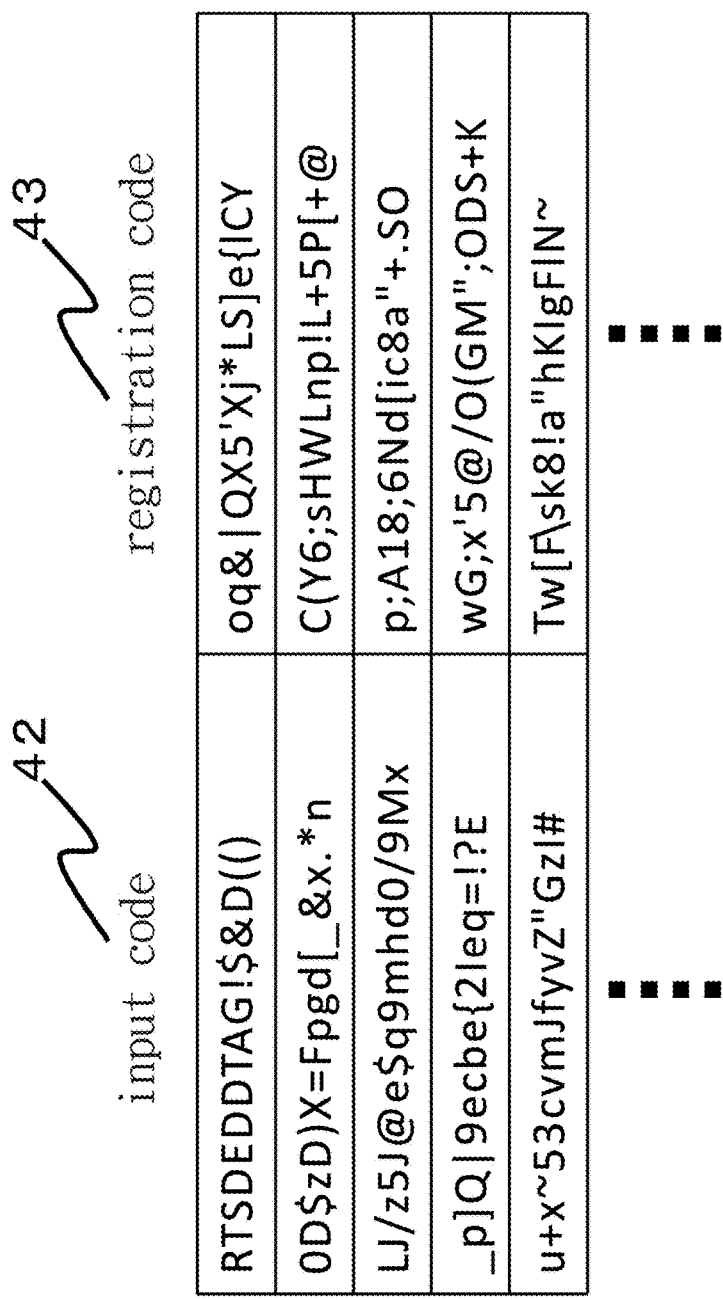
FIG. 20 illustrates an example of the correspondence list of input codes and registration codes.

Subsequently, consider the condition on the chip identification devices of the present invention. First, in the case that the chip identification device is formed by software, the output signal to the input signal must be generated by some kind of algorithm. Accordingly, once the remote-attacker (e.g., 93) decodes this algorithm, the attacker may be able to counterfeit the registration codes as long as the attacker knows the input code, as illustrated in FIG. 20. In this way, this remote-attacker may be able to hijack a part of the peripheral devices and then to irregularly access the stem server. To avoid such an illegal access, as illustrated in FIG. 18, the chip identification device of the present invention needs to satisfy the property of output unpredictability. However, as long as the program is designed with an algorithm, any program cannot satisfy the property of output unpredictability. In other words, perfect random number cannot be generated with any program. Thereby, the chip identification device must adopt physical randomness.

Figure 114:
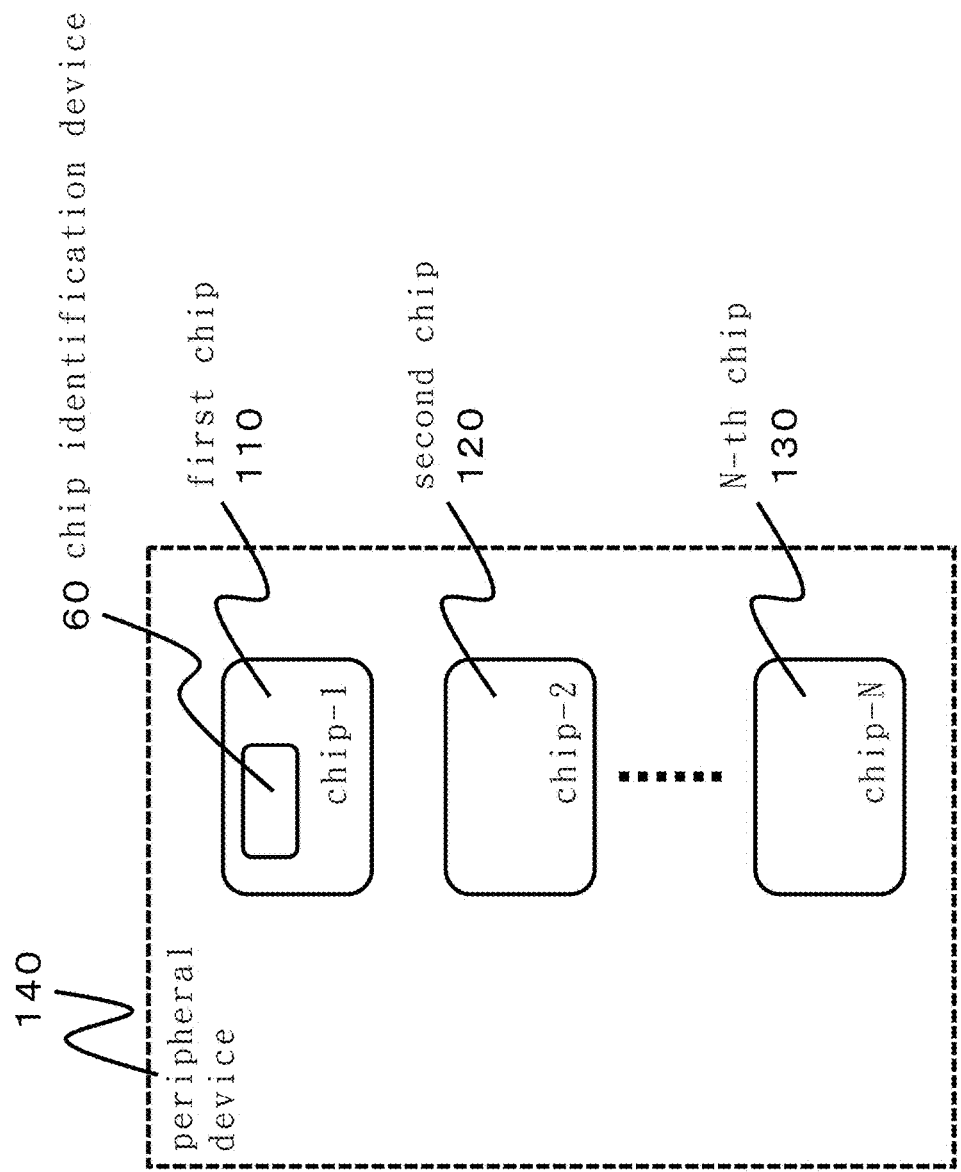
FIG. 114 illustrates an example of the chip configuration of the peripheral devices.

The chip identification device mentioned above may be embedded into the chip with modules of other functions, or may be produced as a standalone product having only the chip identification function. Moreover, it may be preferable that the chip identification device generates the output code (identification code) with physical randomness, every time when receiving the input code (common passcode). It is prohibited that those common passcodes are stored in the peripheral devices. In the case that the electronic appliances are formed with a plurality of chips, as illustrated in FIG. 114, at least one chip among those chips may need to hold the chip identification device of the present invention. Moreover, the chip identification device itself may be a chip realizing an electronic appliance. In this way, the above mentioned network is a network where each of the peripheral devices and stem servers which are components may comprise at least one chip.

Figure 22:
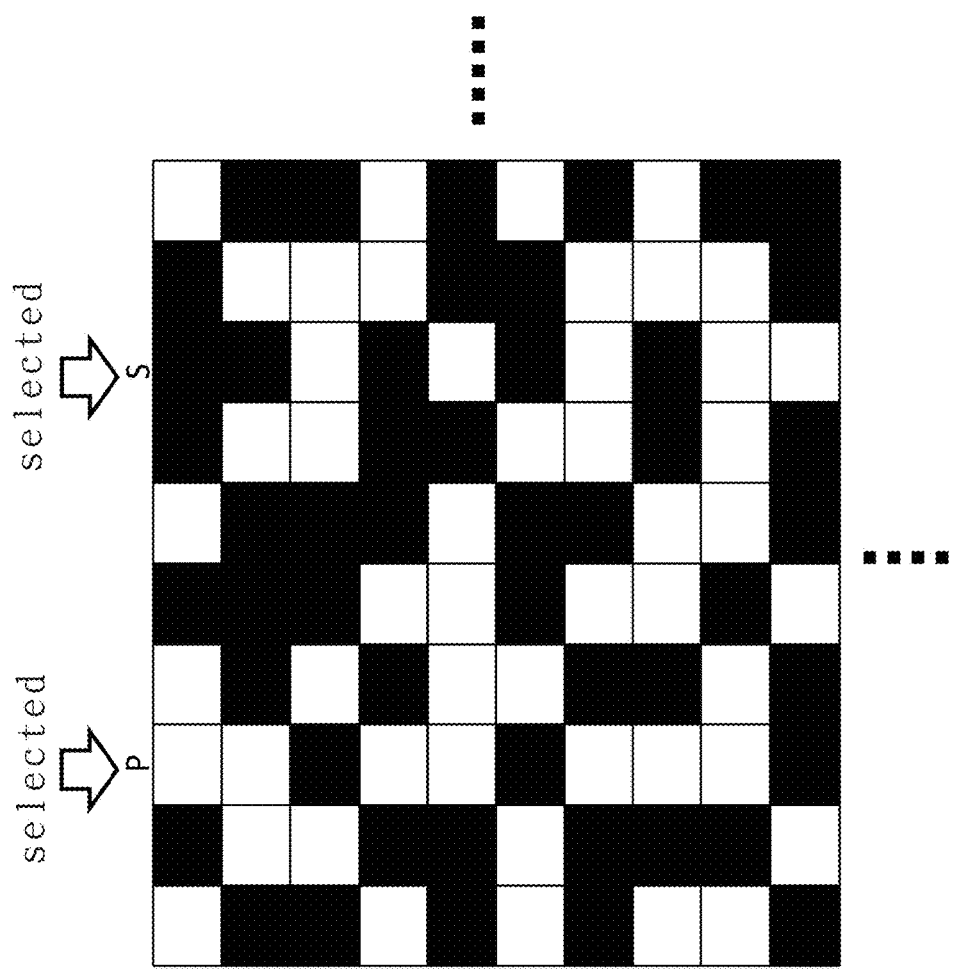
FIG. 22 illustrates an example of data allocated on the checker board cell array.

The chip identification device of the present invention may be formed on cell arrays of a semiconductor device. First, a physically random set of "1" and "0" may be generated in some way. Here, by plotting "1" with black and "0" with white on the cell array, a random pattern of black and white may be formed on a checker board, as illustrated in FIG. 22. Once a random number is made by digital like this, the property of input-output reliability may be satisfied as illustrated in FIG. 19.

In this way, the chip identification device of the present invention may generate physical randomness required as above with the use of uncontrollable uncertainty in the semiconductor devices and the fabrication process of the semiconductor devices.

Figure 23:
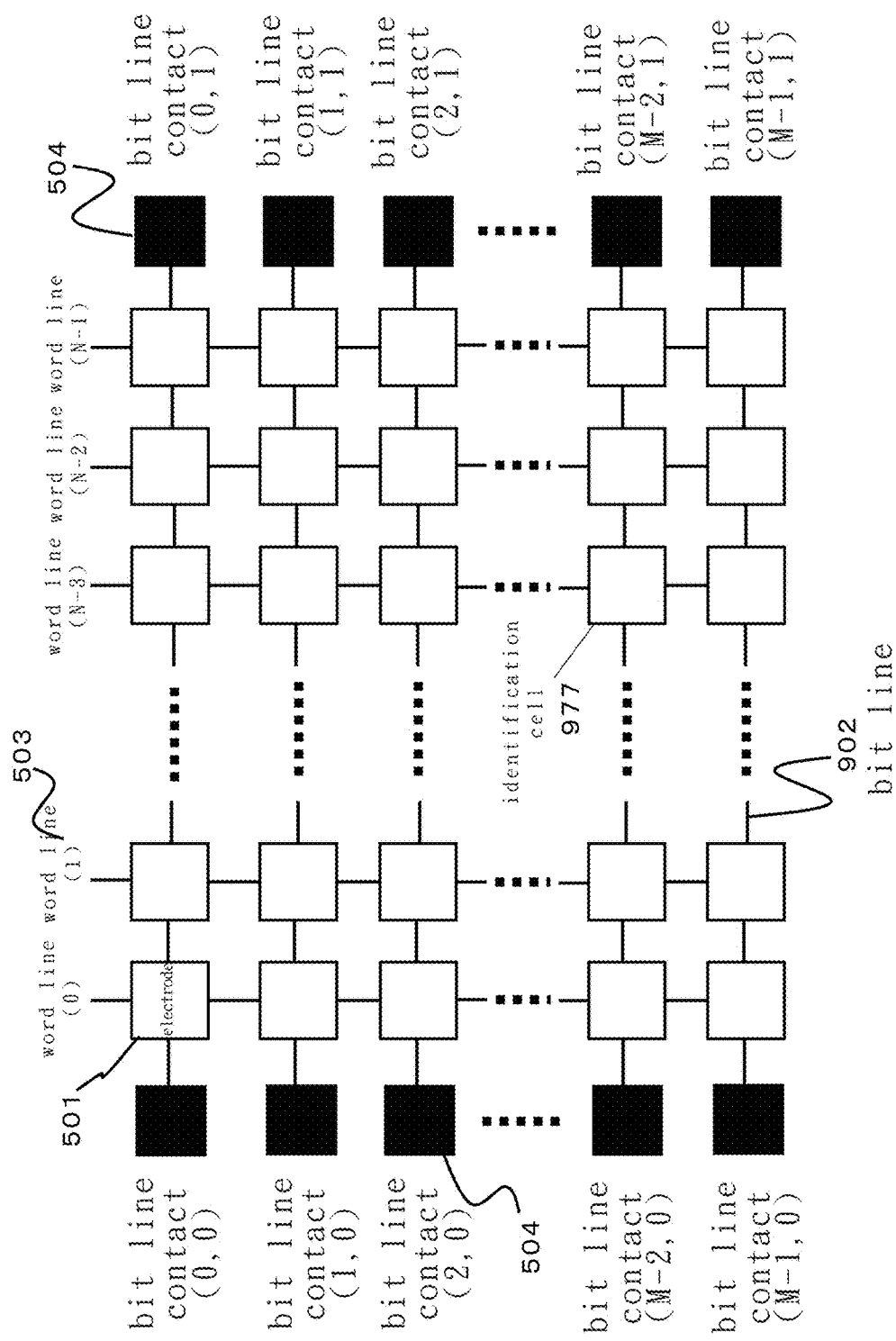
FIG. 23 illustrates an example of a cell array to realize FIG. 22.

FIG. 23 is an example of a cell array to realize FIG. 22. There are N word lines 503 along a column direction. There are M bit lines 902 along a row direction which is perpendicular to the word lines. Those bit lines 902 are terminated with bit line contacts 504, respectively. There are electrodes 501 on the checker board patterns comprising the cross-points of N word lines 503 and M bit lines 902. There are identification cells 977, which are elements of the chip identification device, below the electrodes 501, respectively. In this example, there are no select gate transistors unlike the nonvolatile memory cell array, but the essence of the present invention may be unchanged even while adding select gate transistors between the N-th word line (N-1) and the bit line contacts 504 and between the opposite end word line (0) and the bit line contacts.

Figure 24:
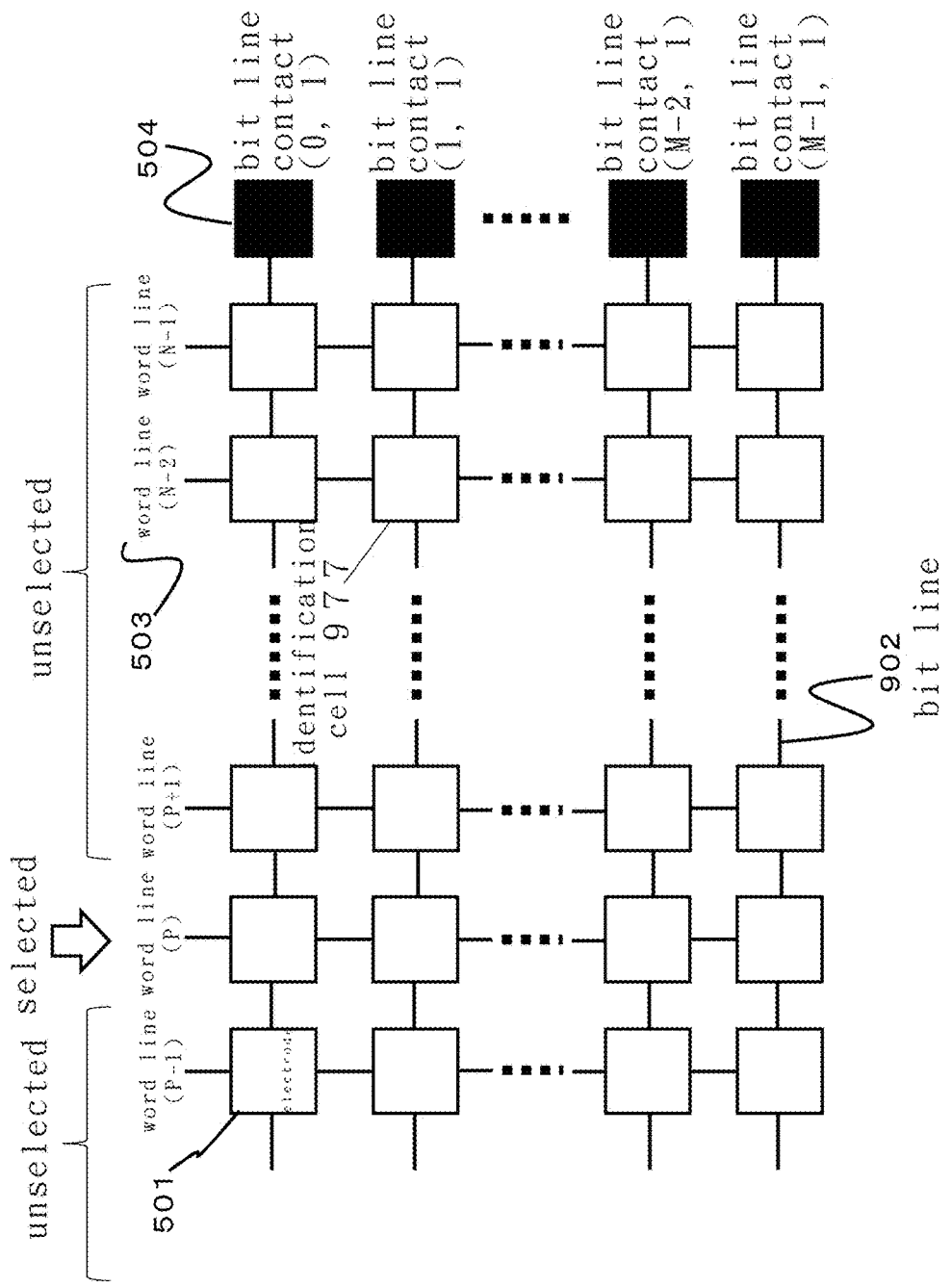
FIG. 24 illustrates an example to input the input signal.
Figure 25:
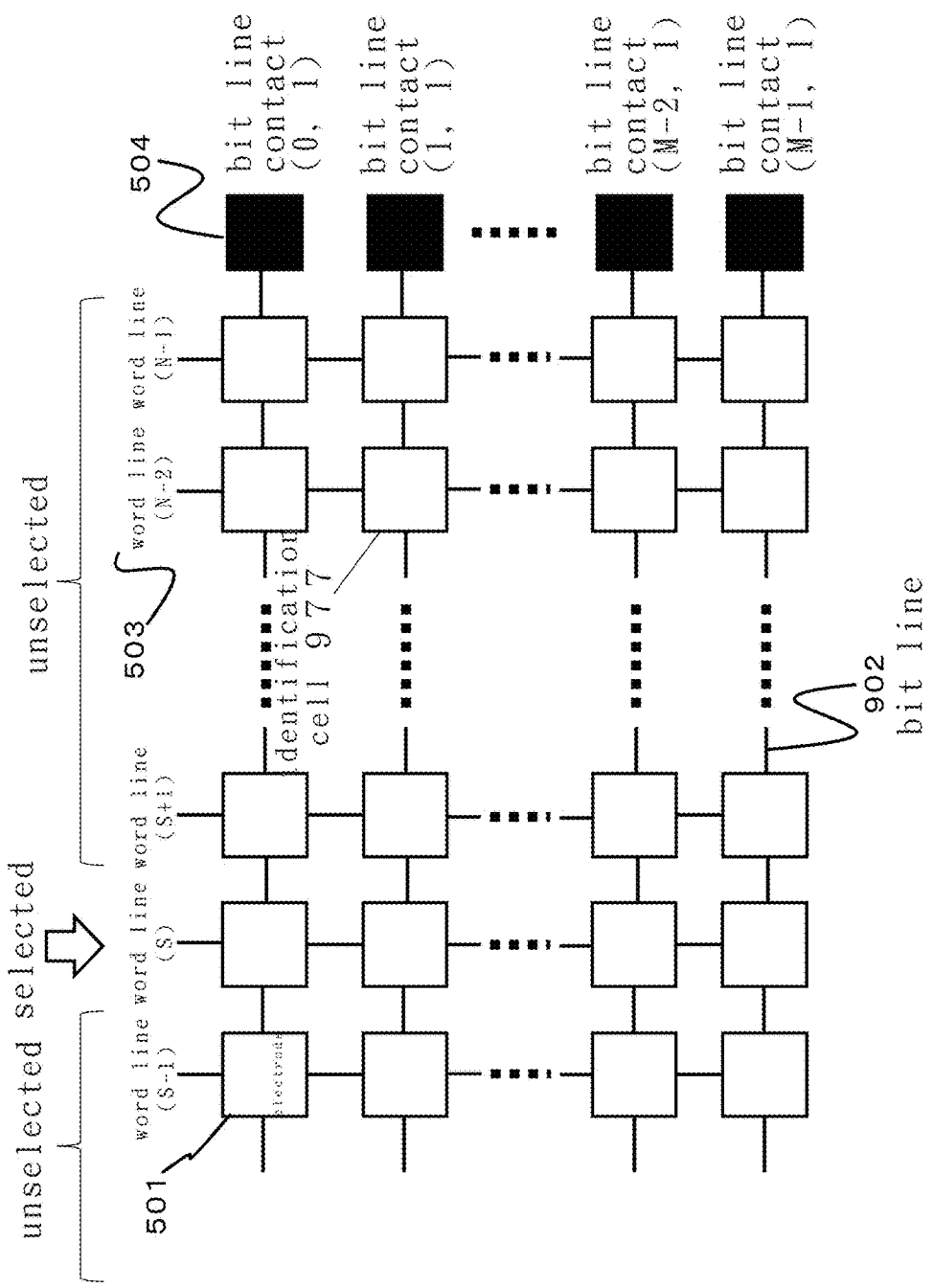
FIG. 25 illustrates an example to input the input signal.
Figure 26:
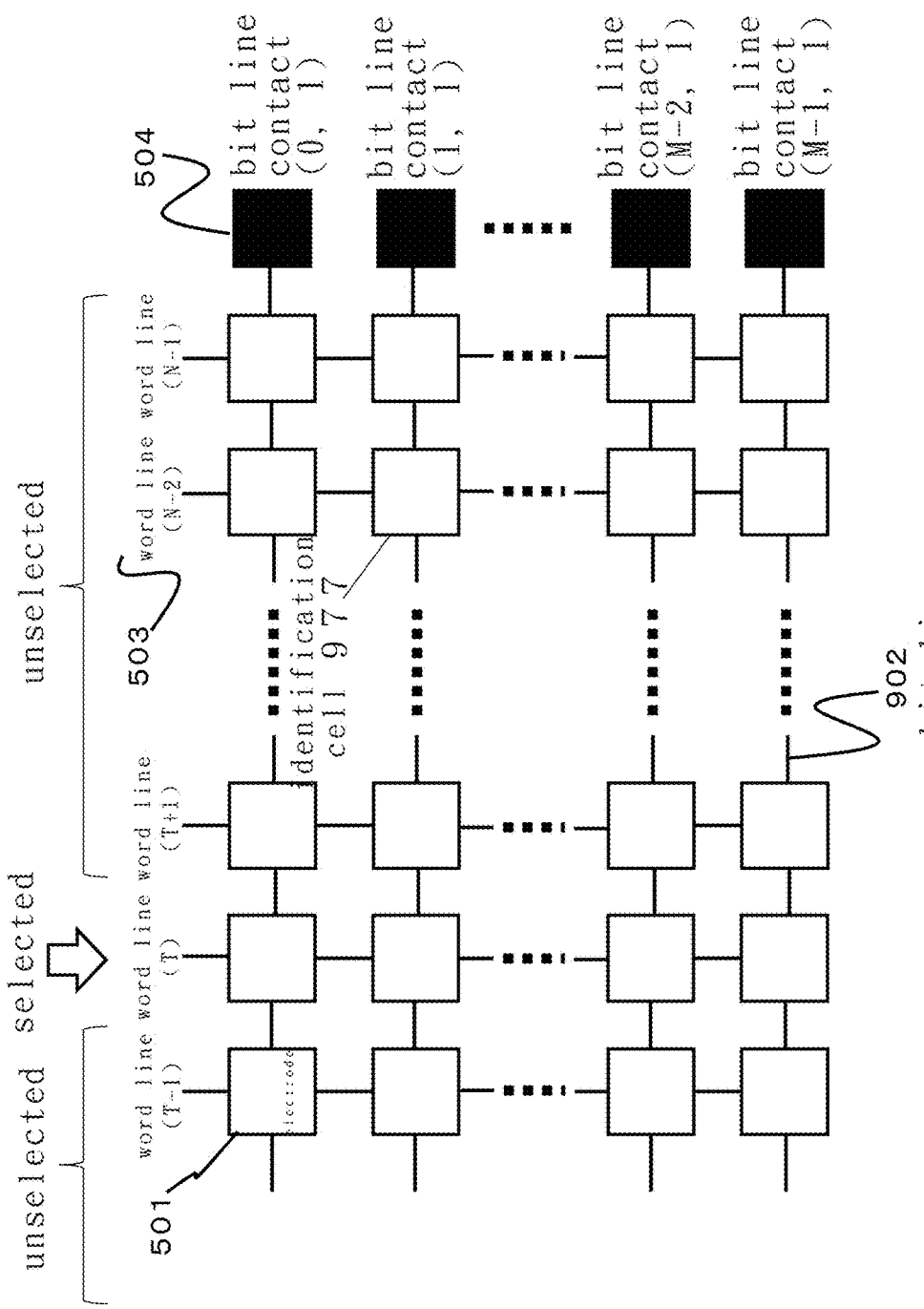
FIG. 26 illustrates an example to input the input signal.

FIG. 24 is an example where the P-th word line (P) is selected and where the others are not selected. FIG. 25 is an example where the S-th word line (S) is selected and where the others are not selected. FIG. 26 is an example where the T-th word line (T) is selected and where the others are not selected. Those series of selecting the P-th, the S-th, and the T-th word lines may correspond to the input code (P, S, T . . .), respectively.

Figure 27:
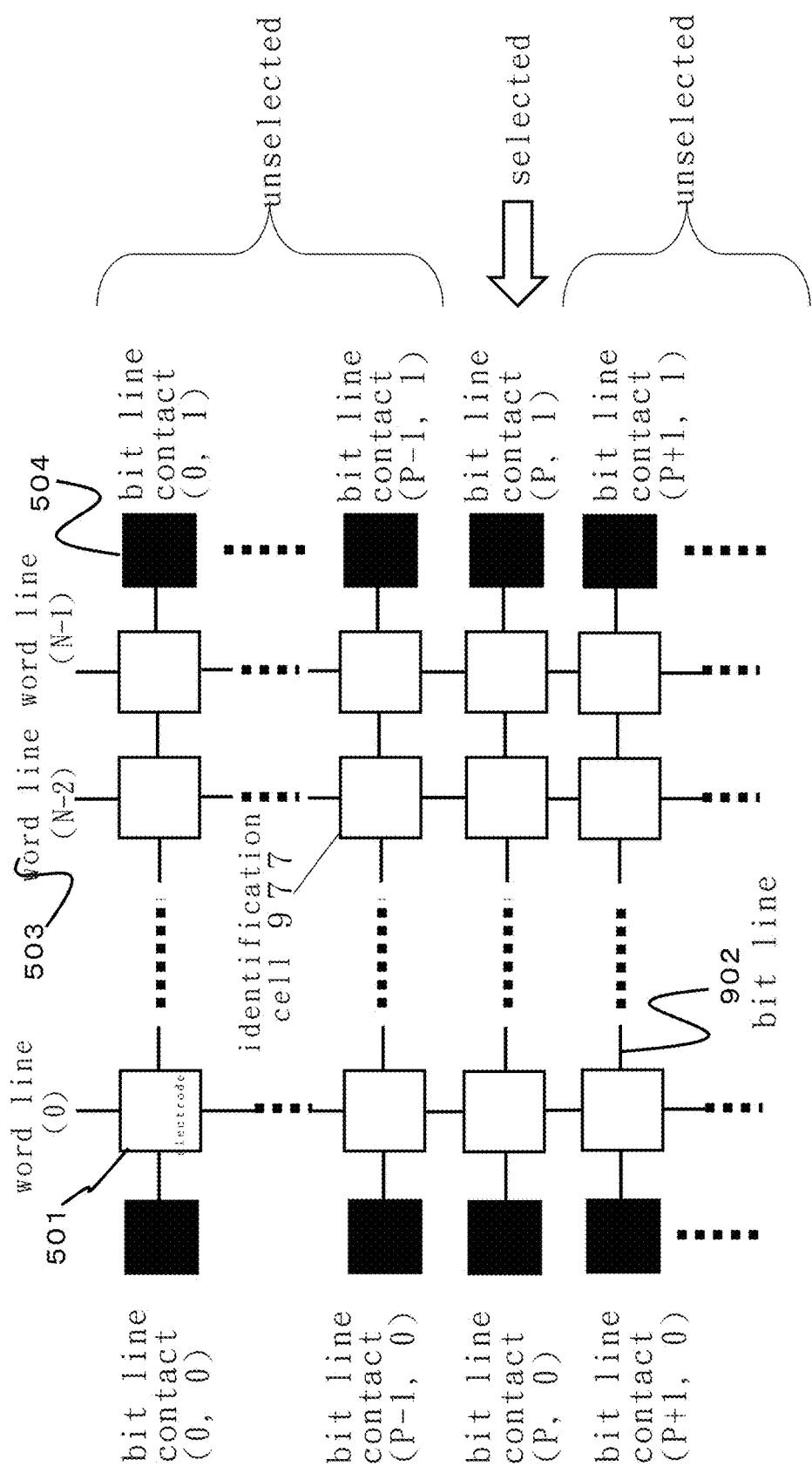
FIG. 27 illustrates an example to input the input signal.
Figure 28:
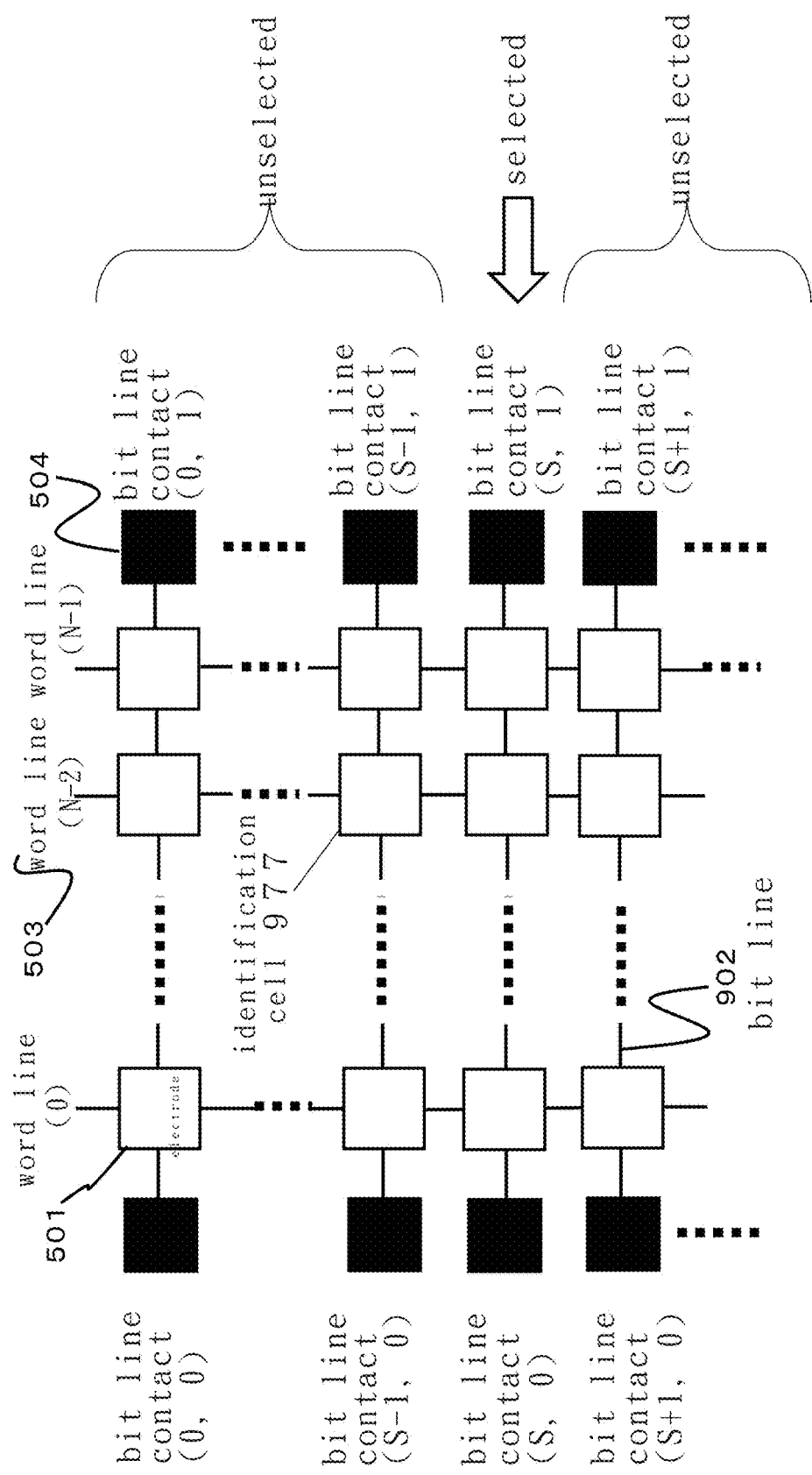
FIG. 28 illustrates an example to input the input signal.
Figure 29:
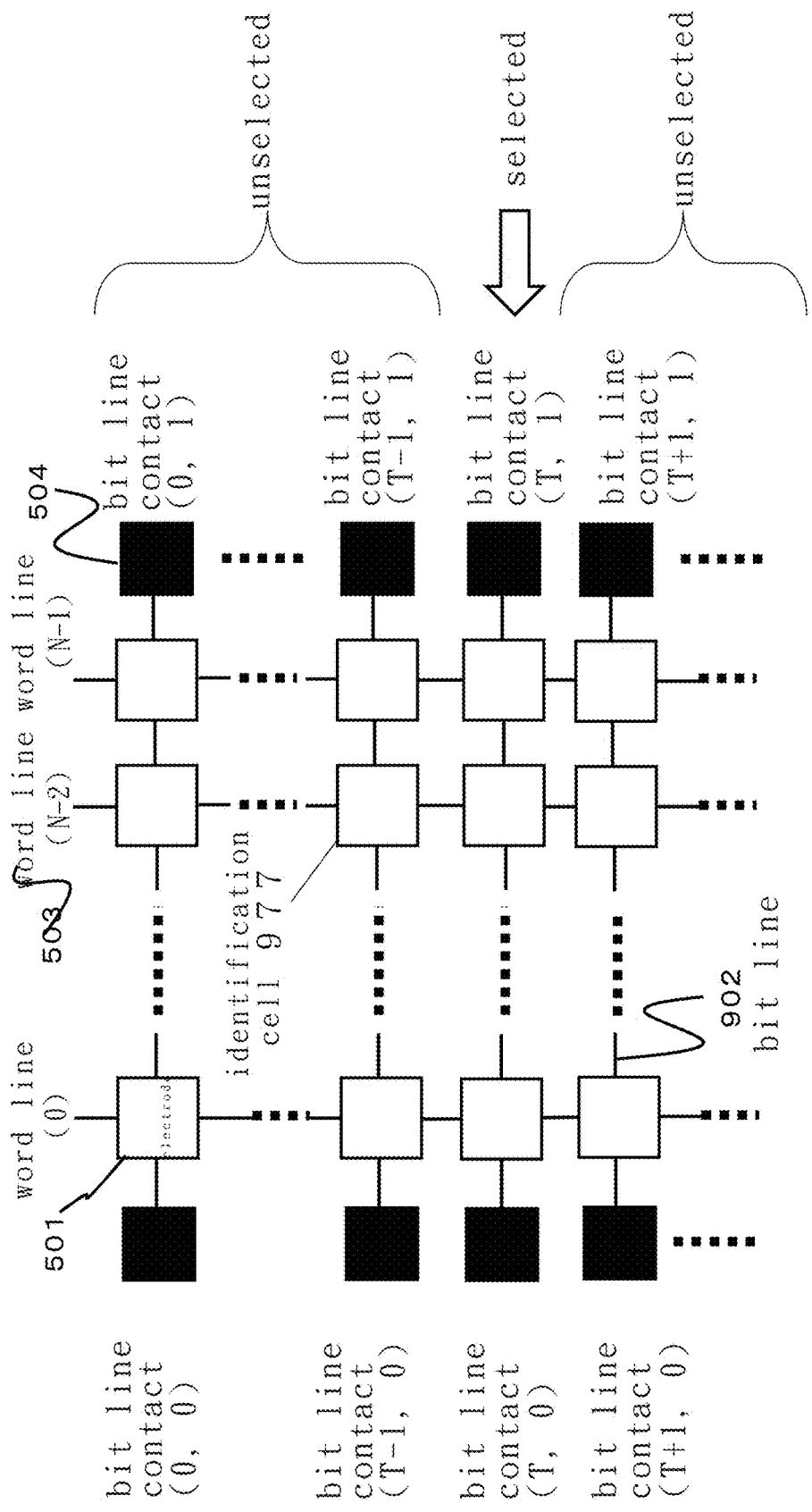
FIG. 29 illustrates an example to input the input signal.

The input code (P, S, T . . .) may be also input to the bit lines. FIG. 27 is an example where the P-th bit line (P) is selected and where the others are not selected. FIG. 28 is an example where the S-th bit line is selected and where the others are not selected. FIG. 29 is an example where the T-th bit line (T) is selected and where the others are not selected. Those series of selecting the P-th, the S-th, and T-th bit lines may correspond to the input code (P, S, T . . .), respectively.

Below, the most preferable embodiments are described concretely.

The embodiments, in particular, the concrete structure of the identification cells 977 and the method how to use the present invention is described below with the drawings.

The first embodiment is discussed herein.

Figure 30:
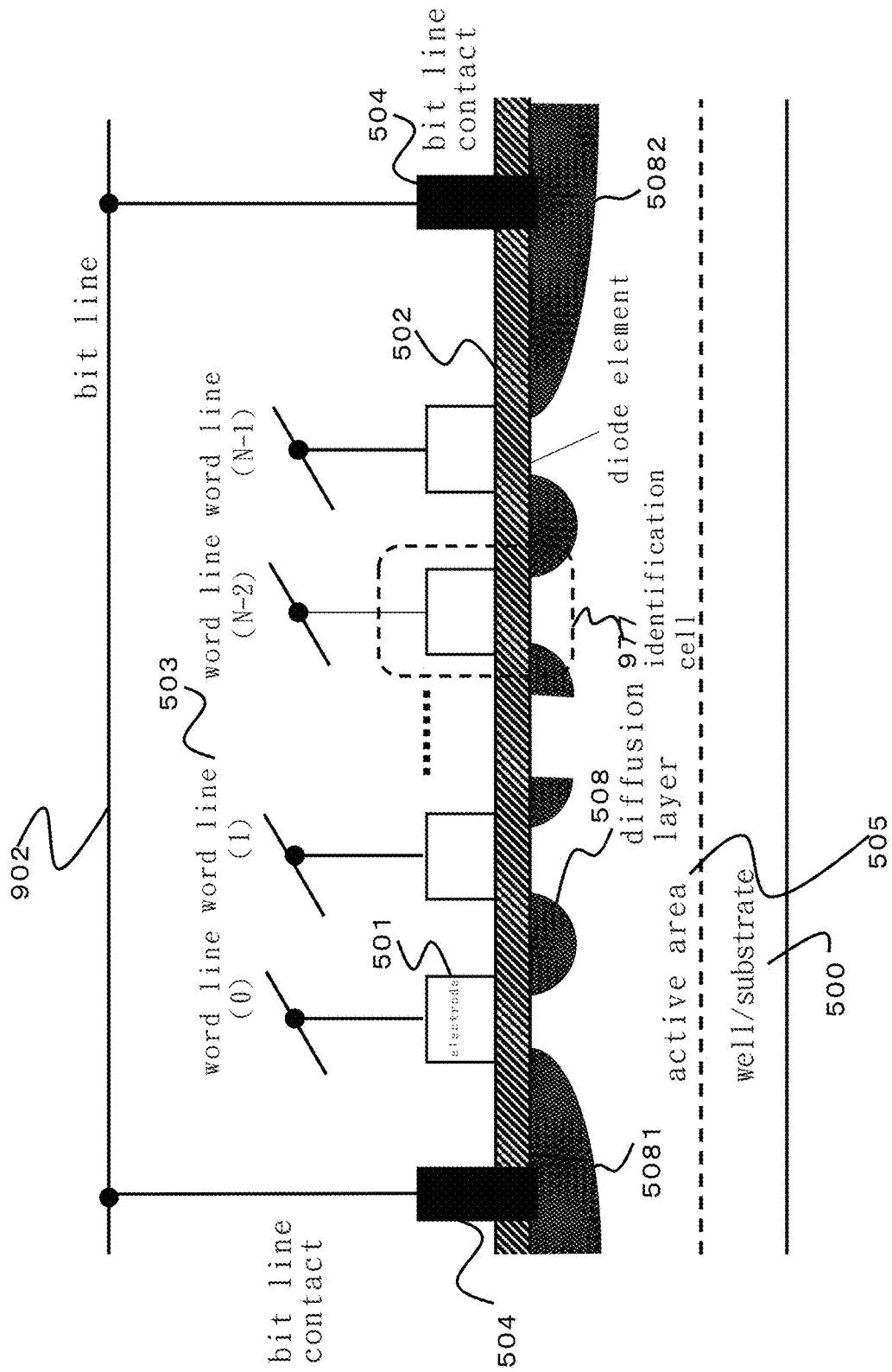
FIG. 30 illustrates an example of the cross-sectional view of a cell array to realize the identification device.
Figure 31:
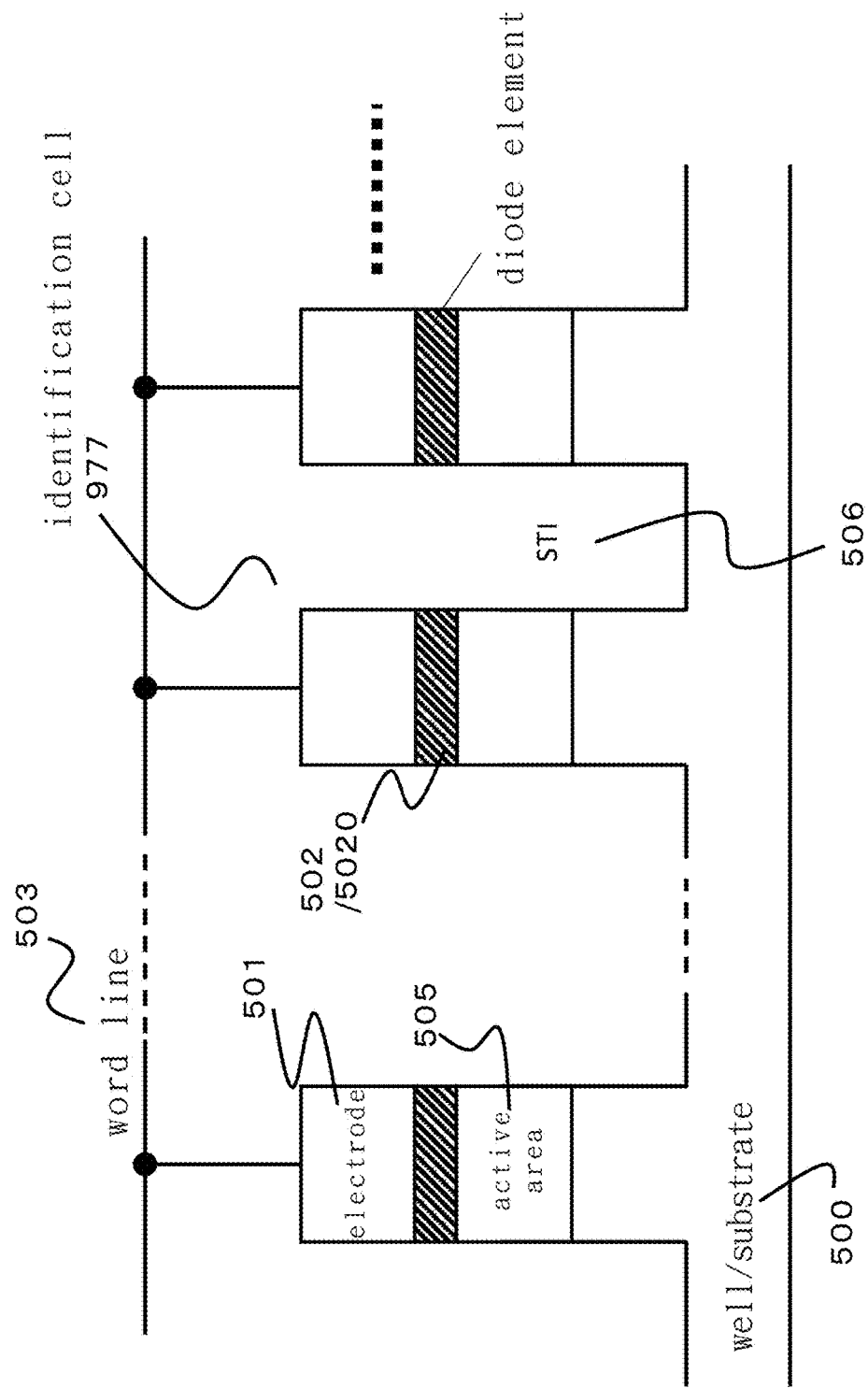
FIG. 31 illustrates an example of the cross-sectional view of a cell array to realize the identification device.
Figure 105:
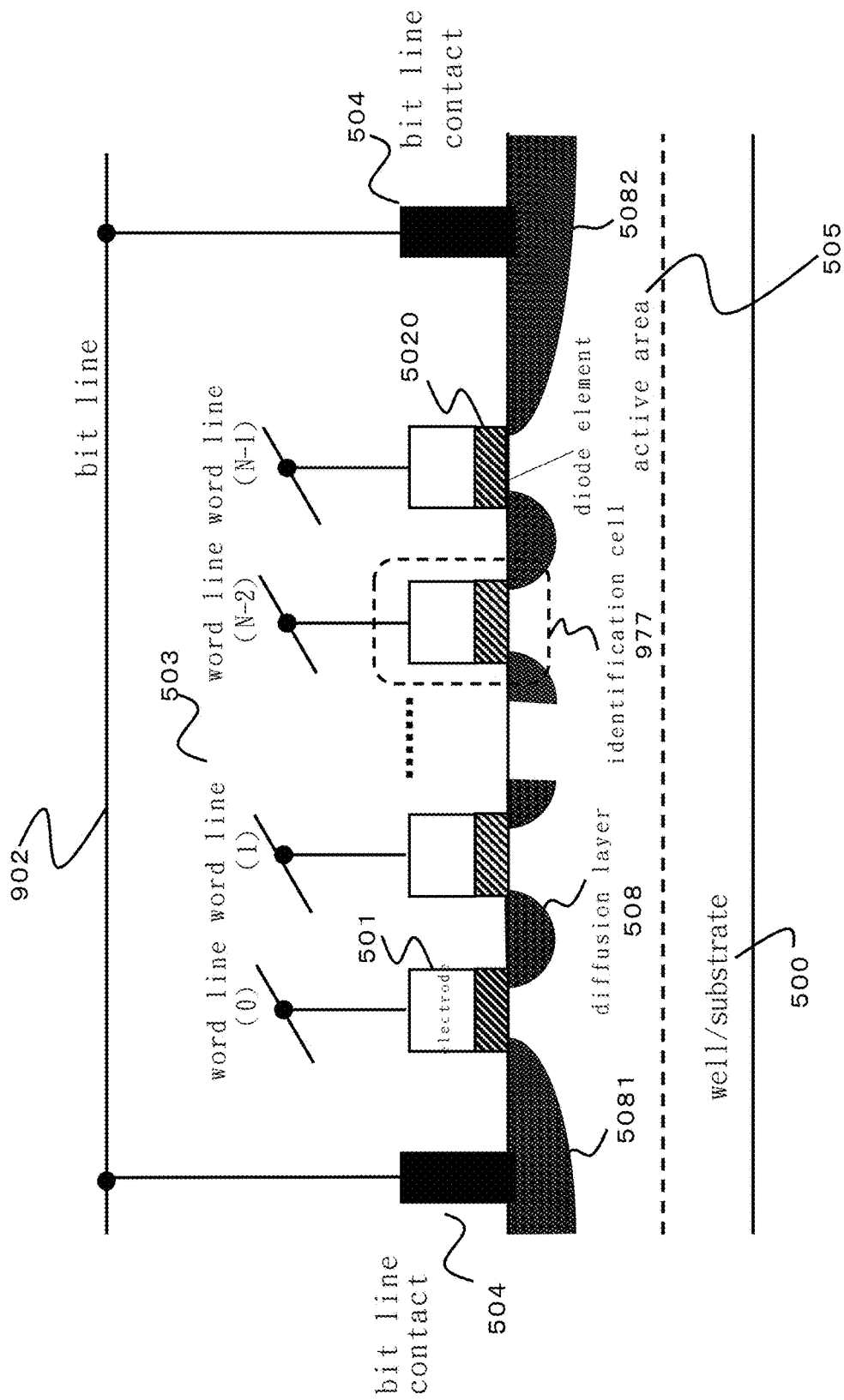
FIG. 105 illustrates an example of the cross-sectional view of a cell array realizing the chip identification device.

FIG. 30 illustrates a cross-sectional view of the cell array along a bit line, corresponding to FIG. 23 to FIG. 29. There are a word line (0), a word line (1) . . . a word line (N-2), and a word line (N-1) from the left side and the bit line contacts 504 at both ends. Unlike the nonvolatile memories, there are no select gate transistors between the bit line contacts 504 and the electrode 501 at both ends, while those select gate transistors can be added there. Each of those N word lines 503 connects to each electrode 501, below which electrode there is a diode element, and further below which diode element there is a semiconductor substrate (or well) 500. The surface of the semiconductor substrate (or well) 500 is formed like the teeth of a comb along a word line direction, as illustrated in FIG. 31. FIG. 30 illustrates the cross-sectional view cut out from a tooth of the comb. The surface there is the active area 505. There are diffusion layers 508 between adjoining electrodes, as shown in FIG. 30. By applying a pass voltage to the unselected word lines, the induced inversion layers therebetween may connect adjoining diffusion layers electrically. The two bit line contacts 504 go through the diode element 502 and then connect to the diffusion layers at both ends 5081 and 5082, respectively. Moreover, as illustrated in FIG. 105, the diode element may be cut out perpendicular to the bit lines. The detailed explanation may be omitted because it may be similar to FIG. 30.

FIG. 31 is a cross-sectional view perpendicular to FIG. 30, in which the word line runs from the left to the right. In each of the teeth of the comb, the diode element 502 (or 5020) and the electrode 501 are laminated on the active area 505. The space between those teeth of the comb may be buried by an interlayer insulating film. Then, the Shallow-Trench-Isolation (STI) 506 is formed.

Figure 32:
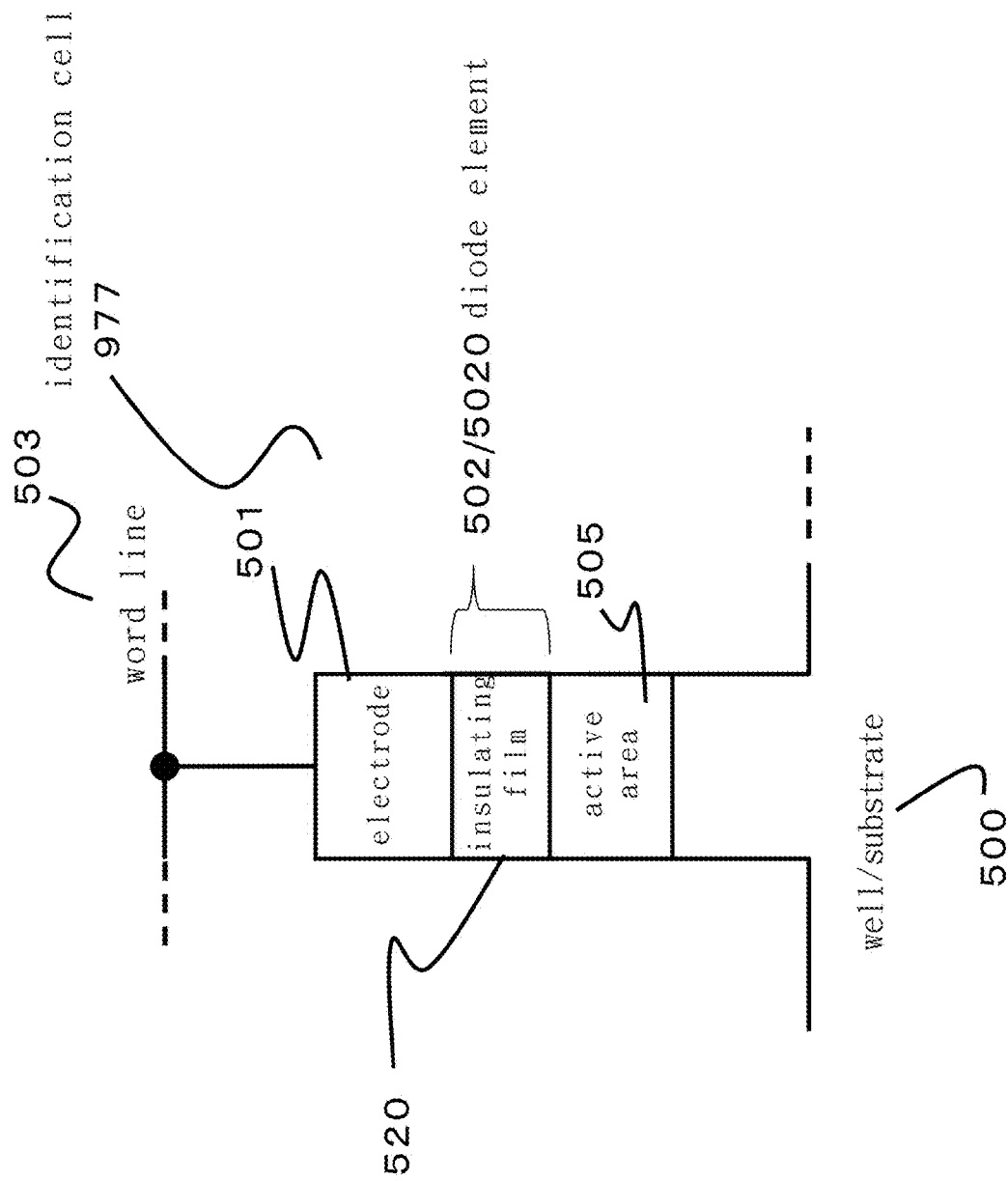
FIG. 32 illustrates an example of the cross-sectional view of a cell to realize the identification device.

FIG. 32 is an example of a cross-sectional view of an exemplary cell structure along the word line direction. In this example, an insulating film 520 may be adopted as the diode element 502 (or 5020). After making chips, the insulating film may be broken by applying the stress of the electric field or electric current. Such a breakdown may probabilistically occur, and physical randomness may be accompanied. In the cells with broken insulating films, the electric current may flow through those broken insulating films, for example, which may correspond to the state "1" in terms of the semiconductor memory. In FIG. 22, they may correspond to "black". On the contrary, in the cells with insulating films being not broken, the electric current may not follow through those insulating films, for example, which may correspond to state "0" in terms of the semiconductor memories. In FIG. 22, they may correspond to "white". The probability of the breakdown like this may be roughly tuned by controlling the quality and thickness of the insulating film 520, the strength and time of the electrical stressing, the pulse of the stressing, and so on. If the probability is made about 50%, then the white-black random pattern on the checker board, like FIG. 22, may be obtained. It may be self-evident that the randomness of this pattern is free from any algorithm. To apply such an electrical stress, for example, the electrode of the substrate (or well) 500 may be grounded, and then a positive or negative voltage may be applied to at least one word line. In another option, at least one word line may be grounded, and then a positive or negative voltage may be applied to the electrode of the substrate (or well) 500.

Figure 33:
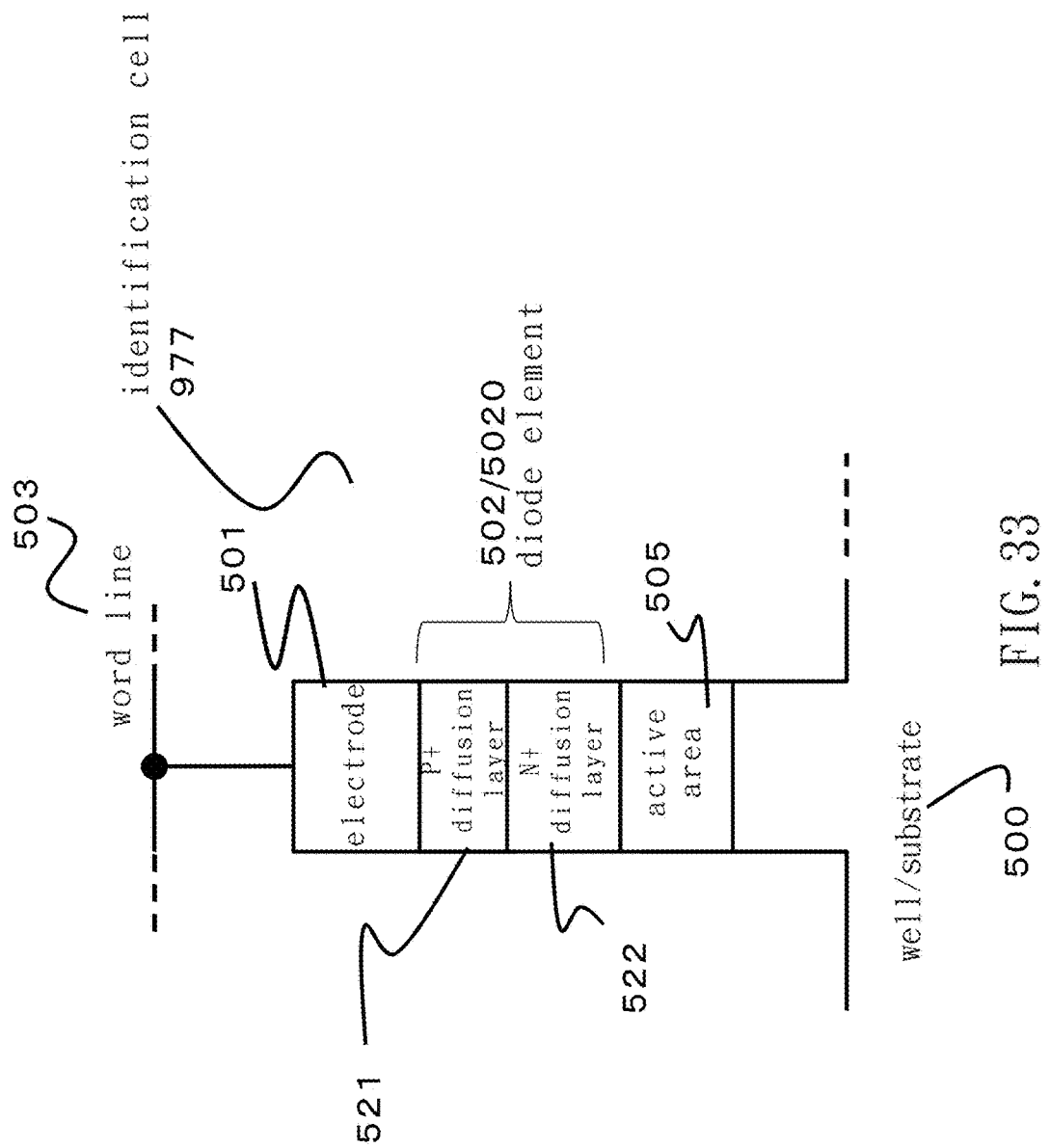
FIG. 33 illustrates an example of the cross-sectional view of a cell to realize the identification device.

FIG. 33 is an example of a cross-sectional view of an exemplary cell structure along the word line direction. In this example, a PN junction may be adopted as the diode element 502 (or 5020). As illustrated in FIG. 33, the top is the P+ diffusion layer 521, and the bottom is the N+ diffusion layer 522. After making the chip, this PN junction may be broken by applying the stress of an electric field or electric current. Such a junction breakdown may probabilistically occur and accompanied with physical randomness. In the cells with broken PN junctions, the electric current may flow through those broken PN junctions even with reverse bias. For example, those broken PN junctions may correspond to state "1" in terms of the semiconductor memories. In FIG. 22, they may correspond to "black". On the contrary, in the cells with PN junctions being not broken, the electric current may not occur through the PN junction with reverse bias, for example, which may correspond to state "0" in terms of the semiconductor memories. In FIG. 22, they may correspond to "white". The probability of breakdown like this may be roughly tuned by controlling the detailed structure of the PN junction (diffusion density, profile and so on), the strength and time of electrical stressing, the stress pulse and so on. If the probability is made about 50%, the white-black random pattern on the checker board may be obtained, as illustrated in FIG. 22. It may be self-evident that this randomness is free from any algorithm. In this example, to apply the electrical stress, it may be preferable that a positive high voltage is relatively applied to the N+ diffusion layer 522. For example, at least one word line 503 may be grounded, and a positive high voltage may be applied to the electrode of the substrate (or well) 500. In another option, the electrode of the substrate (or well) 500 may be grounded, and then a high negative voltage may be applied to at least one word line 503. In this way, the high reverse bias may be applied to the PN junction. The high diffusion density may cause the higher probability of the junction breakdown attributable to this reverse bias. In this way, the probability of the junction breakdown may be roughly tuned.

Figure 34:
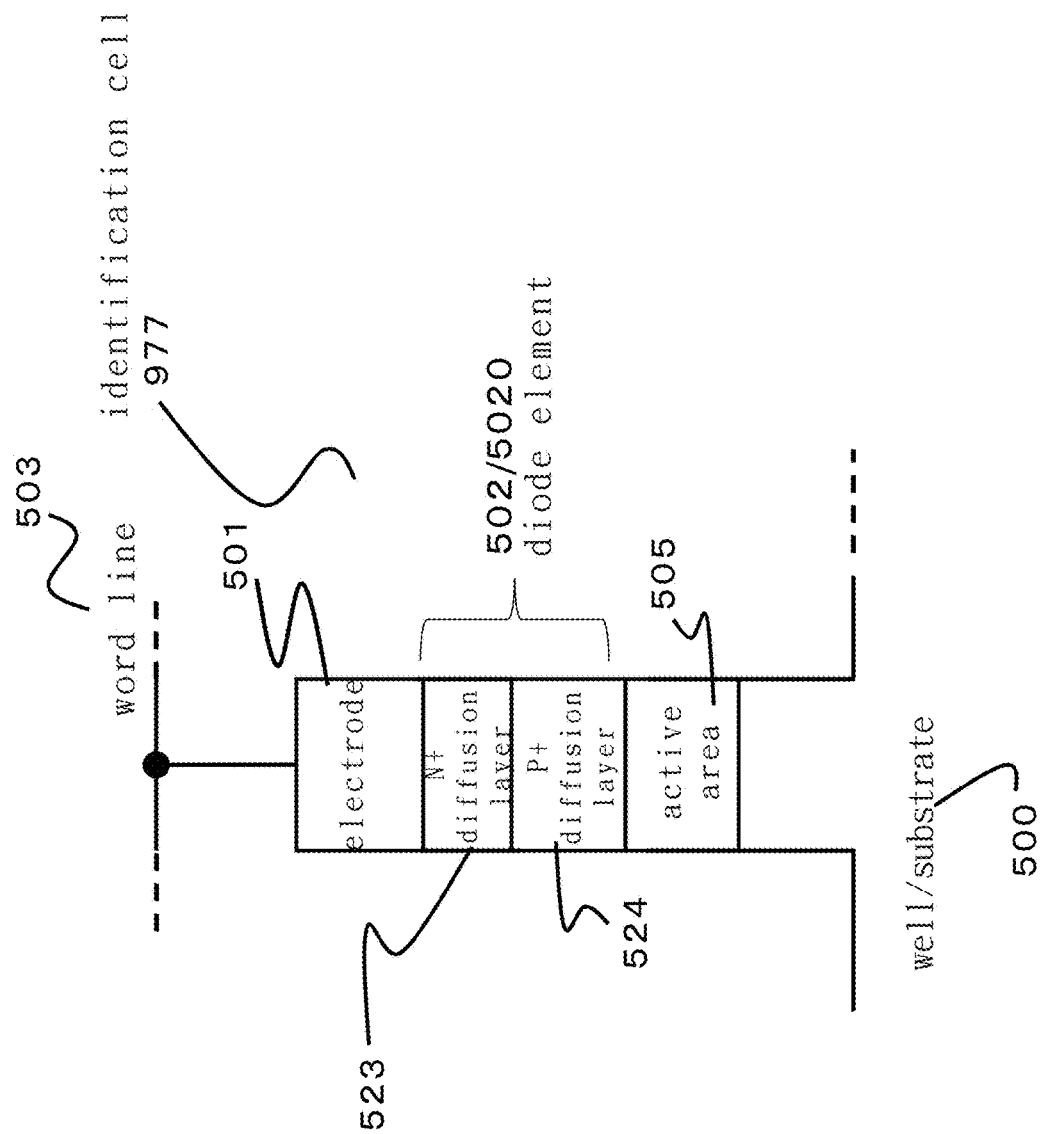
FIG. 34 illustrates an example of the cross-sectional view of a cell to realize the identification device.

FIG. 34 is an example of a cross-sectional view of an exemplary cell structure along the word line direction. In this example, a PN junction may be adopted as the diode element 502 (or 5020). As illustrated in FIG. 34, the top is the N+ diffusion layer 523, and the bottom is the P+ diffusion layer 524. After making the chip, this PN junction may be broken by applying stress of an electric field or electric current. Such a junction breakdown may probabilistically occur and accompanied with physical randomness.

In the cells with broken PN junctions, the electric current may flow through those broken PN junctions even with reverse bias. For example, those broken PN junctions may correspond to state "1" in terms of the semiconductor memories. In FIG. 22, they may correspond to "black". On the contrary, in the cells with the PN junctions being not broken, the electric current may not occur through the PN junction with reverse bias, for example, which may correspond to state "0" in terms of the semiconductor memories. In FIG. 22, they may correspond to "white". The probability of the breakdown like this may be roughly tuned by controlling the detailed structure of the PN junction (diffusion density, profile and so on), the strength and time of electrical stressing, the stress pulse and so on. If the probability is made about 50%, the white-black random pattern on the checker board may be obtained, as illustrated in FIG. 22. It may be self-evident that this randomness is free from any algorithm. In this example, to apply the electrical stress, it may be preferable that a high positive voltage is relatively applied to the N+ diffusion layer 523. For example, at least one word line 503 may be grounded, and a high negative voltage may be applied to the electrode of the substrate (or well) 500. In another option, the electrode of the substrate (or well) 500 may be grounded, and then a positive high voltage may be applied to at least one word line 503. In this way, the high reverse bias may be applied to the PN junction. The high diffusion density may cause the higher probability of the junction breakdown attributable to this reverse bias. In this way, the probability of the junction breakdown may be roughly tuned.

The third embodiment is herein discussed.

Figure 35:
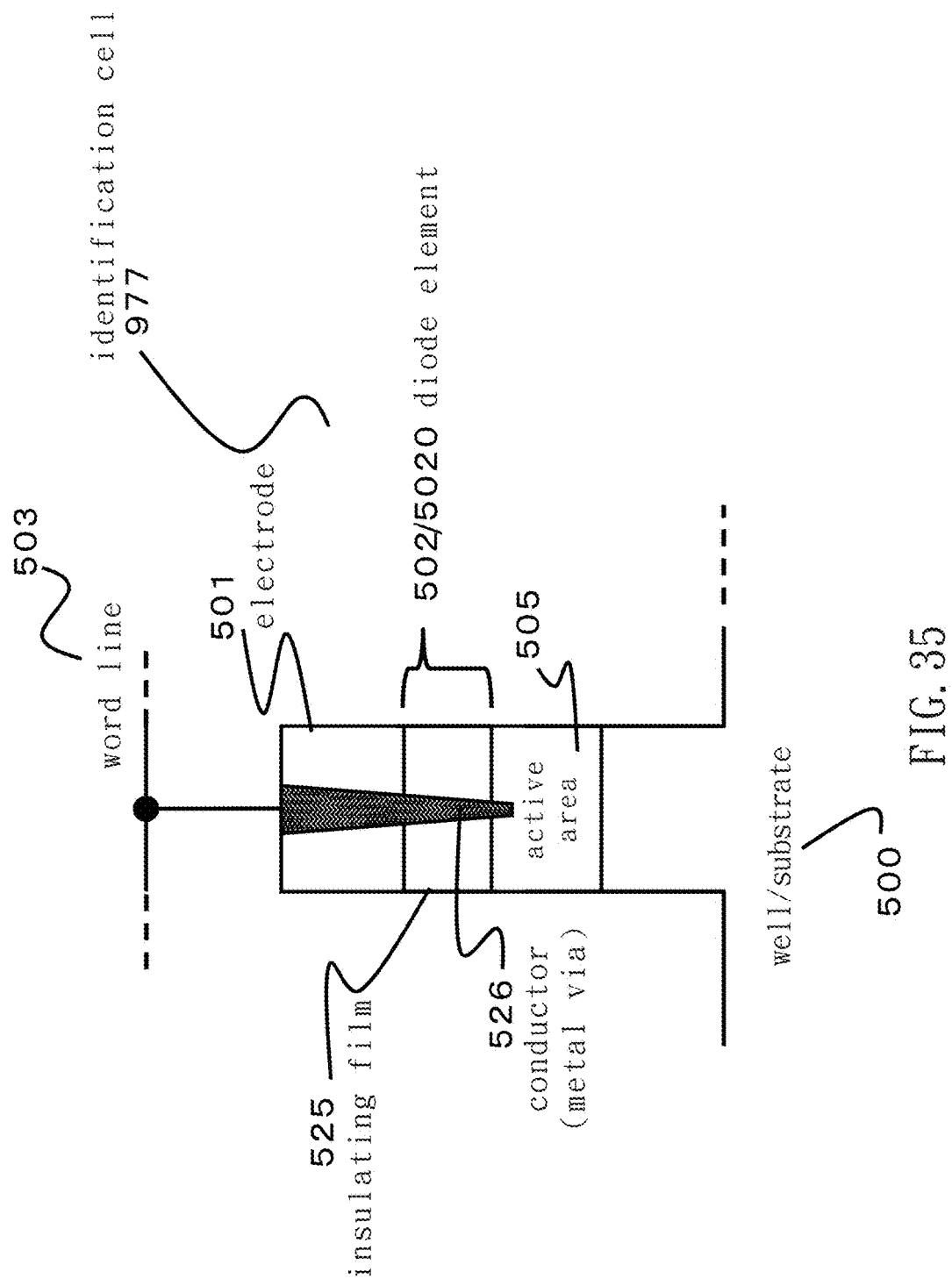
FIG. 35 illustrates an example of the cross-sectional view of a cell to realize the identification device.

FIG. 35 is an example of a cross-sectional view of an exemplary cell structure along the word line direction. In this example, an insulating film 525 may be adopted as the diode element 502 (or 5020), a vertical hole may be opened on the insulator and the metal via 526 may be buried therein. The metal via 526 may be formed by compensating the conduction specimen into the vertical hole that has been opened to reach the active area 505. Accordingly, the electromigration may occur more than in a conventional metal wiring by applying an electric current. The electromigration may probabilistically occur and accompanied with physical randomness. In the cells with the electromigration, the electric current may not flow though the broken metal via, for example, which may correspond to state "0" in terms of the semiconductor memories. In FIG. 22, they may correspond to "white". On the contrary, in the cells without the electromigration, the electric current may flow through the metal via, for example, which may correspond to state "1" in terms of the semiconductor memories. In FIG. 22, they may correspond to "black". The probability of the breakdown like this may be roughly tuned by controlling the electrified amount, the welding time, the opening size of the metal via 526, the length of the metal via 526 (thickness of insulating film 525), the material quality of the conducting specimen, the pressure, the density and temperature of gas, and so on to be used to compensate the conducting specimen. If the probability of this is made about 50%, the white-black random pattern on the checker board may be obtained. It may be self-evident that this randomness is free from any algorithm. For example, to cause the electromigration, a high voltage may be applied between at least one word line 503 and the electrode of the substrate (or well) 500, to make the electric current flow for a predetermined period of time.

The fourth embodiment is herein discussed.

Figure 36:
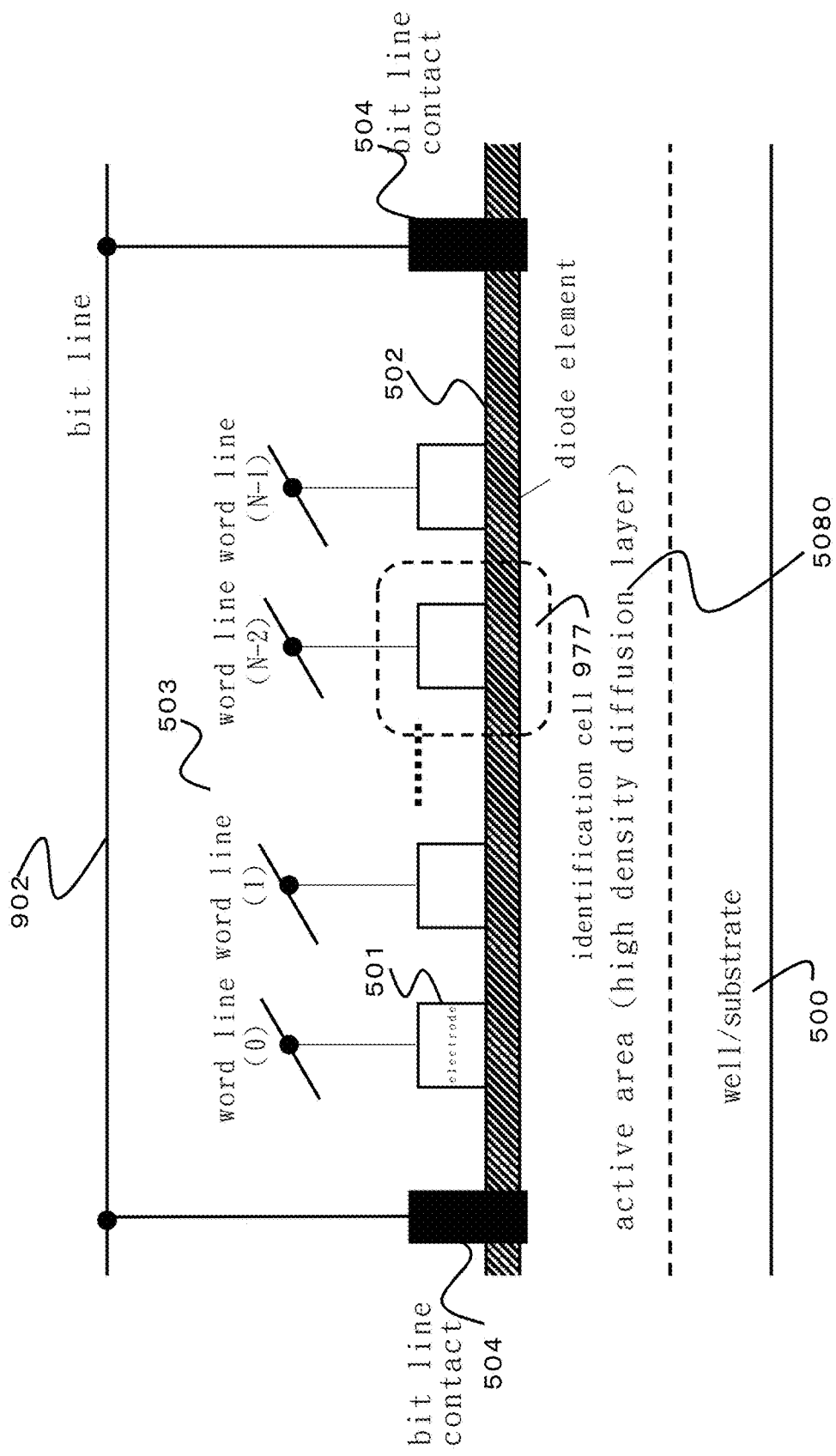
FIG. 36 illustrates an example of the cross-sectional view of a cell array to realize the identification device.
Figure 37:
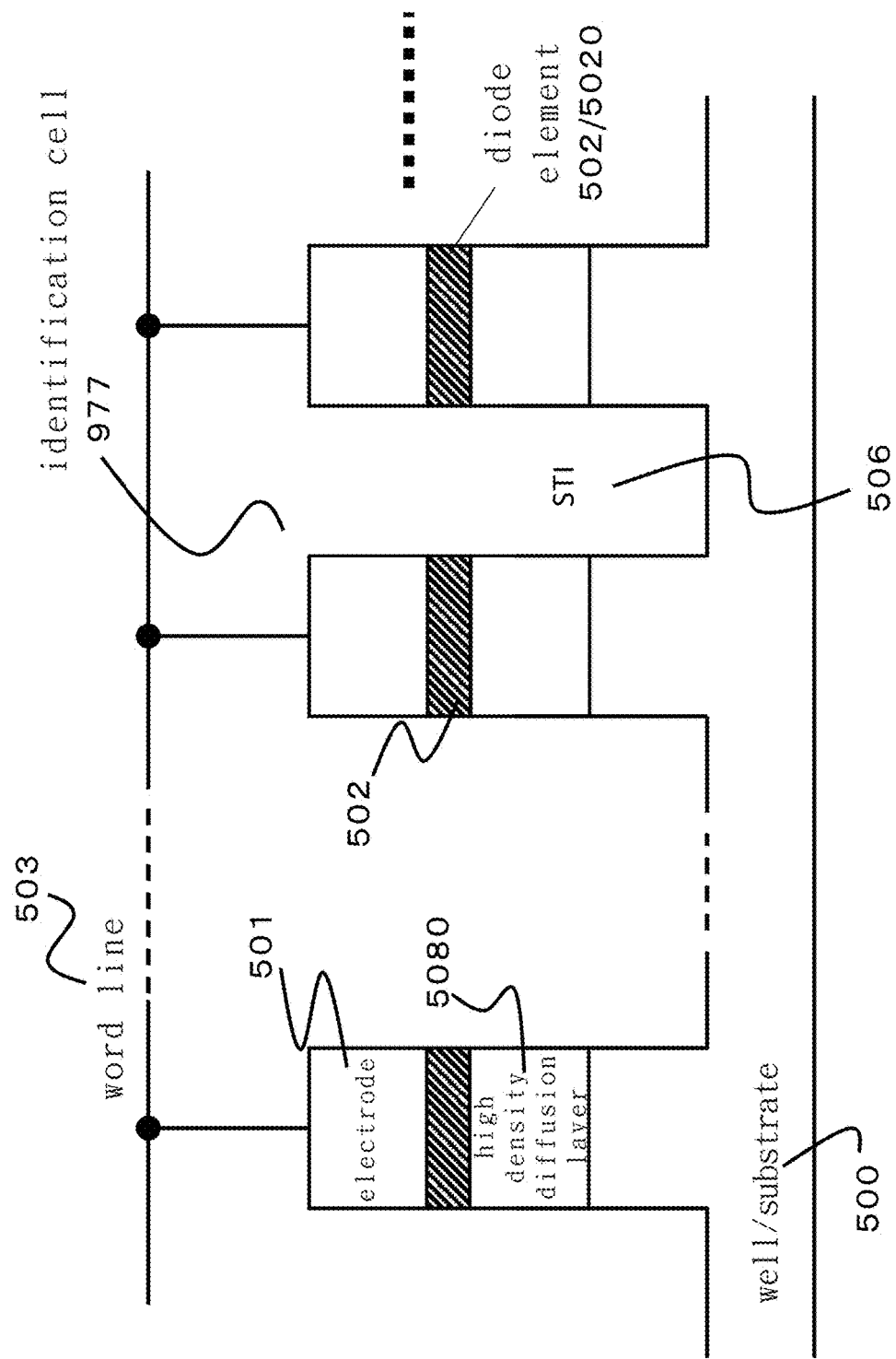
FIG. 37 illustrates an example of the cross-sectional view of a cell array to realize the identification device.
Figure 106:
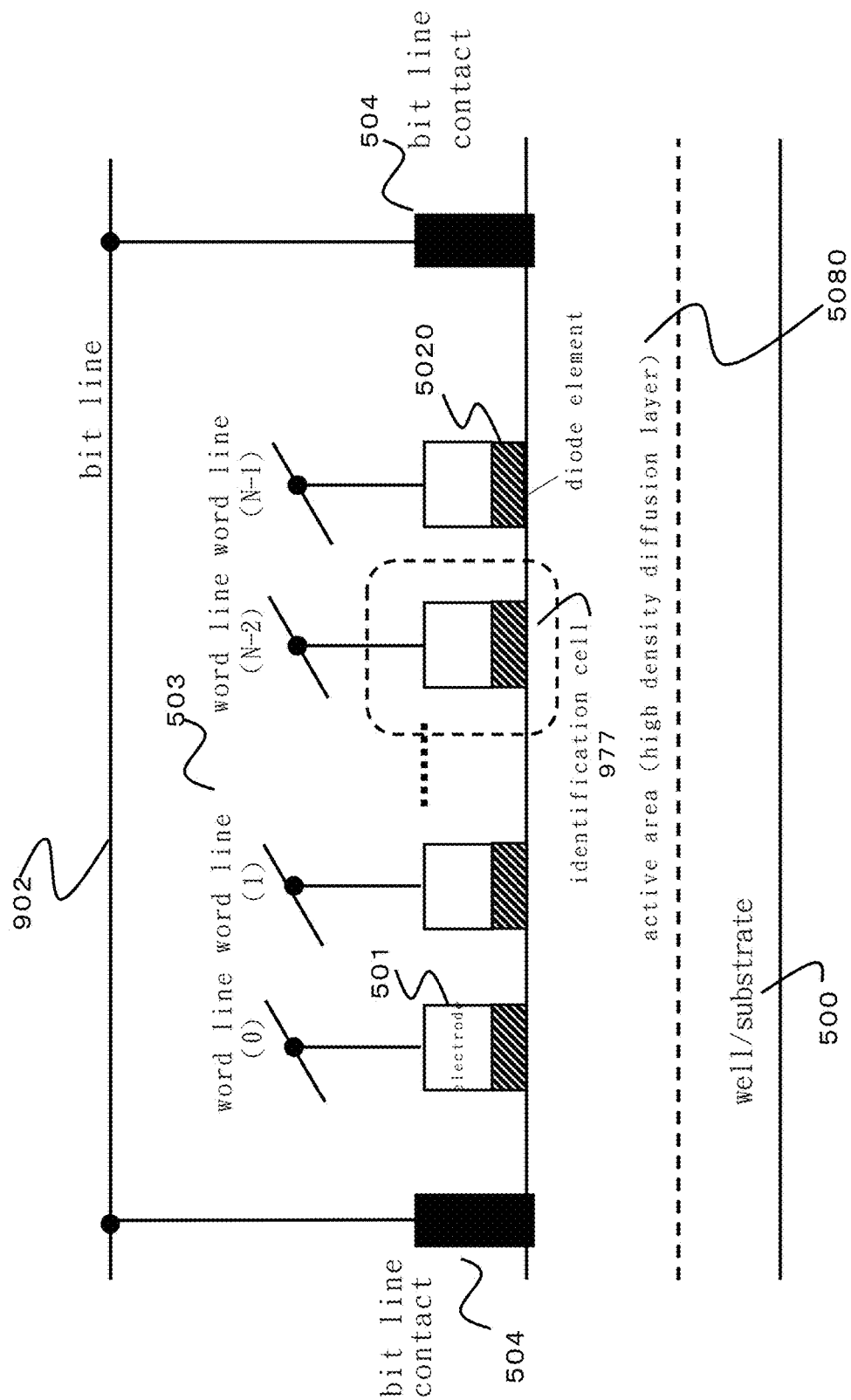
FIG. 106 illustrates an example of the cross-sectional view of a cell array realizing the chip identification device.

FIG. 36 illustrates a cross-sectional view of a cell array along a bit line, which may correspond to FIG. 23 to FIG. 29. There are a word line (0), a word line (1) . . . a word line (N-2), and a word line (N-1) from the left and the bit line contacts 504 at both ends. Unlike non-volatile memories, there are no select gate transistors between the bit line contacts 504 and the electrodes 501 at both ends. However, it may be possible that the select gate transistors are appended therebetween. Each of those N word lines may be connected to each electrode 501, below which electrodes there is a diode element 502, and further below which diode element there is a semiconductor substrate (or well) 500. The surface of the semiconductor substrate (or well) 500 is formed like the teeth of the comb along the word line direction, as illustrated in FIG. 37. FIG. 36 illustrates the cross-sectional view cut out from a tooth of the comb. The active area on the surface may be covered by a high density diffusion layer 5080. With no pass voltage applied to the unselected word lines, the adjoining cells are electrically connected to each other due to the high density diffusion layer 5080. The two bit line contacts 504 may go through the diode element 502 and may then reach the high density diffusion layer 5080. Moreover, as similar to the diode element 5020 in FIG. 106, this diode element may be cut in the direction perpendicular to the bit lines. The detailed explanation may be omitted because it is similar to FIG. 36.

FIG. 37 is a cross-sectional view perpendicular to FIG. 36. The word line 503 runs from the left to the right. In each tooth of the comb, the diode element 502 (or 5020) and the electrode 501 are laminated on the active area (high density diffusion layer) 5080. The space between those teeth of the comb may be buried by the interlayer insulating film. Then, the Shallow-Trench-Isolation (STI) 506 is formed.

Figure 38:
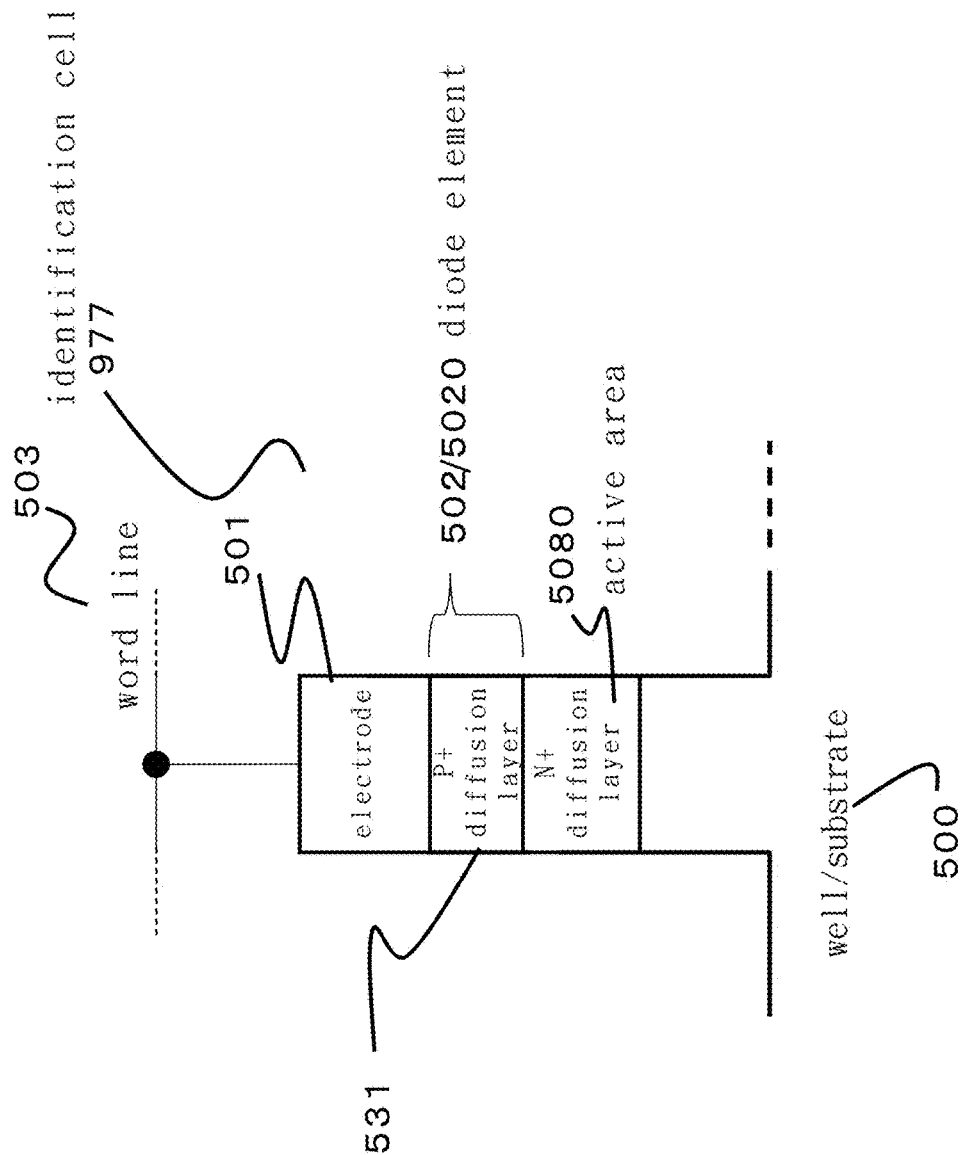
FIG. 38 illustrates an example of the cross-sectional view of a cell to realize the identification device.
Figure 39:
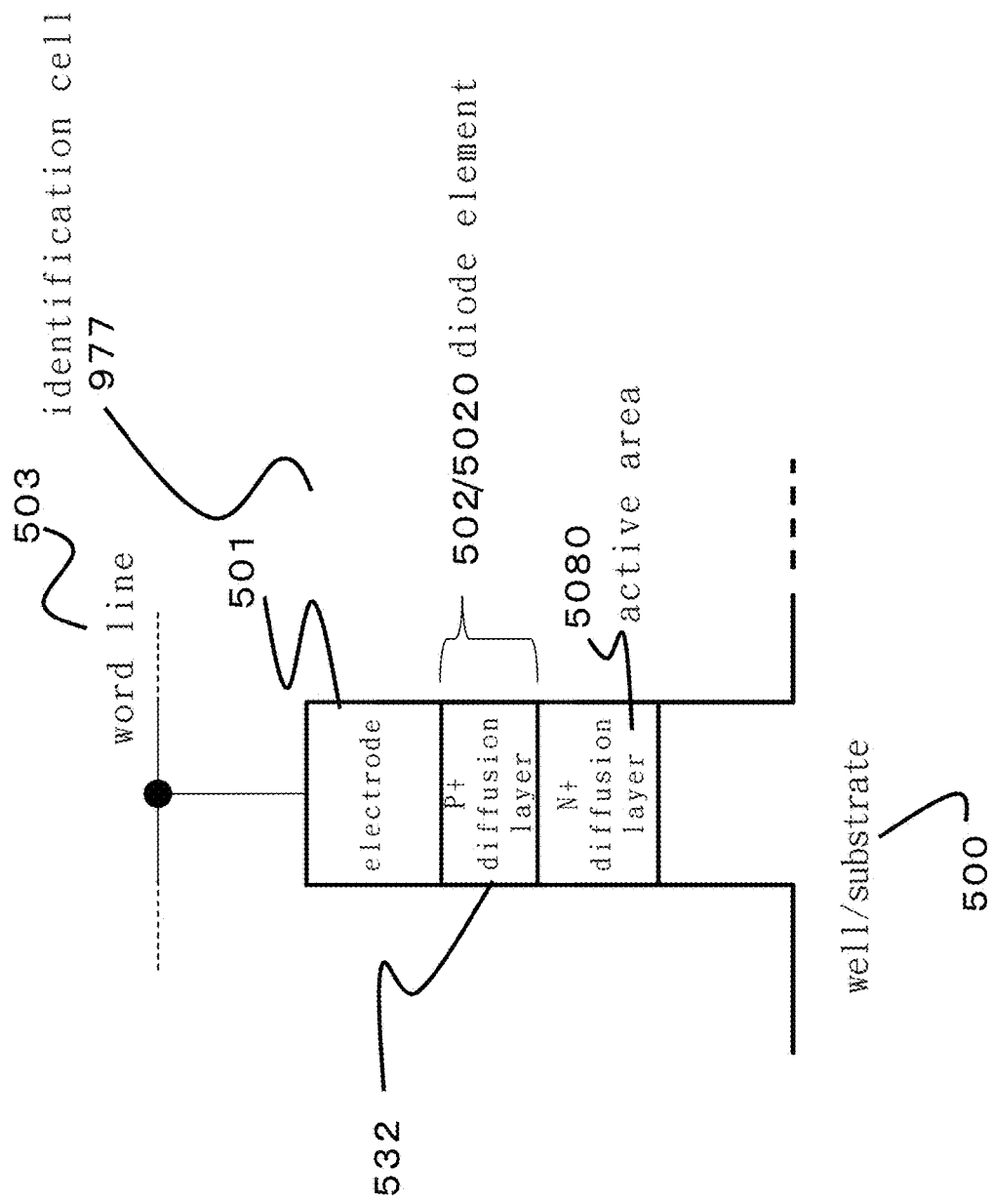
FIG. 39 illustrates an example of the cross-sectional view of a cell to realize the identification device.

FIG. 38 is an example of a cross-sectional view of an exemplary cell structure along the word line direction. In this example, a high density diffusion layer 5080 may be N+ type, and the P+ diffusion layers 531 may be adopted as the diode element 502 (or 5020). In this way, the PN junction may be formed. After making chips, this PN junction may be broken by applying the stress of an electric field or electric current. Such a breakdown may probabilistically occur and accompanied with physical randomness. In the cells with the broken PN junctions, the electric current may flow through those broken PN junctions even with reverse bias. For example, those cells may correspond to state "1" in terms of the semiconductor memory. In FIG. 22, they may correspond to "black". On the contrary, in the cells with the PN junctions being not broken, the electric current may not follow through those PN junctions with reverse bias, which may correspond to state "0" in terms of the semiconductor memories. In FIG. 22, they may correspond to "white". The probability of the breakdown like this may be roughly tuned by controlling the detailed structure of the PN junction, the strength and time of the electrical stressing, and the pulse of the stressing. If the probability is made about 50%, then the white-black random pattern on the checker board like FIG. 22 may be obtained. It may be self-evident that the randomness of this pattern is free from any algorithm. In this example, to apply such an electrical stress, it may be preferable that a high positive voltage is relatively applied to the high density diffusion layer 5080 (N+). For example, at least one word line may be grounded, and then a high positive voltage may be applied to the electrode of the substrate (or well) 500. Alternately, the electrode of the substrate (or well) 500 may be grounded, and then a high negative voltage may be applied to at least one word line 503. In this way, a high reverse bias may be applied to the PN junction. The high diffusion density may cause a higher probability of a junction breakdown attributable to this reverse bias. In this way, the probability of the junction breakdown may be roughly tuned FIG. 39 is an example of a cross-sectional view of an exemplary cell structure along the word line direction. In this example, a high density diffusion layer 5080 may be P+ type, and the N+ diffusion layer 532 may be adopted as the diode element 502 (or 5020). In this way, the PN junction may be formed. After making the chips, this PN junction may be broken by applying the stress of an electric field or electric current. Such a breakdown may probabilistically occur and accompanied with physical randomness. In the cells with the broken PN junctions, the electric current may flow through those broken PN junctions even with reverse bias. For example, those cells may correspond to state "1" in terms of the semiconductor memory. In FIG. 22, they may correspond to "black". On the contrary, in the cells with the PN junctions being not broken, the electric current may not follow through those PN junctions with reverse bias, which may correspond to state "0" in terms of the semiconductor memories. In FIG. 22, they may correspond to "white". The probability of the breakdown like this may be roughly tuned by controlling the detailed structure of the PN junction, the strength and time of the electrical stressing, the pulse of the stressing and so on. If the probability is made about 50%, then the white-black random pattern on the checker board, like FIG. 22, may be obtained. It may be self-evident that the randomness of this pattern is free from any algorithm. In this example, to apply such an electrical stress, it may be preferable that a high positive voltage is relatively applied to the N+ diffusion layer 532. For example, at least one word line may be grounded, and then a high negative voltage may be applied to the electrode of the substrate (or well) 500. In another option, the electrode of the substrate (or well) 500 may be grounded, and then a positive high voltage may be applied to at least one word line 503. In this way, a high reverse bias may be applied to the PN junction. The high diffusion density may cause a higher probability of the junction breakdown attributable to this reverse bias. In this way, the probability of the junction breakdown may be roughly tuned.

Figure 40:
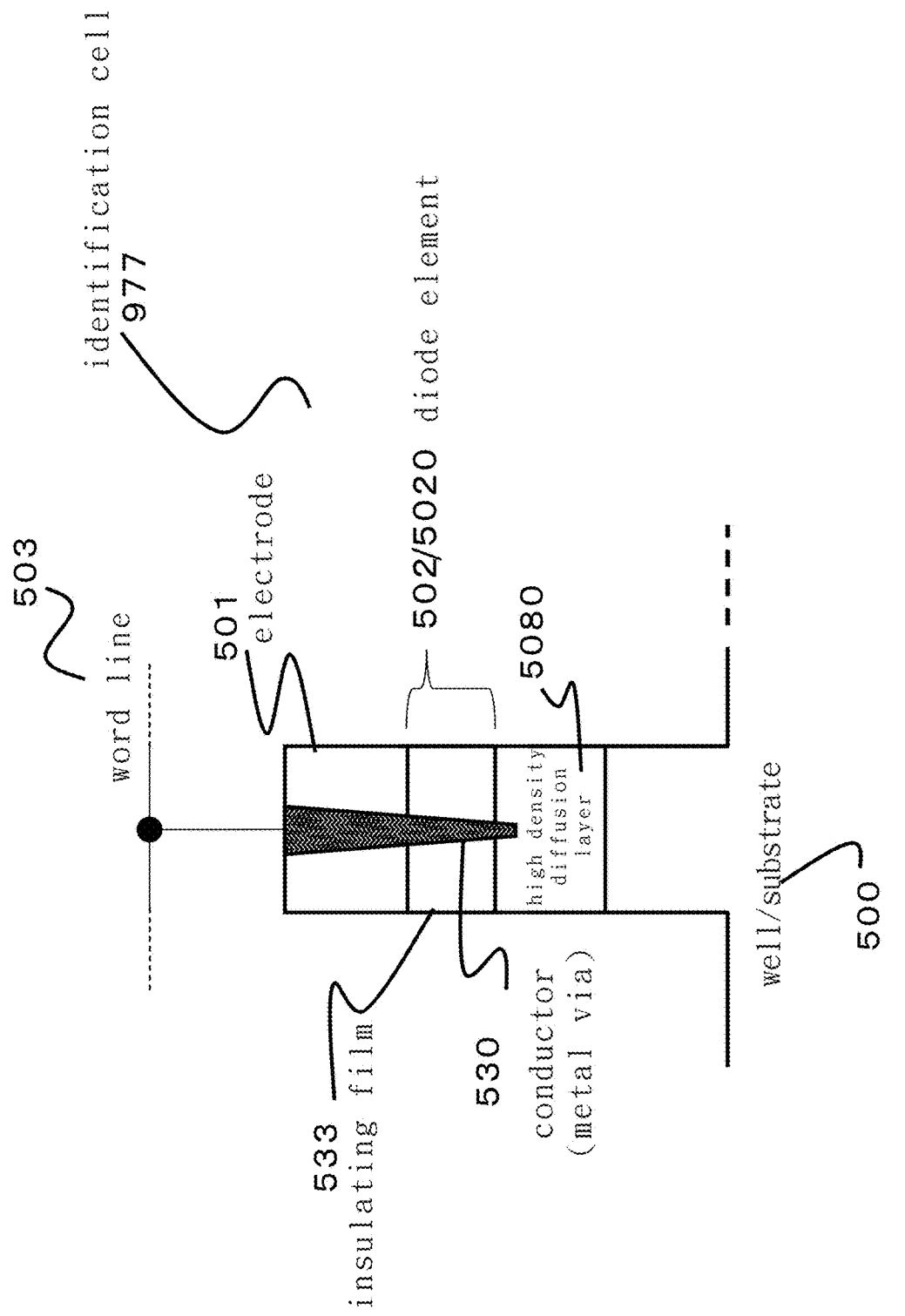
FIG. 40 illustrates an example of the cross-sectional view of a cell to realize the identification device.

FIG. 40 is an example of a cross-sectional view of an exemplary cell structure along the word line direction. In this example, an insulating film 533 may be adopted as the diode element 502 (or 5020). A vertical hole may be opened on the insulator, and the metal via 530 may be buried therein. The metal via 530 may be formed by compensating the conduction specimen into the vertical hole that has been opened to reach the active area (high density diffusion layer) 5080. Accordingly, the electromigration may occur more than in a conventional metal wiring by applying an electric current. However, the electromigration may probabilistically occur and accompanied with physical randomness. In the cells with the electromigration, the electric current may not flow though the broken metal via, for example, which may correspond to state "0" in terms of the semiconductor memories. In FIG. 22, they may correspond to "white". On the contrary, in the cells without the electromigration, the electric current may flow through the metal via, for example, which may correspond to state "1" in terms of the semiconductor memories. In FIG. 22, they may correspond to "black". The probability of the breakdown like this may be roughly tuned by controlling the electrified amount, the welding time, the opening size of the metal via 530, the length of the metal vial 530 (thickness of the insulating film 533), the material quality of conducting specimen, the pressure, the density and temperature of gas and so on to be used to compensate the conducting specimen. If the probability of this is made about 50%, the white-black random pattern on the checker board may be obtained. It may be self-evident that this randomness is free from any algorithm. For example, to cause the electromigration, a high voltage may be applied between at least one word line 503 and the electrode of the substrate (or well) 500, to make the electric current flow therebetween for a predetermined period of time.

The fifth embodiment is herein discussed.

Figure 41:
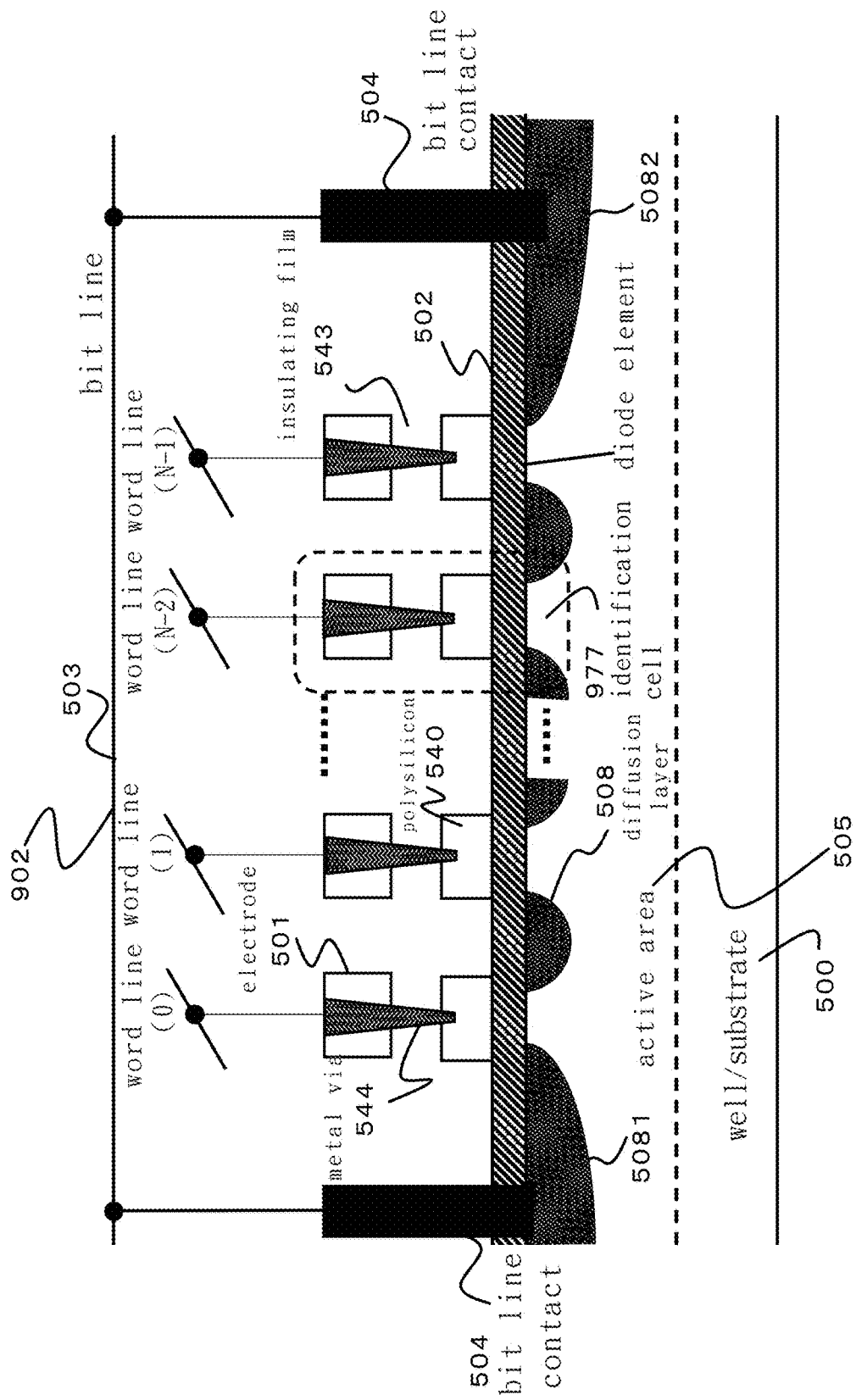
FIG. 41 illustrates an example of the cross-sectional view of a cell array to realize the identification device.
Figure 42:
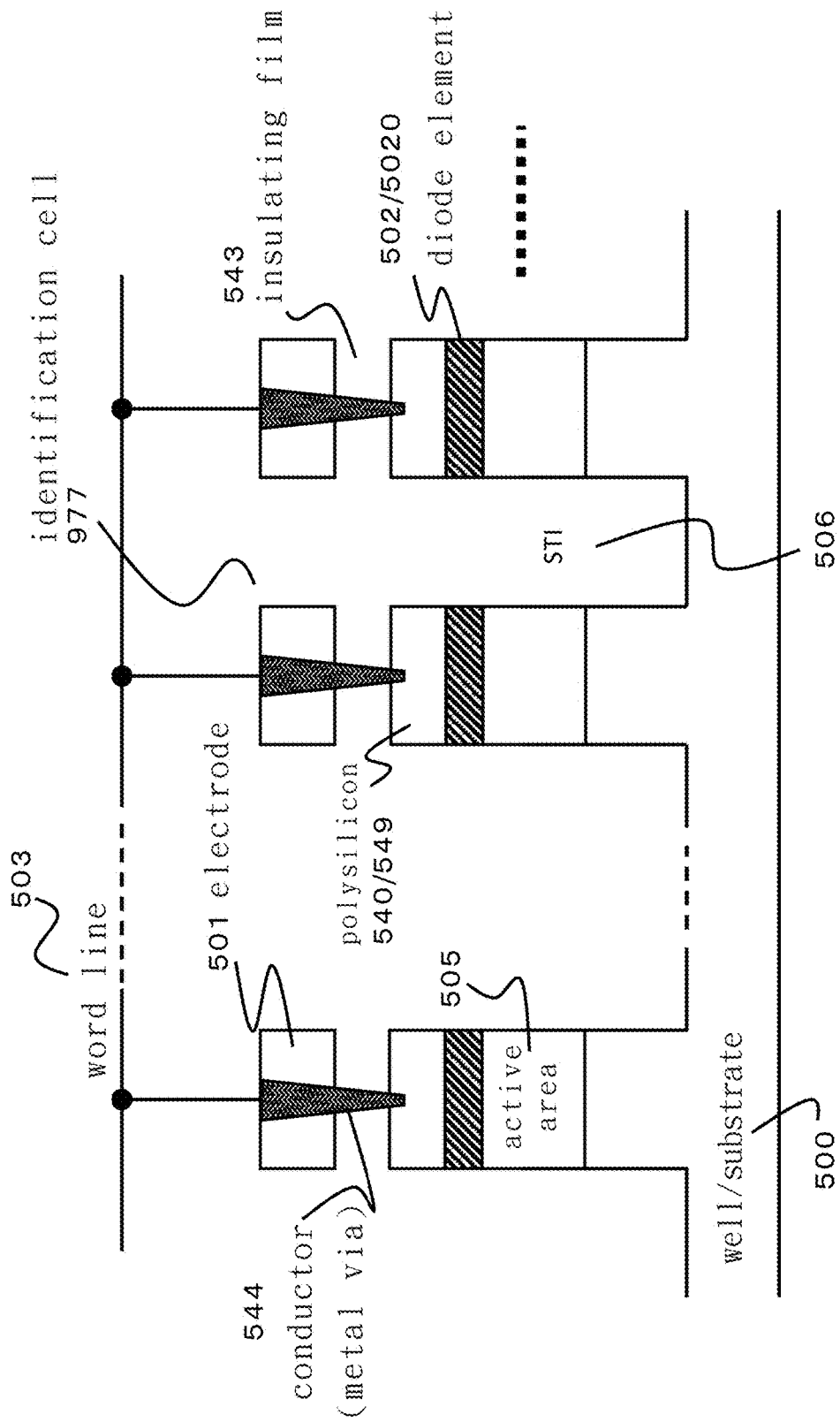
FIG. 42 illustrates an example of the cross-sectional view of a cell array to realize the identification device.
Figure 107:
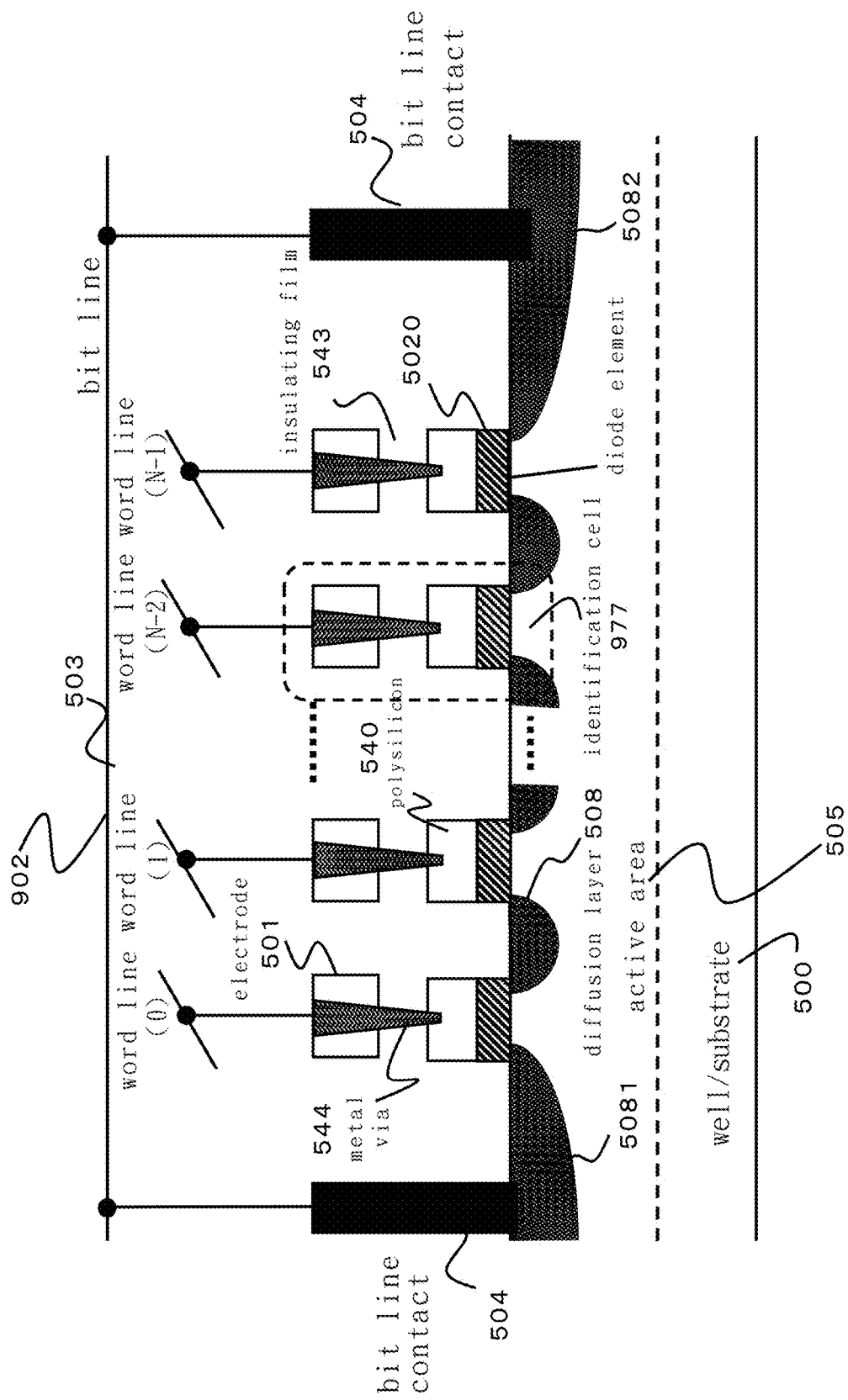
FIG. 107 illustrates an example of the cross-sectional view of a cell array realizing the chip identification device.

FIG. 41 illustrates a cross-sectional view of a cell array along a bit line, which may correspond to FIG. 23 to FIG. 29. There are a word line (0), a word line (1) . . . a word line (N-2), and a word line (N-1) from the left and the bit line contacts 504 at both ends. Unlike non-volatile memories, there are no select gate transistors between the bit line contacts 504 and the electrodes 501 at both ends. However, it may be possible that the select gate transistors are appended therebetween. Each of those N word lines 503 may be connected to each electrode 501, below which electrodes there are an insulating film 543 and a polysilicon 540, and further below which there is a diode element 502. The electrode 501 and the polysilicon 540 may be connected to each other (non-short) with the metal via 544 in which the conductive specimen is buried. Further beneath, there is the substrate (or well) 500. The surface of the semiconductor substrate (or well) 500 is formed like the teeth of the comb along the word line direction. FIG. 41 illustrates the cross-sectional view cut out from a tooth of the comb, as illustrated in FIG. 42. The surface of the teeth of the comb may be the active area 505. There may be diffusion layers 508 between adjoining electrodes, with a pass voltage applied to the unselected word lines. The induced inversion layer may cause the adjoining diffusion layers to be electrically connected to each other. The two bit line contacts 504 may go through the diode element 502 and may then reach the diffusion layers 5081 and 5082, respectively. Moreover, as similar to the diode element 5020 in FIG. 107, this diode element may be cut in the direction perpendicular to the bit lines. The detailed explanation may be omitted because it is similar to FIG. 41.

FIG. 42 is a cross-sectional view perpendicular to FIG. 41, which is along the word line. The word line runs from the left to the right there. The diode element 502 (or 5020), the polysilicon 540, the insulating film 543, and the electrode 501 are laminated on the active area 505 which is a tip of the teeth of the comb. The electrode 501 and the polysilicon 540 may be connected by the metal via 544 in which the conductive specimen may be buried. The space between adjoining teeth of the comb is buried by the interlayer insulating film. Then, the Shallow-Trench-Isolation (STI) 506 is formed.

Figure 43:
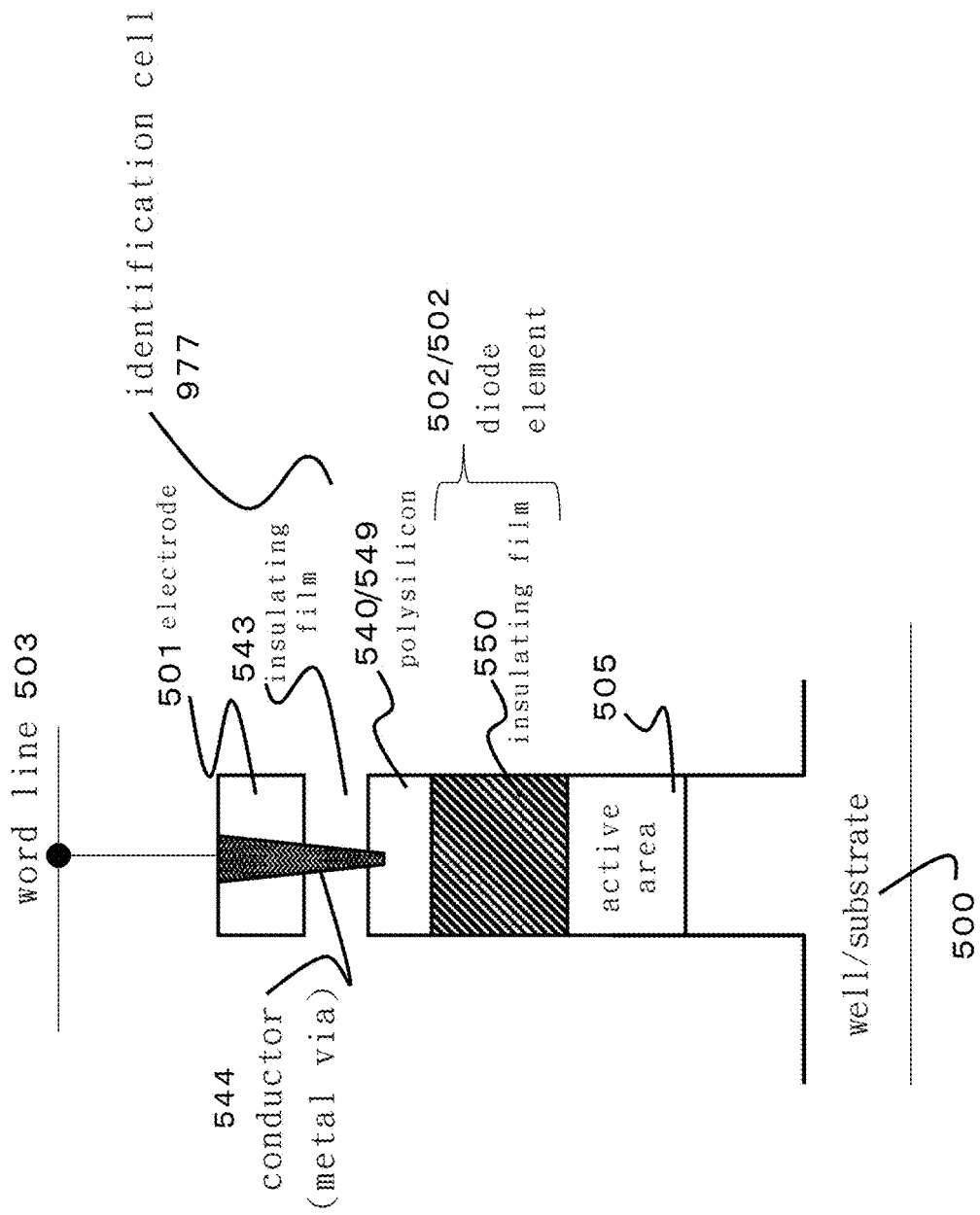
FIG. 43 illustrates an example of the cross-sectional view of a cell to realize the identification device.
Figure 44:
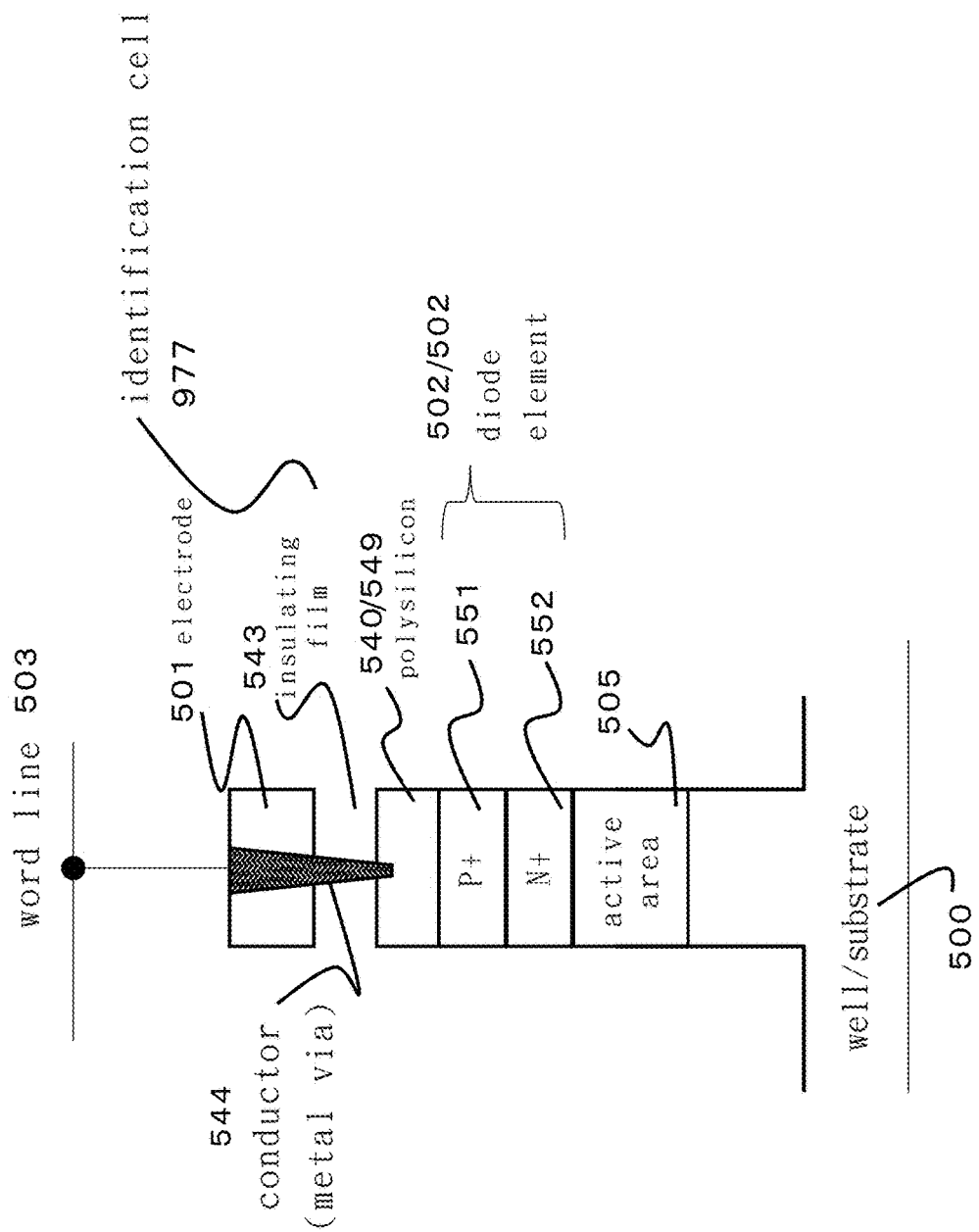
FIG. 44 illustrates an example of the cross-sectional view of a cell to realize the identification device.
Figure 45:
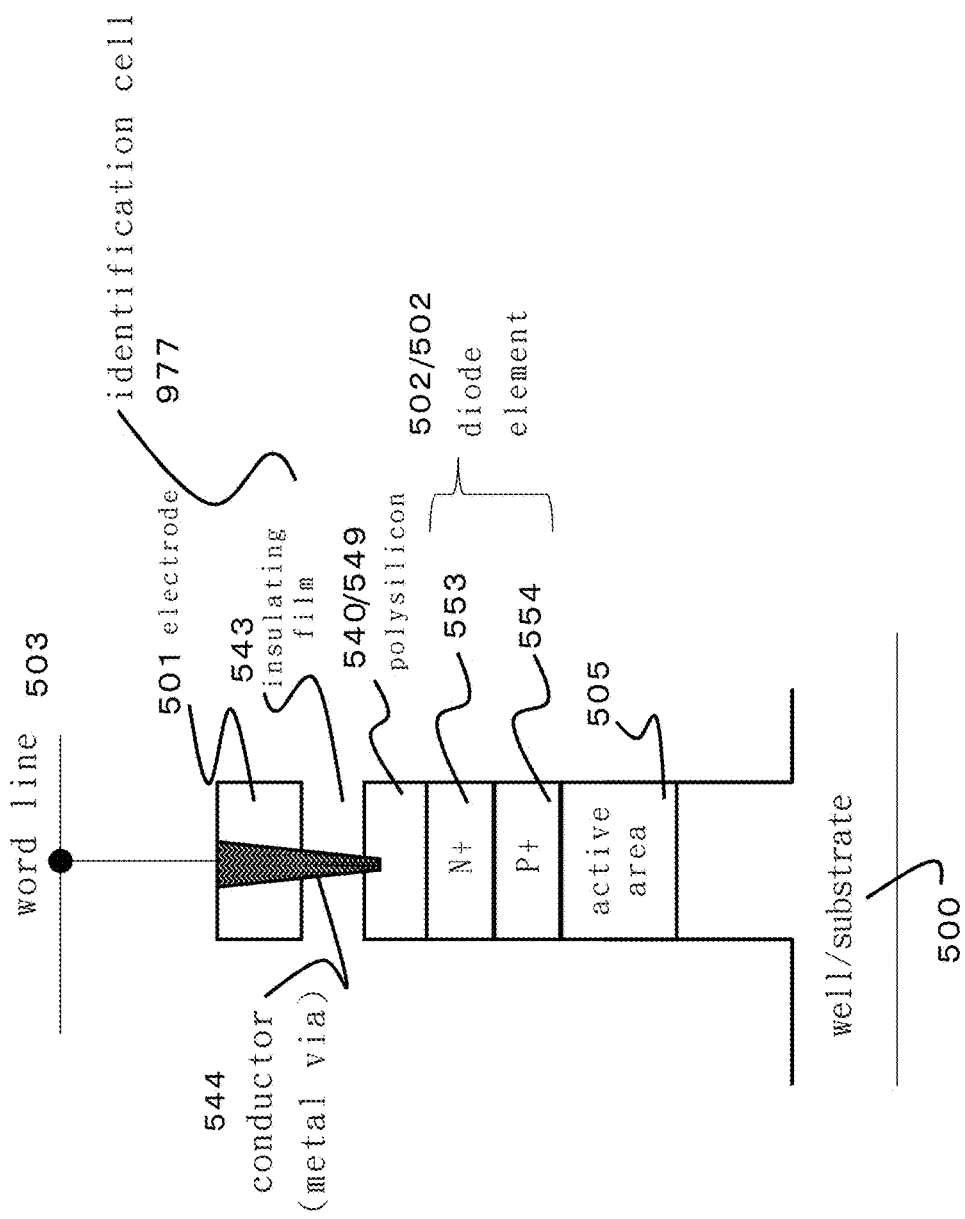
FIG. 45 illustrates an example of the cross-sectional view of a cell to realize the identification device.

In the present embodiment, the diode element 502 may be the insulating film 550 as illustrated in FIG. 43, or may be the PN junctions as illustrated in FIG. 44 and FIG. 45. Those diode elements may be broken in a similar way mentioned above, by applying the electric field stress or the electrical stress such as the electric current. Such a breakdown may probabilistically occur and accompanied with physical randomness. The electric current may flow in the cells with the diode breakdown. On the contrary, the electric current may not flow in the cells without the diode breakdown. The probability of the breakdown may be roughly tuned by controlling the detailed structure of the diode element, the strength and welding time of the electrical stress, the condition of the stress pulse and so on. Moreover, as explained in the third embodiment, the conductive specimen of the metal via 544 may cause the electromigration by applying the electric current more than in the conventional metal wiring. In the present embodiment, the probability of the electromigration may be higher in the cells where the diode element 502 is broken. The occurring ratio of this breakdown may be probabilistically and accompanied with physical randomness. The electric current may not flow in the cells with the electromigration. On the contrary, the electric current may flow in the cells without the electromigration. Considering both failure modes of the diode breakdown (the breakdown of the insulating film or the PN junctions) and the conductivity breakdown by the electromigration, for example, the cells through which the electric current may not flow may be regarded as state "0" in terms of the semiconductor memories. On the contrary, the cells through which the electric current may occur may be regarded as state "1". This probability may be roughly tuned by controlling the electrified amount, the welding time, the diameter of the metal via 544, the length of the metal via 544 (the thickness of the insulating film 543), the material quality of the conductive specimen, the pressure, the density, and the temperature of gas to be used to compensate the conductive specimen into the metal via 544. Thus, in the present embodiment, both factors of the physical randomness, the electromigration of the conductive specimen of the metal via 544 and the breakdown of the diode element 502 may cause the physical random pattern like FIG. 22. In this event, it may be preferable that the ratio of white and black is made about 50% by considering both two types of the physical randomness.

The sixth embodiment is herein discussed.

Figure 46:
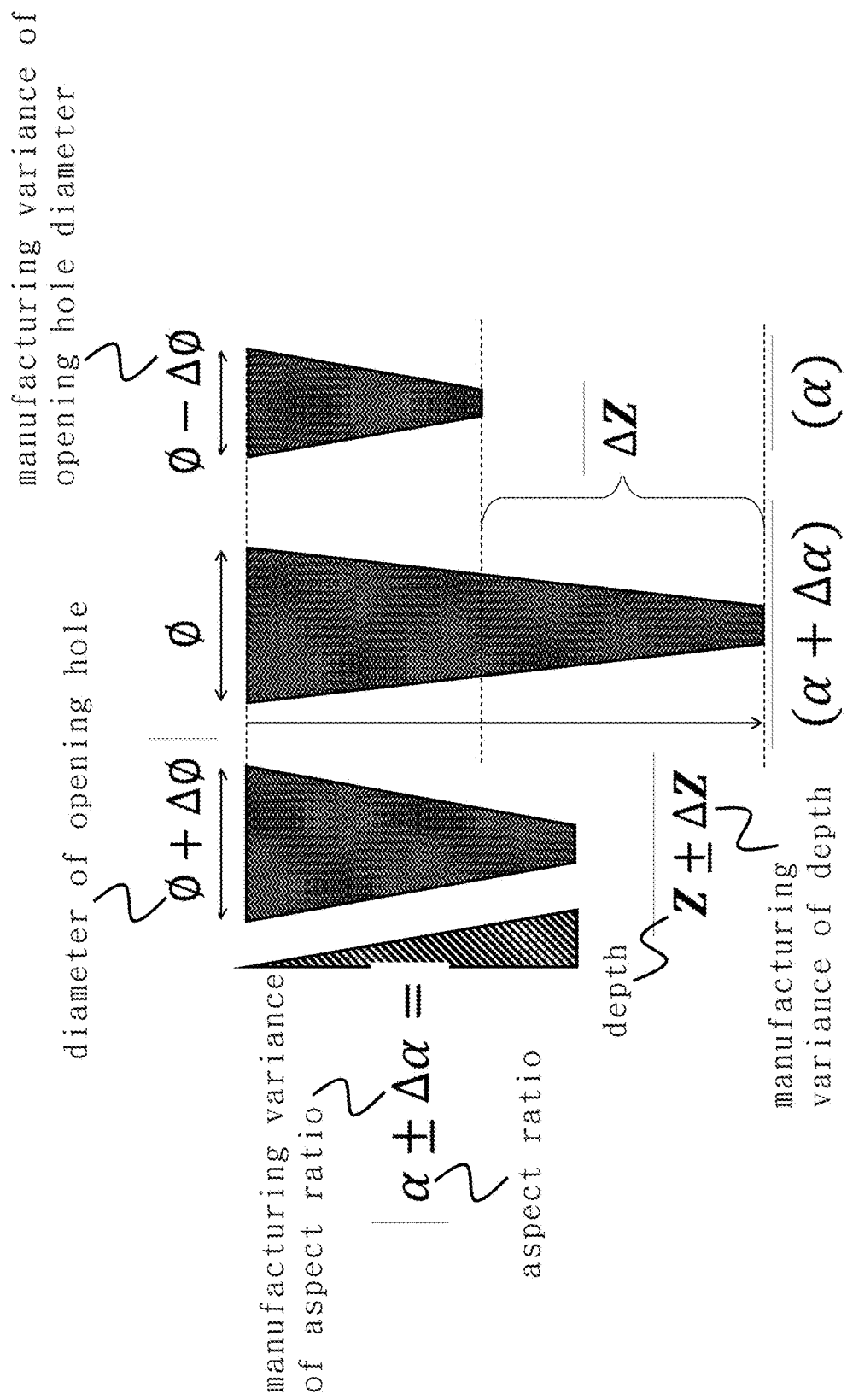
FIG. 46 illustrates the manufacturing variance in the process to form the metal via.

FIG. 46 illustrates the fluctuation of the fabrication of the metal via. To form the metal via, firstly, the process of opening the vertical holes is required. Basically, the photoresist may be laminated with small holes. The etching process may then be performed until the thickness of the vertical hole (via) arrives at the predetermined one, and, then, the photoresist is removed. After that, the metal via may be formed by burying the conductive specimen therein. For example, the photoresist with holes on the electrodes 501 may be laminated, and, then, the etching may be done. The depth of the via may be determined by a combination of the factors such as the diameter of the via, the etching time of the via, the ratio of the etching gases component, and the aspect ratio (the ratio of the diameter of the via to the depth of the via). However, the fluctuation in the aspect ratio and the diameter cannot be ignored. Accordingly, the depth of the via may be also fluctuated. This fluctuation may be regarded as an independent from any algorithm due to physical randomness.

Figure 47:
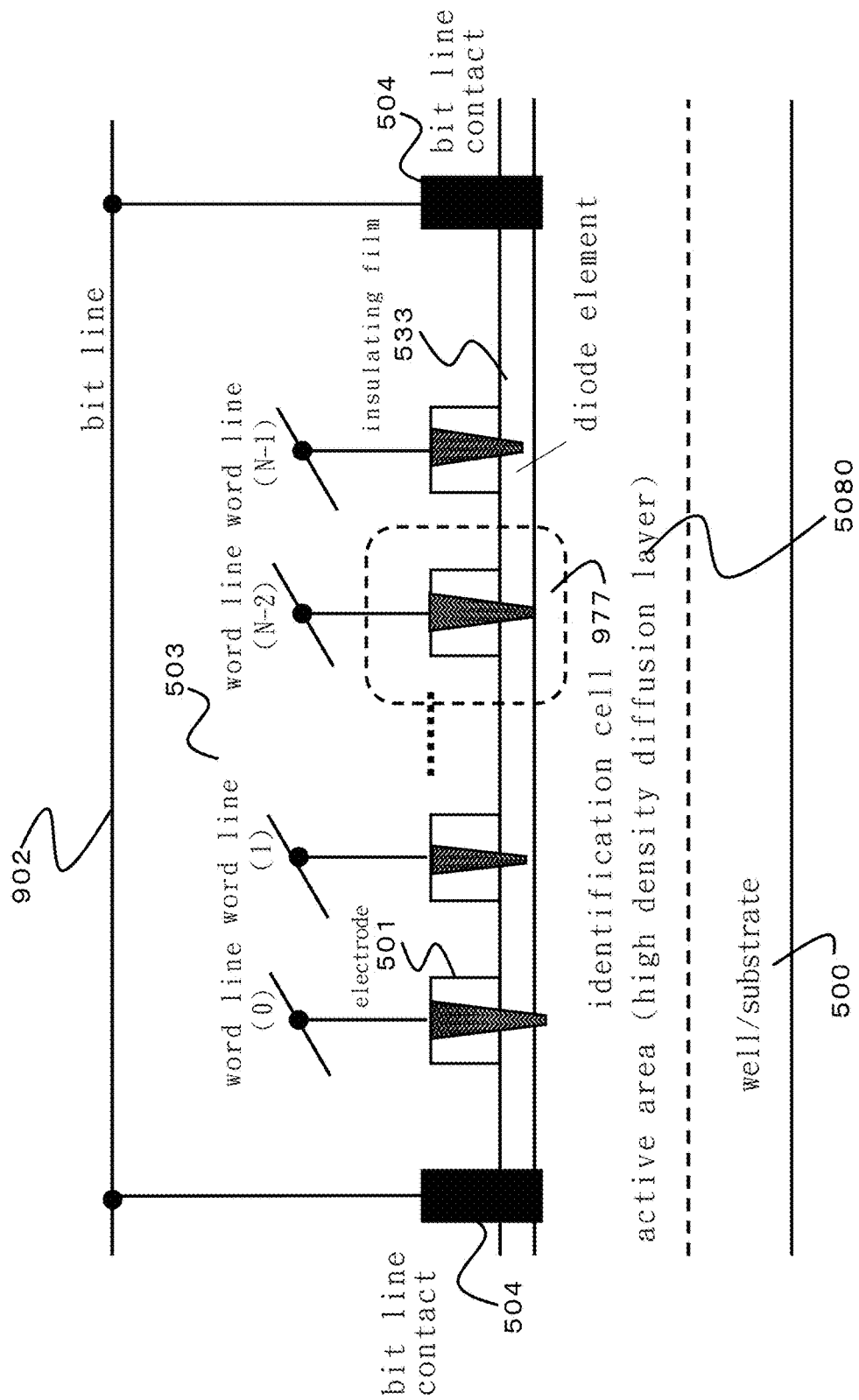
FIG. 47 illustrates an example of the cross-sectional view of a cell array to realize the identification device.

FIG. 47 illustrates an example of applying the physical randomness of the via like this to the structure shown in FIG. 36. For example, the target depth of the via is defined as being equivalent to the thickness from the surface of the electrode 501 to the surface of the high density diffusion layer 5080. In this event, the via thickness may be fluctuated due to the fluctuation of the aspect ratio and the diameter of the via. In some cells, the electrode 501 and the high density diffusion layer 5080 may not be connected to each other (short). However, in other cells, they may be connected to each other (non-short). For example, in this figure, there are non-short, short . . . non-short, and short cells. If the via of the cell selected by the word line and bit line is short, then the electric current may not flow at that address, which may correspond to state "0" in terms of the semiconductor memories. On the contrary, the electric current may flow if the via is not short, which may correspond to state "1" in terms of the semiconductor memories. In a similar way to FIG. 22, by labeling "0" as white and "1" as black, the white-black random pattern may be generated on the checker board. It is noted herein that the fluctuation of the depth of the via comes from the manufacturing variance in the mass product process, which may accordingly be free from any algorithm. Thus, it may be regarded as physical randomness. Moreover, the electrical stress is not necessary to obtain such a physical randomness. However, the ratio of the white and black can be checked after the formation of the metal. If the ratio has a large difference from the predetermined value, the electrical stress may be applied to recover the gap to the predetermined value. For example, a cell with the metal via being short (white) is considered. In this situation, the insulating film (a part of 533) between the bottom of the via and the surface of the high density diffusion layer 5080 may be broken, thus changing from white to black. On the contrary (black), for a cell where the via is not short (reaching the surface of the high density diffusion layer 5080), the electromigration may change it from black to white. In this way, the ratio of the dielectric breakdown and the electromigration may be tuned by applying voltage. However, it may be difficult to artificially control which one of the dielectric breakdown or electromigration occurs more frequently than the other one. Then, if the cells of data "1" are in the majority, we may select only the cells of data "1" and then apply stress on them. On the contrary, if the cells of date "0" are in the majority, we may select only the cells of data "0" and then may apply stress on them. In this way, while checking the ratio of "1" and "0", we may repeatedly apply stress like this until the ratio becomes close to the predetermined value.

Figure 48:
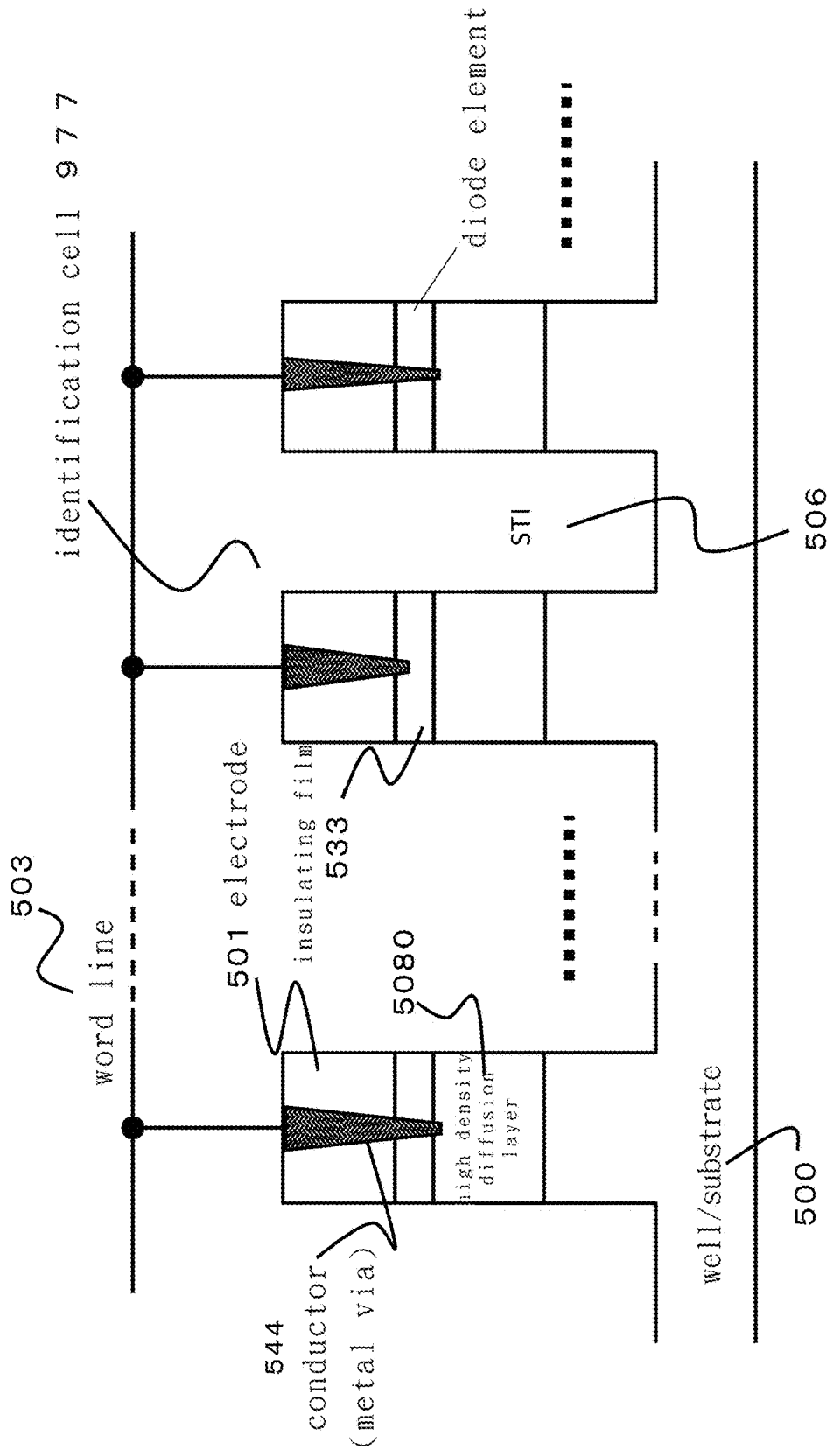
FIG. 48 illustrates an example of the cross-sectional view of a cell array to realize the identification device.

FIG. 48 is a cross-sectional view which is perpendicular to FIG. 47. The word line 503 runs from the left to the right. The insulating film 533 and the electrode 501 are laminated on the high density diffusion layer 5080 at the tips of the teeth of the comb. The space between adjoining teeth may be buried with the interlayer insulating film, and then the Shallow-Trench-Isolation (STI) 506 is formed. The electrode 501 and the high density diffusion layer 5080 may be connected with the metal via in which conductive specimen is buried. This metal via, as mentioned above, may be short in some cells and not short in the other cells. In the example of this figure, there are non-short . . . short, non-short . . . cells.

Figure 108:
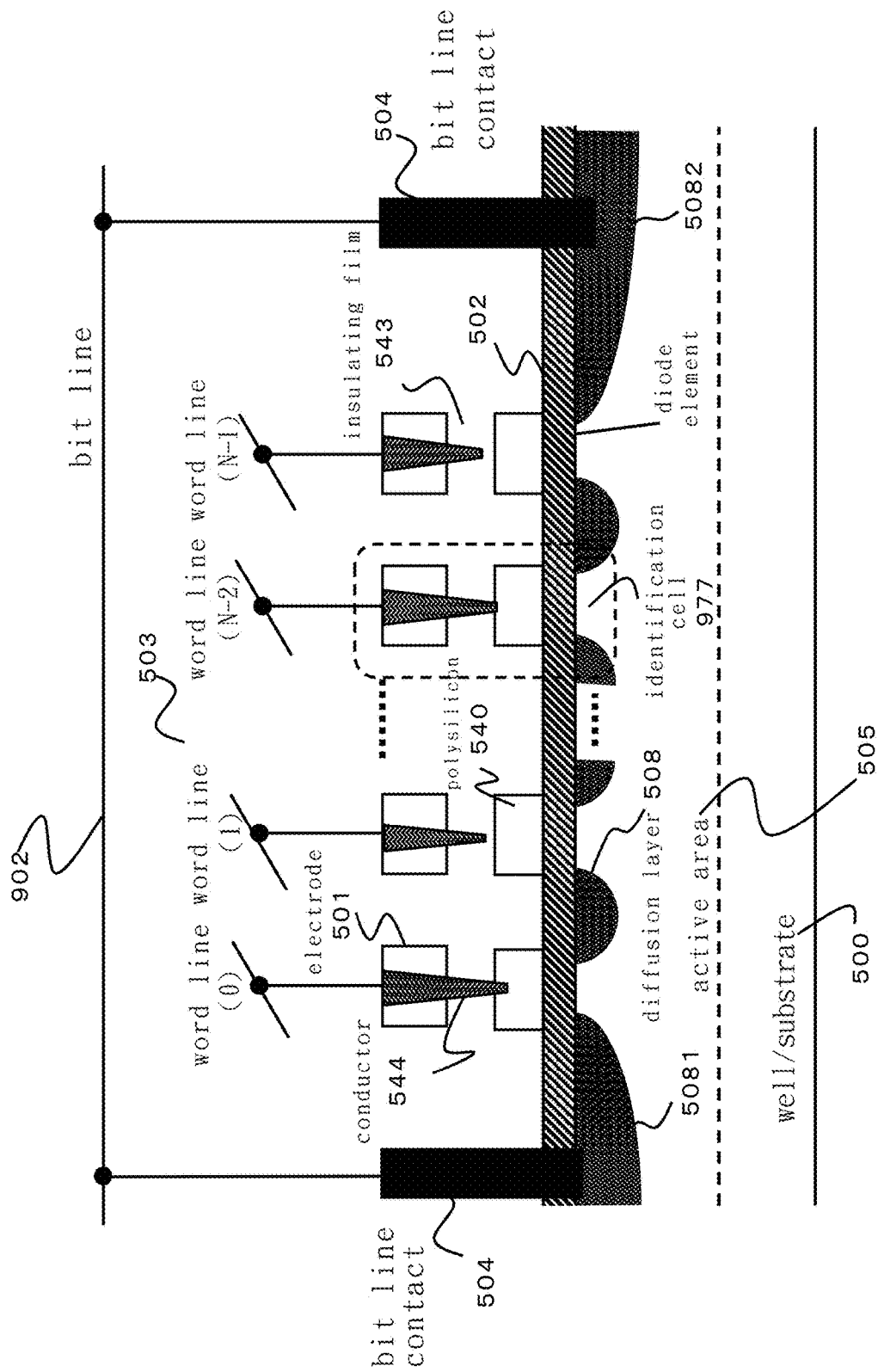
FIG. 108 illustrates an example of the cross-sectional view of a cell array realizing the chip identification device.

Next, an example of using fluctuation of the metal via in the structure of FIG. 41 is described. It is noted herein that the target depth of the via is equivalent to the distance from the surface of electrode 501 to the surface of the polysilicon 540. The depth of the via may be fluctuated due to physical randomness in the fabrication process, namely, the fluctuation in the aspect ratio and diameter, as illustrated in FIG. 108. The thickness fluctuation like this may be probabilistic and accompanied with physical randomness. Thus, the electrode 501 and the polysilicon 540 may be disconnected from each other (short) in some cells or connected to each other in the other cells. In the example of FIG. 108, there are non-short, short . . . non-short, and short cells from the left to the right. The electric current may not flow if the metal via of a cell selected by the word line and the bit line is short. On the contrary, the electric current may flow if the metal via of the selected cell is connected (non-short). It is noted herein that the fluctuation in the via thickness may be the manufacturing variance in the mass product process, which may be free from any algorithm. Accordingly, this fluctuation may be regarded as physical randomness. Moreover, it may not be necessary to apply the electrical stress. However, the ratio of white and black can be checked after the formation of the metal via. If the checked ratio has a large difference from the predetermined ratio as required, electrical stress can be applied to reduce the difference.

Figure 112:
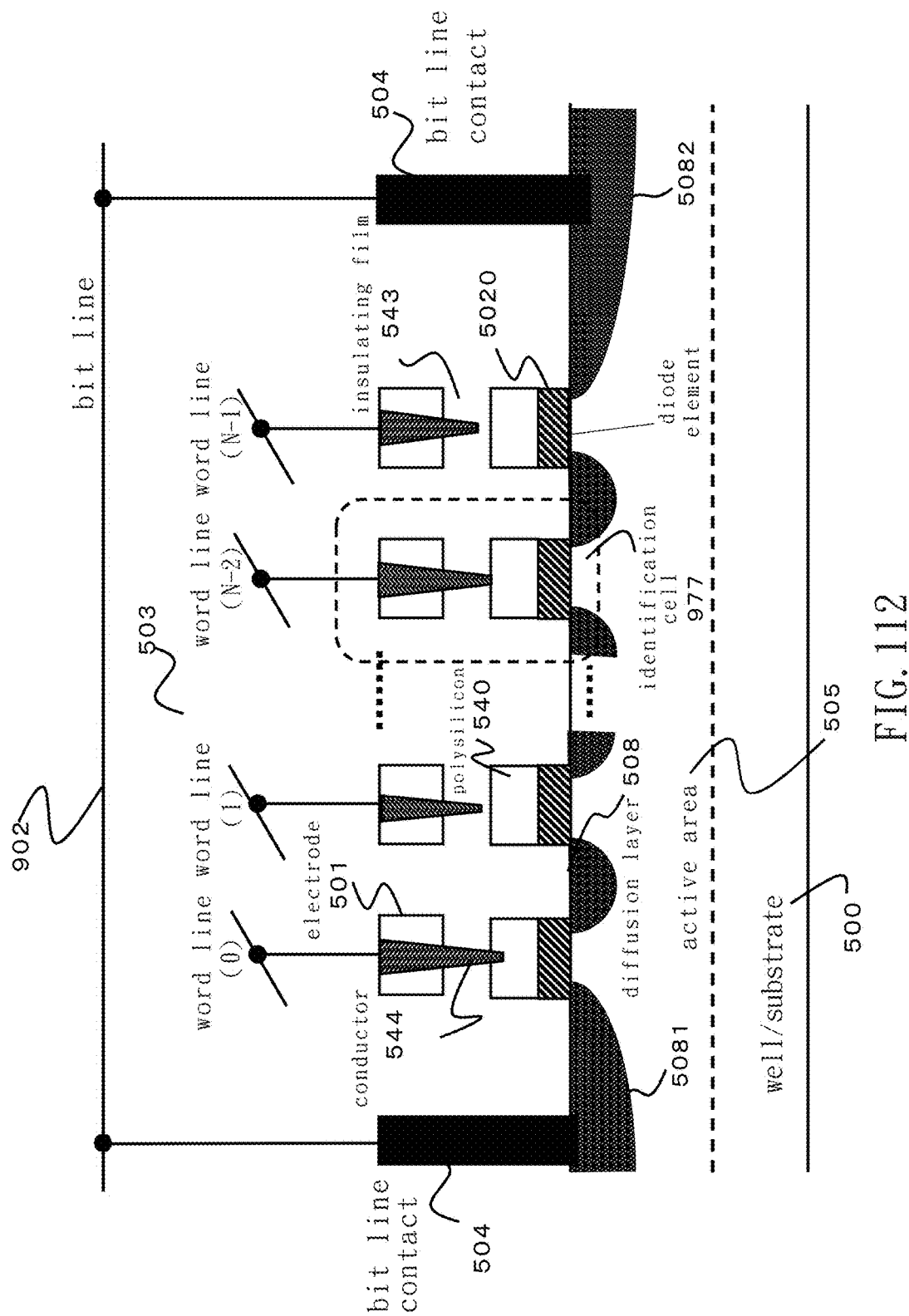
FIG. 112 illustrates an example of the cross-sectional view of a cell array realizing the chip identification device.

For example, a cell in which the metal via is short may be changed to non-short by breaking the insulating film (a part of insulating film 543) between the bottom of the via and the polysilicon 540 in FIG. 108. On the contrary, a cell in which the metal via is non-short may be changed to short by causing the electromigration. In this way, the ratio of the dielectric breakdown and electromigration may be tuned by applying voltage. However, it may be difficult to artificially control which one of the dielectric breakdown or electromigration occurs more frequently than the other one. Then, if the cells of non-short are in the majority, we may select only the non-short cells and then apply stress on them. On the contrary, if the cells of short are in the majority, we may select only the short cells and then apply stress on them. In this way, while checking the ratio of non-short and short, we may repeatedly apply the stress on them. Moreover, the diode element 502 shown in FIG. 108 may be cut in the direction perpendicular to the bit line direction, as illustrated in FIG. 112. The detailed description in that event may be similar to this and then may be omitted.

In this way, we may be able to adopt three factors of physical randomness—the conductivity breakdown by electromigration of the metal via 544, a short of the metal via 544 by the manufacturing variance, and the breakdown of the diode element 502. In this event, it may be preferable that the ratio of short and non-short is made about 50% by collecting all three factors of physical randomness. Here, short may correspond to "0" in terms of the semiconductor memories. Non-short may correspond to "1" in terms of the semiconductor memories. If one of the three factors is "0", then the cell may be "0". Moreover, if the target value of the depth of the metal via 544 is thicker than the distance to the surface of the polysilicon 540, then we may adopt two factors of physical randomness—the electromigration of the metal via 544 and the breakdown of the diode element 502. In this event, it may be preferable that the ratio of "0" and "1" is made about 50% by combining these two factors of physical randomness. Here, if one of those factors is "0", the cell may be The seventh embodiment is herein discussed.

Figure 49:
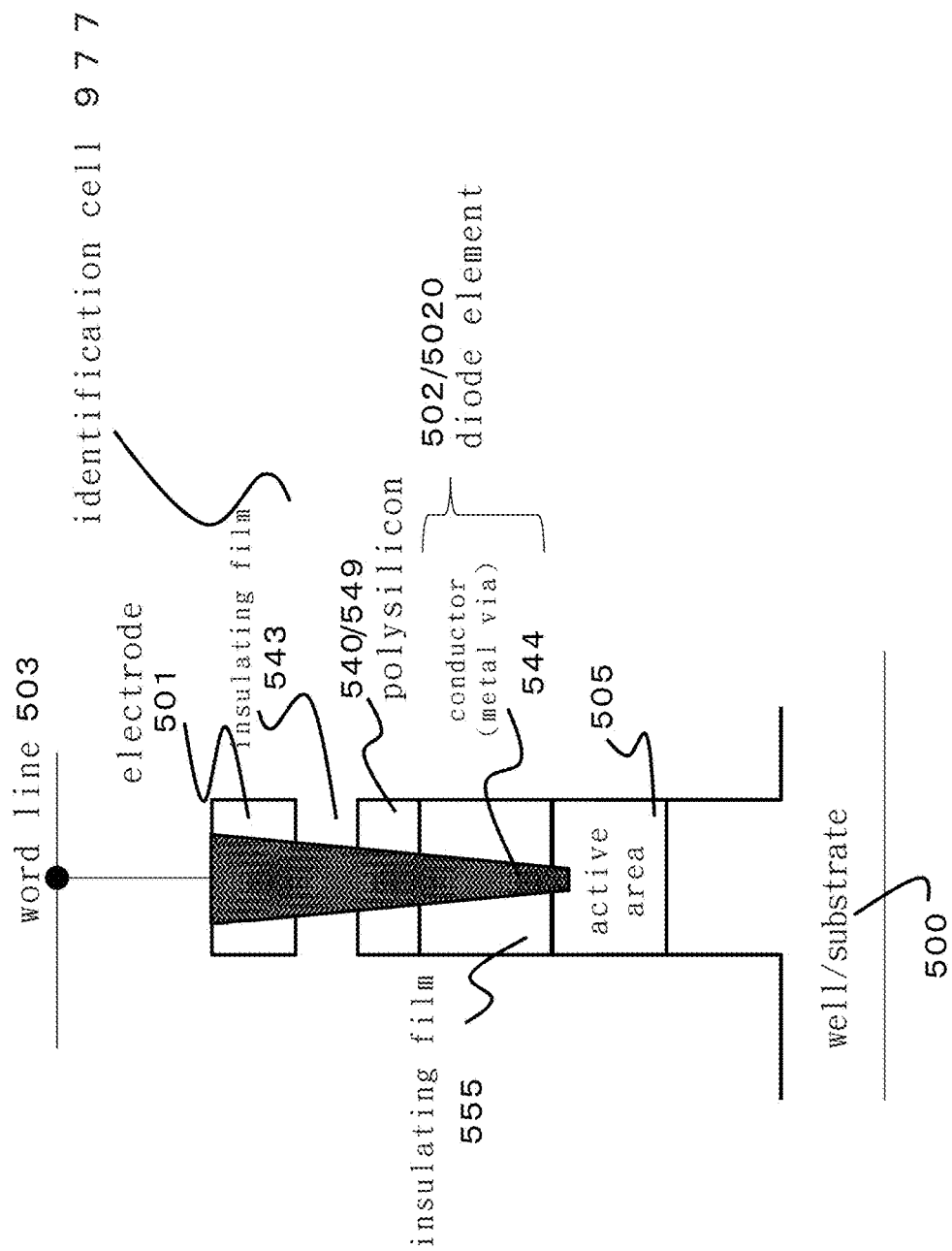
FIG. 49 illustrates an example of the cross-sectional view of a cell to realize the identification device.
Figure 50:
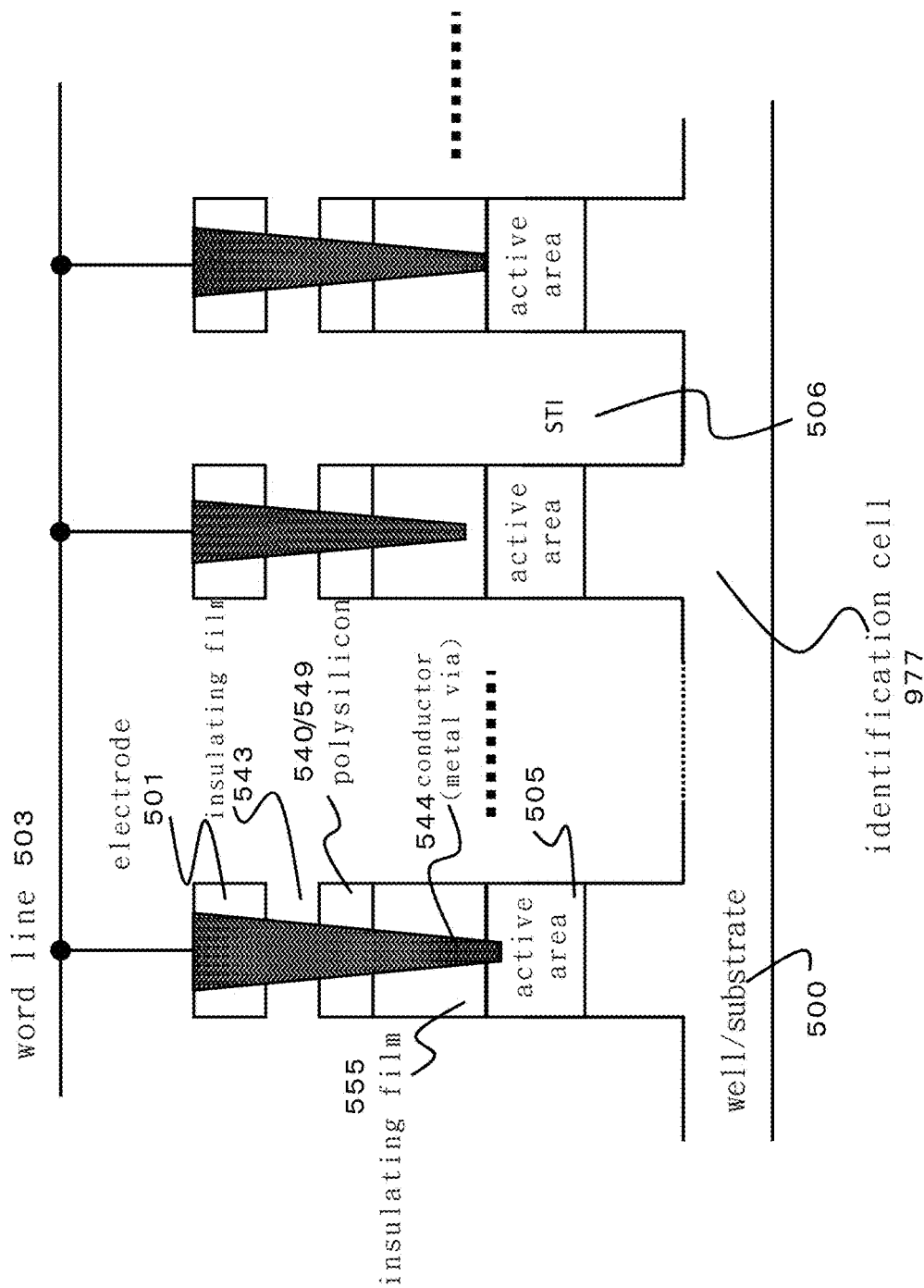
FIG. 50 illustrates an example of the cross-sectional view of a cell array to realize the identification device.
Figure 51:
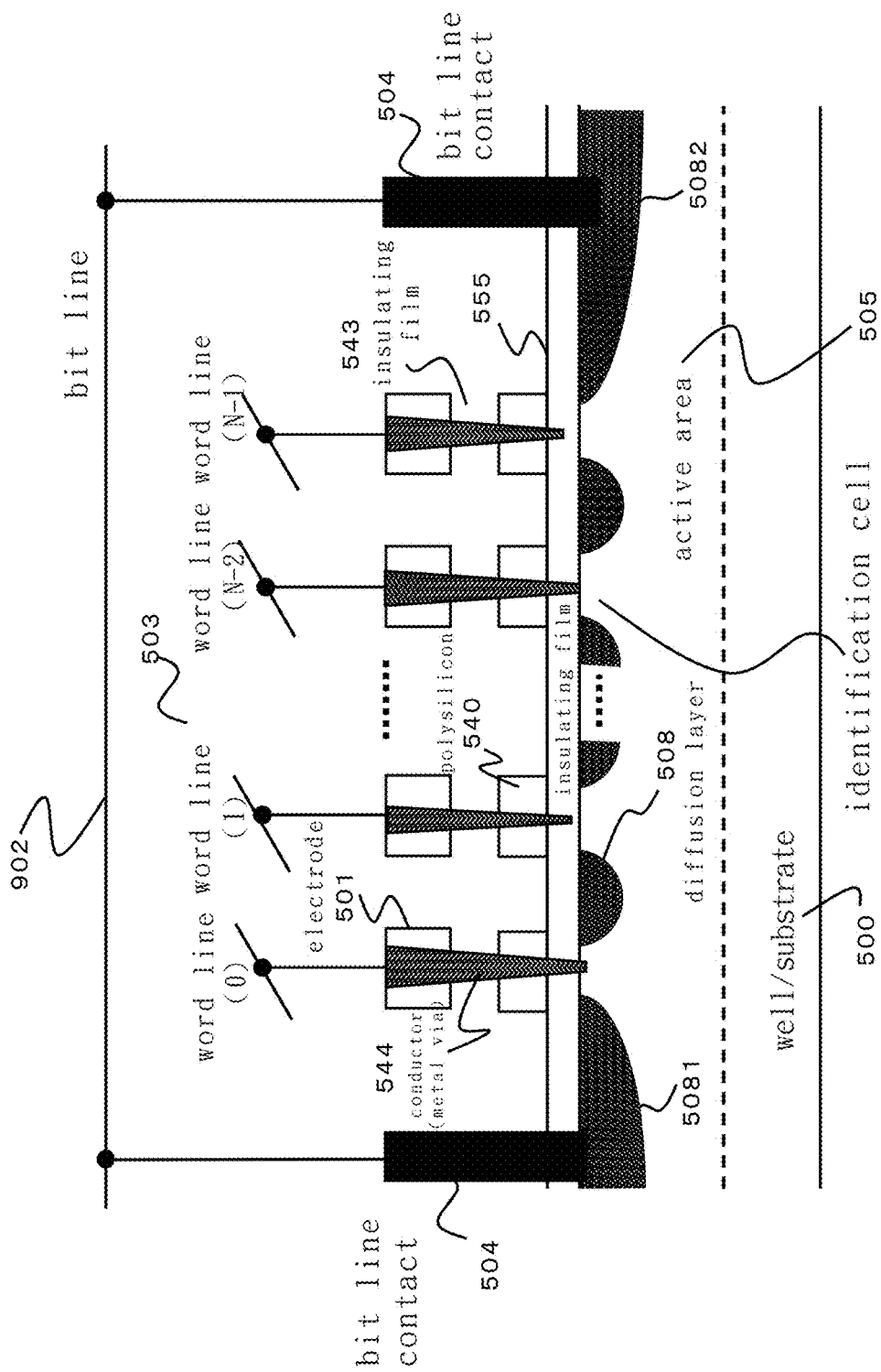
FIG. 51 illustrates an example of the cross-sectional view of a cell array to realize the identification device.

FIG. 49 is an example of adopting the insulating film 555 as the diode element 502 and regarding the target value of the via thickness as the distance from the surface of the electrode 501 to the surface of the active area 505. As mentioned above, the thickness fluctuation of the via may be probabilistic due to the fabrication variance in the mass product process. It is considered that a voltage is applied between the word line 503 and the substrate (or well) 500. In some cells, the electrode 501, the polysilicon 540 and the active area 505 may be connected to each other (non-short) and then may correspond to state "1" in terms of the semiconductor memories. In FIG. 22, this may correspond to black. In the other cells, the distance of the metal via is short. For example, the polysilicon 540 and the active area 505 are disconnected from each other. This may correspond to state "0" in terms of the semiconductor memories and white in FIG. 22. FIG. 50 is an example of the cross-sectional view with the cells arrayed along the word line 503. There are non-short . . . short, non-short . . . from the left. FIG. 51 is an example in which the cells are arrayed along the bit line. In this example, there are non-short, short . . . , non-short, and short cells from the left. In this way, the physical random pattern of white and black may be obtained, as illustrated in FIG. 22.

In this embodiment, if the ratio of short is too high, the randomness of the pattern may degrade. By applying a voltage between the word line 503 and the substrate (or well) 500, the dielectric breakdown of the dielectric film 555 of the short cells may be caused to reduce the ratio of short. Thereby, the randomness of pattern may be recovered. On the contrary, if the ratio of non-short is too high, we may apply a high voltage on the metal via of the cells of non-short and then cause electromigration. Thus, the ratio of non-short may be reduced, and, then, the randomness of the pattern may be recovered. In this way, the ratio of short and non-short may be roughly tuned by the method to apply the voltage. However, it may be difficult to control which of the dielectric breakdown or electromigration occurs more frequently than the other one. Then, if the data "1" is in majority, we may select only cells of "1" and then apply stress on them. On the contrary, if the data "0" is in majority, we may select only the cells of "0" and then apply stress on them. In this way, while checking the ratio of "1" and "0", we may repeatedly apply such a stress.

The eighth embodiment is herein discussed.

Figure 52:
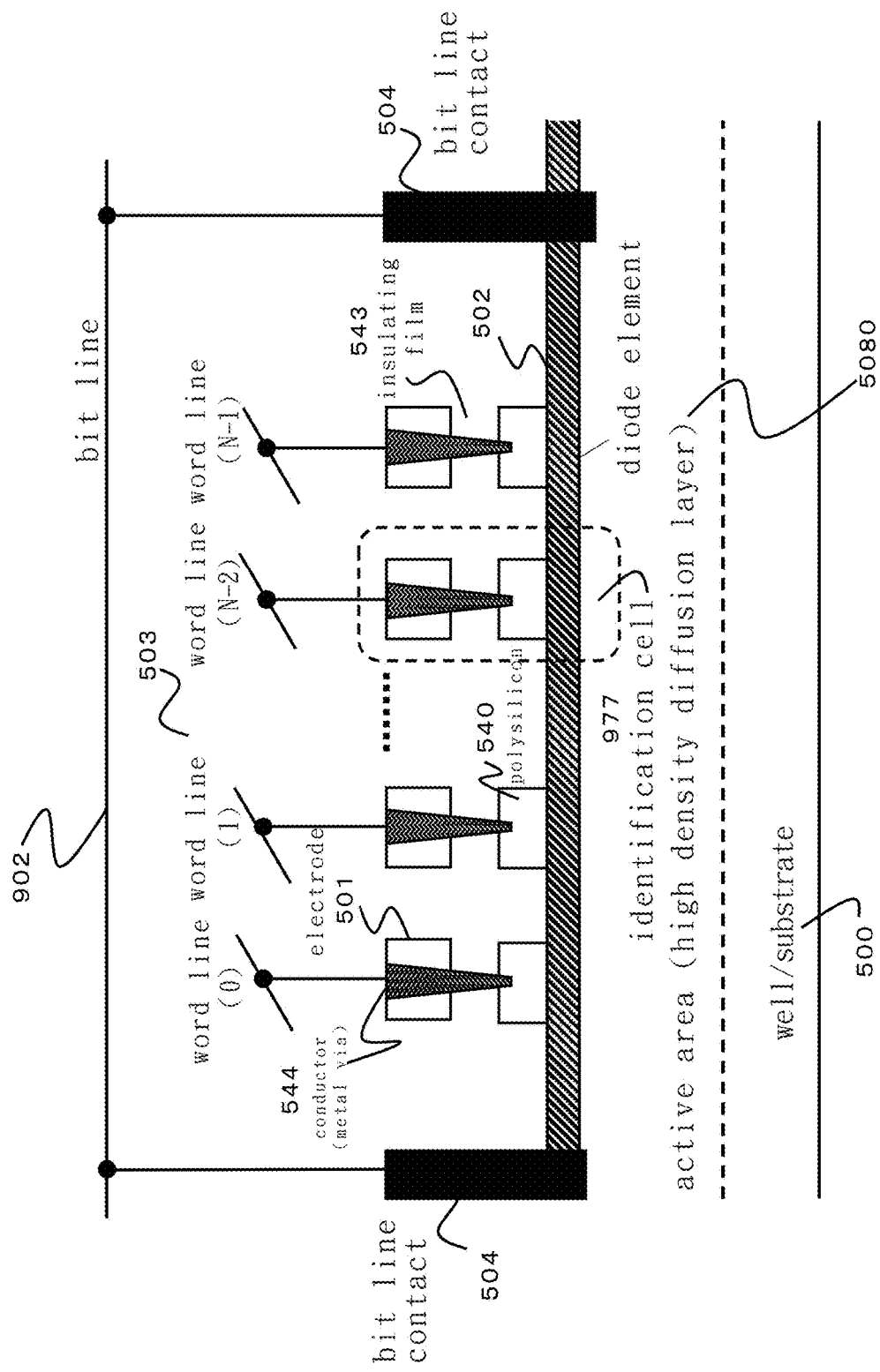
FIG. 52 illustrates an example of the cross-sectional view of a cell array to realize the identification device.
Figure 53:
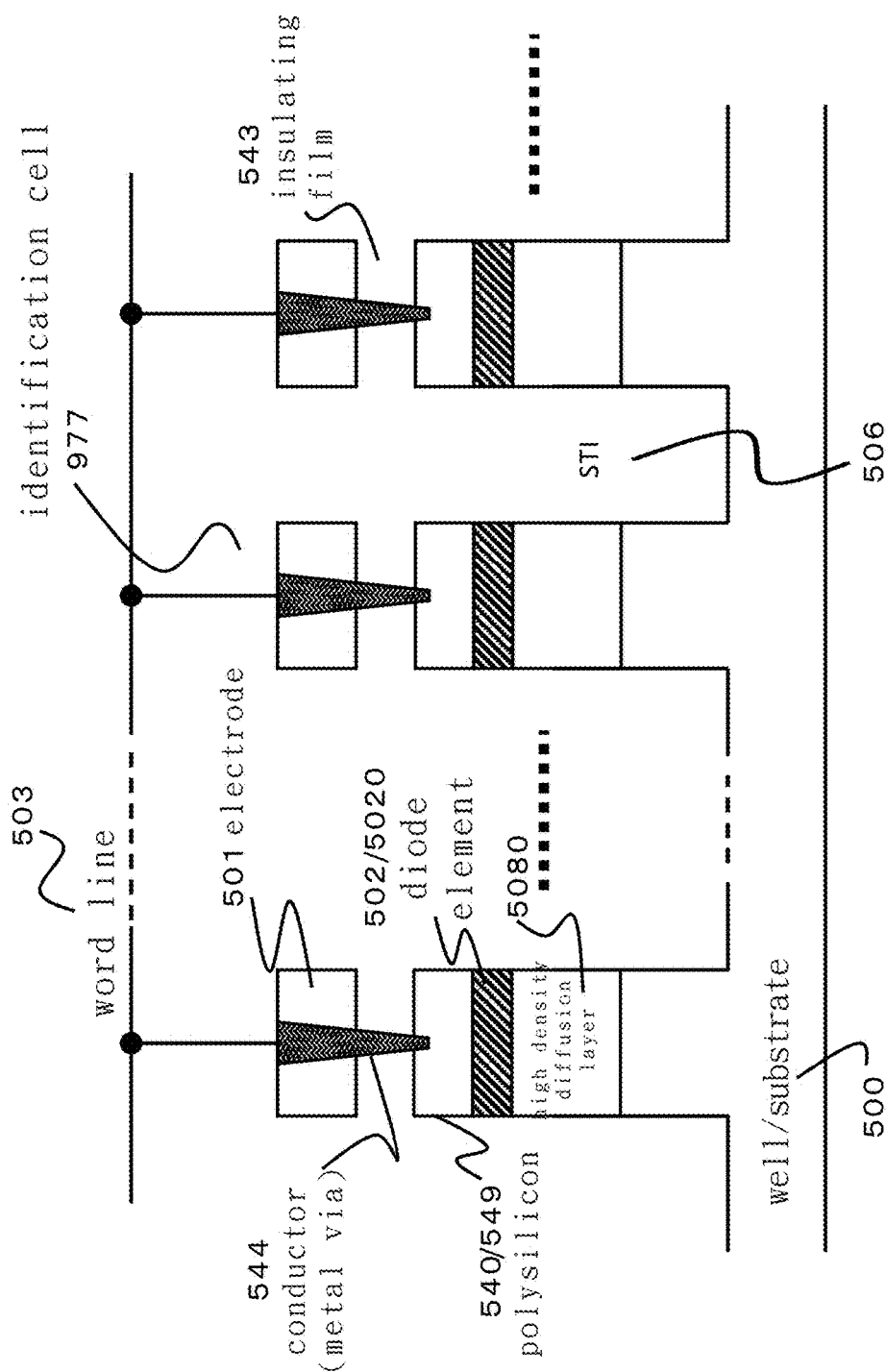
FIG. 53 illustrates an example of the cross-sectional view of a cell array to realize the identification device.
Figure 109:
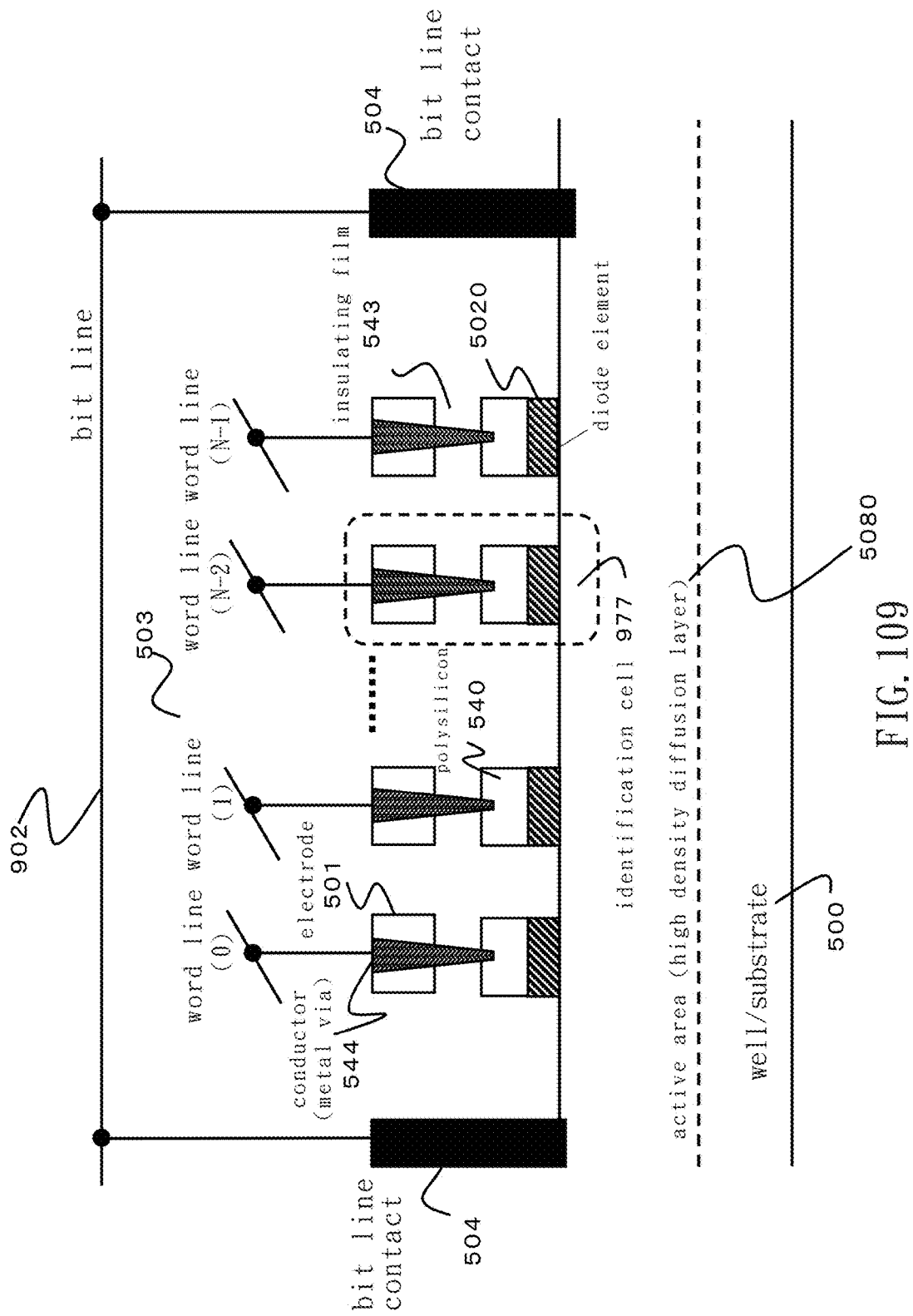
FIG. 109 illustrates an example of the cross-sectional view of a cell array realizing the chip identification device.

FIG. 52 illustrates a cross-sectional view of a cell array along a bit line, which may correspond to FIG. 23 to FIG. 29. There are a word line (0), a word line (1) . . . a word line (N-2), and a word line (N-1) from the left and the bit line contacts 504 at both ends. Unlike non-volatile memories, there are no select gate transistors between the bit line contacts 504 and the electrodes 501 at both ends. However, it may be possible that the select gate transistors are appended there. Each of those N word lines 503 may be connected to each electrode 501, below which electrodes there are the insulating film 543 and the polysilicon 540, and further below which there is a diode element 502. The electrode 501 and the polysilicon 540 may be connected to each other (non-short) with the metal via 544 in which conductive specimen is buried. Further beneath, there is the substrate (or well) 500. The surface of the semiconductor substrate (or well) 500 is formed like the teeth of the comb along the word line direction, as illustrated in FIG. 53. FIG. 52 illustrates the cross-sectional view cut out from a tooth of the comb in FIG. 53. The surface of the teeth of the comb (active area) may be a high density diffusion layer 5080. Two bit line contacts may go through the diode element 502 and be then connected to the high density diffusion layer 5080. Moreover, as similar to the diode element 5020 in FIG. 109, this diode element may be cut in the direction perpendicular to the bit line direction. The detailed explanation may be omitted because it is similar to FIG. 52.

FIG. 53 is a cross-sectional view along the word line direction, which is perpendicular to FIG. 52. The word line 503 runs from the left to the right. The active area, which is a tip of the teeth of the comb, may be covered by the high density diffusion layer 5080, above which the diode element 502 (or 5020), the polysilicon 540, the insulating film 543, and the electrode 501 may be laminated. The electrode 501 and the polysilicon 540 may be connected (non-short) by the metal via 544 in which the conductive specimen is buried. The space between adjoining teeth may be buried by the interlayer insulating film. Then, the Shallow-Trench-Isolation (STI) 506 is formed.

Figure 54:
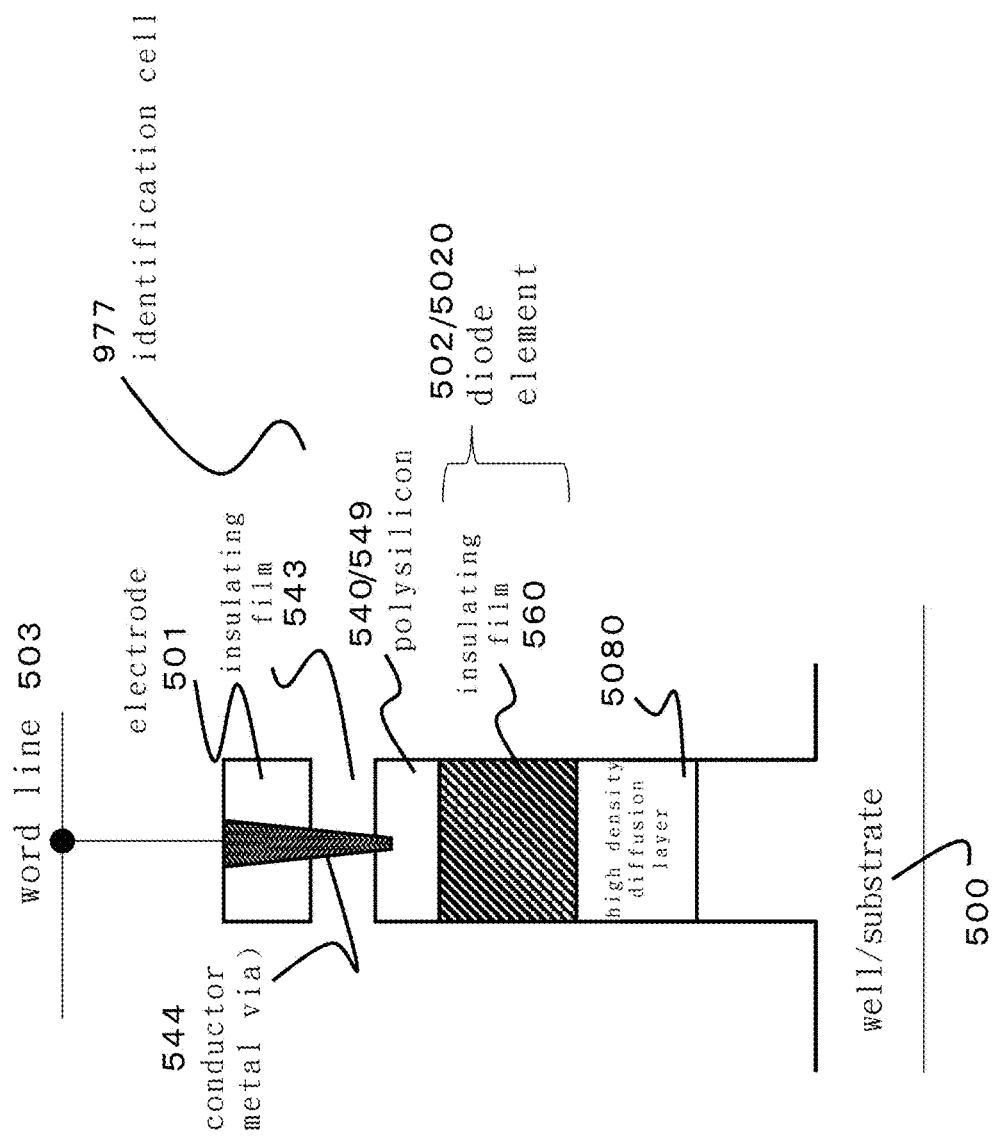
FIG. 54 illustrates an example of the cross-sectional view of a cell to realize the identification device.

FIG. 54 is a cross-sectional view along the word line direction of an example of a cell structure related to the present invention. In this example, an insulating film 560 may be adopted as the diode element 502 (or 5020). After making a chip, this insulating film may be broken by applying the electrical stresses of an electric field or electric current. Such a breakdown of the insulating film may be probabilistic and accompanied with physical randomness. In the cells with broken insulating films, the electric current may flow. For example, those cells may correspond to state "1" in terms of the semiconductor memories. In FIG. 22, it may correspond to black. On the contrary, in the cells with no breakdown of the insulating film, the electric current may not flow. For example, those cells may correspond to "0" in terms of the semiconductor memories. In FIG. 22, it may correspond to white. This probability may be roughly tuned by controlling the quality and thickness of the insulating film 560 and the strength and time of electrical stress, the condition of stress pulse and so on. If the probability is made about 50%, the white-black random pattern may be obtained on the checker board, as illustrated in FIG. 22. It may be self-evident that this randomness is free from any algorithm. To apply such an electrical stress, for example, the substrate (or well) 500 may be grounded, and a high positive or negative voltage may be applied to at least one word line. Alternately, at least one word line may be grounded, and a high positive or negative voltage may be applied to the electrode of the substrate (or well) 500.

Figure 55:
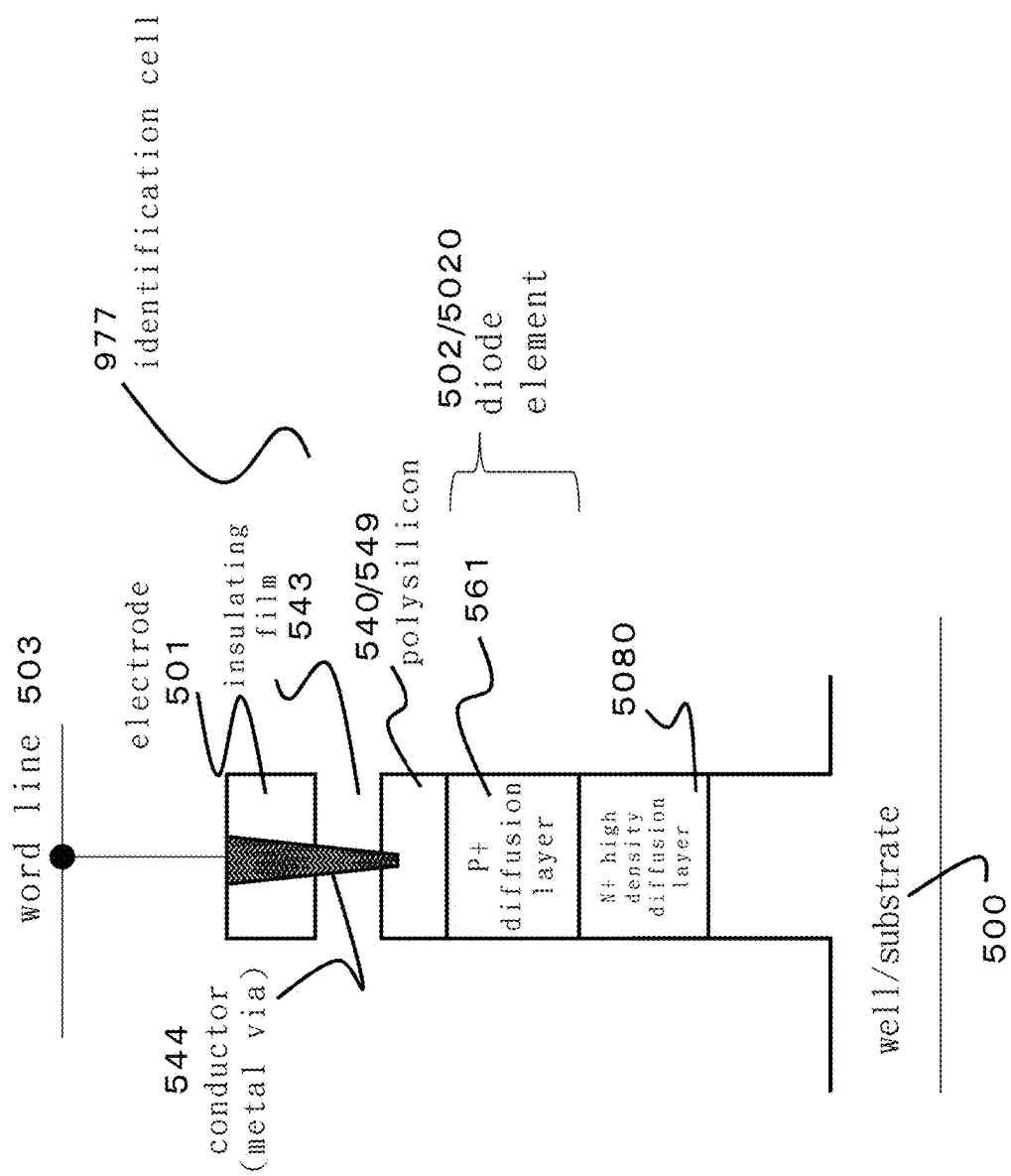
FIG. 55 illustrates an example of the cross-sectional view of a cell to realize the identification device.

FIG. 55 is a cross-sectional view along the word line direction of an example of a cell structure related to the present invention. In this example, the high density diffusion layer 5080 may be the N+ type, and the P+ type diffusion layer 561 may be adopted as the diode element 502 (or 5020). In this way, the PN junction with the top being the P+ diffusion layer 561 and the bottom being the N+ diffusion layer 5080 may be formed. After making a chip, this PN junction may be broken by applying the electrical stresses of an electric field or electric current. Such a breakdown of the PN junction may be probabilistic and accompanied with physical randomness. In the cells with broken PN junctions, the electric current may flow even with reverse bias. For example, those cells may correspond to state "1" in terms of the semiconductor memories. In FIG. 22, it may correspond to black. On the contrary, in the cells with no breakdown of the PN junctions, the electric current may not flow with reverse bias. For example, those cells may correspond to "0" in terms of the semiconductor memories. In FIG. 22, it may correspond to white. This probability may be roughly tuned by controlling the detailed structure of the PN junction, the strength and time of electrical stress, the condition of stress pulse and so on. If this probability is made about 50%, the white-black random pattern may be obtained on the checker board, as illustrated in FIG. 22. It may be self-evident that this randomness is free from any algorithm. To apply such an electrical stress, in this example, a high positive voltage may be relatively applied to the high diffusion layer 5080 (N+). For example, at least one word line 503 may be grounded, and a high positive voltage may be applied to the electrode of the substrate (or well) 500. Alternately, the substrate (or well) 500 may be grounded, and a high negative voltage may be applied to at least one word line 503. Thus, the high reverse bias may be applied to the PN junction. The higher density of the diffusion layer may cause a higher possibility of the junction breakdown due to the reverse bias. Thus, the probability of the junction breakdown may be roughly tuned.

Figure 56:
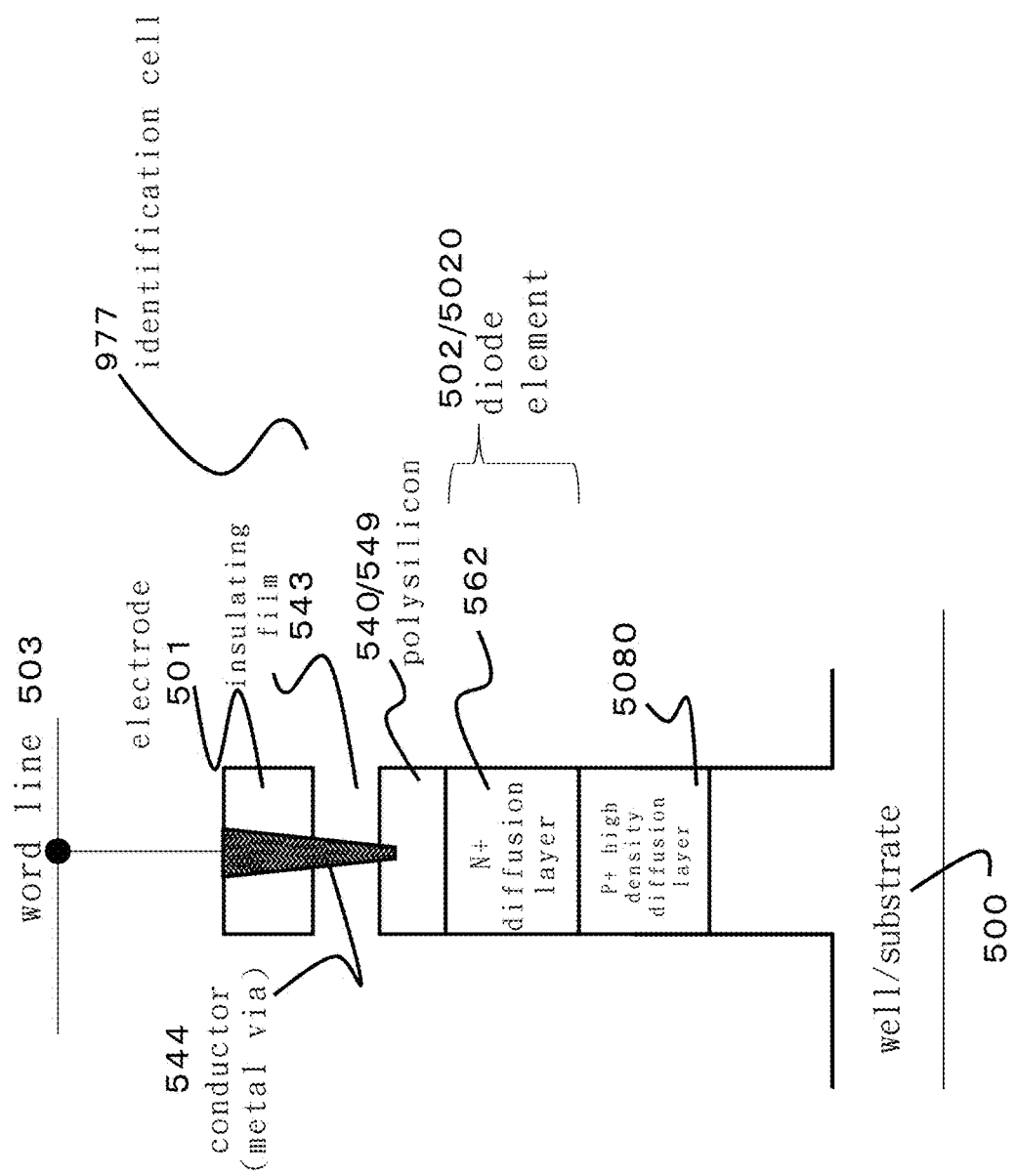
FIG. 56 illustrates an example of the cross-sectional view of a cell to realize the identification device.

FIG. 56 is a cross-sectional view along the word line direction of an example of a cell structure related to the present invention. In this example, the high density diffusion layer 5080 may be the P+ type and the N+ type diffusion layer 562 may be adopted as the diode element 502 (or 5020). In this way, the PN junction with the top being the N+ diffusion layer 562 and the bottom being the high diffusion layer 5080 (P+) may be formed. After making a chip, this PN junction may be broken by applying the electrical stresses of an electric field or electric current. Such a breakdown of the PN junction may be probabilistic and accompanied with physical randomness. In the cells with broken PN junctions, the electric current may flow even with reverse bias. For example, those cells may correspond to state "1" in terms of the semiconductor memories. In FIG. 22, it may correspond to black. On the contrary, in the cells with no breakdown of the PN junctions, the electric current may not flow with reverse bias. For example, those cells may correspond to "0" in terms of the semiconductor memories. In FIG. 22, it may correspond to white. This probability may be roughly tuned by controlling the detailed structure of the PN junction, the strength and time of electrical stress, the condition of stress pulse and so on. If this probability is made about 50%, the white-black random pattern may be obtained on the checker board, as illustrated in FIG. 22. It may be self-evident that this randomness is free from any algorithm. To apply such an electrical stress, in this example, a high positive voltage may be relatively applied to the N+ diffusion layer 562. For example, at least one word line 503 may be grounded, and a high negative voltage may be applied to the electrode of the substrate (or well) 500. Alternately, the substrate (or well) 500 may be grounded, and a high positive voltage may be applied to at least one word line 503. Thus, the high reverse bias may be applied to the PN junction. The higher density of the diffusion layer may cause a higher possibility of the junction breakdown due to the reverse bias. Thus, the probability of the junction breakdown may be roughly tuned.

As mentioned above, those diode elements may be broken by the electrical stress of an electric field or electric current. Those breakdown may probabilistically occur and accompanied with physical randomness. In the broken cells, the electric current may flow, for example, may correspond to state "1" in terms of the semiconductor memories. In FIG. 22, it may correspond to black. On the contrary, in the unbroken cells, the electric field may not occur even with an applied voltage, for example, may correspond to state "0". In FIG. 22, it may correspond to white. This probability may be roughly tuned by controlling the detailed structure of the diode elements, the strength and time of the electrical stress, the stress pulse condition and so on. Moreover, in the metal via 544, the electromigration may occur more by applying the electric current than in the conventional metal wiring, as mentioned above. In the present embodiment, it may be possible that the electromigration may occur more frequently in the cells with breakdown of the diode element 502 (or 5020). However, this occurrence may be probabilistic. This probability may be roughly tuned by controlling the electrified amount, the welding time, the opening diameter of the metal via 544 and its length (thickness of insulating film 543), the material quality of conductive specimen, and the pressure, the density and the temperature of the gas to be used to bury the specimen into the metal via. In this way, in the present invention, the physically-random pattern like FIG. 22 may be generated by adopting two factors of the physical randomness such as the electromigration of conductive matter of the metal via 544 and the breakdown of the diode element. In this event, it may be preferable that the ratio of white and black is made about 50% by combining those two factors of the physical randomness. For example, if either of those two randomness mode is "0", then the cell may be regarded as "0".

Figure 57:
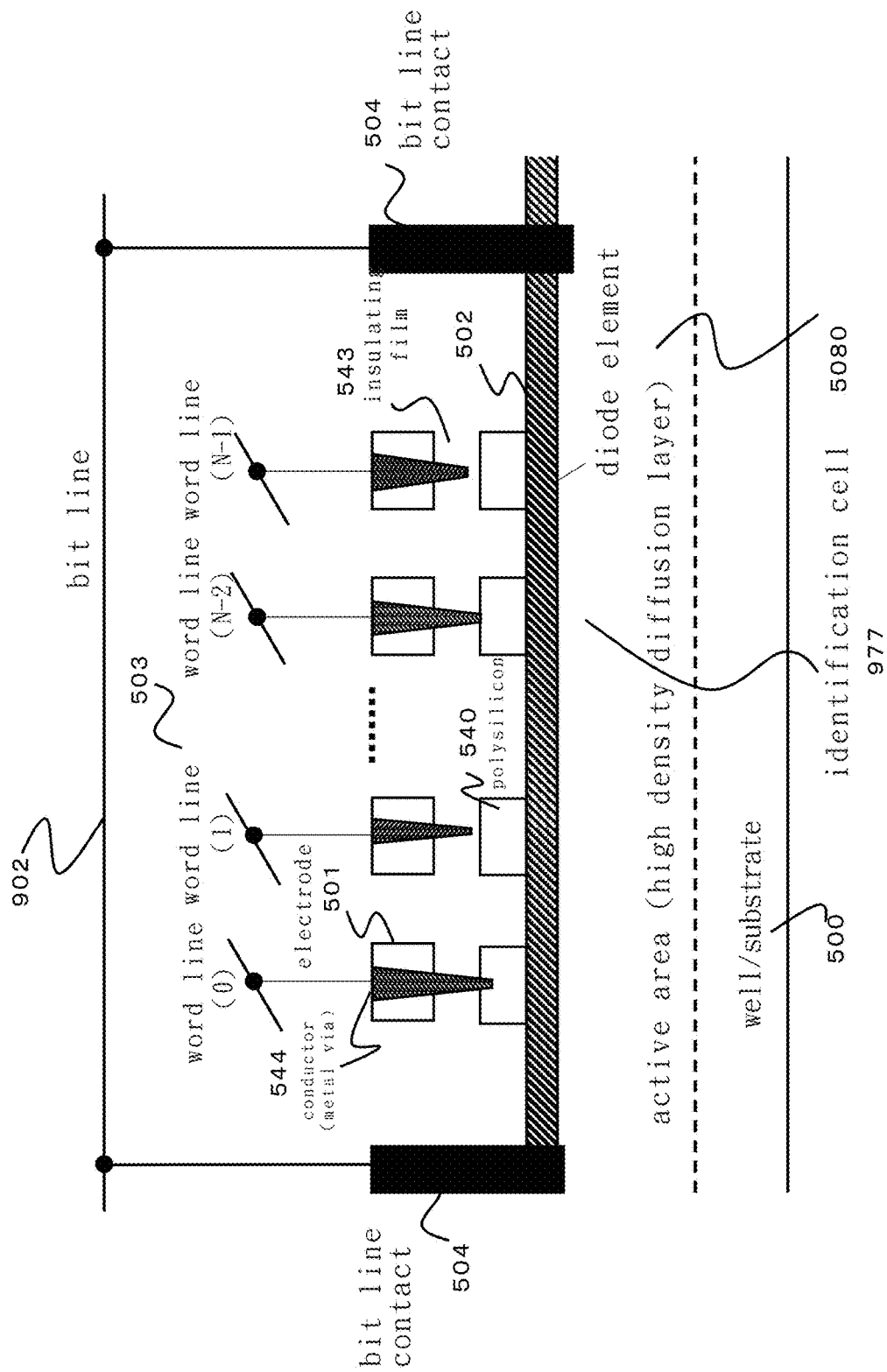
FIG. 57 illustrates an example of the cross-sectional view of a cell array to realize the identification device.
Figure 110:
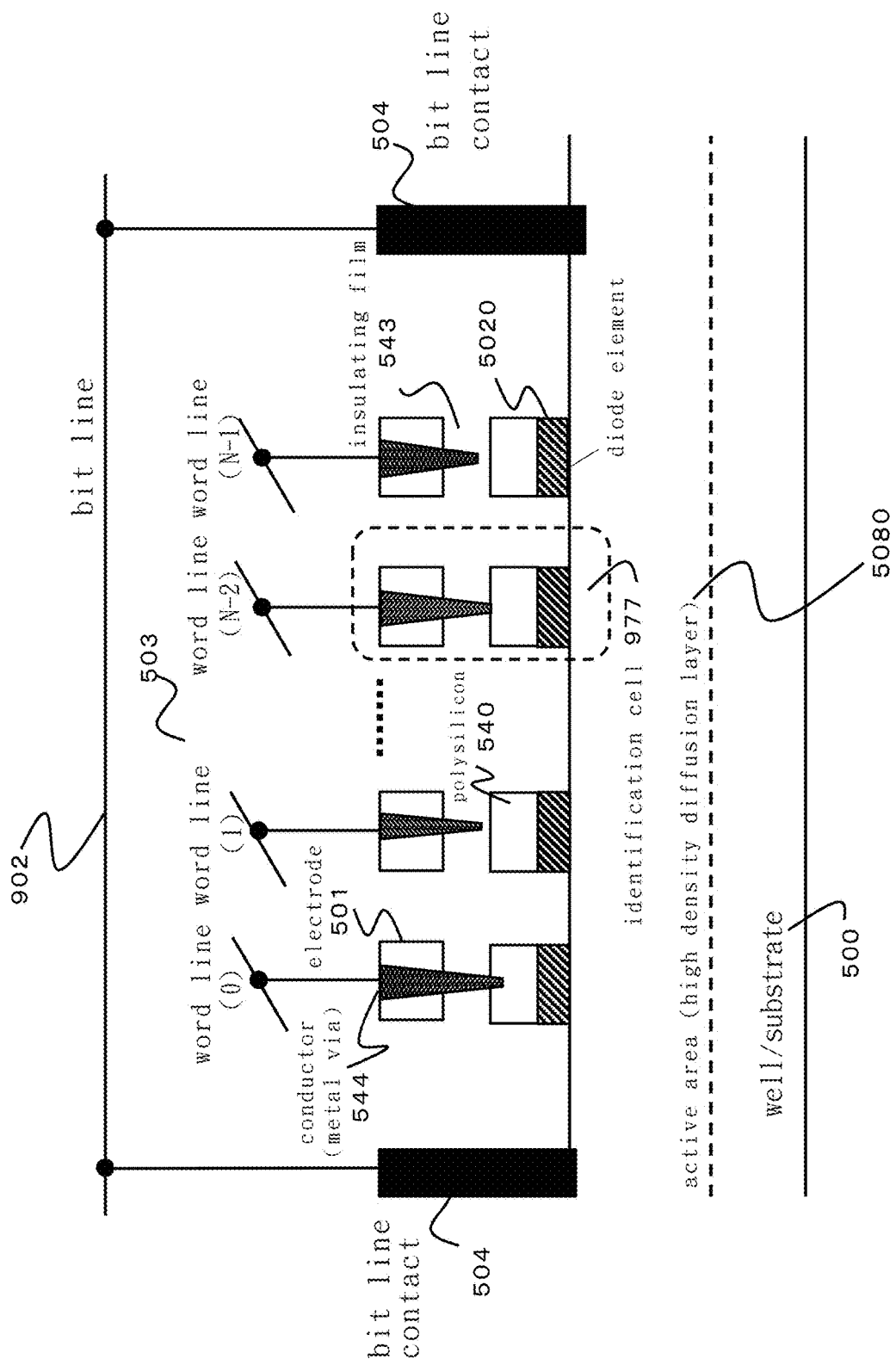
FIG. 110 illustrates an example of the cross-sectional view of a cell array realizing the chip identification device.

FIG. 57 is an example of adopting physical randomness of the thickness of the metal via 544. For example, the target depth of the via may be the same as the distance from the surface of the electrode 501 to the surface of the polysilicon 540. In this event, as explained in FIG. 46, the depth of the via may be fluctuated with the variance of the aspect ratio and the diameter of the vertical holes. This thickness fluctuation may be probabilistic and accompanied with the physical randomness. Some cells may be short, and the others may be non-short (connected). For example, in the example of this figure, there are non-short, short . . . non-short, and short cells from the left. If the metal via selected by the word line and the bit line is short, then the electric current may not flow. On the contrary, if the selected metal via is non-short, then the electric current may flow. It is noted herein that the fluctuation of the via thickness may be free from any algorithm because this fluctuation is a fabrication variance in the mass product process. Accordingly, it may be regarded as the physical randomness. Moreover, it may not be necessary to apply the electrical stress. This mode of randomness may be effective when the diode element 502 (or 5020) is broken. Moreover, FIG. 110 is an example of adopting the diode element 5020. In this way, the diode element may be cut in the direction perpendicular to the bit line direction. The detailed description in that case may be omitted because it may be similar to FIG. 57. Alternately, as similar to the polysilicon 549 of FIG. 65, the polysilicon may be expanded along the bit line direction. In this event, with or without the breakdown of the diode element 502, it may be possible to adopt the physical randomness in via the thickness in fabrication.

Consider an ensemble of the cells with the diode element being broken. First of all, it is necessary to take care that the randomness of the pattern may be degraded if the ratio of short in the metal via is too high. In such an event, the dielectric breakdown of the dielectric film 543 of the cells with the metal via being short may be caused by applying a high voltage between the corresponding word line 503 and the substrate (or well) 500. Then, the ratio of short may be decreased to recover the randomness of the patterns. On the contrary, it may be also possible to cause the transition from non-short (electrical connected) to short by causing the electromigration. Thus, the ratio of the dielectric breakdown and electromigration may be tuned by applying voltage. However, it may be difficult to artificially determine which one of the dielectric breakdown or electromigration occurs more frequently than the other one. Then, while checking the ratio of "1" and "0", the application of such an electrical stress may be repeated.

Figure 58:
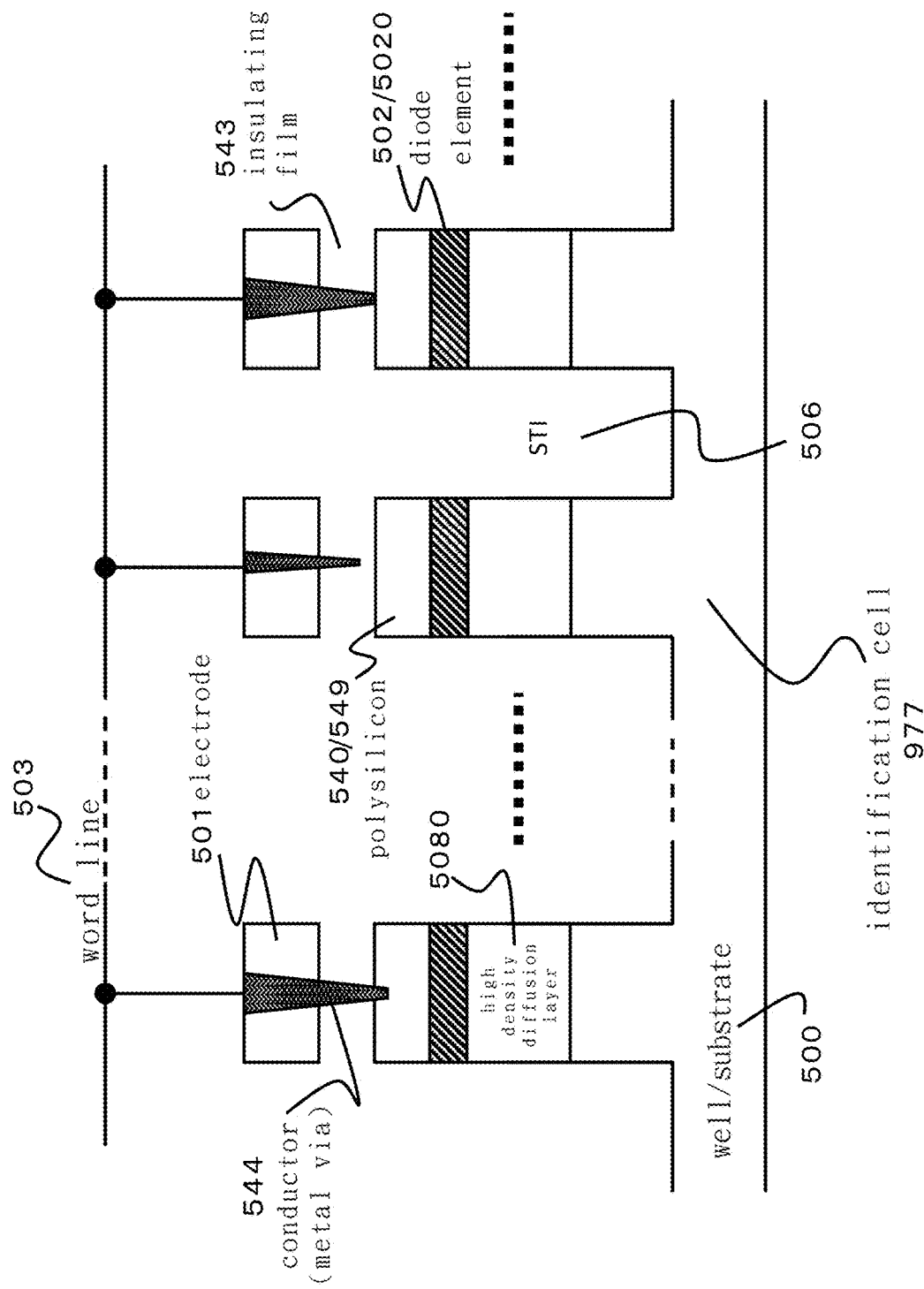
FIG. 58 illustrates an example of the cross-sectional view of a cell array to realize the identification device.

FIG. 58 is a cross-sectional view along the word line direction which is perpendicular to FIG. 57. The word line 503 runs from the left to the right. The diode element 502, the polysilicon 540, the insulating film 543, and the electrode 501 may be laminated on the high density diffusion layer 5080 at the active area surface which is a tip of the teeth. The space between the adjoining teeth may be buried by the interlayer insulating film. Then, the Shallow-Trench-Isolation (STI) 506 is formed. The electrode 501 and the polysilicon 540 may be connected by the metal via 544 in which the conductive specimen is buried. Some of the metal via, as mentioned above, may be short, and the other metal via may be non-short (connected) by the fabrication variance in the mass product process. In the example of this figure, there are non-short . . . short, non-short . . . cells from the left. The diode element 502 may be the insulating film 560 as shown in FIG. 54, the P+ diffusion layer 561 as shown in FIG. 55, or the N+ diffusion layer 562 as shown in FIG. 56.

As mentioned above, those diode elements may be broken by applying an electrical stress such as an electric field stress or electric current stress. The occurring of such a breakdown may be probabilistic and then cause physical randomness. In the cells with the diode elements broken, the electric current may flow, for example, which may correspond to state "1". In FIG. 22, it may correspond to black. On the contrary, in the cells with the diode elements not broken, the electric current may not flow, which may correspond to state "0". In FIG. 22, it may correspond to white. This probability may be roughly tuned by controlling the detailed structure of the diode element, the strength and time of electrical stress, the condition of stress pulse and so on. Moreover, as mentioned above, the electromigration may be caused more than in the conventional metal wiring by applying an electric current. In the present embodiment, it may be possible that the electromigration may be caused in the cells with the diode element 502 being broken. The occurrence of this electromigration may be probabilistic and accompanied with physical randomness. In the cells with the electromigration, the electric current may not flow, which may correspond to state "0". In FIG. 22, it may correspond to white. On the contrary, in the cells with no electromigration, the electric current may flow, which may correspond to state "1". In FIG. 22, it may correspond to black. This probability may be roughly tuned by controlling the electrified amount, the welding time, the diameter of the metal via opening, the length of the metal via (the thickness of the insulating film 543), the material quality of the conductive specimen, and the pressure, the density and the temperature of the gas to be used to bury the conducting specimen. In this way, in this embodiment, the physical random pattern like FIG. 22 may be generated by combining three factors of the physical randomness of the short/non-short of the metal via 544, the electromigration of the metal via 544, and the breakdown of the diode element. For example, at least one of the three modes of randomness is "0", and the corresponding cell may be "0". In this event, the probability of white and black may be made about 50% by combining these three factors of physical randomness.

Figure 59:
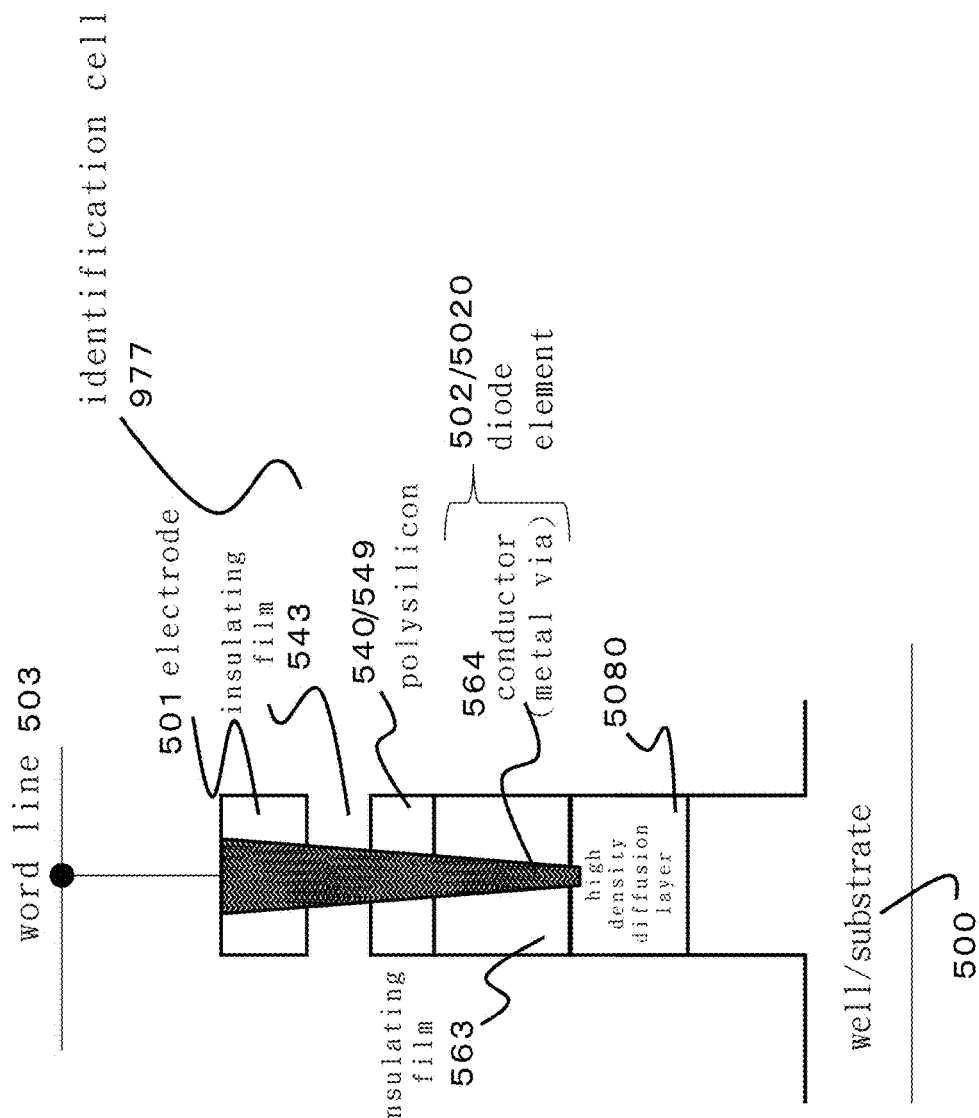
FIG. 59 illustrates an example of the cross-sectional view of a cell to realize the identification device.
Figure 60:
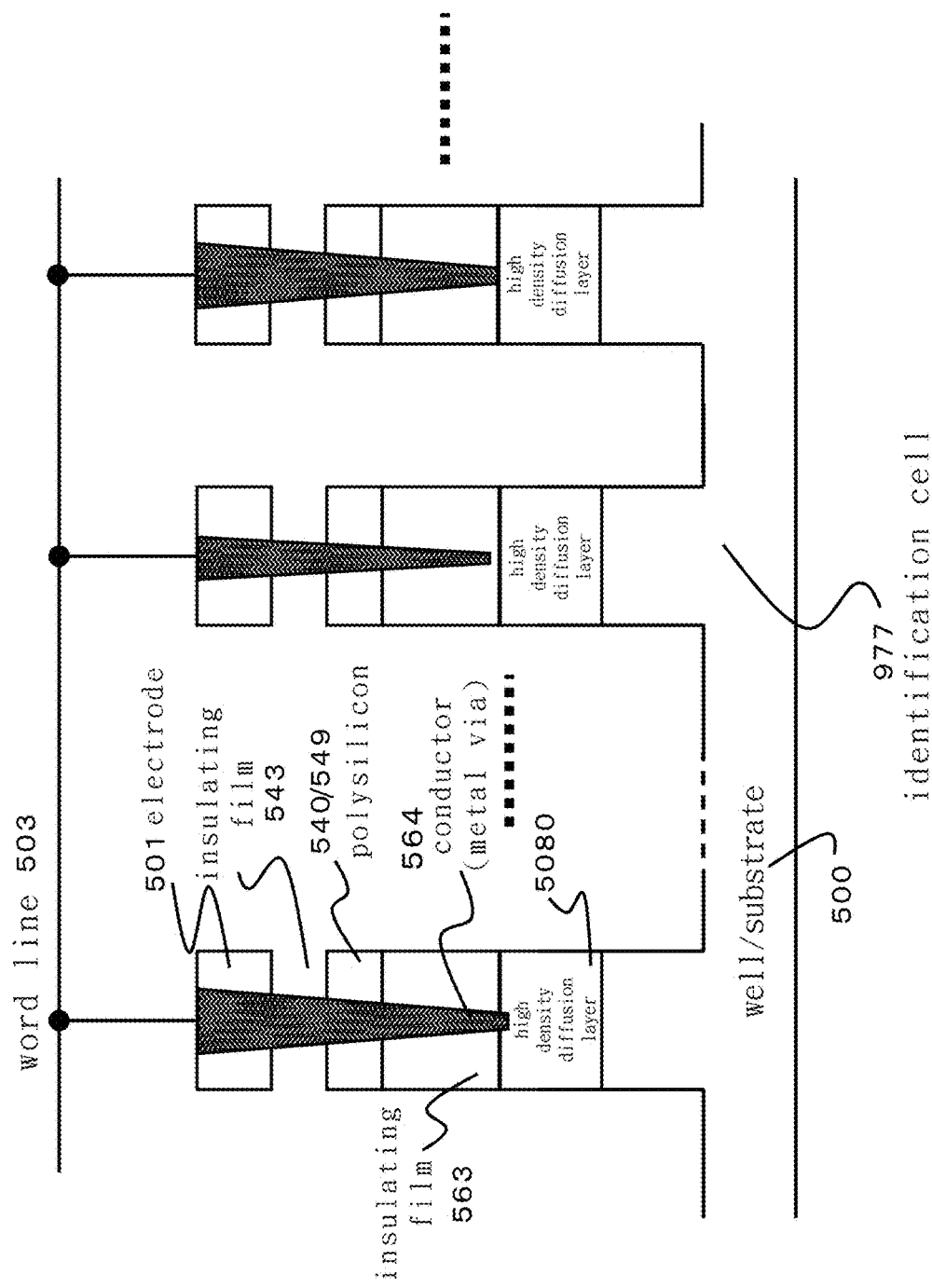
FIG. 60 illustrates an example of the cross-sectional view of a cell array to realize the identification device.
Figure 61:
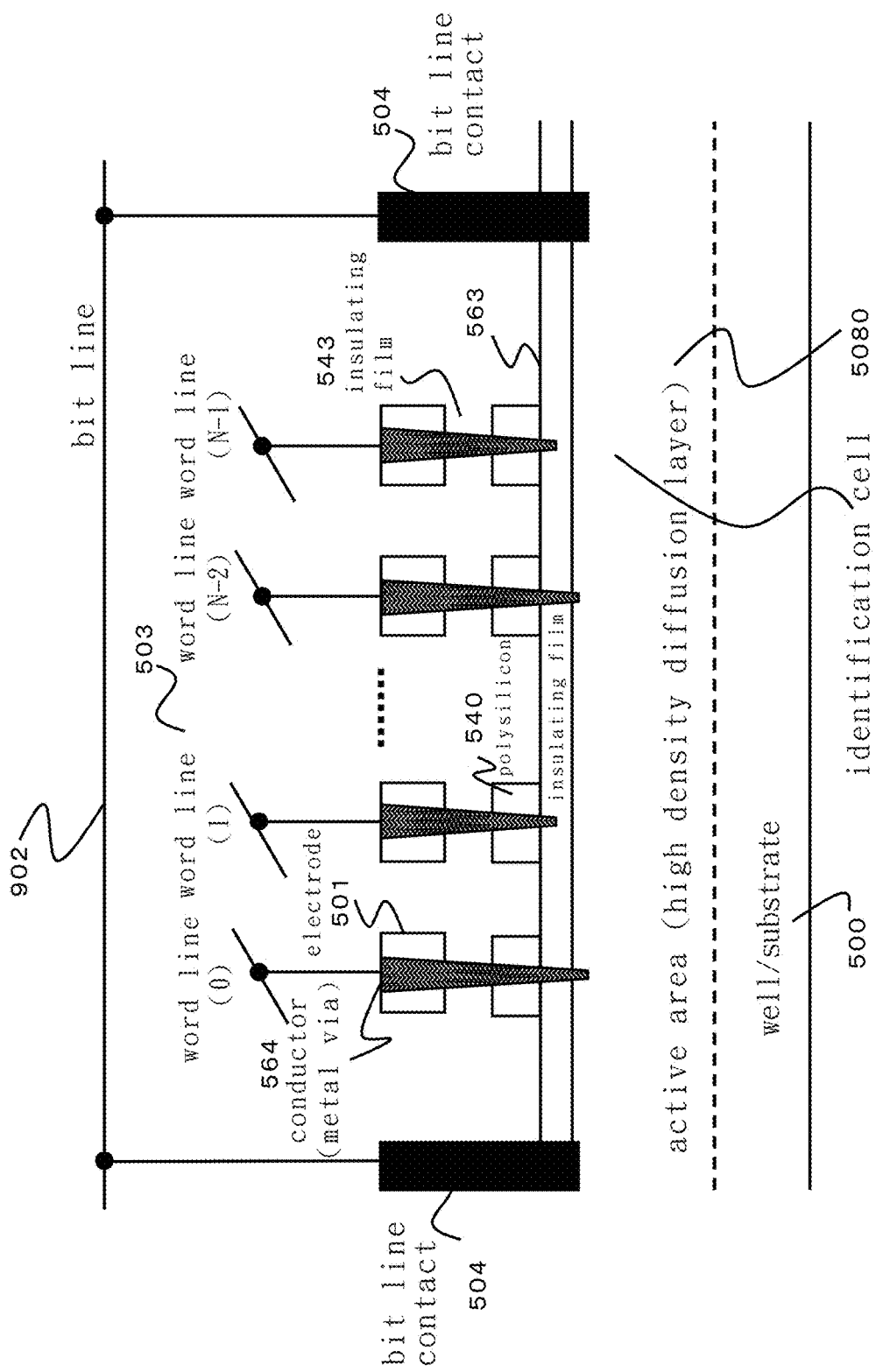
FIG. 61 illustrates an example of the cross-sectional view of a cell array to realize the identification device.

FIG. 59 is an example where the insulating film 563 with the metal via 564 may be adopted as the diode element 502 and where the target depth of the metal via 564 may be set as the distance between the surface of the electrode 501 and the surface of the high density diffusion layer 5080. As mentioned above, the depth of the via may be fluctuated by the manufacturing variance in the mass product process. The depth fluctuation may be probabilistically and then regarded as physical randomness. In some cells, the electrode 501, the polysilicon 540, and the high density diffusion layer 5080 may be connected to each other. In other cells, the depth of the via may be short. For example, the polysilicon 540 and the high density diffusion layer 5080 may not be connected to each other. FIG. 60 is an example of the cross-sectional view where there are cells along the word line 503. In this example, there are non-short . . . short, non-short . . . cells from the left. FIG. 61 is an example in which the cells are arrayed along the bit line direction. In this example, there are non-short, short . . . non-short, and short cells from the left. In this way, the physical random pattern of white-black may be obtained like FIG. 22. In this embodiment, it may be concerned that the randomness of pattern is degraded if the ratio of short is too high. In such an event, the ratio of short may be decreased by causing the dielectric breakdown in the cells with the diode element being short with a high voltage applied between the word line 503 and the substrate (or well) 500. As a result, the randomness of the pattern may be recovered. On the contrary, if the ratio of non-short is too high, the electromigration may be caused by applying the electrical stress to reduce the ratio of non-short. However, it may be difficult to artificially determine which one of the dielectric breakdown or electromigration occurs more frequently than the other one. Then, if non-short is in majority, only the cells of non-short may be selected and stressed. On the contrary, if short is in majority, only the cells of short may be selected and stressed. In this way, while checking the ratio of short and non-short, such a stressing may be repeated.

The ninth embodiment is herein discussed.

Figure 62:
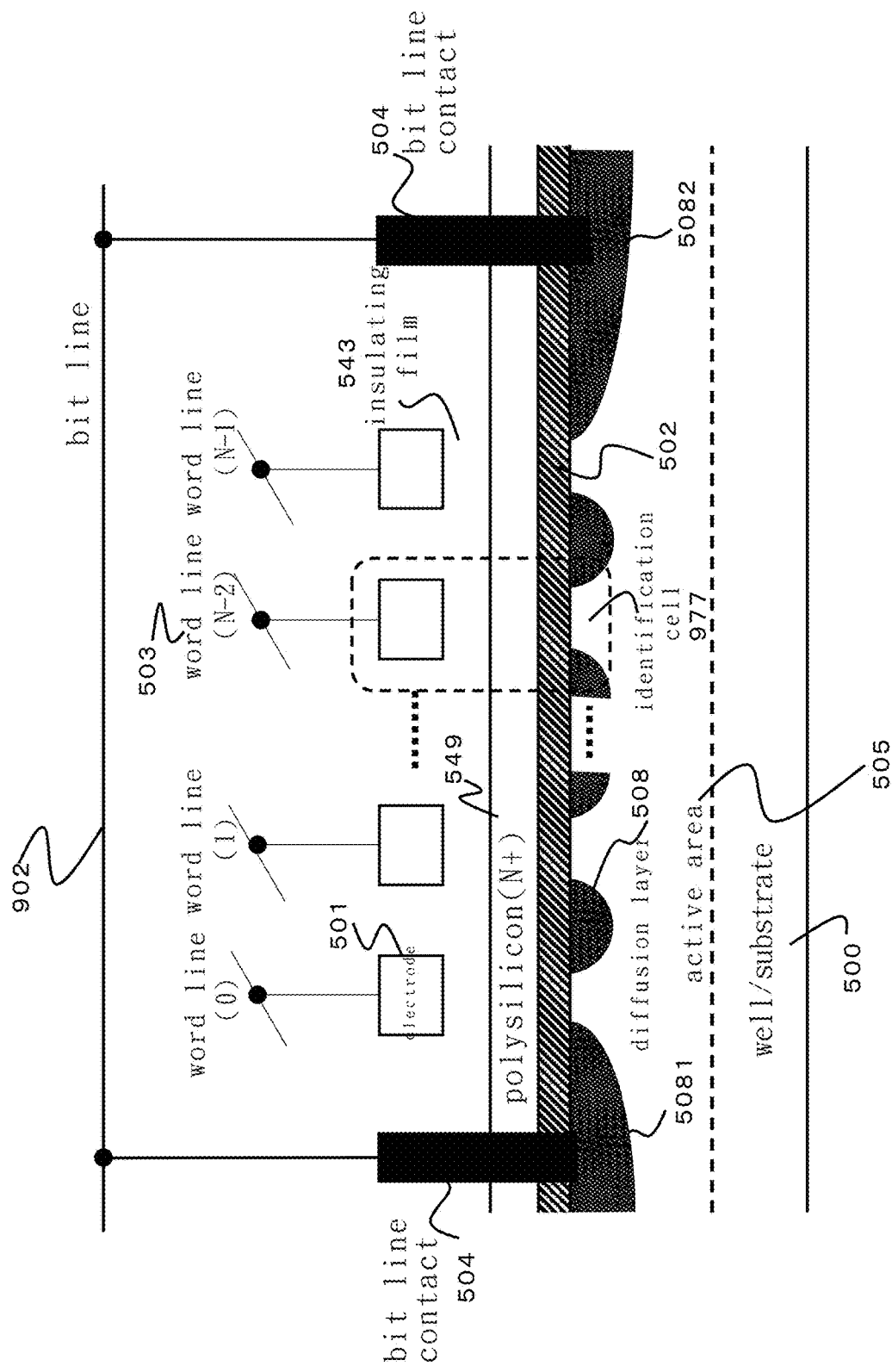
FIG. 62 illustrates an example of the cross-sectional view of a cell array to realize the identification device.
Figure 63:
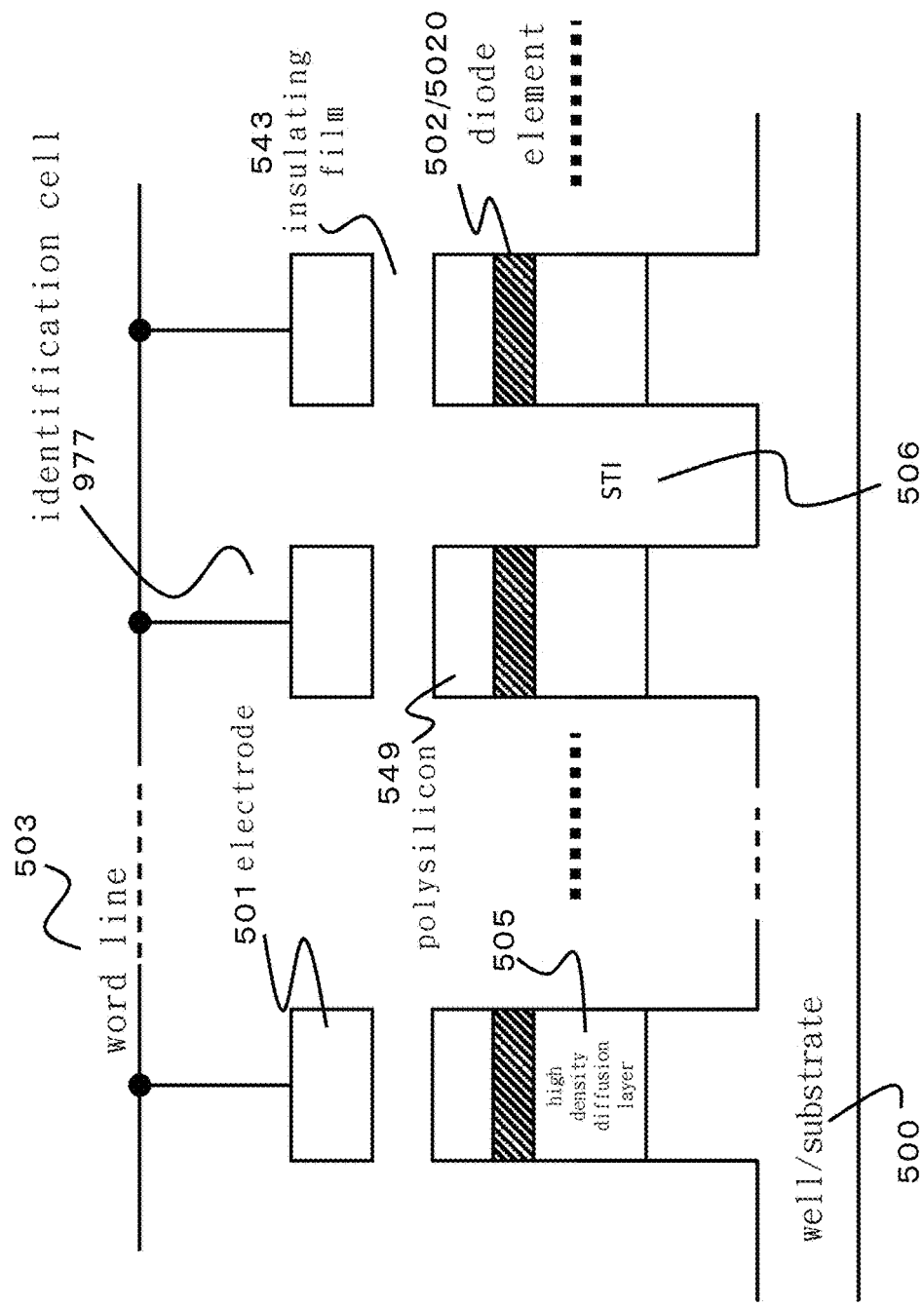
FIG. 63 illustrates an example of the cross-sectional view of a cell array to realize the identification device.

FIG. 62 illustrates an example in which the polysilicon 549 is expanded along the bit line direction. As an example, the polysilicon 549 is doped with N+ high density to be the N+ polysilicon. The N+ polysilicon 549 may be cut in the direction perpendicular to the word line. FIG. 63 is an example of the cross-sectional view which is perpendicular to the bit line 902. The insulating film 543 between the electrode 501 and the polysilicon 549 may take a place of the above mentioned diode element (e.g., 502). For example, after making the chip, the insulating film may be broken by applying the electrical stress such as an electric field stress or electric current stress. The occurrence of such a breakdown may be probabilistic and accompanied by physical randomness. In the cells with the dielectric breakdown, the electric current may flow, for example, which may correspond to state "1". In FIG. 22, it may correspond to black. On the contrary, in the cells with no dielectric breakdown, the electric current may not follow, for example, which may correspond to state "0". In FIG. 22, it may correspond to white. This probability may be roughly tuned by controlling the film quality and thickness of the insulating film 543, the strength and time of the electrical stress, the condition of the stress pulse and so on. If this probability is made about 50%, the white-black random pattern like FIG. 22 may be generated on the checker board. It may be self-evident that this randomness is free from any algorithm. To apply such an electrical stress, for example, the bit line contact 504 may be grounded, and a high positive or negative voltage may be applied to at least one of the word lines. Alternately, at least one of the word lines may be grounded, and a high positive or negative voltage may be applied to at least one of the bit line contact 504.

The tenth embodiment is herein discussed.

Figure 64:
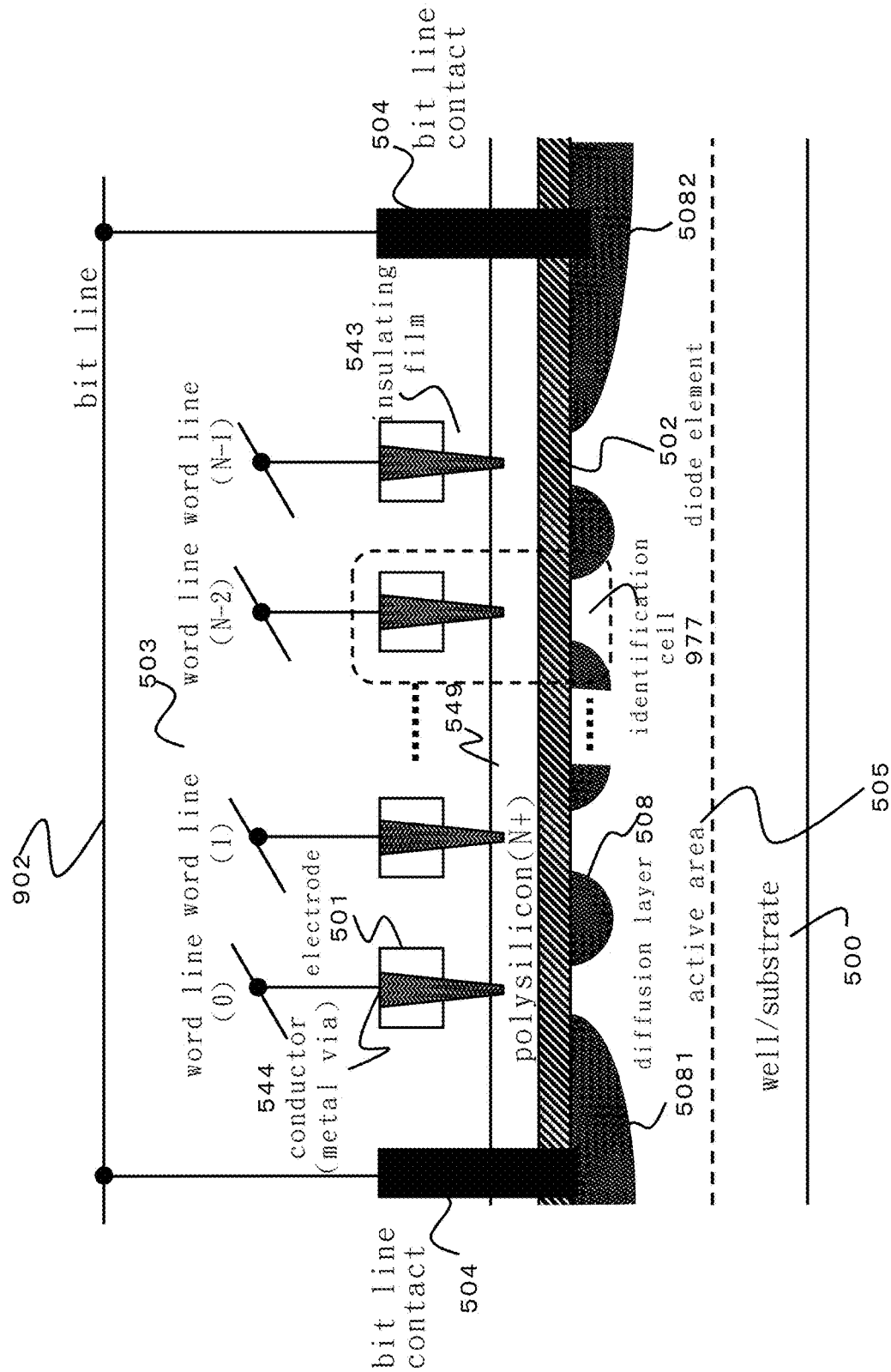
FIG. 64 illustrates an example of the cross-sectional view of a cell array to realize the identification device.

Although the polysilicon 540 shown in FIG. 41 is cut in the direction perpendicular to the bit line 902, the effect of the present invention may be obtained without cutting it. For example, as illustrated in FIG. 64, the polysilicon 549 which is expanded along the bit line 902 may be adopted to replace the polysilicon 540. As an example, the polysilicon 549 may be doped with N+ high density to be the N+ polysilicon. The N+ polysilicon 549 may be cut in the direction along the word line 503. The cross-sectional view which is perpendicular to the bit line 902 may be similar to FIG. 42. In this example, the metal via 544 may reach the N+ polysilicon 549. Thus, the electromigration may be caused by applying an electric current. However, the occurrence of this electromigration may be probabilistic and accompanied with physical randomness. In the cells with the electromigration, the electric current may not flow, which may correspond to state "0". In FIG. 22, it may correspond to white. On the contrary, in the cells without the electromigration, the electric current may flow, for example, which may correspond to state "1". In FIG. 22, it may correspond to black. This probability may be roughly tuned by controlling the electrified amount, the welding time, the opening diameter of the metal via 544, its depth (the thickness of the insulating film 543), the material quality of the conductive specimen, the pressure, the density and the temperature of the gas to be buried, and so on. If this probability is made about 50%, the white-black random pattern like FIG. 22 may be generated on the checker board. It may be self-evident that this randomness is free from any algorithm. To cause the electromigration, for example, a high voltage may be applied between at least one of the word lines 503 and at least one of the bit line 902 to cause an electric current flow for a predetermined period of time. Alternately, such an operation may be repeated.

The eleventh embodiment is herein discussed.

Figure 65:
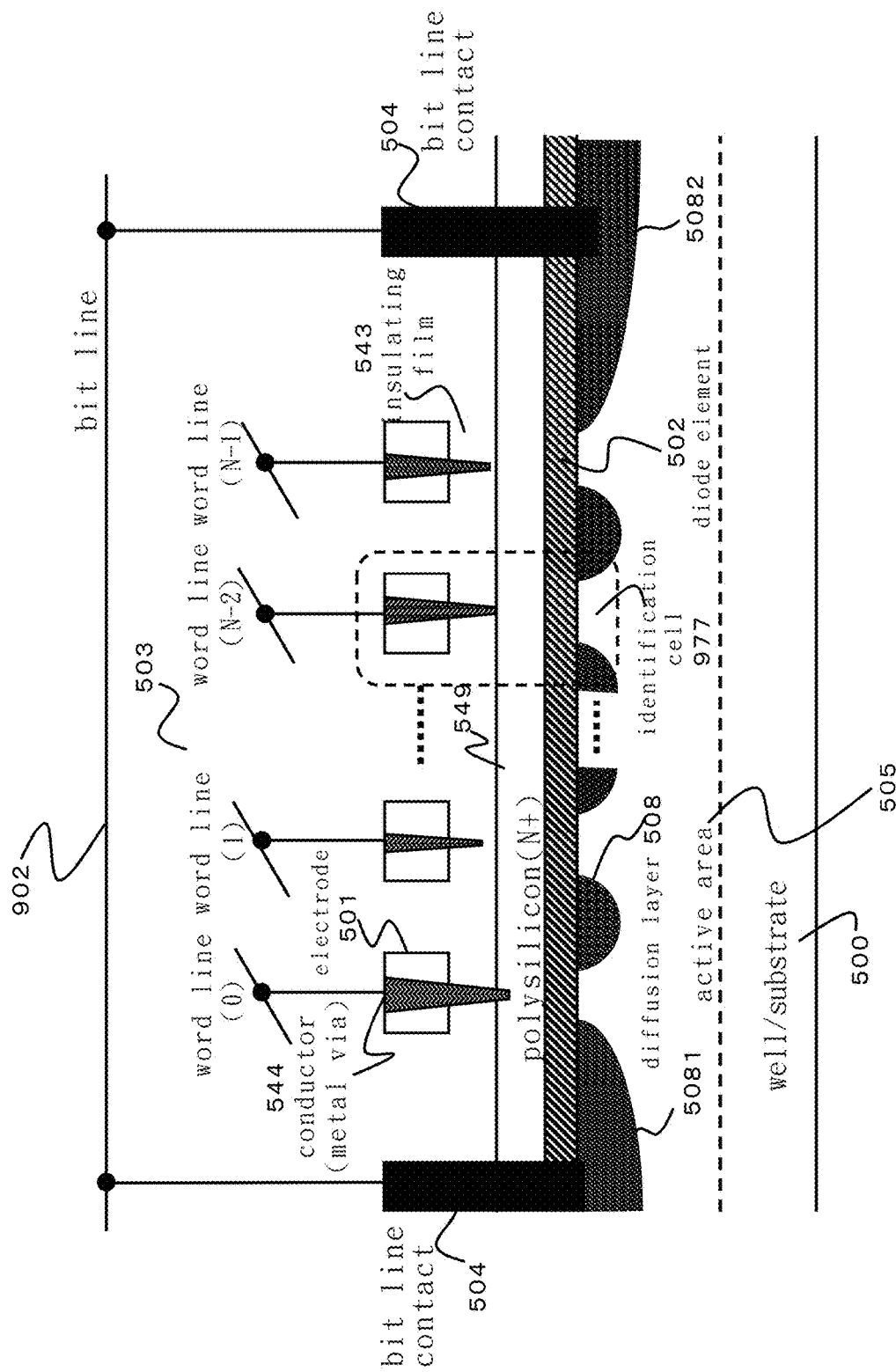
FIG. 65 illustrates an example of the cross-sectional view of a cell array to realize the identification device.
Figure 113:
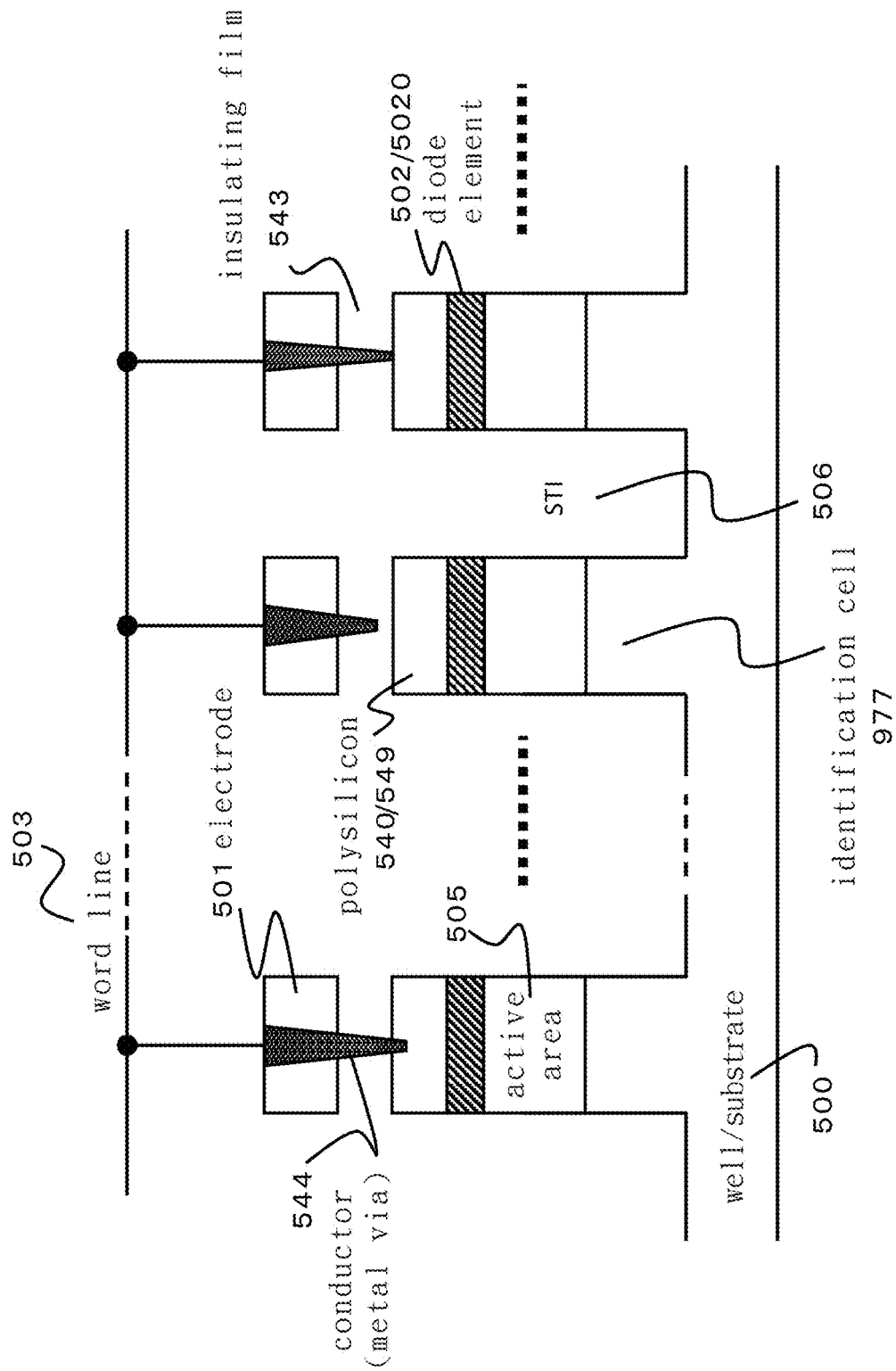
FIG. 113 illustrates an example of the cross-sectional view of a cell array realizing the chip identification device.

FIG. 65 is an example of adopting physical randomness of the depth of the via. For example, the depth of the via is set as being equivalent to the distance between the surface of the electrode 501 and the surface of the polysilicon 549. In this event, the depth of the via may be fluctuated by the manufacturing variance of the aspect ratio and the opening diameters. The variance like this may be probabilistic and accompanied by physical randomness. Some cells may be short, and the others may be connected. In the example of this figure, there are non-short, short . . . non-short, and short cells from the left. If the metal via 544 selected by the word line and bit line are short, then the electric current may not flow, for example, which may correspond to state "0" in terms of the semiconductor memories. On the contrary, if they are not short, then the electric current may flow, for example, which may correspond to sate"1" in terms of the semiconductor memories. In a similar way to FIG. 22, regarding "0" as white and "1" as black, the white-black random pattern may be generated. Here note that the fluctuation in the via thickness may come from the manufacturing variance in the mass product process. It may be, accordingly, regarded as being free from any algorithm, that is, physical randomness. Moreover, in this embodiment, it may not be necessary to apply the electrical stress. The cross-sectional view along the word line, which is perpendicular to FIG. 65, may be similar to FIG. 113.

If the electrical stress is applied to the cells which are short, then the insulating film 543 may be broken, and the state of those cells may be transited to non-short (electrically connected), to some amount. On the contrary, if the electrical stress is applied to the cells which are non-short (electrically connected), the electromigration may occur, and, then, the state of those cells may be transited to short, to some amount. In this way, until the ratio of white and black is made close to a predetermined value, the electrical stress may be repeated. However, it may be difficult to artificially control either of the dielectric breakdown or electromigration to occur more frequently. Then, if the data "1" is in majority, the stress may be applied only to the cells of state "1". On the contrary, if data "0" is in majority, the stress may be applied to only the cells of state "0". In this way, while checking the ratio of "1" and "0", such a stressing may be repeated.

The twelfth embodiment is herein discussed.

Figure 66:
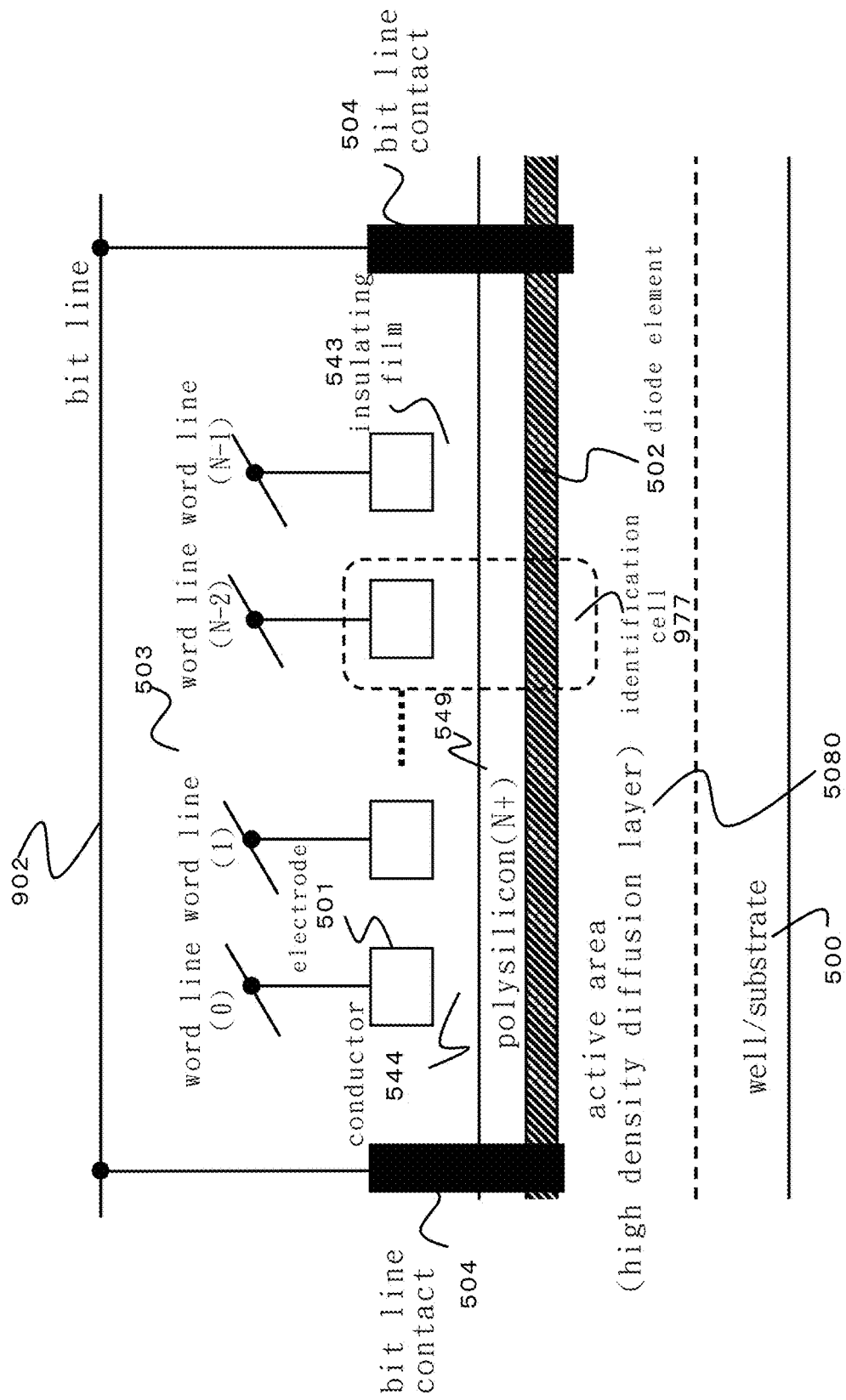
FIG. 66 illustrates an example of the cross-sectional view of a cell array to realize the identification device.
Figure 67:
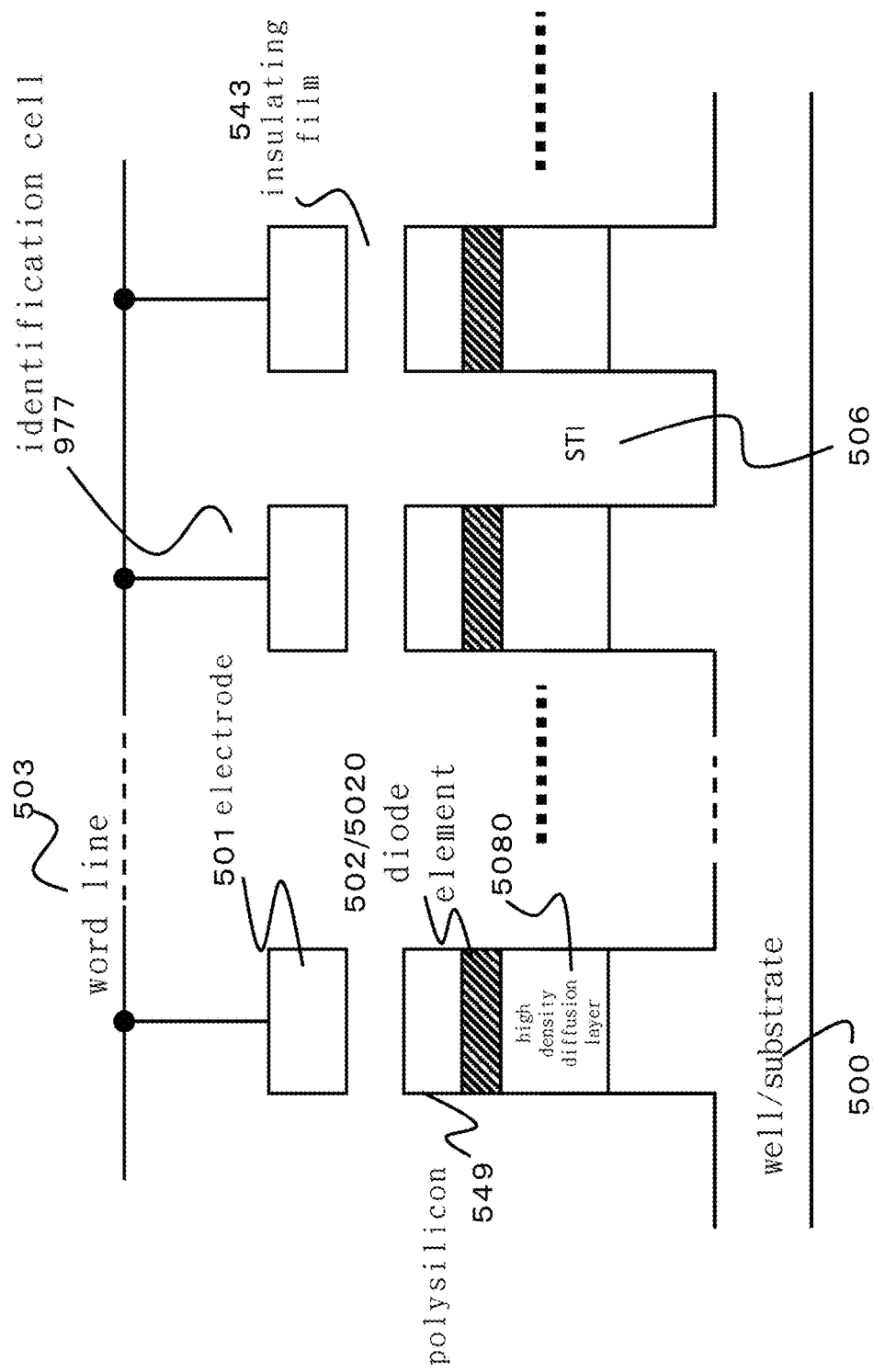
FIG. 67 illustrates an example of the cross-sectional view of a cell array to realize the identification device.

In FIG. 66, the polysilicon 549 may be expanded along the bit line direction. As an example, the polysilicon 549 may be doped with N+ high density to be the N+ polysilicon 549. The N+ polysilicon 549 may be cut in the direction perpendicular to the word line, as illustrated in FIG. 67. FIG. 67 is a cross-sectional view which is perpendicular to the bit line 902. There may be the insulating film 543 between the electrode 501 and the N+polysilicon 549, which may be used for the above mentioned diode element. For example, after making the chip, this insulating film may be broken by applying the electrical stress such as the electric field stress or the electric current stress. Such a breakdown may probabilistically occur and be accompanied with physical randomness. In the cells with the dielectric breakdown, the electric current may flow, for example, which may correspond to state "1" in terms of the semiconductor memories. In FIG. 22, it may correspond to black. On the contrary, in the cells without the dielectric breakdown, the electric current may not flow, for example, which may correspond to state "0" in terms of the semiconductor memories. In FIG. 22, it may correspond to white. This probability may be roughly tuned by controlling the film quality and thickness of the insulating film 543, the strength and time of the electrical stress, the stress pulse condition, and so on. If this probability is made about 50%, the white-black random pattern like FIG. 22 may be generated on the checker board. It may be self-evident that this randomness is free from any algorithm. To apply such an electrical stress, for example, at least one of the bit line 902 may be grounded and a high positive or a negative voltage may be applied to at least one of the word lines. Alternately, at least one of the word lines may be grounded, and a high positive or a negative voltage may be applied to at least one of the bit line 902.

The thirteenth embodiment is herein discussed.

Figure 68:
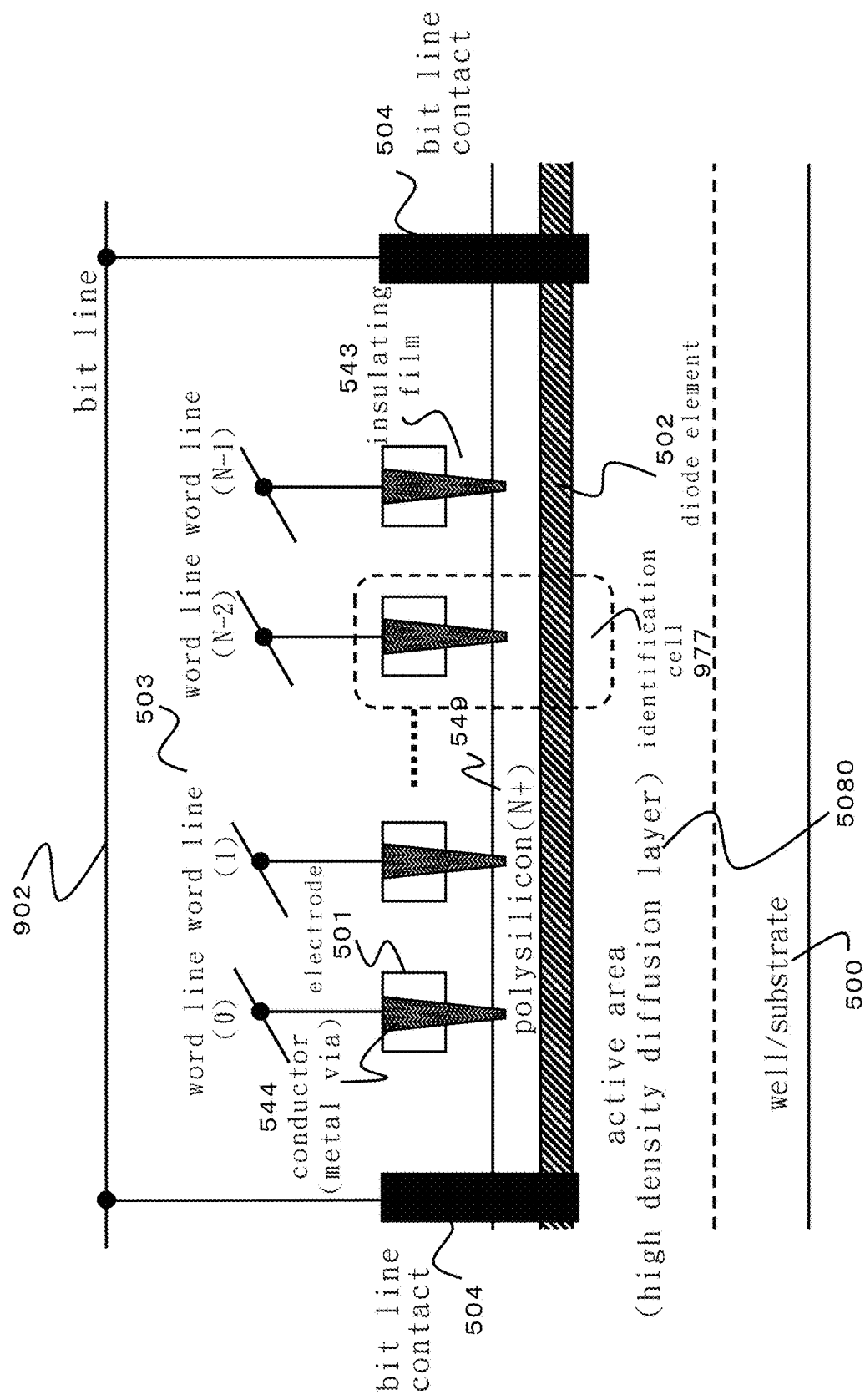
FIG. 68 illustrates an example of the cross-sectional view of a cell array to realize the identification device.

Although the polysilicon 540 of FIG. 52 is cut in the direction along the word line 503, the effect of the present invention may be obtained without cutting it. For example, in FIG. 68, the polysilicon 549 expanded along the bit line 902 may be adopted to replace the polysilicon 540. As an example, the polysilicon 549 may be doped with a N+ high density to be the N+ polysilicon. The N+ polysilicon 549 may be cut in the direction along the bit line 902, and the cross-sectional view which is perpendicular to the bit line 902 may be similar to FIG. 53. In this example, the metal via 544 may reach the N+ polysilicon 549. Thus, the electromigration may be caused by applying an electric current there. The occurrence of the electromigration may be probabilistic and accompanied with physical randomness. In the cells with the electromigration, the electric current may not flow, for example, which may correspond to state "0" in terms of the semiconductor memories. In FIG. 22, it may correspond to the state of white. On the contrary, in the cells without electromigration, the electric current may flow, for example, which may correspond to state "1" in terms of the semiconductor memories. In FIG. 22, it may correspond to black. This probability may be roughly tuned by controlling the electrified amount, the welding time, the opening diameter of the metal via 544, and its depth (the thickness of the insulating film 543), the material quality of the conducting specimen, and the pressure, the density, and the temperature of the gas to be buried into the metal via and so on. If the probability is made about 50%, the white-black random pattern like FIG. 22 may be generated on the checker board. It may be self-evident that this randomness is free from any algorithm. To cause such an electromigration, for example, a high voltage may be applied between at least one of the word lines 503 and at least one of the bit line 902, and then causing the electric current flow there for a predetermined period of time.

The fourteenth embodiment is herein discussed.

Figure 69:
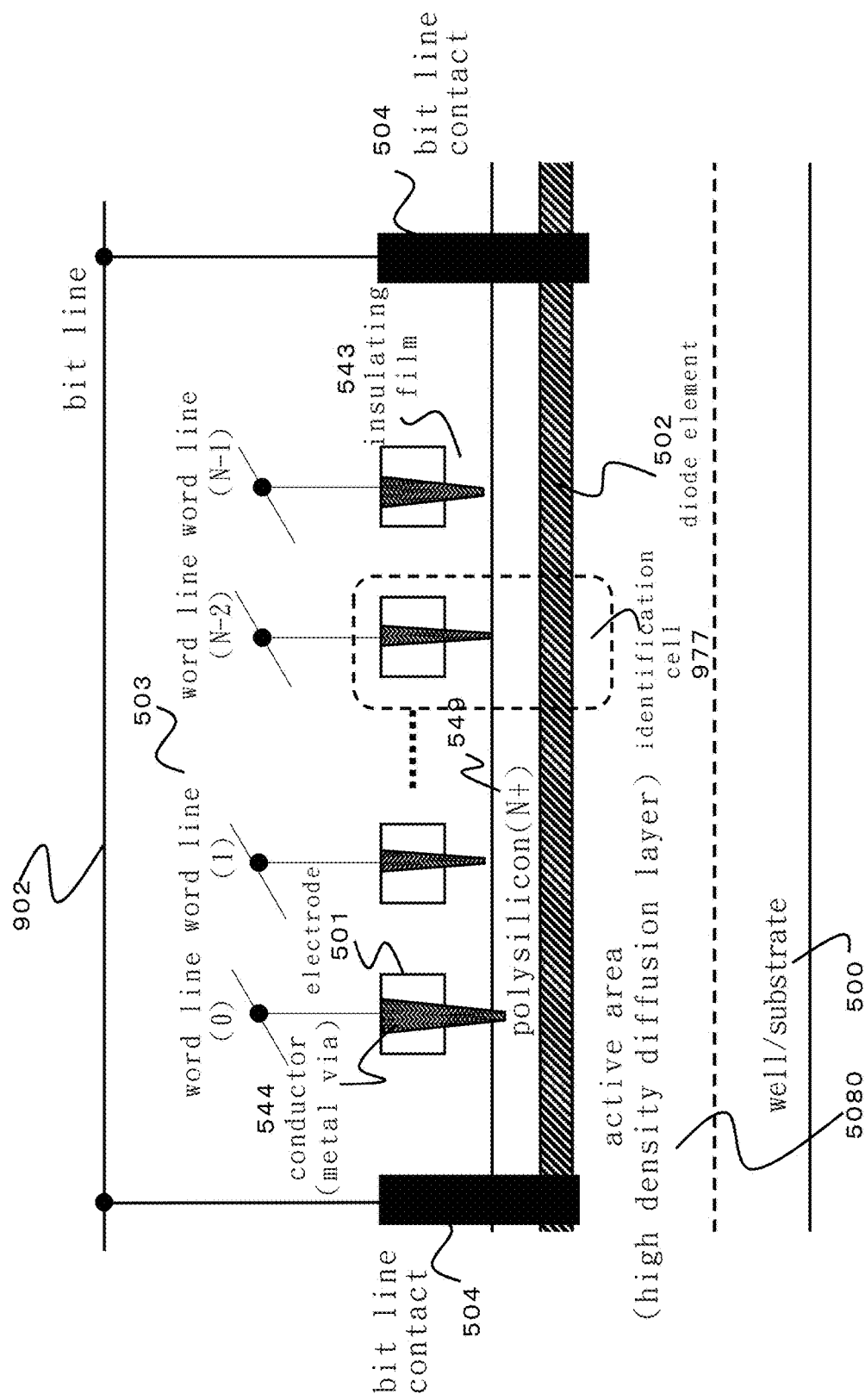
FIG. 69 illustrates an example of the cross-sectional view of a cell array to realize the identification device.

FIG. 69 is an example in which the physical the randomness of depth of the metal via 544 may be adopted. For example, the target depth of the via may be set as being equivalent to the distance from the surface of the electrode 501 to the surface of the N+ polysilicon 549. In this event, the depth of the via may be fluctuated by the manufacturing variance of the aspect ratio and the opening diameters. In some cells, the metal via is short, and in the other cells, the metal via is non-short. For example, there are non-short, short . . . non-short, short cells from the left in FIG. 69. If the metal via 544 of the cells selected by the word line and the bit line are short, then the electric current may not flow therein, for example, which may correspond to state "0" in terms of the semiconductor memories. On the contrary, if the metal via 544 is non-short, then the electric current may flow therein, for example, which may correspond to state "1" in terms of the semiconductor memories. In a similar way to FIG. 22, regarding "0" as white and "1" as black, the white-black random pattern may be generated. It is noted herein that the fluctuation of the via depth may come from the manufacturing variance in the mass production process. Then, it may be free from any algorithm. Accordingly, it may be regarded as physical randomness. Moreover, it may not be necessary to apply the electrical stress. The cross-sectional view which is perpendicular to the bit line 902 may be similar to FIG. 58. In this way, in the present embodiment, the random pattern like FIG. 22 may be generated by adopting the physical randomness of the manufacturing variance of the thickness of the metal via 544. In this event, the ratio of white-black may be made about 50%. Moreover, if an electrical stress is applied to the cells with the metal via which is short, the insulating film 543 may be broken there, and, then, the state of some of those cells may be transited to non-short. On the contrary, if an electrical stress is applied to the cells with the non-short metal via, the electromigration may be caused there, and, then, the state of some of those cells may be transited to short. In this way, until the ratio of white and black is made closed to a predetermined value, such an electrical stressing may be repeated. However, it may be difficult to artificially determine which one of the dielectric breakdown or electromigration occurs more frequently than the other one. Then, if data "1" is in the majority, the cells of state "1" may be selected and then stressed. On the contrary, if the data "0" is in the majority, the cells of state "0" may be selected and then stressed. In this way, while checking the ratio of "1" and "0", such a stressing may be repeated.

The fifteenth embodiment is discussed herein.

Figure 70:
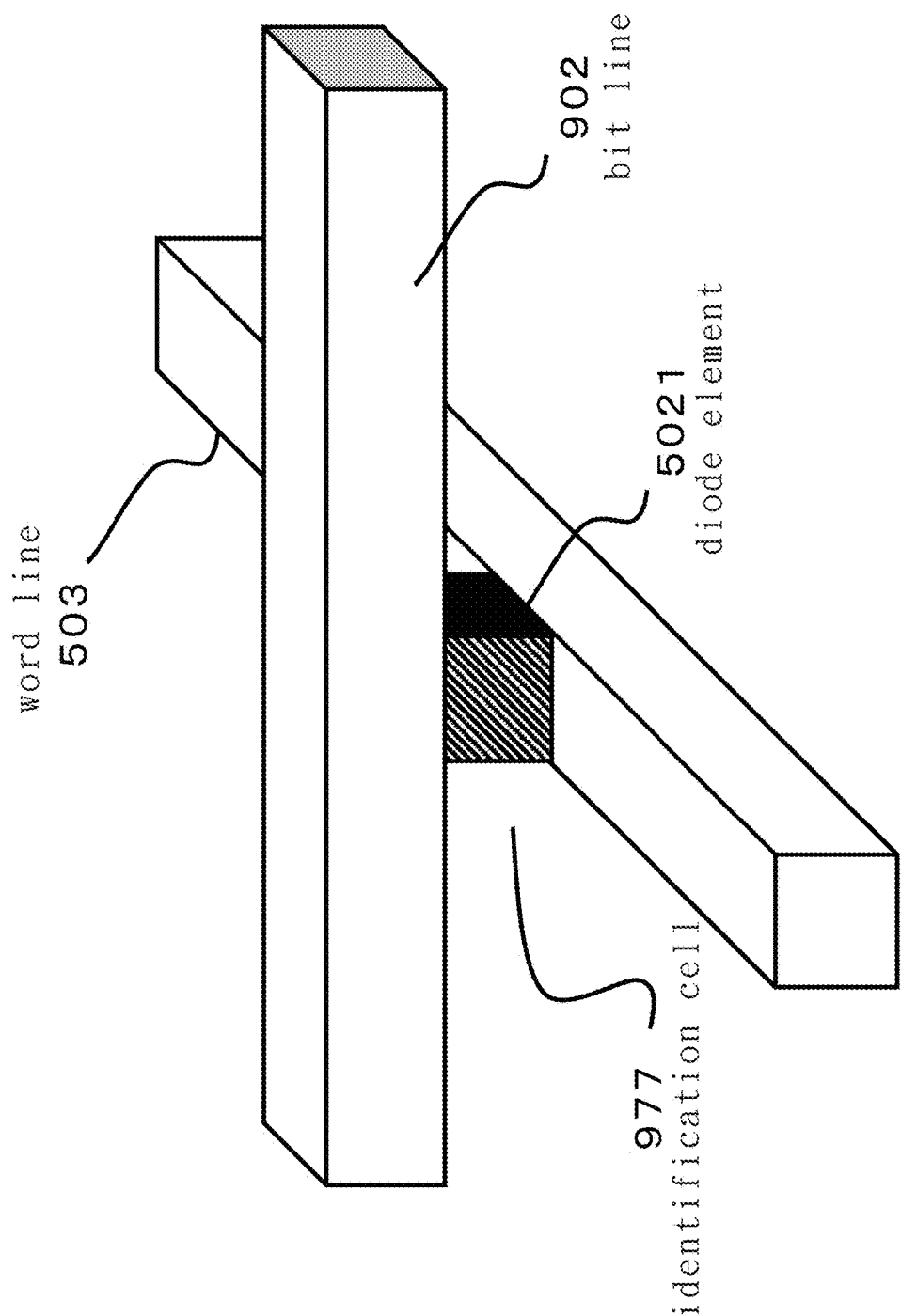
FIG. 70 illustrates an example of a cell structure to realize the chip identification device.

In FIG. 70, there are diode elements 5021 at the cross-points of the word lines 503 and the bit lines 902. Such a structure may be formed in the process to form subsequent metal layers on the insulating film. A damascene process may be an example. A diode element on the selected cross-point may be electrically stressed by applying a high voltage between the selected word line and the bit line. Alternately, the electric current stress may be applied to the diode element on the selected cross-point by applying a predetermined electric current between the selected word line and the bit line. Thus, the diode breakdown (insulating film breakdown or PN junction breakdown) may be caused. The occurrence of such a breakdown may be probabilistic and accompanied by the physical randomness. In the cells with the diode breakdown, the electric current may flow therein, for example, which may correspond to state "1" in terms of the semiconductor memories. In FIG. 22, it may correspond to black. On the contrary, in the cells without the breakdown, the electric current may not flow therein, for example, which may correspond to state "0" in terms of the semiconductor memories. In FIG. 22, it may correspond to white. This probability may be roughly tuned by controlling the condition of the electrical stress and the detailed condition of the diode (material quality, structure, size and so on). If this probability is made about 50%, the white-black random pattern like FIG. 22 may be generated on the checker board.

Figure 71:
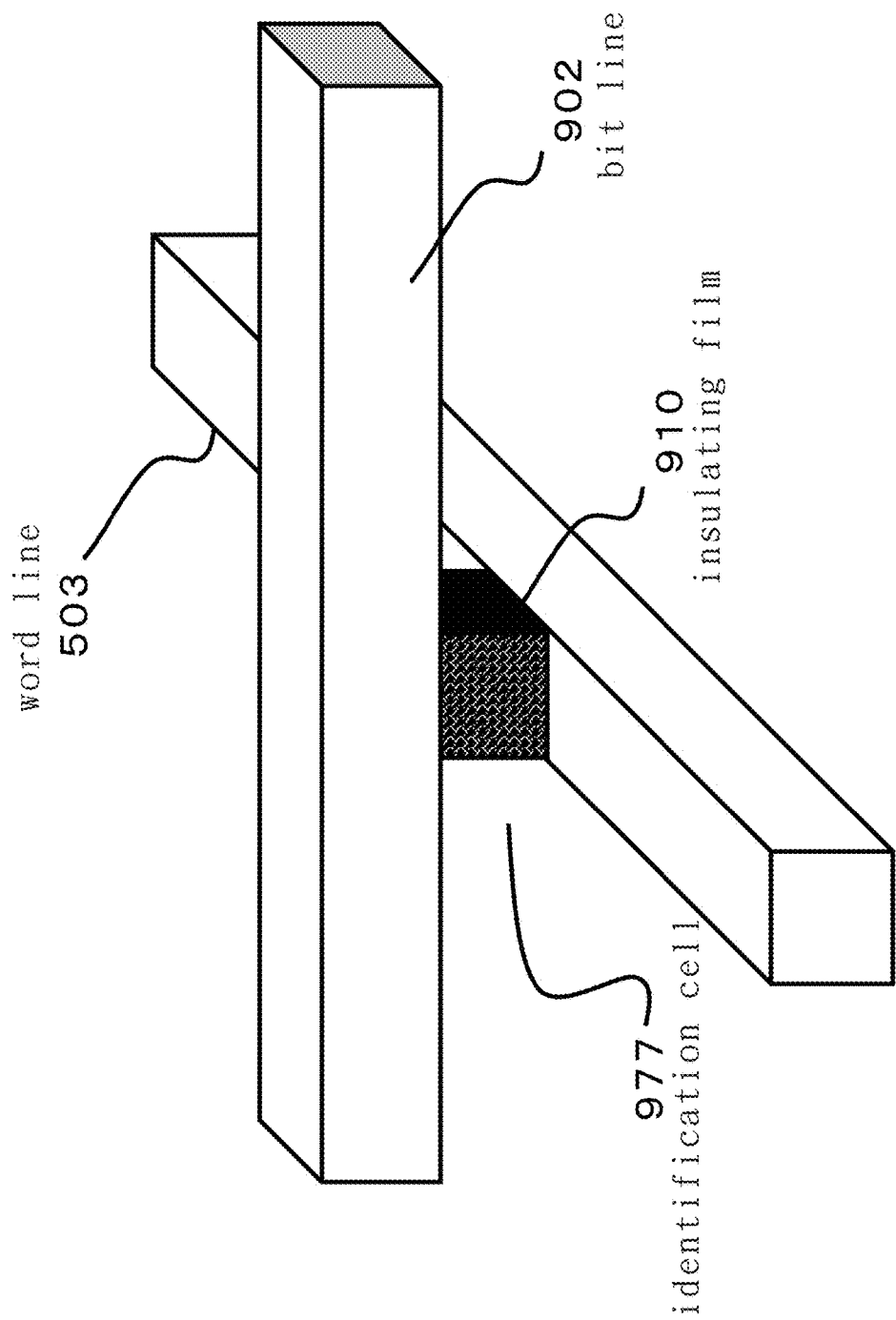
FIG. 71 illustrates an example of a cell structure to realize the chip identification device.

FIG. 71 is an example in which the insulating film 910 may be adopted as a diode element. In this event, the insulating breakdown may be adopted as a factor of the physical randomness.

Figure 72:
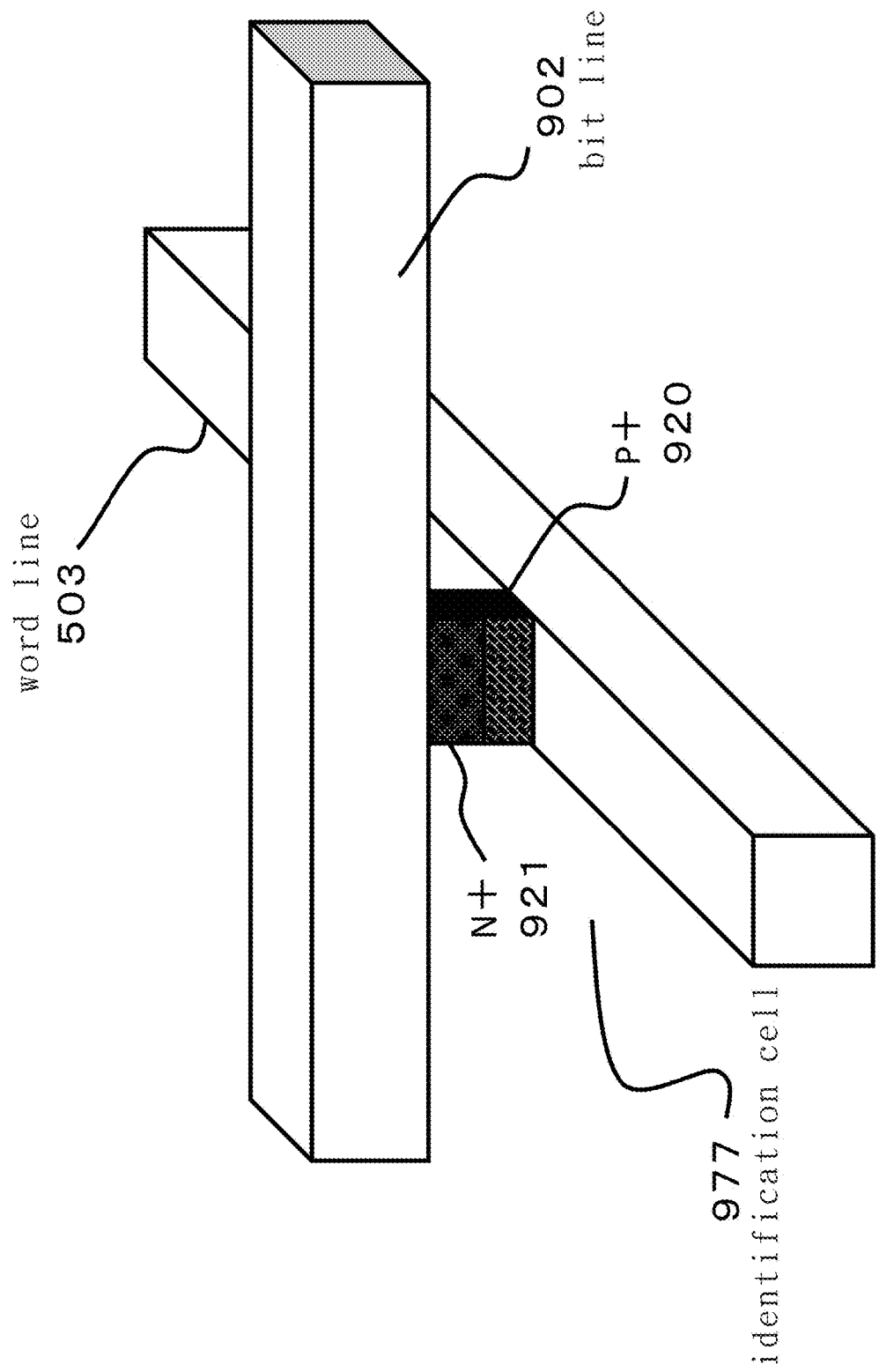
FIG. 72 illustrates an example of a cell structure to realize the chip identification device.

FIG. 72 is an example in which the PN junction, which comprises the P+ diffusion layer 920 and the N+ diffusion layer 921, is adopted as a diode element. In this event, the junction breakdown may be adopted as a factor of the physical randomness. Of course, the P+ diffusion layer 920 and the N+ diffusion layer 921 may be replaced by each other. The figure may be omitted because it may be self-evident.

Figure 73:
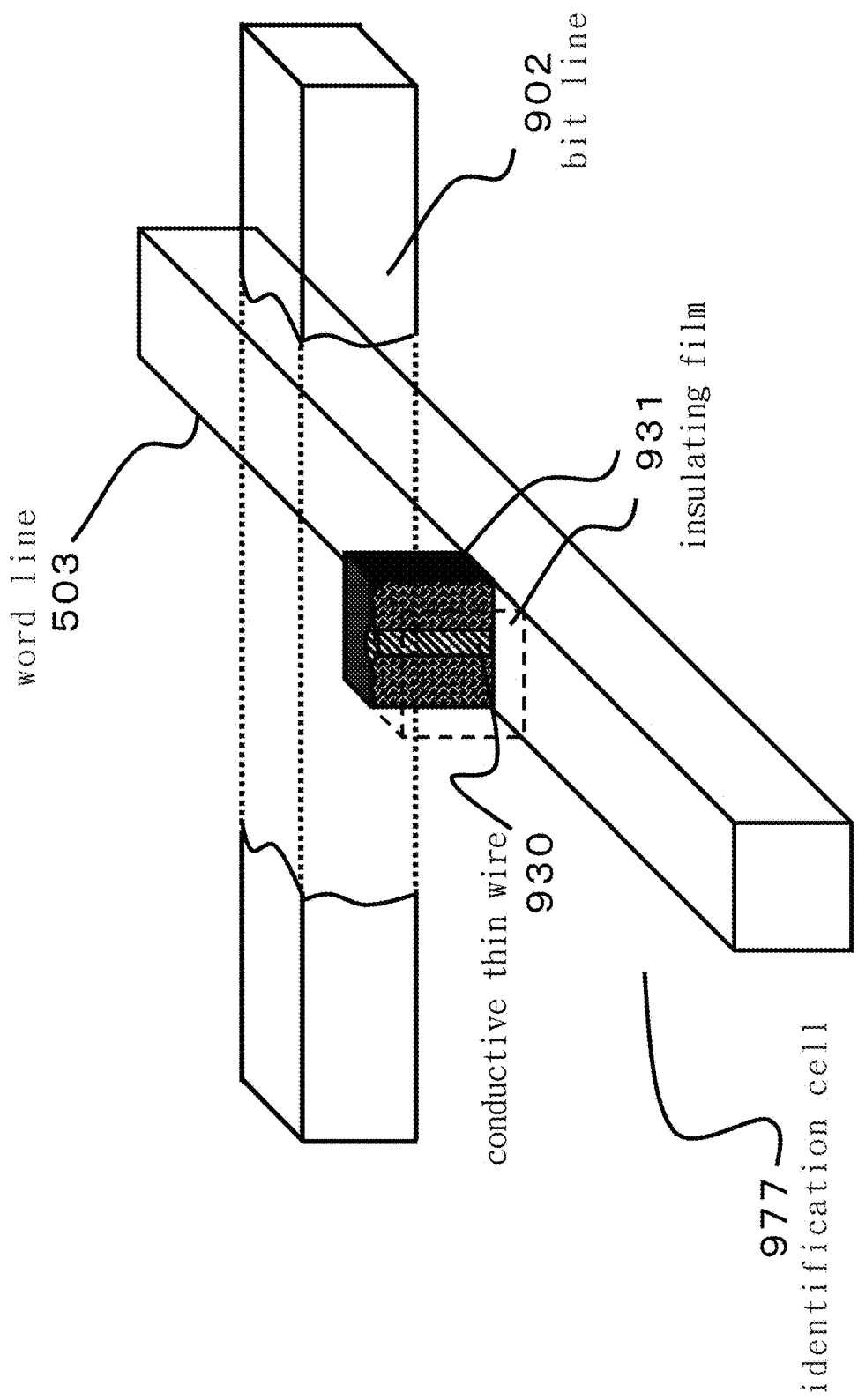
FIG. 73 illustrates an example of a cell structure to realize the chip identification device.

In FIG. 73, firstly, the insulating film 931 may be buried to the space at the cross-point between the word line 503 and the bit line 902 for the diode element. Next, a thin vertical hole may be opened on this insulating film and then buried with a conductive specimen therein, to form the conductive thin wire 930. This conductive thin wire 930, as similar to the metal via in FIGS. 35 and FIG. 40, may have the feature to likely exhibit the electromigration than the conventional mental wiring. To cause the electromigration, it may be required to flow a predetermined electric current through the conductive thin wire 930 for a predetermined period of time. However, since the occurrence of the electromigration may be probabilistic, this feature may be adopted as physical randomness.

The sixteenth embodiment is herein discussed.

Figure 74:
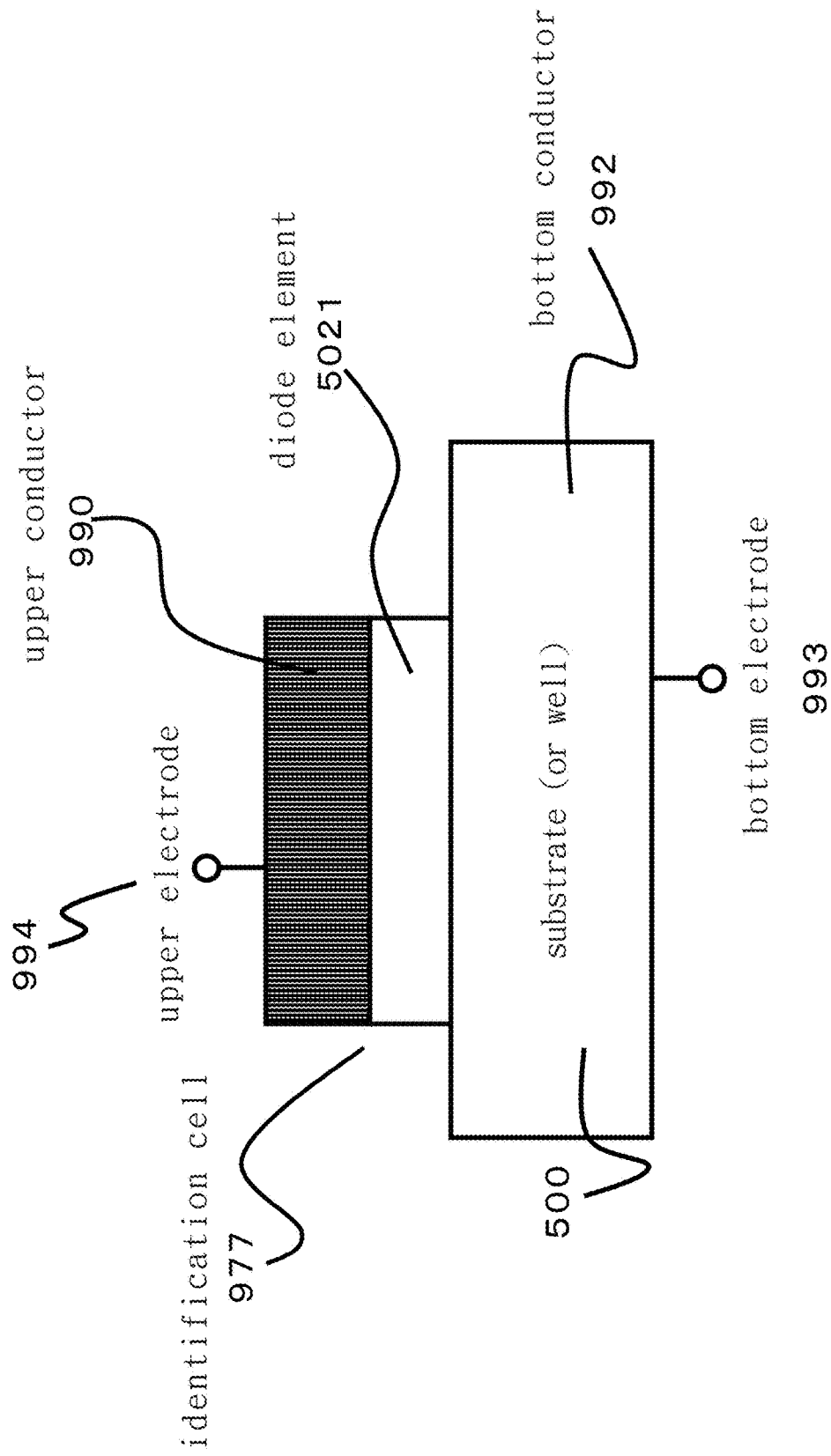
FIG. 74 illustrates an example of the cross-sectional view of a cell structure to realize the chip identification device.
Figure 93:
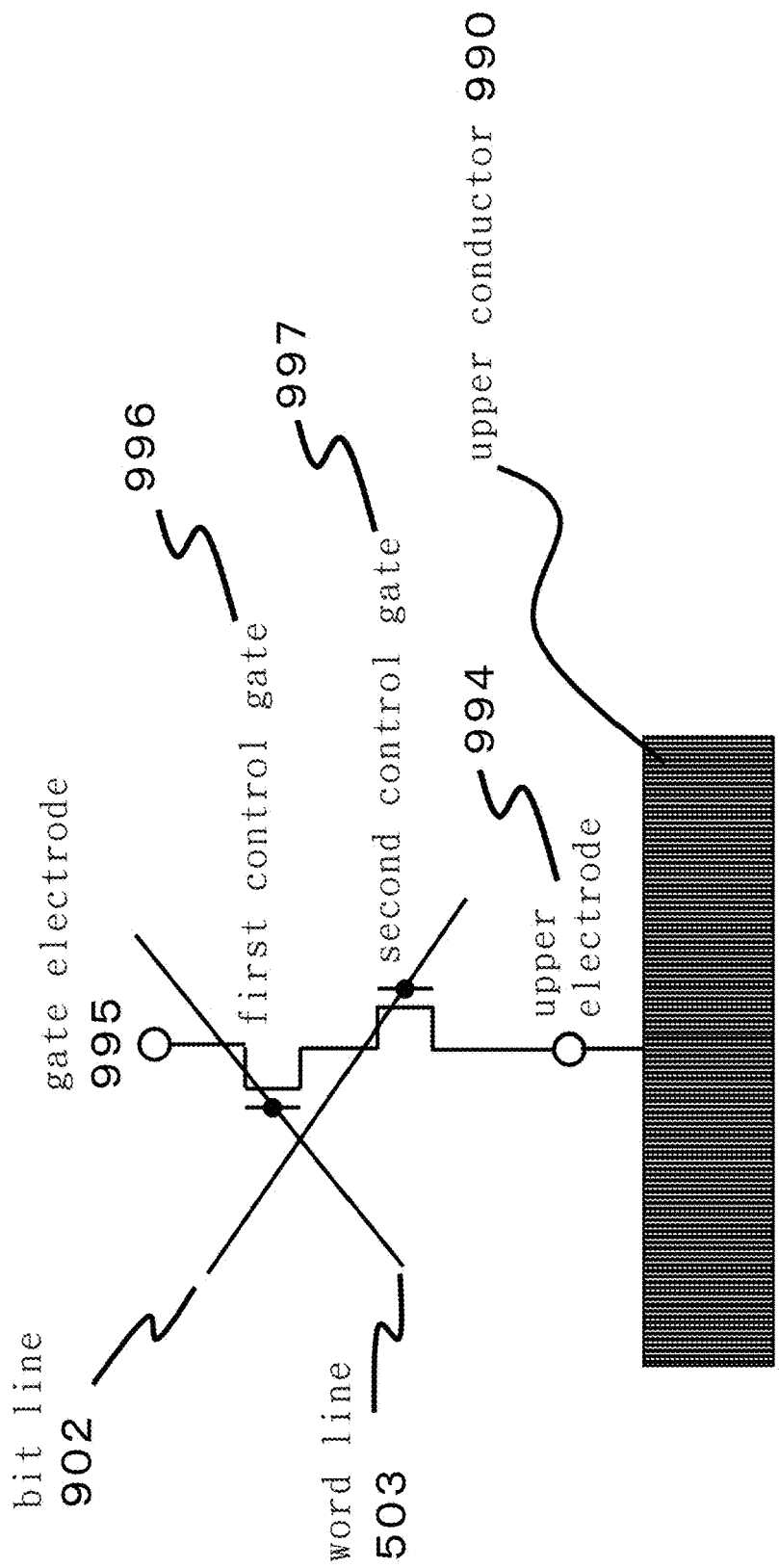
FIG. 93 illustrates an example of the method to associate a bit line and a word line to an identification cell realizing the chip identification device.

An example of the identification cells 977 located at the cross-points of the word lines 503 and the bit lines 902, as shown in FIGS. 23-FIG. 29, may have a structure as illustrated in FIG. 74. The bottom conductor 992 and the upper conductor 990 may sandwich the diode element 5021. The upper conductor 990 may be connected to the upper electrode 994, and the bottom conductor 992 may be connected to the bottom electrode 993. As an example, the bottom electrode 993 may be grounded to the earth as a substrate electrode. The upper electrode 994, as illustrated in FIG. 93, may be connected to the gate electrode 995 via two control gates. The first control gate 996 may be connected to the word line 503, and the second control gate 997 may be connected to the bit line 902. In another example, a route through which the charge is carried may be formed electrically or structurally by specially processing a substrate surface which is connected to the bit line contacts. For example, the active area 505 in FIGS. 30-34 and FIG. 105 and the high density diffusion layer 5080 in FIGS. 36-39 and FIG. 106 may electrically and structurally form a route through which the charge is carried on the substrate surface to the bit line contact 504. Furthermore, it may be connected to the bit line 902. Alternately, the N+ polysilicon 549 in FIG. 62, FIG. 63, FIG. 66 and FIG. 67 may form the route through which the charge is carried to the bit line contact 504. Furthermore, it may be connected to the bit line 902. In this event, the substrate (or well) 500 may be usually grounded to the earth, and the upper electrode may be connected to the word line 503. Moreover, at least a part of the upper electrode 994 and of the upper conductor 990 may be connected to each other by the metal via. For example, FIGS. 41-45, FIGS. 52-56 and FIG. 107 may be those examples. Moreover, regarding the bottom conductor 992 as the substrate (or well) 500 and the upper conductor 990 as the electrode 501, the present embodiment may represent the cell structures illustrated in FIGS. 30-34, FIGS. 36-39, FIG. 105, and FIG. 106.

Figure 75:
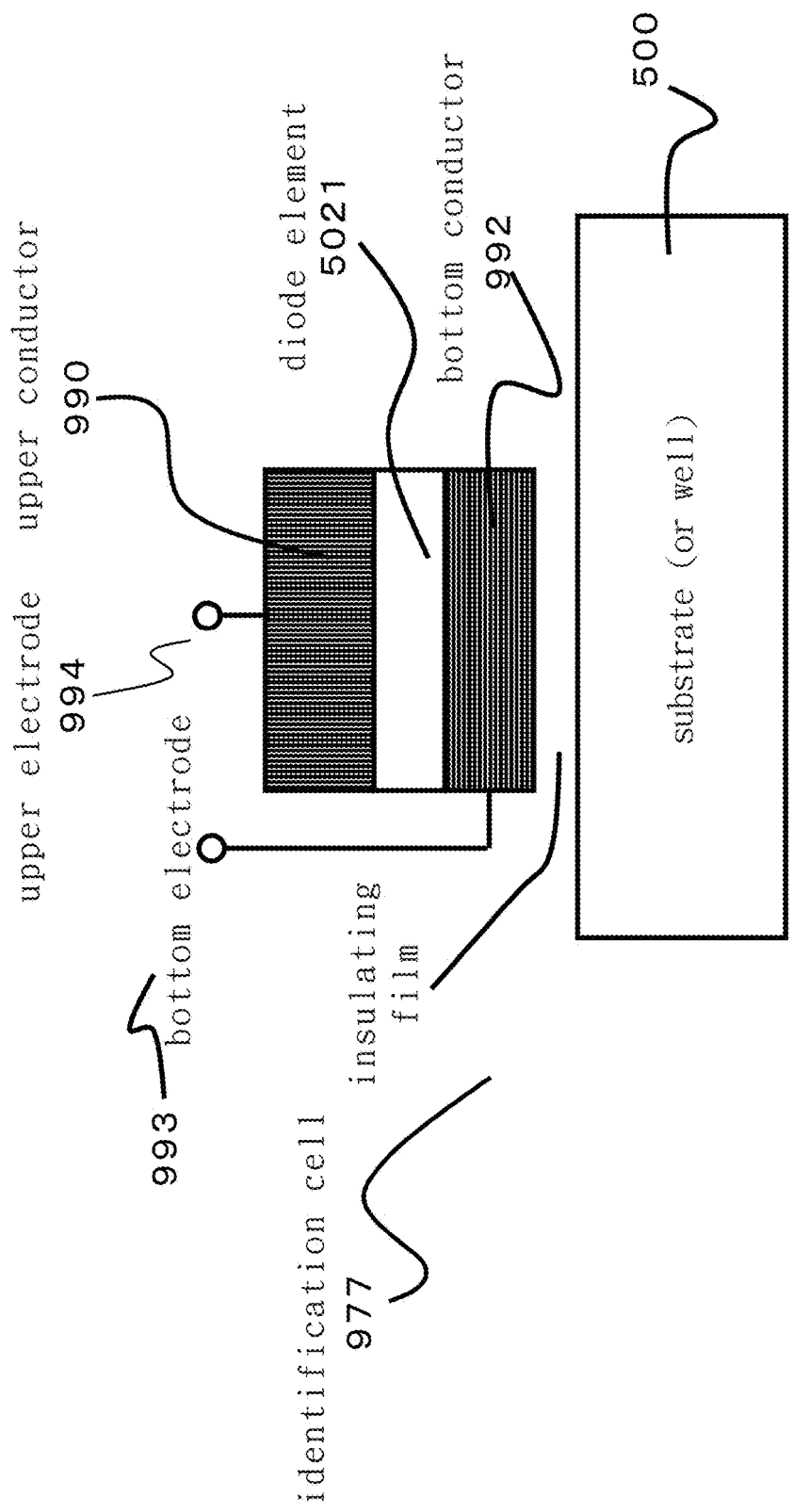
FIG. 75 illustrates an example of the cross-sectional view of a cell structure to realize the chip identification device.

Another example of identification cells 977 located at the cross-points of the word lines 503 and the bit lines 902, as shown in FIGS. 23-FIG. 29, may have a structure as illustrated in FIG. 75. The bottom conductor 992 and the upper conductor 990 may sandwich the diode element 5021. The upper conductor 990 may be connected to the upper electrode 994, and the bottom conductor 992 may be connected to the bottom electrode 993. The bottom electrode 993 may be above the substrate (or well) 500 via the insulating film. For example, regarding the bottom conductor 992 as the N+ polysilicon 549 and the upper conductor 990 as the electrode 501, the present embodiment may represent the structures illustrated in FIG. 62, FIG. 63, FIG. 66, and FIG. 67. As an example, if the bottom electrode 993 may be grounded to the earth, then the upper electrode 994 may be connected to the gate electrode 995 via two control gates, as illustrated in FIG. 93. The first control gate 996 may be connected to the word line 503, and the second control gate 997 may be connected to the bit line 902. In another example, the upper electrode 994 may be connected to the word line 503, and the bottom electrode 993 may be connected to the bit line 902. Moreover, the structures as illustrated in FIGS. 70-72 may be represented by FIG. 75 with damascene.

Figure 76:
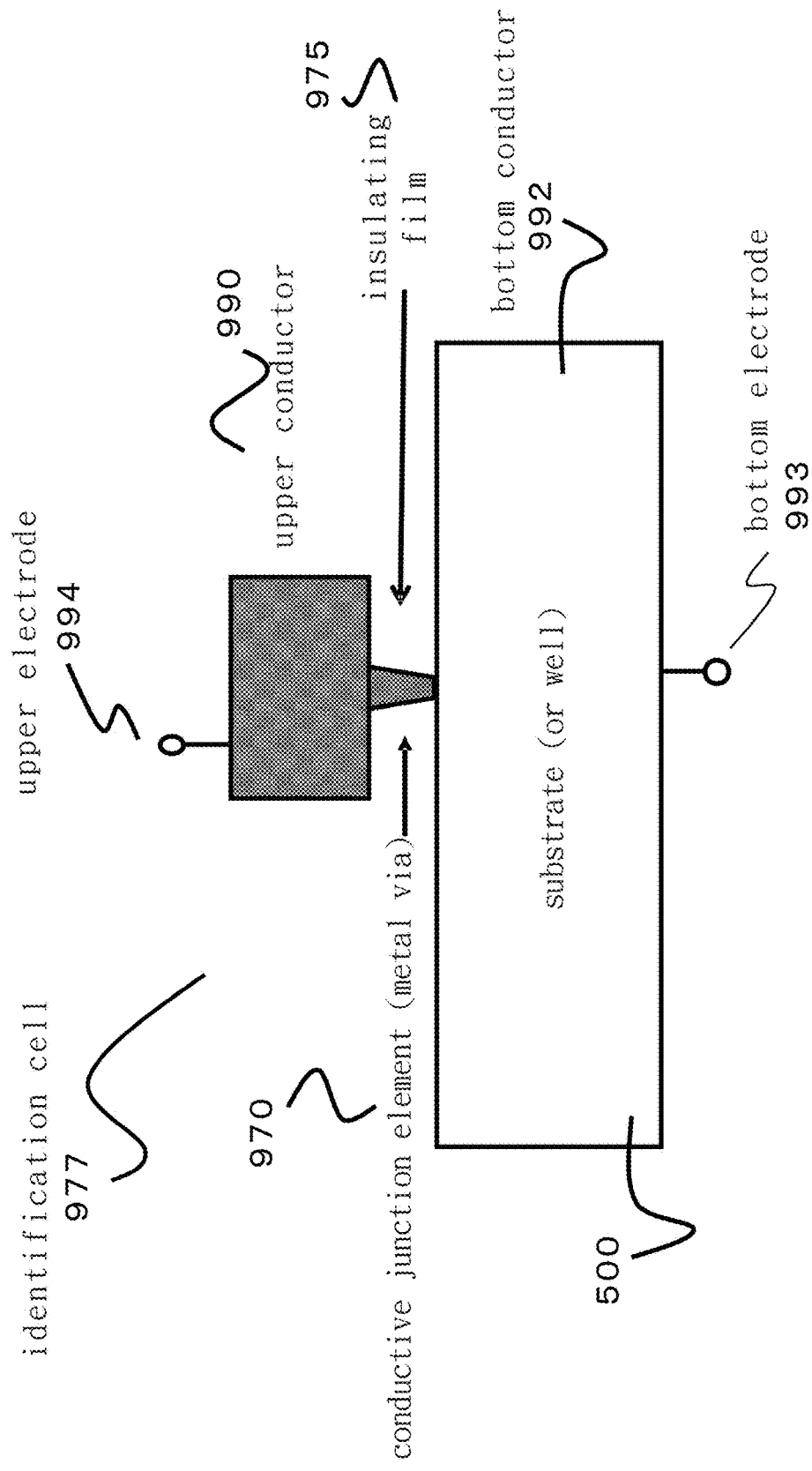
FIG. 76 illustrates an example of the cross-sectional view of a cell structure to realize the chip identification device.

Another example of identification cells 977 located at the cross-points of the word lines 503 and the bit lines 902, as shown in FIGS. 23-FIG. 29, may have a structure as illustrated in FIG. 76. The bottom conductor 992 and the upper conductor 990 may sandwich the conductive junction element 970 wrapped by the insulating film 975. The upper conductor 990 may be connected to the upper electrode 994, and the bottom conductor 992 may be connected to the bottom electrode 993. As an example, the bottom electrode 993 may be grounded to the earth as the substrate electrode. The upper electrode 994 may be connected to the gate electrode 995 via two control gates, as illustrated in FIG. 93. The first control gate 996 may be connected to the word line 503, and the second control gate 997 may be connected to the bit line 902. In another example, a route through which the charge is carried may be formed electrically or structurally by specially processing a substrate surface which is connected to the bit line contacts. For example, the active area 505 in FIG. 35 and FIG. 49 and the high density diffusion layer 5080 in FIG. 40 and FIG. 59 may electrically and structurally form a route through which the charge is carried on the substrate surface to the bit line contacts 504. Furthermore, it may be connected to the bit line 902. For example, the N+ polysilicon 549 in FIG. 64 and FIG. 68 may form the route through which the charge is carried to the bit line contacts 504. Furthermore, it may be connected to the bit line 902. In this event, the substrate (or well) 500 may be usually grounded to the earth, and the upper electrode may be connected to the word line 503.

Figure 77:
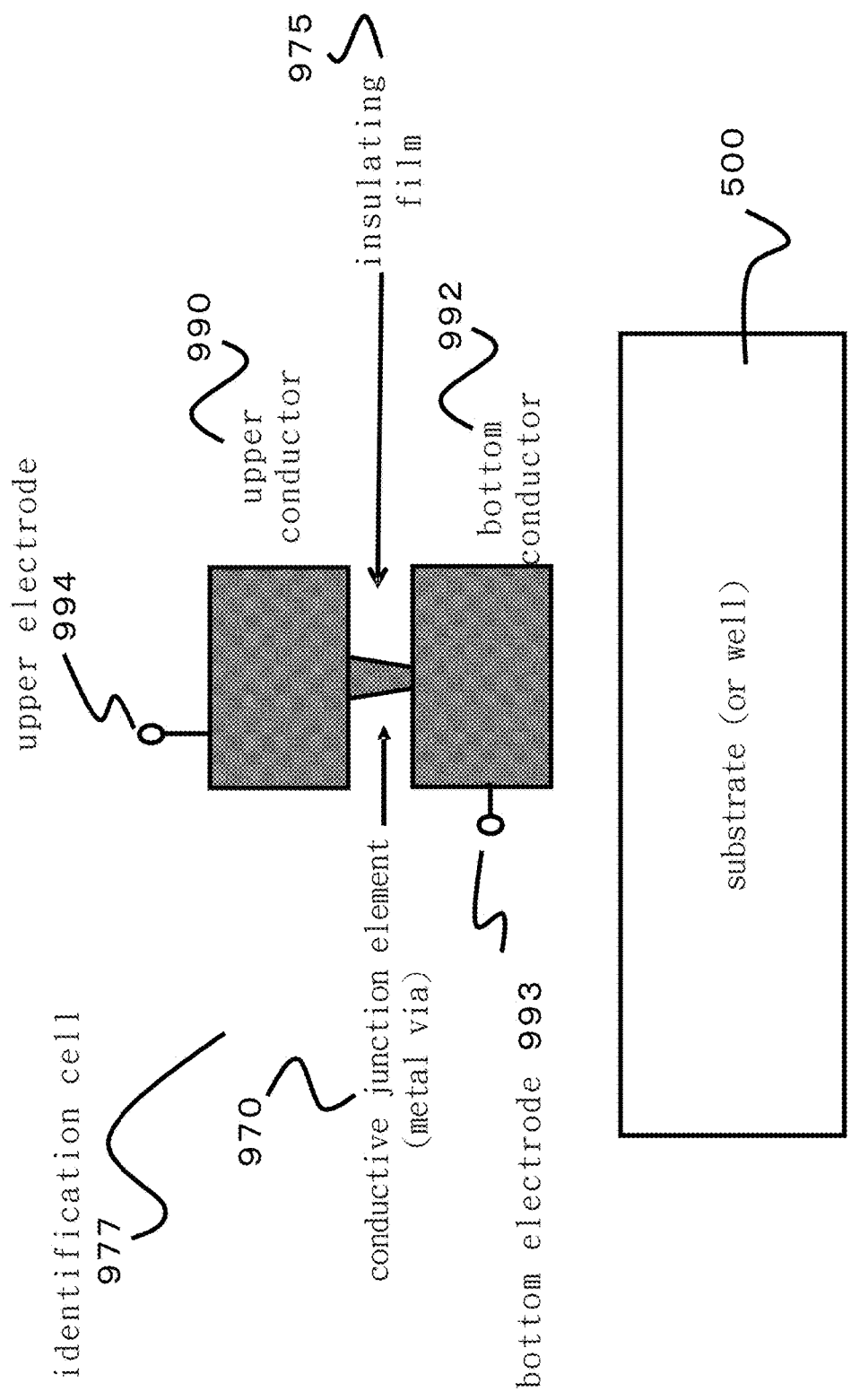
FIG. 77 illustrates an example of the cross-sectional view of a cell structure to realize the chip identification device.

Another example of identification cells 977 located at the cross-points of the word lines 503 and the bit lines 902, as shown in FIGS. 23-FIG. 29, may have a structure as illustrated in FIG. 77. The bottom conductor 993 and the upper conductor 990 may sandwich the conductive junction element 970 wrapped by the insulating film 975. The upper conductor 990 may be connected to the upper electrode 994, and the bottom conductor 992 may be connected to the bottom electrode 993. The bottom electrode 992 may be above the substrate (or well) 500 via the insulating film. For example, regarding the conductive junction element 970 as the metal via 544, in which the conductive specimen is buried, or the conductive thin wire 930, the present embodiment may represent the structures illustrated in FIG. 64, FIG. 68, and FIG.73. It is noted herein that the N+ polysilicon 549 in FIG. 64 and FIG. 68 may form a route through which the charge is carried to the bit line contacts 504. Furthermore, it may be connected to the bit line 902. In this event, the substrate (or well) 500 may be usually grounded to the earth, and the upper electrode may be connected to the word line 503. As another example, the bottom electrode 993 may be grounded to the earth, and the upper electrode 994 may be connected to the gate electrode 995 via two control gates, as illustrated in FIG. 93. The first control gate 996 may be connected to the word line 503, and the second control gate 997 may be connected to the bit line 902.

Figure 78:
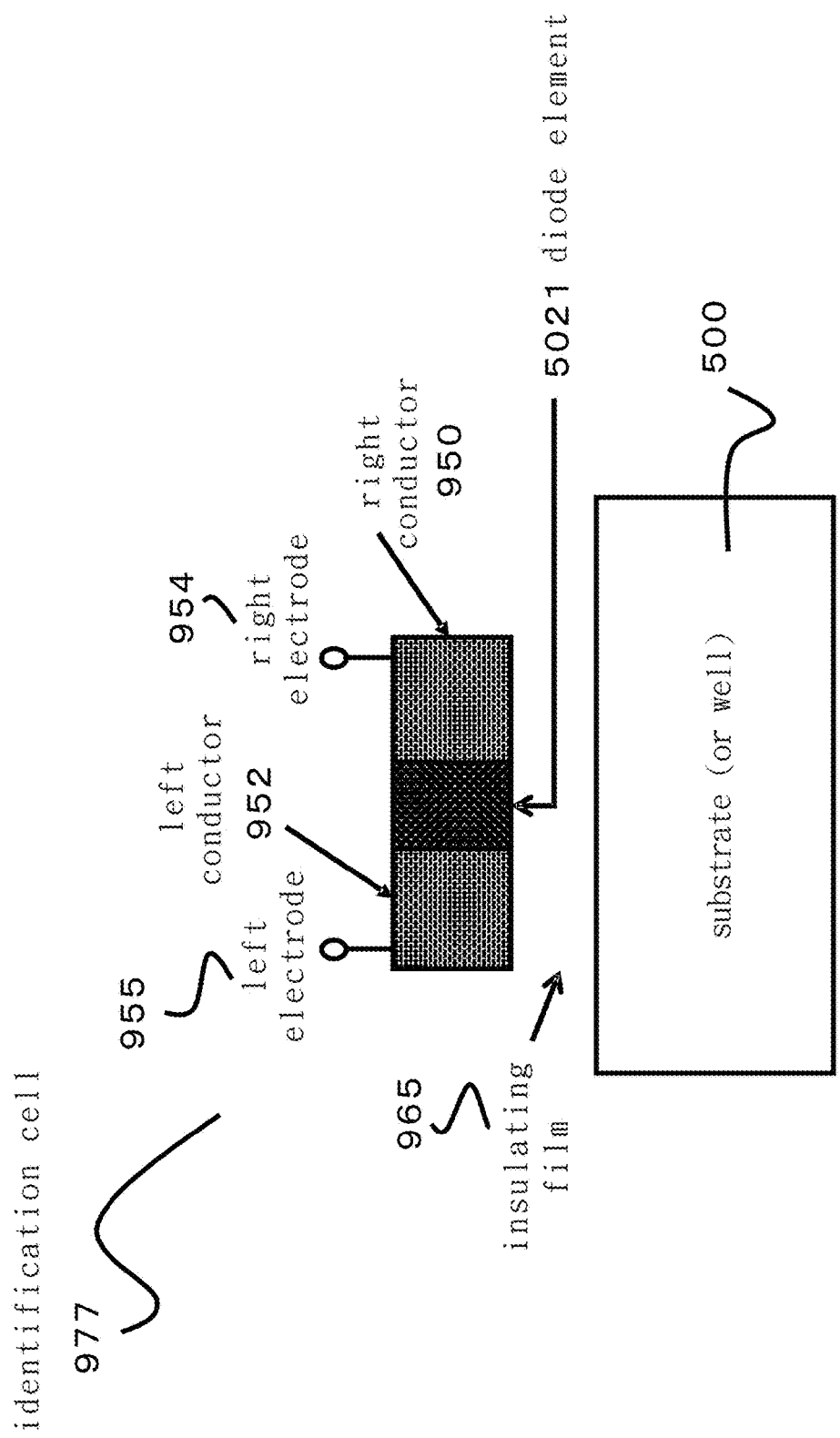
FIG. 78 illustrates an example of the cross-sectional view of a cell structure to realize the chip identification device.
Figure 94:
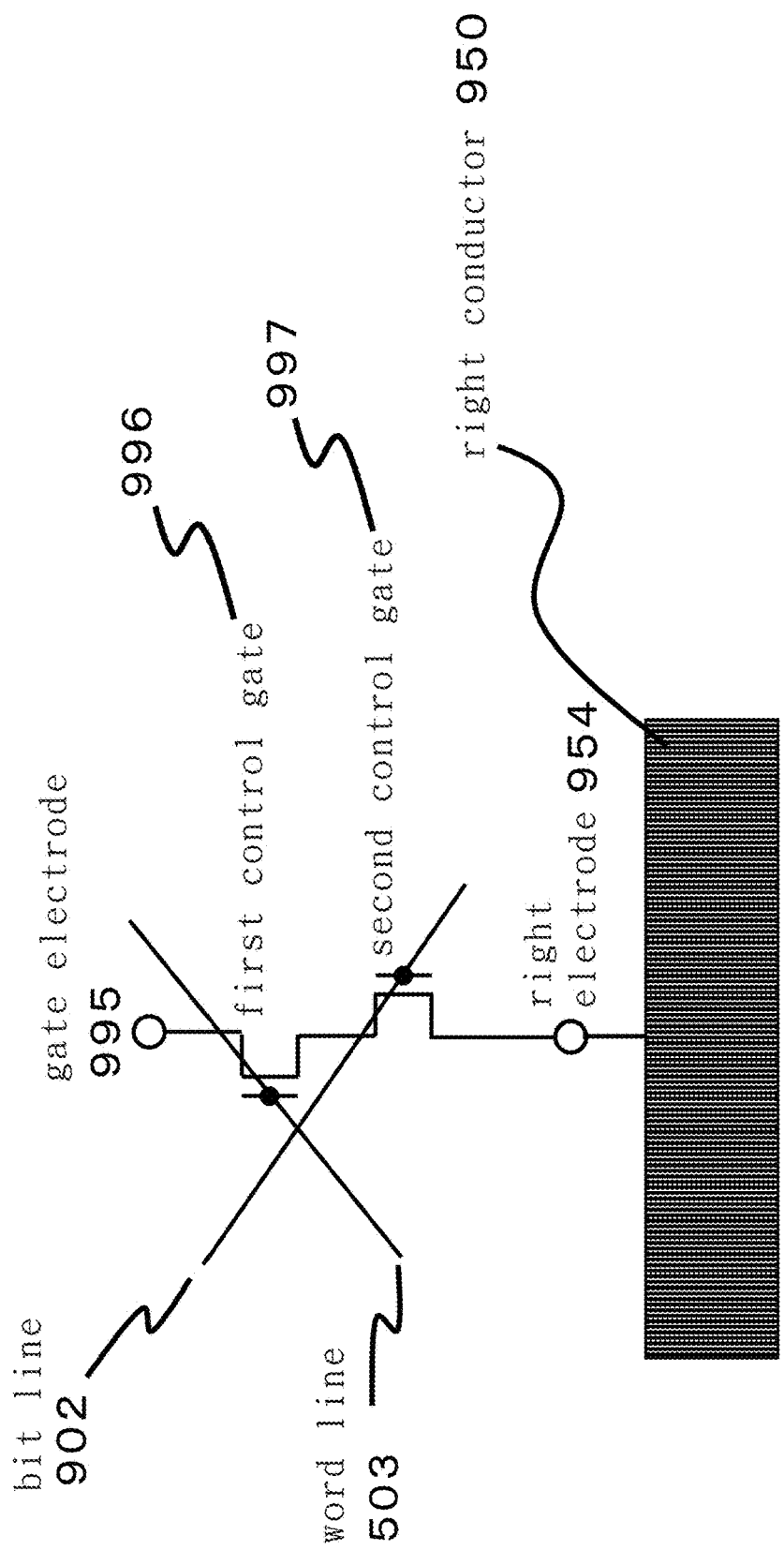
FIG. 94 illustrates an example of the method to associate a bit line and a word line to an identification cell realizing the chip identification device.

Another example of identification cells 977 located at the cross-points of the word lines 503 and the bit lines 902, as shown in FIGS. 23-FIG. 29, may have a structure as illustrated in FIG. 78. There may be two conductors, the right conductor 950 and the left conductor 952, above the substrate (or well) 500 via the insulating film 965, which are parallel to the substrate surface. The diode element 5021 may be inserted between both conductors, the right conductor 950 may be connected to the right electrode 954, and the left conductor 952 may be connected to the left electrode 955. As an example, the right electrode 954 may be connected to the word line 503, and the left electrode 955 may be connected to the bit line 902. In another example, the left electrode 955 may be grounded to the earth, and the right electrode 954 may be connected to the gate electrode 995 via two control gates, as illustrated in FIG. 94. In this event, the first control gate 996 may be connected to the word line 503, and the second control gate 997 may be connected to the bit line 902.

Figure 79:
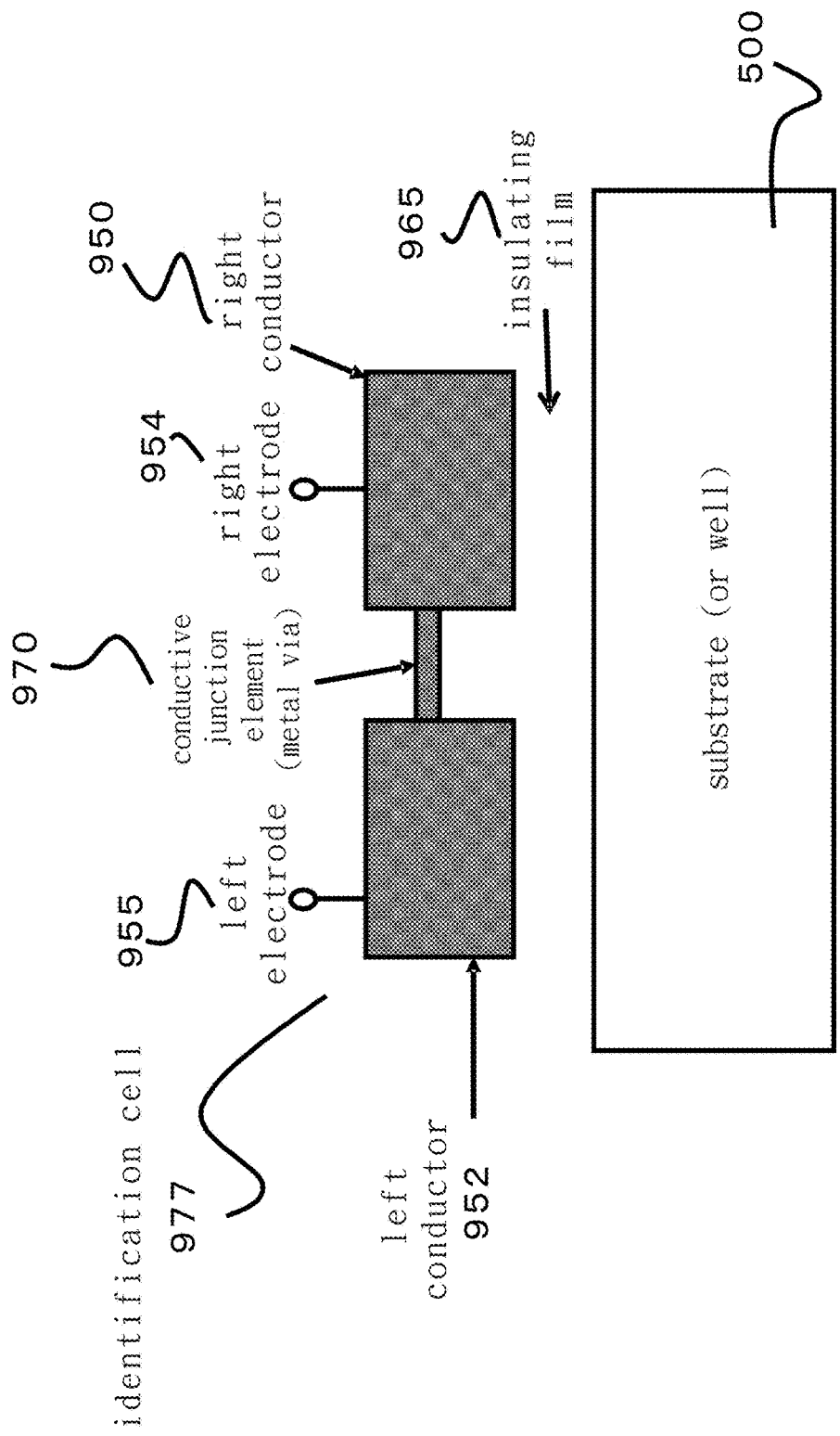
FIG. 79 illustrates an example of the cross-sectional view of a cell structure to realize the chip identification device.

Another example of identification cells 977 located at the cross-points of the word lines 503 and the bit lines 902, as shown in FIGS. 23-FIG. 29, may have a structure as illustrated in FIG. 79. There may be two conductors, the right conductor 950 and the left conductor 952, above the substrate (or well) 500 via the insulating film 965, which are parallel to the substrate surface. The conductive junction element 970 may be inserted between the right conductor 950 and the left conductor 952 to bridge those conductors. The right conductor 950 may be connected to the right electrode 954, and the left conductor 952 may be connected to the left electrode 955. The conductive junction element 970 may be formed by cutting into a short piece of the metal wires formed by the damascene process, or by carbon nano tubes. As an example, the right electrode 954 may be connected to the word line 503, and the left electrode 952 may be connected to the bit line 902. In another example, the left electrode 955 may be grounded to the earth, and the right electrode 954 may be connected to the gate electrode 995 via two control gates, as illustrated in FIG. 94. In this event, the first control gate 996 may be connected to the word line 503, and the second control gate 997 may be connected to the bit line 902.

Figure 80:
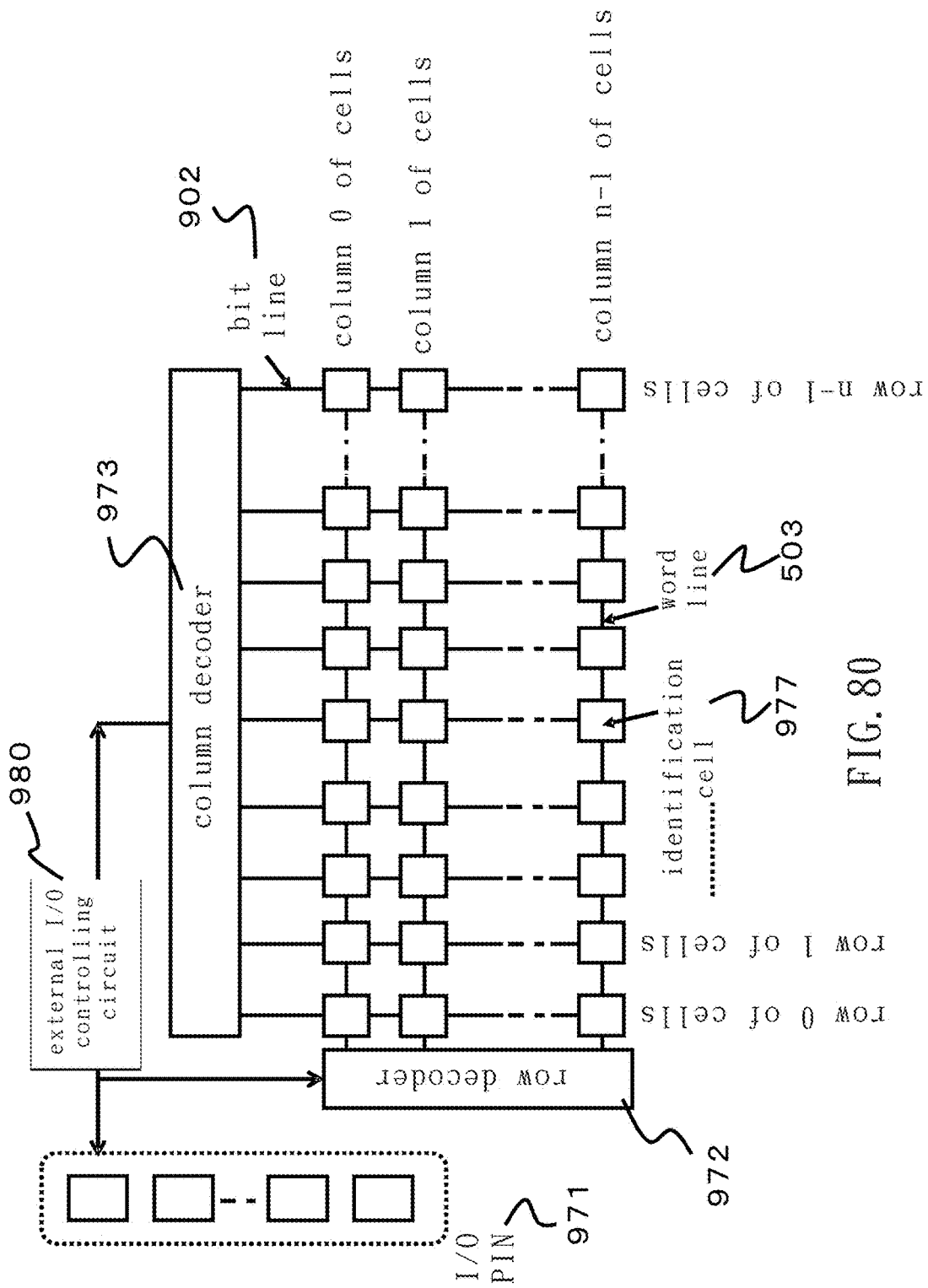
FIG. 80 illustrates an example of a cell array to realize the chip identification device.

FIG. 80 illustrates an example of the cell array layout of the identification cells 977 in FIGS. 74-79 and the wiring layout with peripheral circuits. The word line 503 may be connected to the row decoder 972, and the bit line 902 may be connected to the column decoder 973. The external I/O controlling circuit 980 may control the I/O related to the column decoder 973, and the output may be output from the I/O PIN 971. This example may correspond to the example of FIGS. 27-29 in which the passcode (P, S, T . . . ) may be input via the bit lines. Of course, if the external I/O controlling circuit 980 controls the I/O related to the row decoder 972, then the examples of FIGS. 24-26 in which the passcode (P, S, T . . . ) may be input via the word lines may be realized.

A common feature of the cell structures illustrated in FIGS. 74-79 may be that at least one cell selected by the word line 503 and the bit line 902 may comprise at least one of the diode element 502 and the conductive junction element 970. FIG. 74, FIG. 75 and FIG. 78 may correspond to the diode element 502, and FIG. 76, FIG. 77, and FIG. 79 may correspond to the conductive junction element 970.

Figure 111:
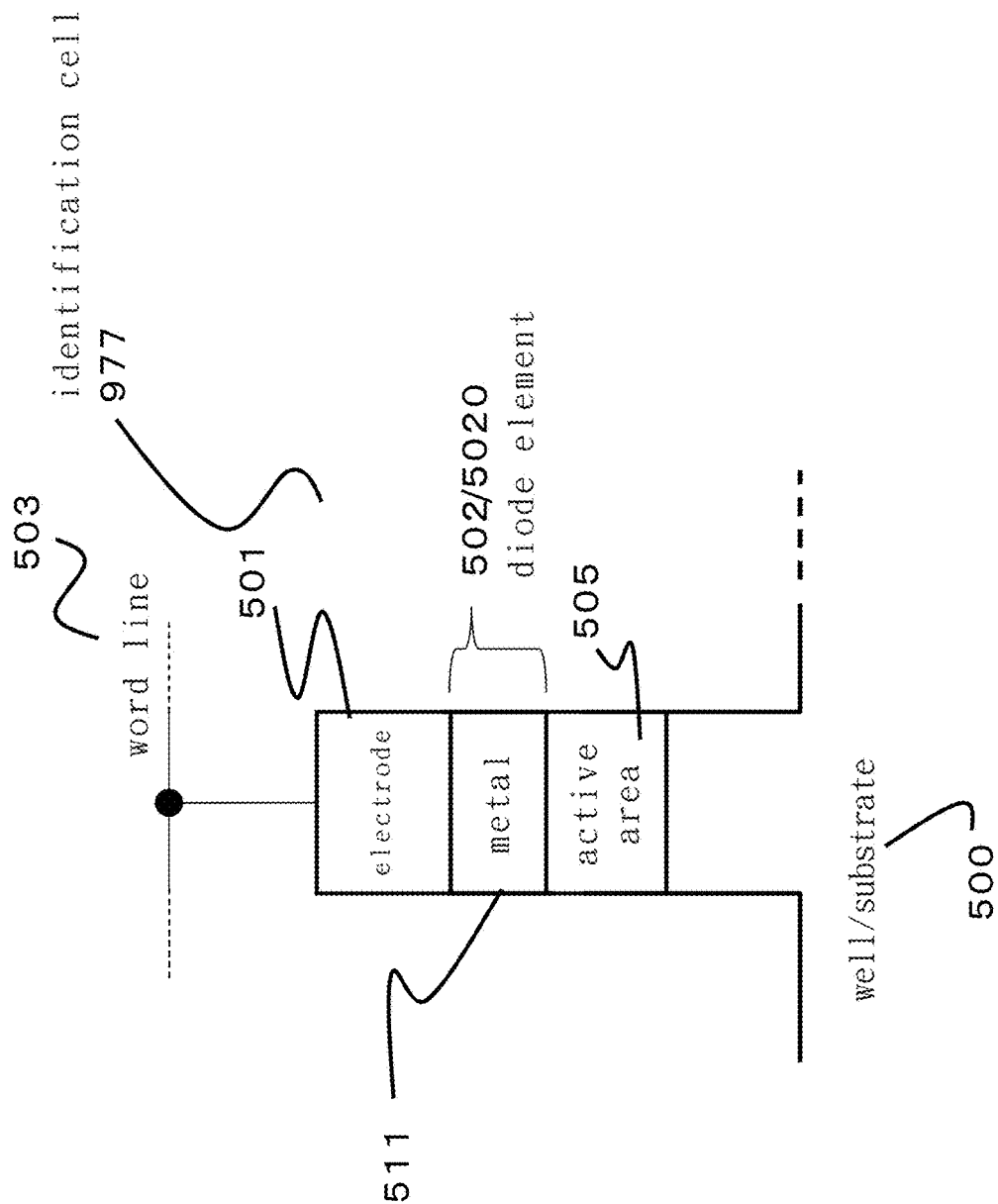
FIG. 111 illustrates an example of the cross-sectional view of a cell realizing the chip identification device.

Some of the diode elements 502 may adopt the insulating film 520, as illustrated in FIG. 32, or, for example, the high density PN junction, as illustrated in FIGS. 33 and 34. Moreover, in FIG. 111, a Schottkey junction may be adopted as the diode element 502. As an example, if the insulating film 520 of FIG. 32 is replaced by the metal layer 511, then the Schottkey junction may be formed at the interface between the active area and the metal layer 511.

In the case that two conductors respectively connected to the word line 503 and the bit line 902 may sandwich the identification cell 977 (FIG. 74, FIG. 75, and FIG. 78), if the diode element 502 is an insulating film, the insulating film may be probabilistically broken by applying high electrical stress to the diode element 502. Whether or not the insulating film is broken may be judged by applying the read voltage to the diode element 502. In the cells with the insulation breakdown, the electric current may flow through the diode element 502 even at a low read voltage, for example, which may correspond to state "1" in terms of the semiconductor memories. In the cells without the insulation breakdown, the electric current may not flow through the diode element 502 even by applying the read voltage, for example, which may correspond to state "0" in terms of the semiconductor memories.

In the case that two conductors respectively connected to the word line 503 and the bit line 902 may sandwich the identification cell 977 (FIG. 74, FIG. 75, and FIG. 78), if the diode element 502 is a PN junction or a Schottkey junction, then the junction may be probabilistically broken by applying high electrical stress to the diode element 502. Whether or not the junction is broken may be judged by applying a read voltage which is a reverse bias to the diode element 502. In the cells with the junction breakdown, the electric current may flow through the diode element 502 even at a read voltage which is a reverse bias, for example, which may correspond to state "1" in terms of the semiconductor memories. In the cells without the junction breakdown, the electric current may not flow through the diode element 502 by applying a read voltage which is a reverse bias, for example, which may correspond to state "0" in terms of the semiconductor memories.

If the diode element 502 is a PN junction or a Schottkey junction, as mentioned above, the read voltage may be a reverse bias to the junction. On the other hand, if the diode element 502 is an insulating film, both polarities of the read voltage may be acceptable. Taking care of this point, the method to judge the breakdown of the diode element may be described with the following figures. Then, the method may be explained by using the absolute value of the read voltage applied between the two electrodes sandwiching the diode element 502. In other words, the absolute value may mean the absolute value of the reverse bias in the case of the PN junction and the Schottkey junction. Moreover, the electric current flowing through the diode element 502 when the read voltage is applied may be also the absolute value.

Figure 81:
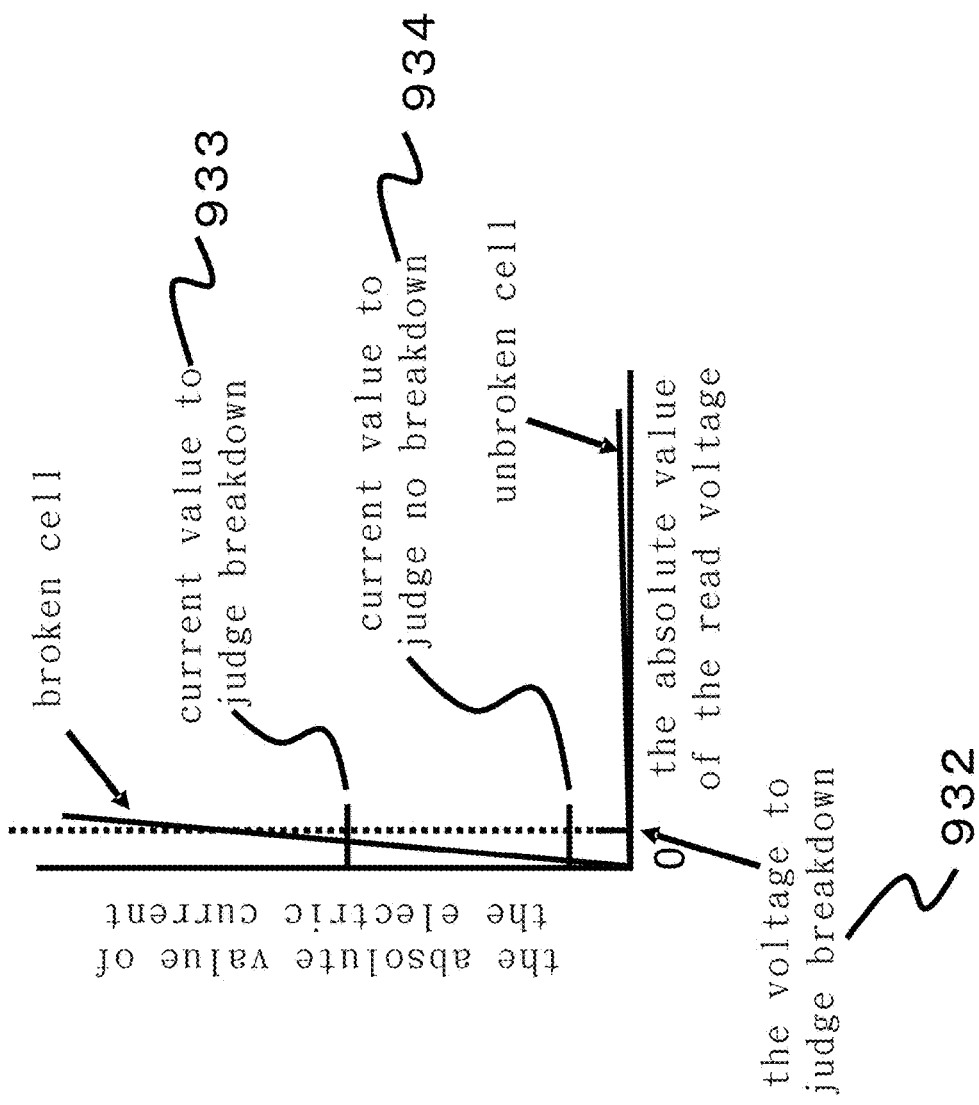
FIG. 81 illustrates an example of the method to judge breakdown/non-breakdown of the cells realizing the chip identification device.

FIG. 81 illustrates the current—voltage characteristics (IV-characteristics) to be used for judging with or without diode breakdown. The horizontal axis is the absolute value of the read voltage to be applied to the diode element 502 to read. The vertical axis is the absolute value of the electric current flowing through the diode element 502 in reply to the read voltage. In the cells with the breakdown, a very high electric current may flow even at a low voltage. On the other hand, in the cells without breakdown, the electric current may hardly flow even at a high voltage. To detect this difference, the current value to judge the breakdown 933 and the current value to judge the no breakdown 934 while the voltage to judge the breakdown 932 is applied may be proposed. In other words, while the read voltage, the absolute value of which is equivalent to the voltage to judge the breakdown 932, is applied to the diode element 502, if the absolute value of the electric current flowing through the diode element 502 is higher than the current value to judge the breakdown 933, the breakdown may be regarded as being detected. If the absolute value of the electric current flowing through the diode element 502 is lower than the current value to judge the no breakdown 934, then no breakdown may be regarded as being detected.

Figure 82:
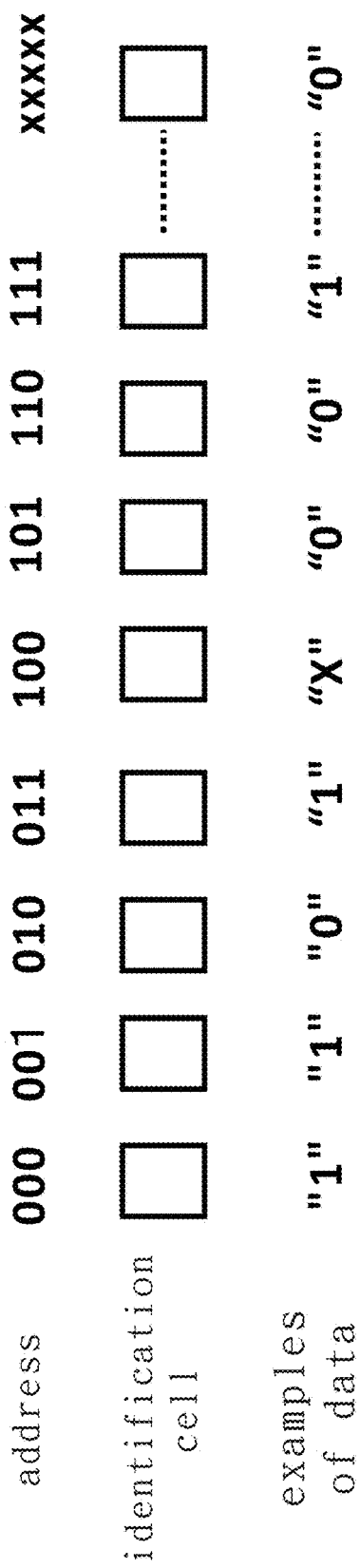
FIG. 82 illustrates an example of the correspondence between address and data of the identification cell.

There is a certain gap between the current value to judge the breakdown 933 and the current value to judge the no breakdown 934 in the judge method of FIG. 81. Accordingly, the cells in which the absolute value of the read electric current is inside this gap may be judged as being neither broken nor unbroken. Those cells may be regarded as being neither "0" nor "1" in terms of the semiconductor memories, and then may be labeled as "X". In FIG. 82, there are addresses on the cell array and the data associated with those addresses, as an example. From the left, there are "1", "1", "0", "1", "X", "0", "0", "1". . . "0". In this way, the data of the fifth identification cell from the left is "X".

In the case that two conductors respectively connected to the word line 503 and the bit line 902 may sandwich the identification cells 977 composed of the conductive junction element 970 (FIG. 76, FIG. 77, and FIG. 79), the conductive junction element 970 may be probabilistically broken by applying electrical stress to the conductive junction element 970. Whether or not the insulating film is broken may be judged by applying the read voltage to the conductive junction element 970. In the cells with the conductive junction breakdown, the electric current may not flow through the conductive junction element 970 by even by applying the read voltage, for example, which may correspond to state "0" in terms of the semiconductor memories. In the cells without the conductive junction breakdown, the electric current may flow through the conductive junction element 970 even at a low read voltage, for example, which may correspond to state "1" in terms of the semiconductor memories. Such a conductor breakdown may be caused by the electromigration. In other words, the electromigration may probabilistically occur, and then the cells with the electromigration may correspond to state "0" in terms of the semiconductor memories. Those cells without the electromigration may correspond to state "1" in terms of the semiconductor memories.

Figure 83:
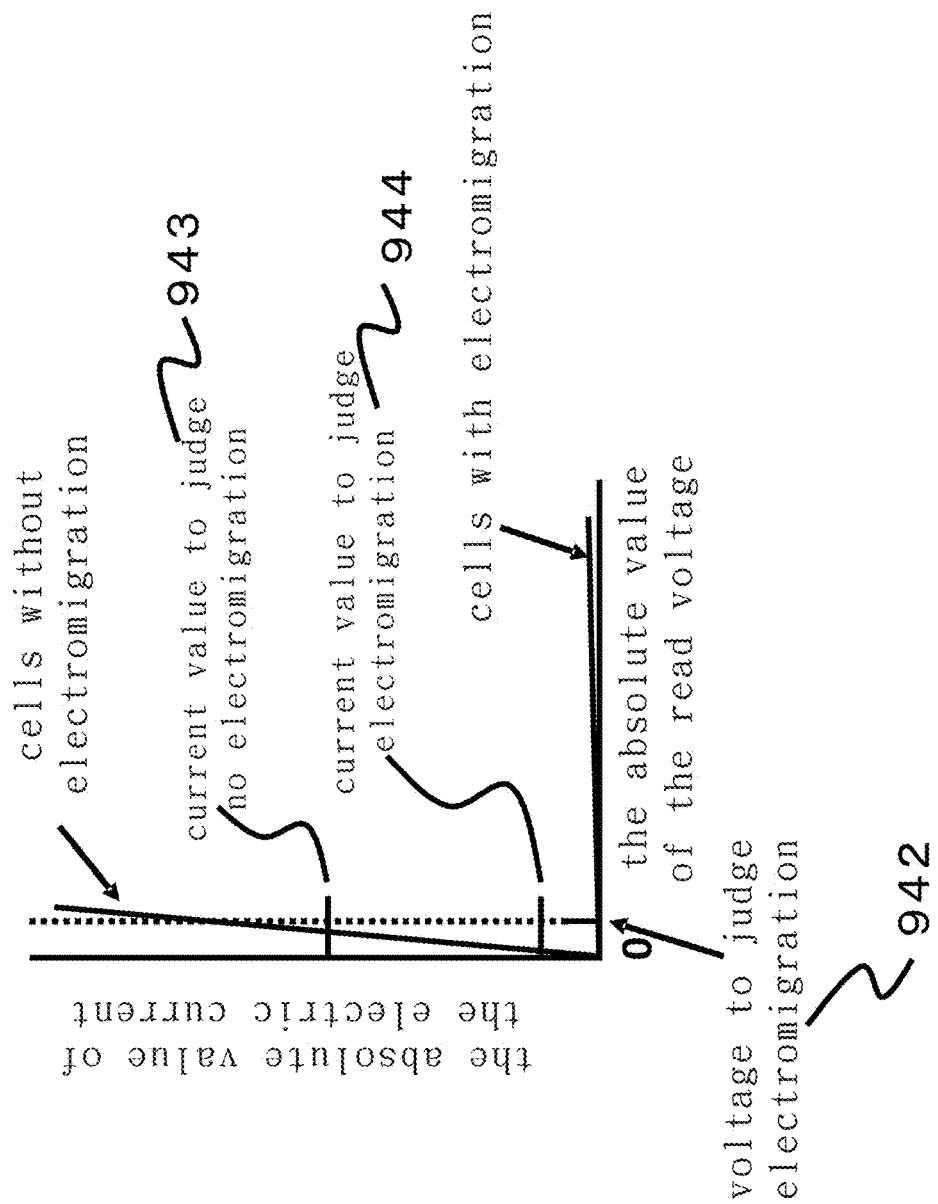
FIG. 83 illustrates an example of the method to judge occurrence/non-occurrence of electromigration in the cells realizing the chip identification device.

FIG. 83 illustrates the current—voltage characteristics (IV-characteristics) to be used for judging with or without electromigration. The horizontal axis is the absolute value of the read voltage to be applied to the conductive junction element 970 to read. The vertical axis is the absolute value of the electric current flowing through the conductive junction element 970 in reply to the read voltage. In the cells without the electromigration, a very high electric current may flow even at a low read voltage. On the other hand, in the cells with the electromigration, an electric current may hardly flow even at a high read voltage. To detect this difference, the current value to judge the no electromigration 943 and the current value to judge the electromigration 944 while the voltage to judge the electromigration 942 is applied may be proposed. In other words, while the read voltage, the absolute value of which is equivalent to the voltage to judge the electromigration 942, is applied to the conductive junction element 970, if the absolute value of the electric current flowing through the conductive junction element 970 is higher than the current value to judge the no electromigration 943, no electromigration may be regarded as being detected. If the absolute value of the electric current flowing through the conductive junction element 970 is lower than the current value to judge the electromigration 944, then electromigration may be regarded as being detected.

There is a certain gap between the current value to judge the no electromigration 943 and the current value to judge the electromigration 944 in the judge method of FIG. 83. Accordingly, the cells in which the absolute value of the read electric current is inside this gap may be judged to exhibit neither electromigration nor no-electromigration. Those cells may be regarded as being neither "0" nor "1" in terms of the semiconductor memories, then may be labeled as "X". In FIG. 82, there are addresses on the cell array and the data associated with those addresses, as an example. From the left, there are "1", "1", "0", "1", "X", "0", "0", "1". . . "0". In this way, the data of the fifth identification cell from the left is "X".

In this way, the combination of address and data in the cell array comprising a plurality of identification cells 977 which may correspond to FIGS. 74-79 may be obtained, as illustrated in FIG. 82.

To actually read the data of the cells which may correspond to FIGS. 74-79, firstly, the address of the cells to be read may be selected. To select the address, as shown in FIG. 80, the column number may be selected by the row decoder 972, and the row number may be selected by the column decoder 973. The pair of the column number and the row number may represent the address. In the example of FIG. 82, this address is represented by binary. The read voltage may be applied between the word line 503 and the bit line 902 which correspond to the selected address in the method described in FIG. 81 and FIG. 83. Then, the data of the corresponding address ("1" or "0") may be read. After being read, the address of the cell to be selected may be changed. This process may be repeated until all of the cells in the cell array in FIG. 80 is read.

Next, it may be supposed that the pair of the sequence of "0" and "1" and the corresponding addresses, like shown in FIG. 82, may form the white-black pattern on the checker board, as shown in FIG. 22. Here assume that "0" may be converted to white and "1" to black. However, as illustrated in FIG. 82, if there is "X" which is neither "0" nor "1", then the white-black pattern on the checker board like FIG. 22 may not be generated. Then, the cells corresponding to "X" may be removed from the plot on the checker board before plotting.

For example, the addresses of the cells corresponding to "X" (e.g., 100 in binary) may be stored in a buffer, as illustrated in FIG. 84. Then, each data of each address may be compared with the buffer memory. Next, the data may not be read if the corresponding address is found in the buffer. In this way, the data corresponding to "X" may not be shown on the checker board pattern like FIG. 22. Then, only the pairs of data and addresses comprising "0" and "1" are generated. Finally, the white-black checker board pattern may be obtained, as shown in FIG. 22.

On the other hand, in order to apply high electrical stress on the identification cell 977 corresponding to FIGS. 74-79, at least one cell to be stressed may be selected by the row decoder 972 and the column decoder 973, as shown in FIG. 80. Subsequently, a high voltage pulse may be applied between the corresponding word line 503 and the corresponding bit line 902. Alternately, as shown in FIGS. 74-79, FIG. 93, and FIG. 94, a high voltage pulse may be applied between the upper electrode 994 and the bottom electrode 993, between the left electrode 955 and the right electrode 954, or between the gate electrode 995 and the upper electrode 994 or the right electrode 954, while the cell to be stressed may be selected by the word line 503 and the bit line 902.

In general, there may be two modes in the above mentioned breakdown phenomena of the insulating film or junction—soft breakdown and hard breakdown. The soft breakdown may often occur at a previous step of the hard breakdown. The electric current at read voltage may be lower than in the hard breakdown and higher than in the non-breakdown. Moreover, a state of the soft breakdown mode may be unstable, for example, may be returned to that of the non-breakdown or transited to that of the hard breakdown during the repetition of voltage stress. Once falling in the mode of the hard breakdown, however, the state may be stable and then neither returned to that of the non-breakdown nor transited to the soft breakdown. In the present invention, only the hard breakdown mode, which is a more stable mode of the breakdown, may be regarded as "1", and the soft breakdown mode may be regarded as "X". The gap between the current value to judge the breakdown and the current value to judge the no breakdown may be necessary to attach the label "X" to the soft breakdown mode. By removing the data of "X" with the above mentioned method, the white and black checker board pattern in FIG. 22 may be stable even after the repetition of voltage stressing. In this way, the reproducibility of the pattern may be obtained.

In general, for the transition from soft breakdown to hard breakdown and the transition from hard breakdown to soft breakdown, it may be impossible for the electrical stress to artificially control which transition occurs more frequently than the other one. Therefore, the ratio of soft breakdown labeled "X" may be less than a predetermined value or may be higher. However, if the number of soft breakdown cells is larger than a certain limit, the data amount may be decreased, and, then, the randomness of the pattern may become insufficient. In this way, a method to repeat the voltage pulse to electrically stress cells may be necessary. As an example, after applying the first break pulse voltage, the method described with FIG. 81 and FIG. 83 may be performed to judge the status of breakdown. If the ratio of "X" is higher than a certain limit, the second break pulse voltage may be applied subsequently, and, then, the breakdown judgment may be performed with the method described with FIG. 81 and FIG. 83. If the ratio of "X" is still higher than a certain limit, the third voltage pulse may be applied, and, then, the breakdown judgment may be performed with the method described with FIG. 81 and FIG. 83. This process may be repeated until the ratio "X" is lower than a predetermined value. It may also be necessary to predetermine the number of the repetition of this process. Even if the process is repeated until the upper limit of the repetition, the corresponding chip identification device may be regarded as failing the product inspection. Alternately, if the corresponding chip identification device passes the product inspection, the addresses of the cells labeled "X" may be stored in the buffer memory, and, then, the data of those cells may be removed. However, if the number of the cells is large enough, physical randomness may be sufficient even while the ratio of soft breakdown is high to some amount. In this event, the present process with the inspection of the ratio of "X" may be omitted.

Figure 85:
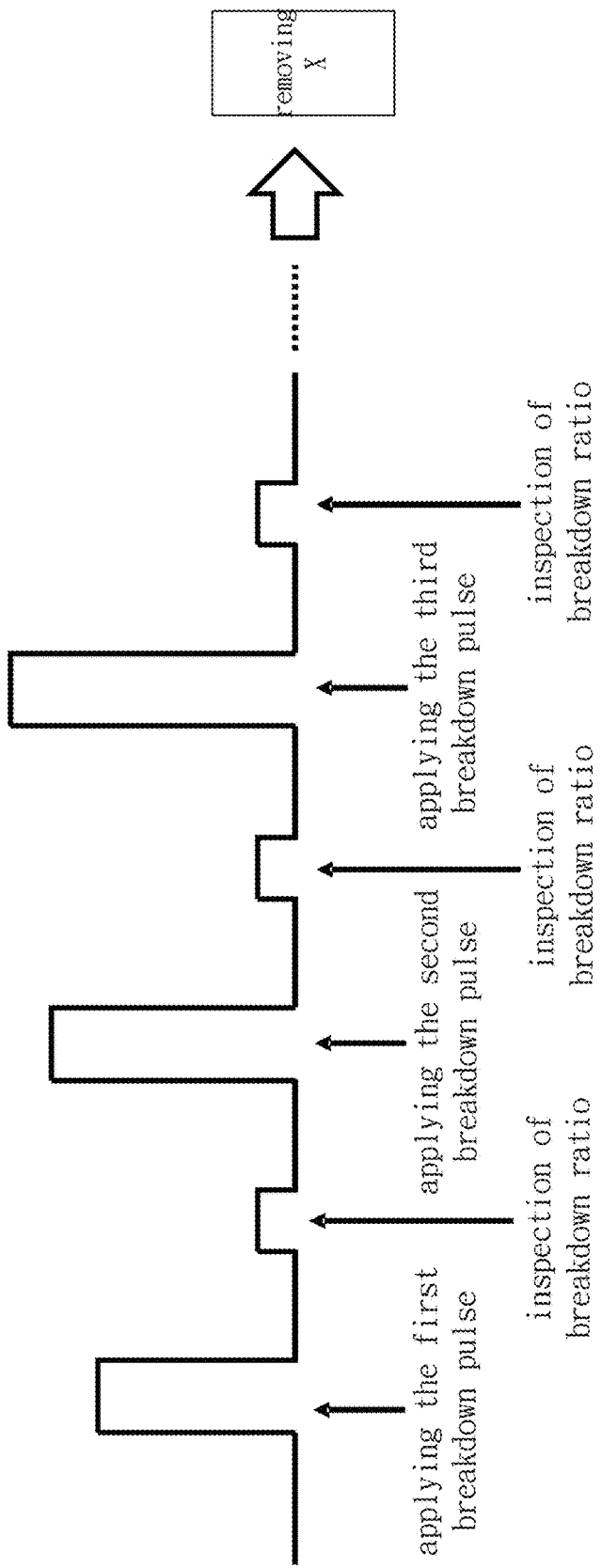
FIG. 85 illustrates an example of the method to apply the breakdown pulse to the cells realizing the chip identification device.

To maximize the physical randomness, it may be preferable to make the ratio of "0" and "1" about 50%. The cells labeled "X" of the soft breakdown mode may be probabilistically transited to "1" of the hard breakdown by repeating the pulse voltage stress. Then, it may be preferable that the pulse height is incremented by a certain value at every application of the pulse voltage while the pulse time is fixed, as illustrated in FIG. 85. In this way, even though the cells of "0" may be in majority at the first pulse, the number of the cells of "1" may be increased as the application of pulses are repeated.

Thus, by optimizing the number and time of applying pulses and the method of the implementation of the pulse height, the ratio of "0" and "1" may be made about 50% while reducing the ratio of data "X" to be removed as possible. Nevertheless, if the reduction of "X" fails, then the chip identification device on test may be disposed as inferior goods. Finally, it may be possible to forward only the quality product having sufficient physical randomness and stable data of "0" and "1".

Figure 95:
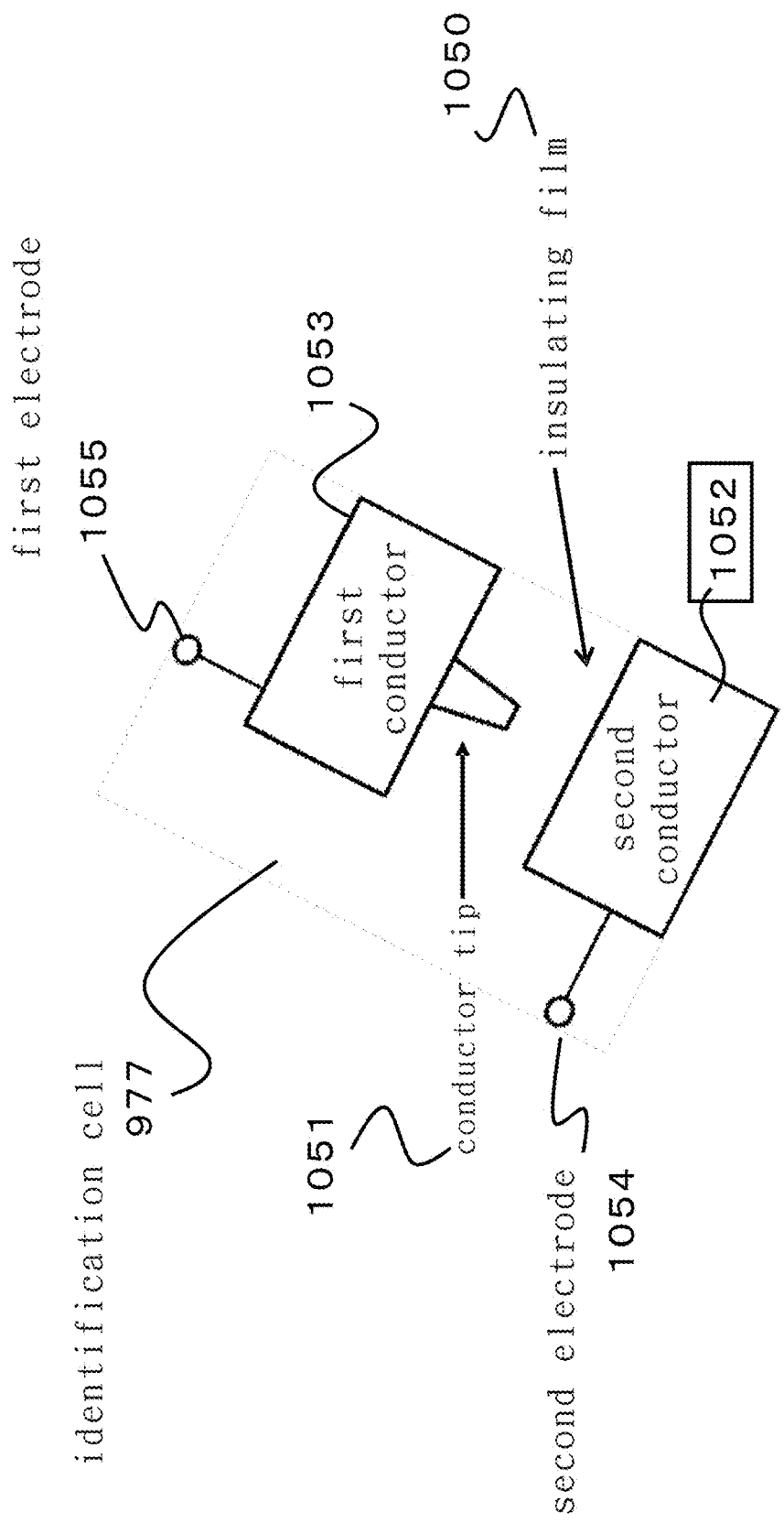
FIG. 95 illustrates the cross-sectional view to describe the feature of the identification cell realizing the chip identification device.

In another example, it may be possible to control the hard breakdown to occur more frequently than the soft breakdown by slightly adjusting the device structure. For example, consider the device structure comprising the first conductor 1053, the second conductor 1052, the insulating film 1050, and the conductor tip 1051, as illustrated in FIG. 95. The first electrode 1055 may be connected to the first conductor 1053. The second electrode 1054 may be connected to the second conductor 1052. The molecular structure of the periphery of the conductor tip 1051 may be made unstable by mechanical stressing and then may be likely to be broken. Moreover, the electric field may be concentrated around the periphery of the conductor tip 1051 while the breakdown pulse is applied thereon. Since the depth of the conductor tip 1051 may be fluctuated according to the manufacturing variance, the breakdown probability of the insulating film 1050 between the conductor tip 1051 and the second conductor 1052 may be different with regard to cells. This structure may be adopted for FIG. 74, FIG. 75, and FIG. 78. As mentioned above, the randomness of "0" and "1" may be made as large as possible by contriving the method to apply the breakdown pulse.

Figure 86:
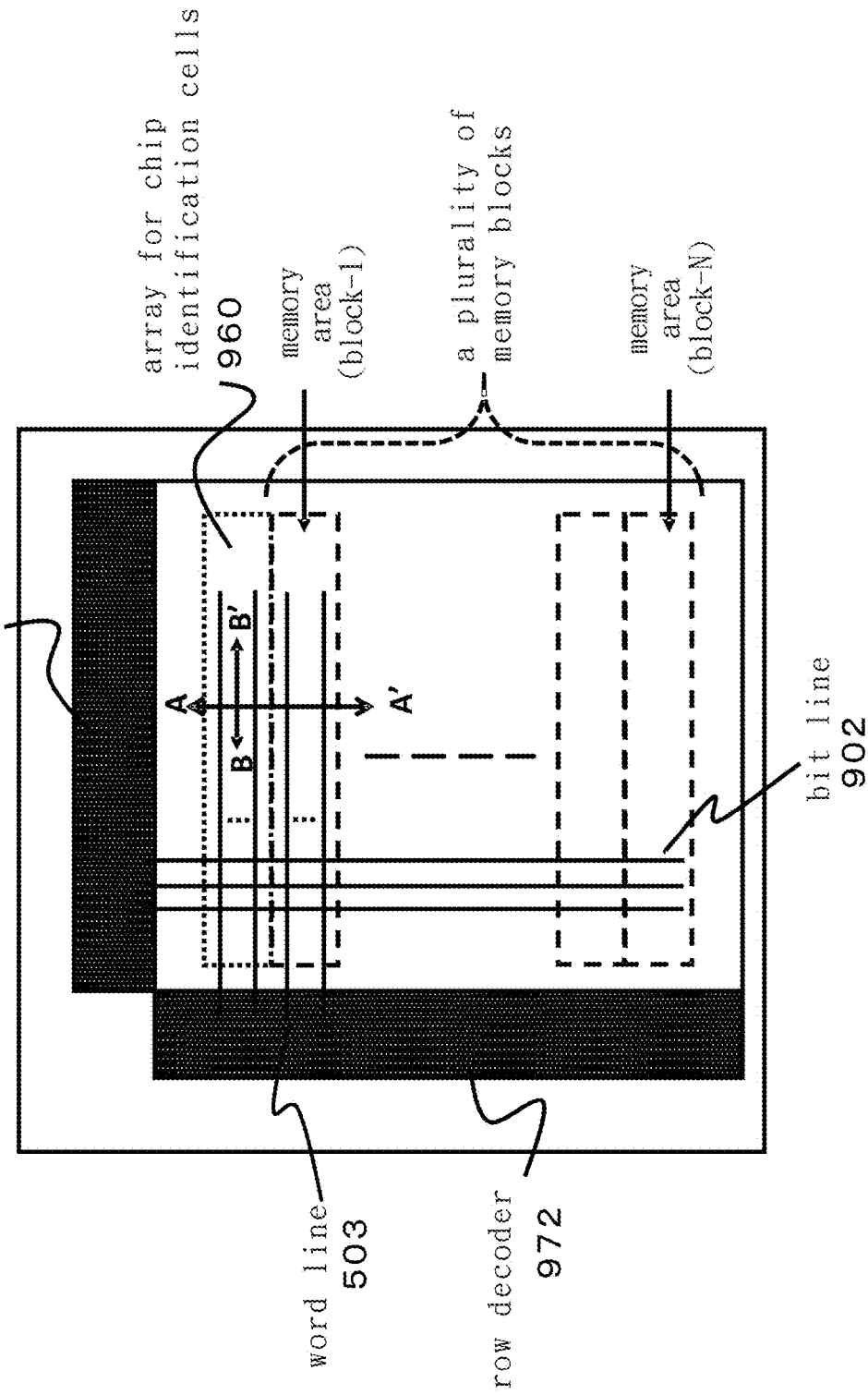
FIG. 86 illustrates an example of the method to embed the chip identification device to a part of the memory system.

FIG. 86 is an example illustrating a layout where a block area (e.g., an array for chip identification cells 960) adjoining a plurality of memory blocks for NAND Flash may be allocated to a chip identification device. Accordingly, the chip identification device is decisively different from any non-volatile memory device, even while the array for the chip identification cells 960 may share the bit line 902 with the non-volatile memory area.

Figure 87:
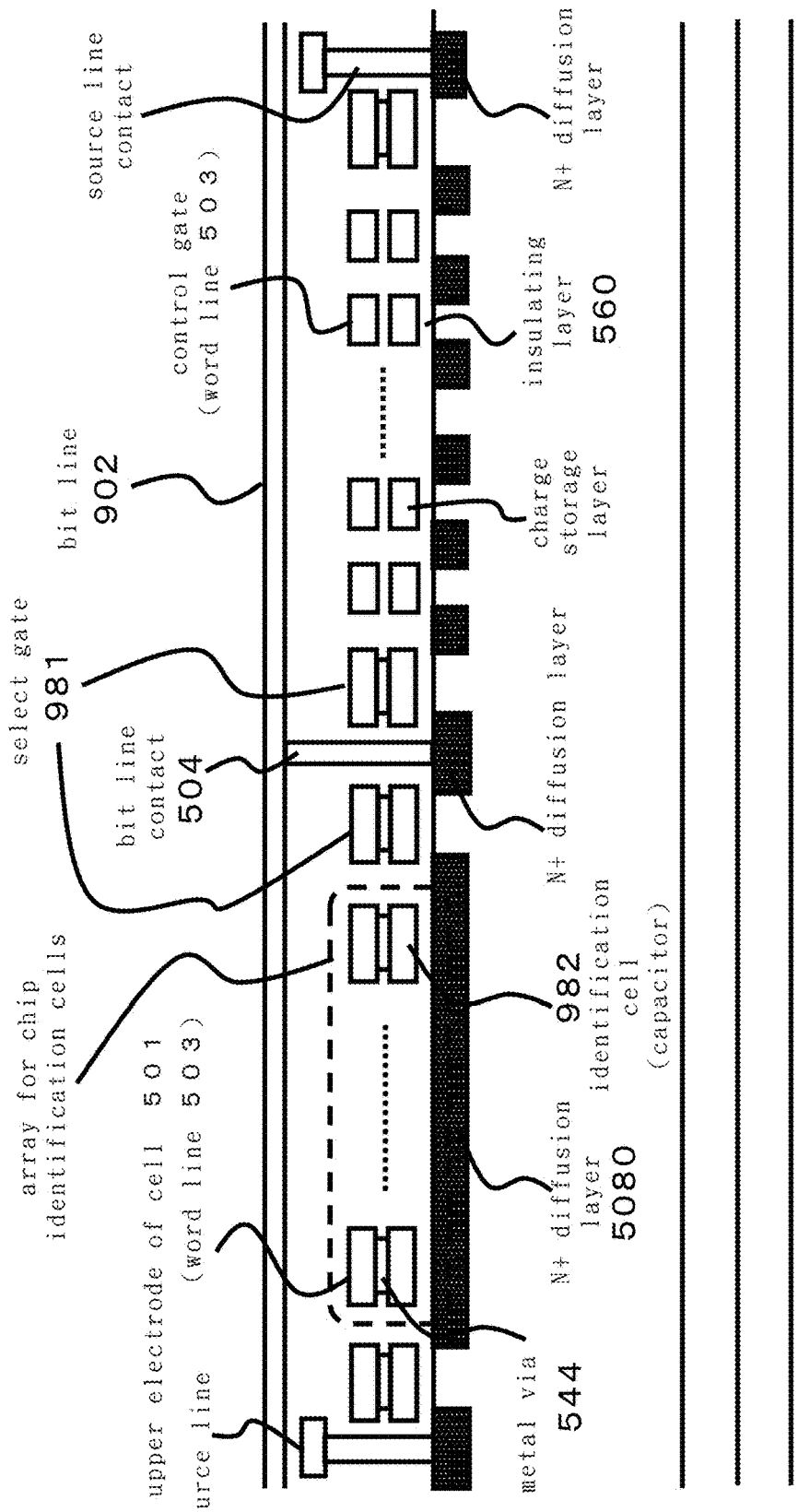
FIG. 87 illustrates an example of the cross-sectional view of the chip embedding the chip identification devices in a part of the memory system.

FIG. 87 is a cross-sectional view along A-A' line in FIG. 86. The cross-sectional view of the block for chip identification (the array for chip identification cells 960) may be similar to FIG. 52 except for the select gate 981 at both ends. Since the cell transistors of non-volatile memories are manufactured according to the design rule, the opening diameter of the metal via 544 may be required to be at least equivalent to or larger than the gate length of the cell transistor of the non-volatile memory. Accordingly, if the identification cell like FIG. 52 is adopted, then the identification cell may be almost as big as the select gate 981 and almost the same in structure as the select gate 981. In other words, the page number of the array for the chip identification cells 960 per area may be smaller than that of the memory array. Moreover, the configuration of only one word line and two select gate transistors may be approved. In this event, the width of the block for chip identification along the bit line direction may be smaller than that of the memory block. Alternately, it may be possible that a plurality of blocks for chip identification is equipped in a chip.

Figure 88:
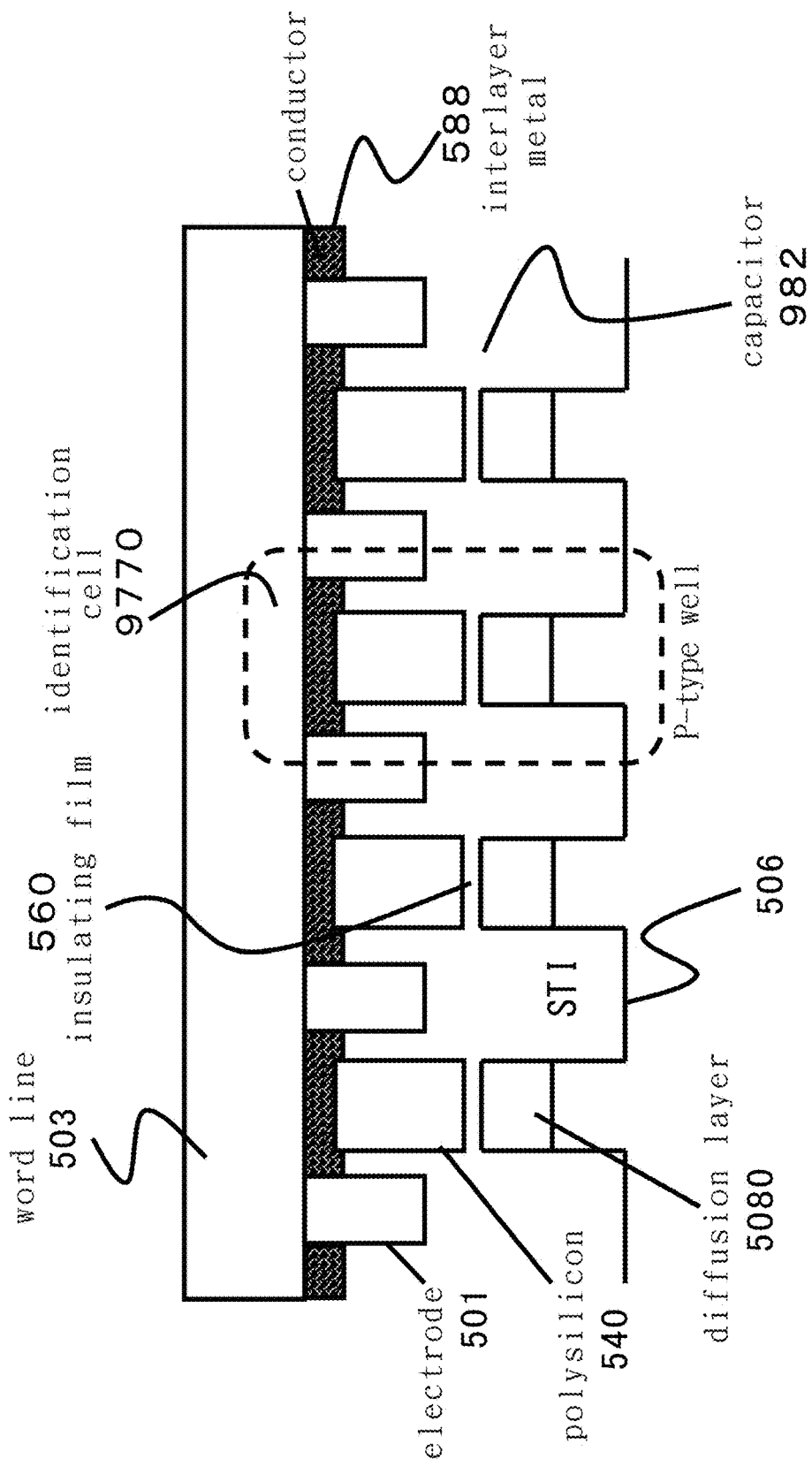
FIG. 88 illustrates an example of the cross-sectional view of a cell array embedding the chip identification devices into a part of the memory system.

FIG. 88 is a cross-sectional view along B-B' line in FIG. 86. This cross-sectional view may correspond to FIG. 54, but the structure of the metal via 544 may differ. For example, before forming the word line 503, an interlayer insulating film formed simultaneously with the fabrication process of the memory block may be removed, and, then, a conductive film may be buried therein. After that, a conventional process to form the word line may be performed. As a result, the interlayer metal 588 may be formed for the metal via 544 of FIG. 54. Thus, an identification cell 9770, which is the same in size as the memory cell transistor, may be formed. Of course, this identification cell 9770 may be an example of the identification cell 977 adopted in FIG. 23. In FIG. 88, the capacitor 982 (used in FIG. 89) may comprise the polysilicon 540, the diffusion layer 5080 which type is opposite to the substrate, and the insulating film 560. In this embodiment, this capacitor 982 may be the identification cell 9770. The insulating film 560 may be equivalent to the tunnel oxide film of the non-volatile memory cell and may be an insulating film composed mainly of a silicon oxide film. Of course, this capacitor 982 may be also an example of the identification cell 977 of FIG. 23.

Figure 89:
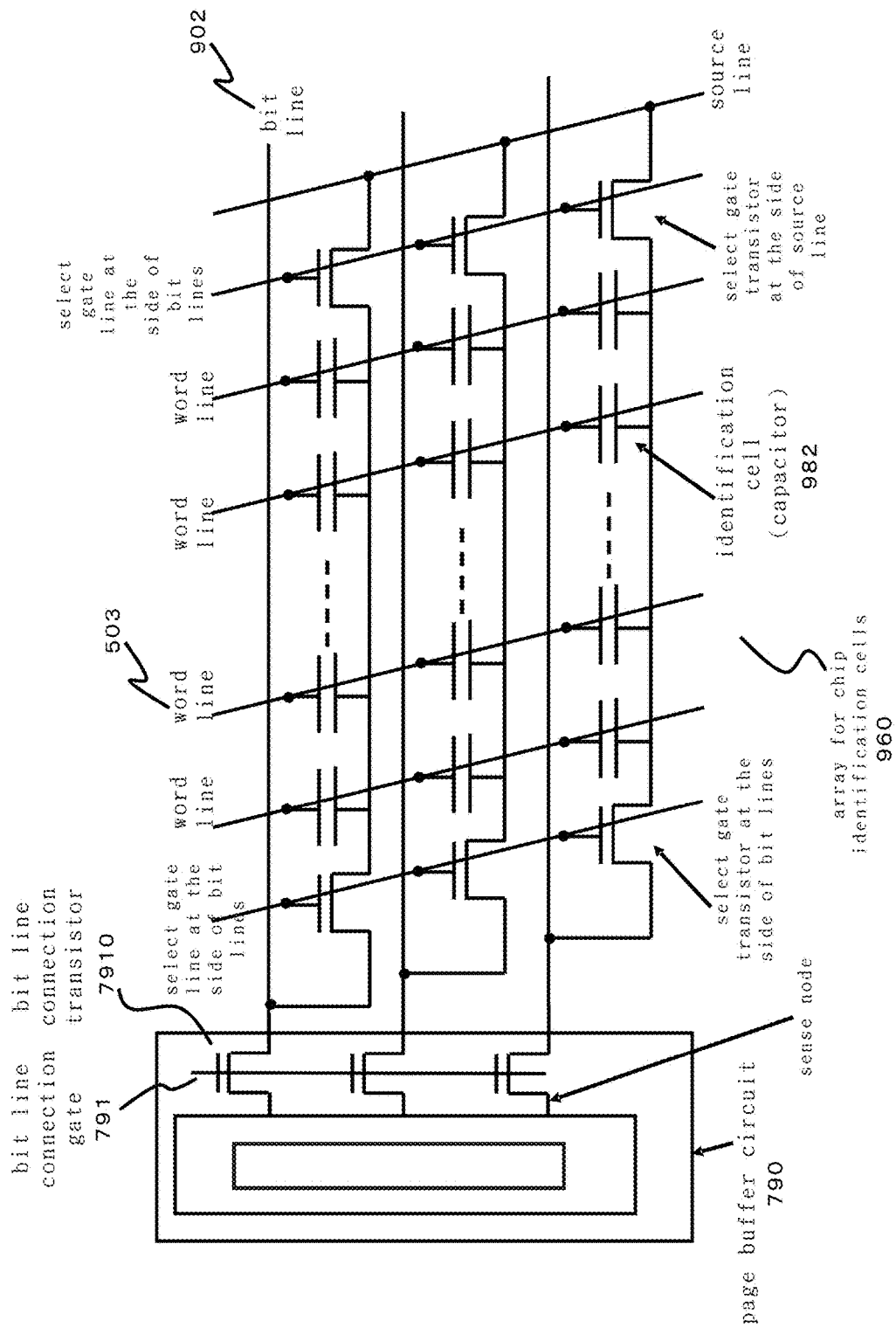
FIG. 89 illustrates an example of the equivalent circuit to realize the chip identification device.

FIG. 89 is an equivalent circuit of the array for the chip identification cells 960 of the present embodiment. The page buffer circuit 790 may serve also for the page buffer circuit of the NAND cell array. The page buffer circuit 790 may hold the bit line connection gate 791 for switching the connection ON/OFF to the bit line 902. Moreover, each identification cell may be identified with the capacitor 982. The page buffer circuit 790 may equip the circuits of the sense-amplifier and the latch-up inside.

In this embodiment, the embedded memory cell is the NAND cell. However, volatile memories, such as DRAM, or non-volatile memories like NOR Flash, MRAM and so on, may be embedded to the present embodiment. That is, the embedded memory with the array for the chip identification cell of the present invention may only share at least either of the bit lines or the word lines with regardless of the species of the embedded memories.

The following method is adopted to apply the breakdown pulse on the silicon insulating film of the identification cell (capacitor 982). First, the select gate at the side of the bit line is biased positively, and, then, the select gate transistor there may be switched on. Simultaneously, if there are some word lines between the word line, to which the cell to be broken is connected, and the select gate transistor at the bit line side, those word lines may be also biased positively, and, then, the corresponding transistors may be switched on. Here, the bit line to which the cell to be broken is connected may be biased to zero. Next, the word line to which the cell to be broken is connected may be selected, and, then, the breakdown pulse may be applied to this word line. One of the methods to apply the breakdown pulse may be the same as described in FIG. 85, for example. Moreover, if the plurality of the chip identification codes is used in the authentication communication, then each identification code may need each chip identification block. In this event, the method of FIG. 85 may be tested with a chip identification device to define the number of the pulses, which may be stored in the inner memory of the chip. Thus, the same number of the pulses, stored in the inner memory, may be applied to another chip identification area. In this event, the inspection of the breakdown ratio between adjoining pulses may be omitted.

Figure 90:
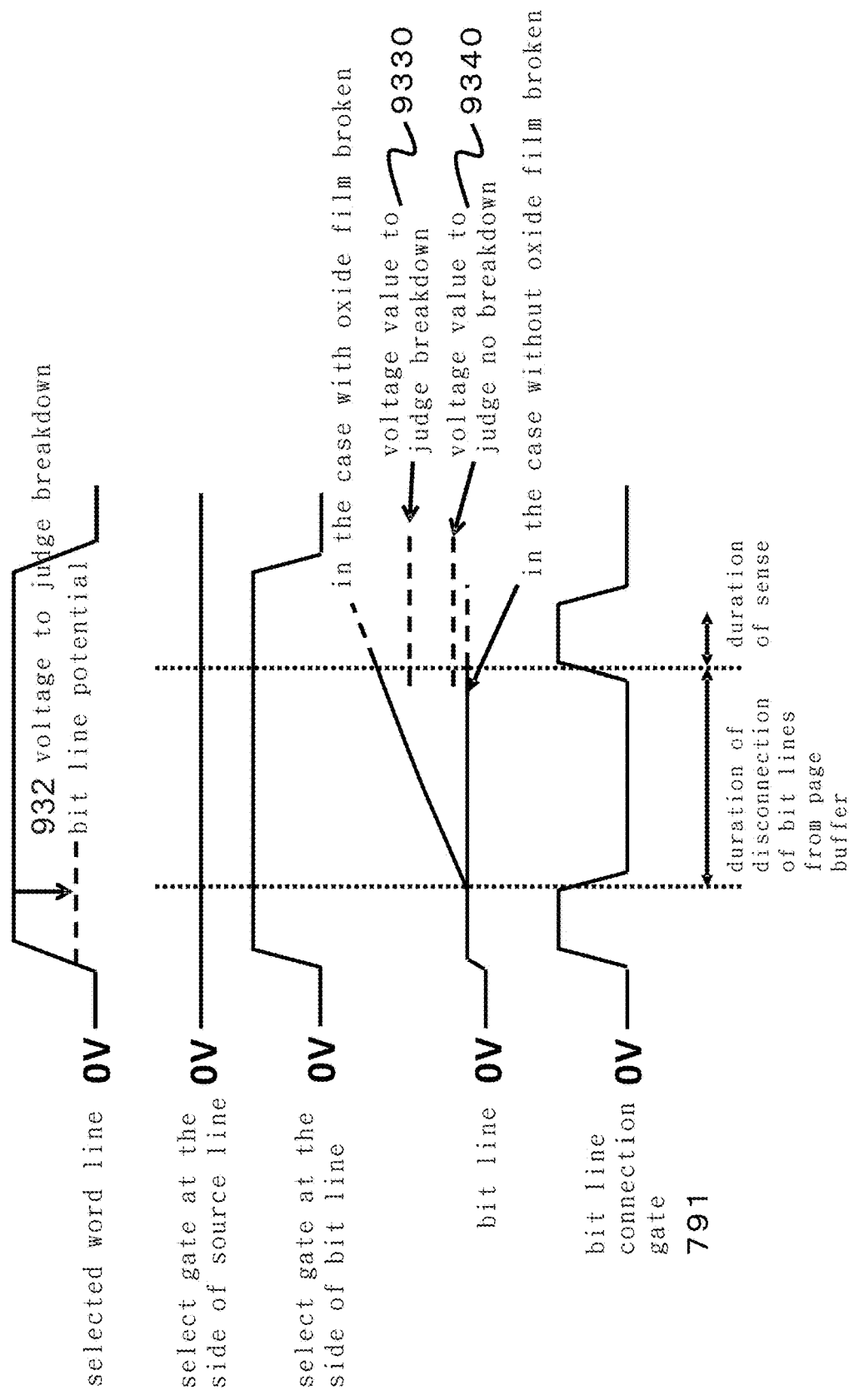
FIG. 90 illustrates an example of the voltage input to operate the system realizing the chip identification device.

FIG. 90 illustrates the shape of the voltage pulse for the breakdown inspection related to the present embodiment. First, a word line to which the cell to be read is connected may be selected, and a predetermined voltage higher than 0 may be applied to this word line. If there are other word lines between the selected word line and the select gate transistor at the side of the bit line, then those word lines may be biased positively to switch on the corresponding transistors (comprising unselected capacitors 982). The bit line may be given a zero voltage or a predetermined positive voltage lower than that applied to the selected word line. The potential difference between this selected word line and the bit line may be, for example, about the voltage to judge the breakdown 932 of FIG. 81. At the same moment, a positive voltage may be given to the select gate at the side of the bit line, and, then, the select gate transistor may be switched on. Next, the bit line connection gate 791 may be 0V. Thus, the bit line connection transistor 7910 may be switched off, and, then, the bit line may be disconnected from the sensing circuit inside the page buffer. If the insulating film of the selected identification cell (capacitor 982) is broken, then the potential of the bit line may be pulled up. On the contrary, if the insulating film is not broken, then the potential of the bit line may hardly be changed. Next, the bit line connection gate 791 may be biased positively to switch on the bit line connection transistor 7910. Subsequently, the change in potential of the bit line may be inspected within the page buffer circuit. The potential difference of the bit line, which is attributable with or without the breakdown of the insulating film, may be amplified in the page buffer to be stored in the latch circuit as high/low data. That is, if the bit line potential is higher than a predetermined value (e.g., the voltage value to judge the breakdown 9330), then the insulating film of the selected identification cell (capacitor 982) may be regarded as being broken. If the bit line potential is lower than another predetermined value (e.g., the voltage value to judge the no breakdown 9340), then the insulating film of the selected identification cell (capacitor 982) may be regarded as being unbroken. The data stored in the latch circuit may be output from the chip via the external I/O in reply to the requirement. It is noted that the voltage value to judge the breakdown 9330 and the voltage value to judge the no breakdown 9340 may be the voltage values corresponding to the current value to judge the breakdown 933 and the current value to judge the no breakdown 934, respectively.

Figure 96:
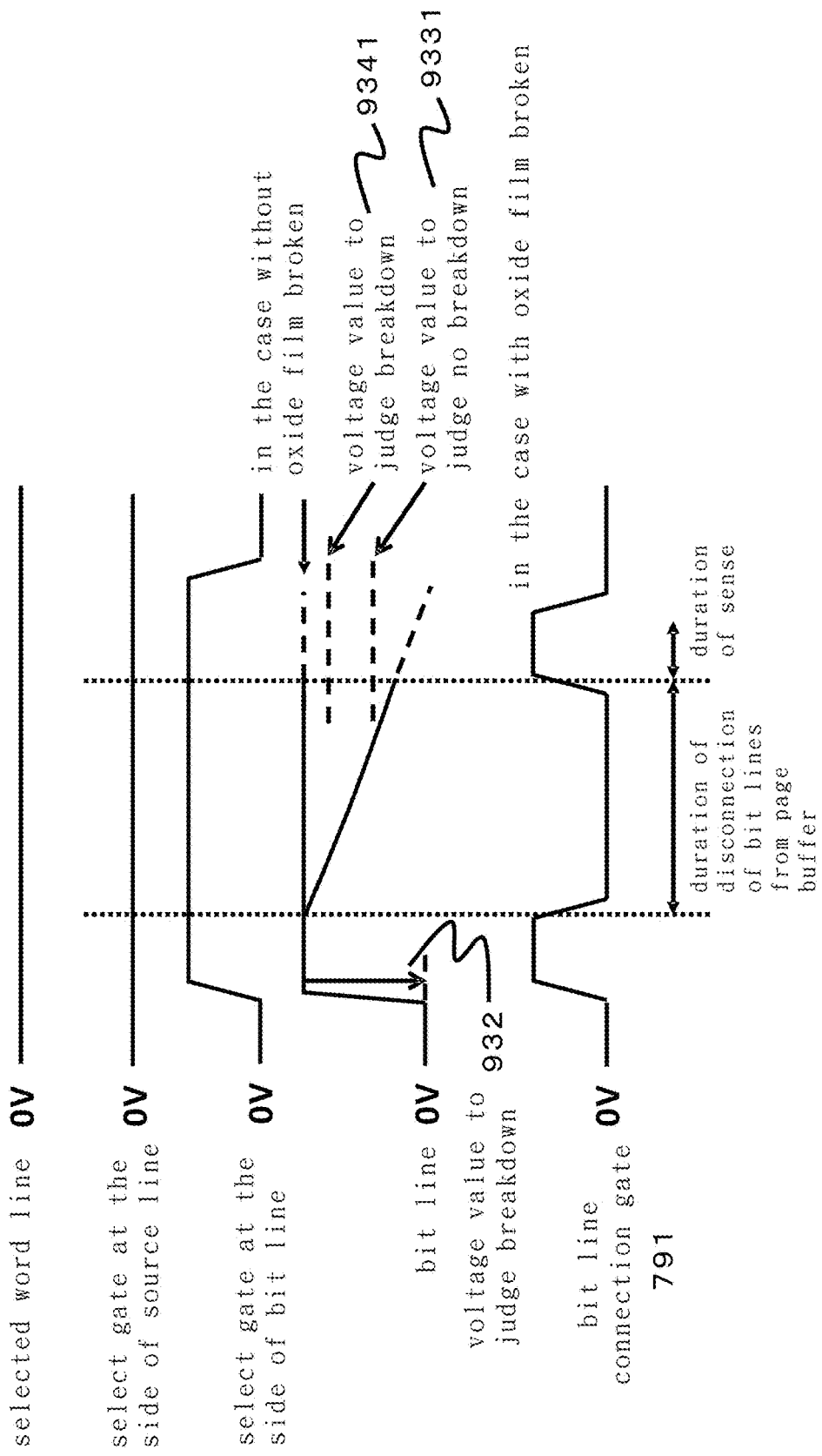
FIG. 96 illustrates an example of the voltage input to operate the system realizing the chip identification device.

FIG. 96 illustrates the shape of the voltage pulse for the breakdown inspection related to another embodiment. A word line to which the capacitor to be read is connected may be firstly selected to be given 0V. If there are other word lines between the selected word line and the select gate at the side of the bit line, then those word lines may be given a positive potential to switch on the corresponding transistors (comprising unselected capacitors 982). Thus, the bit line may be given a predetermined positive potential. The potential difference between the selected word line and the bit line may be about the voltage value to judge the breakdown 932, for example. At the same moment, a positive potential may be given to the select gate at the side of the bit line to switch on the select gate transistor. Next, the potential of the bit line connection gate 791 may be 0V. Thus, the bit line connection transistor 7910 may be switched off, and, then, the bit line may be disconnected from the inspection circuit inside the page buffer. If the insulating film of the selected identification cell (capacitor 982) is broken, then the potential of the bit line may be pulled down. On the contrary, if the insulating film of the selected identification cell is unbroken, then the bit line potential may be hardly changed. Next, the bit line connection gate 791 may be biased positively again to switch on the bit line connection transistor 7910. Subsequently, the bit line potential may be sensed by the page buffer circuit. The potential difference of the bit line, which is attributable with or without the breakdown of the insulating film, may be amplified in the page buffer and then to be stored in the latch up circuit as high/low data. That is, if the bit line potential is lower than a predetermined value (e.g., the voltage value to judge the breakdown 9331), then the insulating film of the selected identification cell (capacitor 982) may be regarded as being broken. If the bit line potential is higher than another predetermined value (e.g., the voltage value to judge the no breakdown 9341), then the insulating film of the selected identification cell (capacitor 982) may be regarded as being unbroken. The data stored in the latch up circuit may be output from the chip via the external I/O in reply to the requirement. It is noted that the voltage value to judge the breakdown 9331 and the voltage value to judge the no breakdown 9341 may be the voltage values corresponding to the current value to judge the breakdown 933 and the current value to judge the no breakdown 934 of FIG. 81, respectively.

The eighteenth embodiment is herein discussed.

Figure 91:
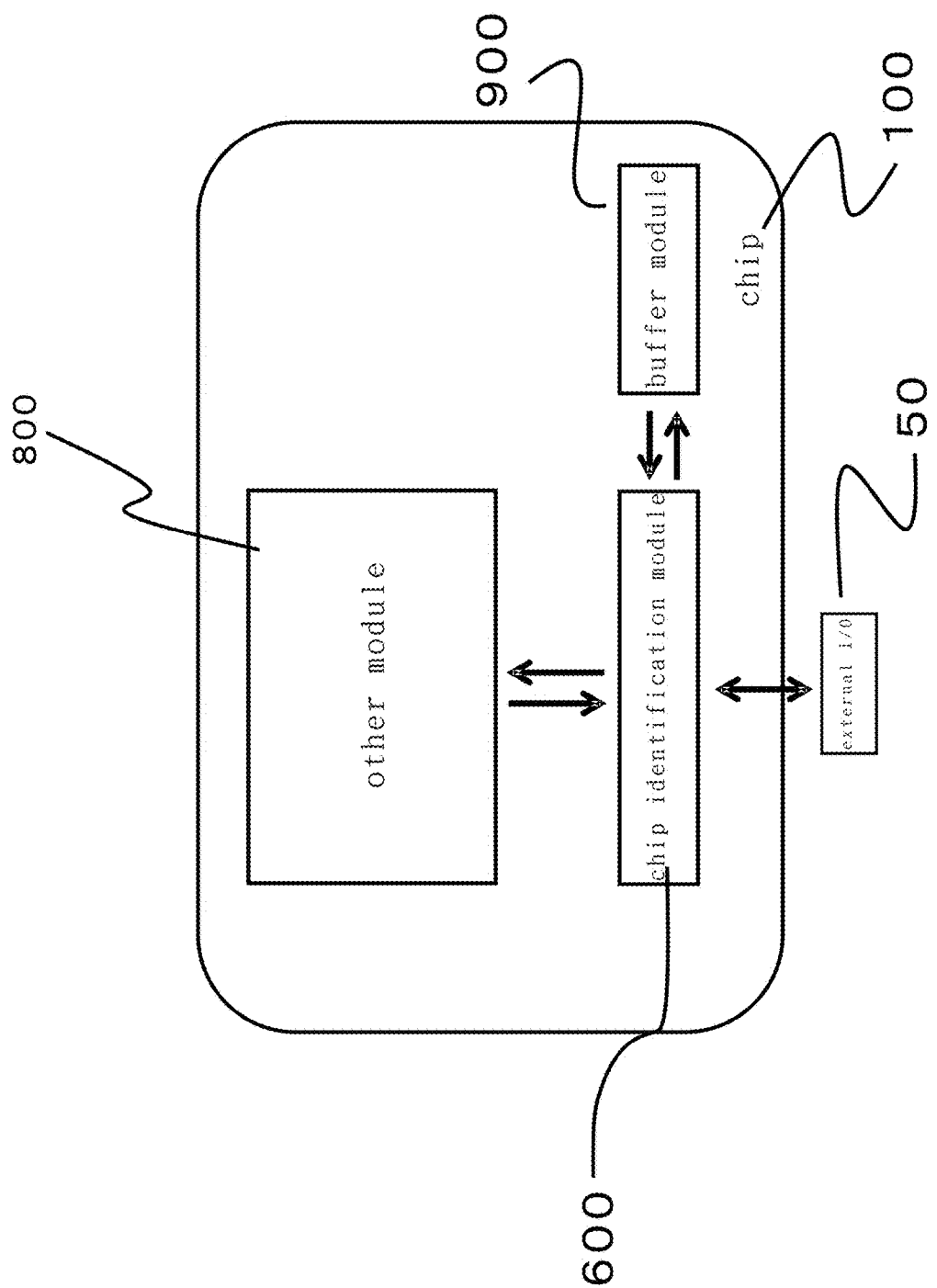
FIG. 91 illustrates an example of the method to embed the identification device into a chip as a chip identification module with other modules.

The chip identification device of the present invention may be, for example, embedded as the chip identification module 600 with the other module 800 into the chip 100, as shown in FIG. 91. It is noted that the buffer module 900 may involve the page buffer circuit 790 of FIG. 89. The data stored in the latch up circuit in the page buffer may be output from the chip via the external I/O 50 in reply to the request from the external.

The nineteenth embodiment is herein discussed.

Figure 92:
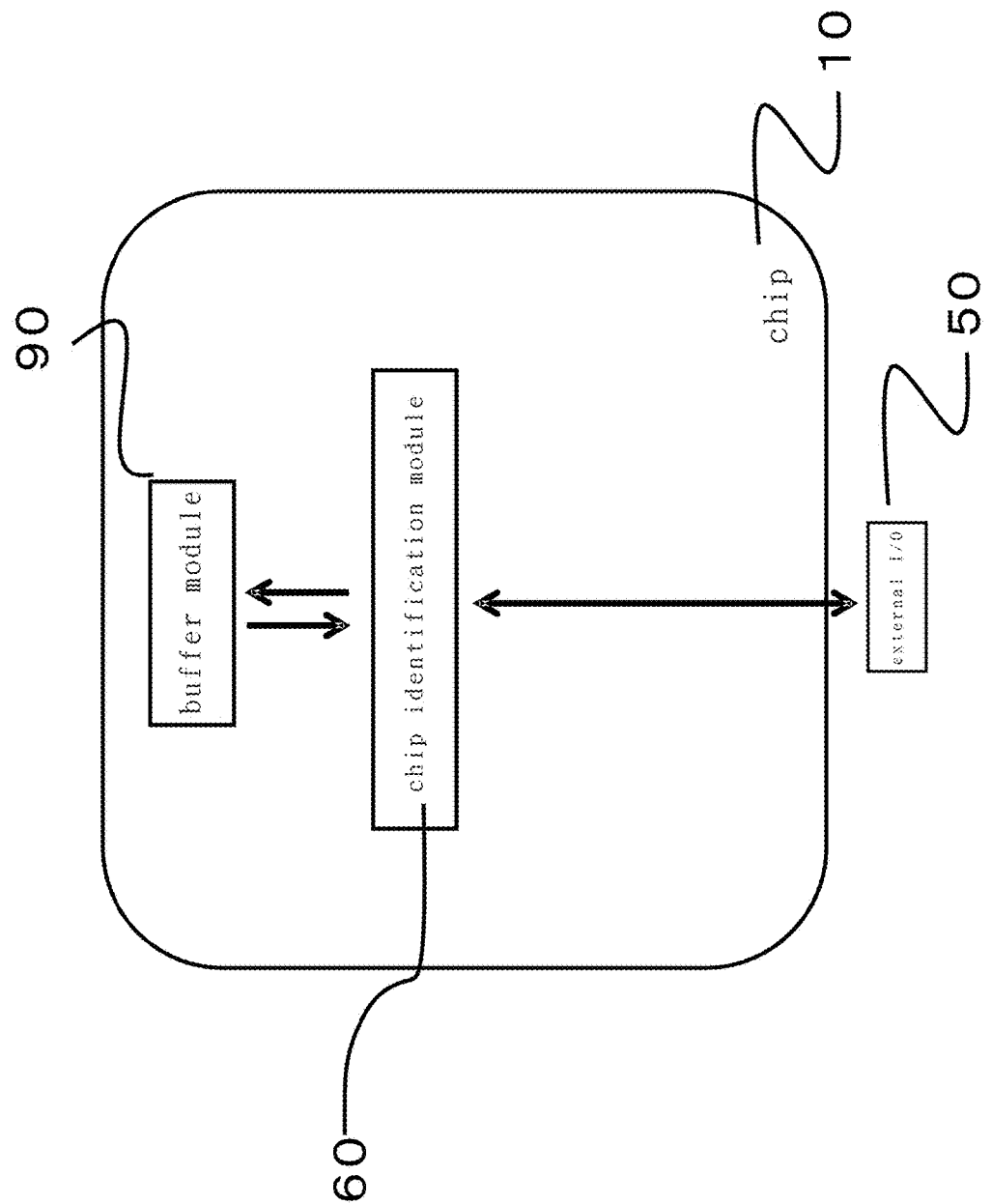
FIG. 92 illustrates an example of the method to equip the identification device to a chip as a stand-alone chip identification module.

The chip identification device of the present invention, for example, may be equipped as the chip identification module 60 into a stand-alone type chip 10, as illustrated in FIG. 92. It is noted that the buffer module 90 may involve the page buffer circuit 790 of FIG. 89. The data stored in the latch up circuit in the page buffer may be output from the chip via the external I/O 50 in reply to the request from the external.

The twentieth embodiment is herein discussed.

In FIG. 87, the chip identification cells array 960 and the memory cell array are separate from each other. However, actually the effect of the present invention may be available even while they are not separate from each other. For example, several examples may be shown in FIGS. 97-103. As an example, in FIG. 97, the identification cells (capacitor 982) having the similar structure to the select gate 981 and the memory cells share the same bit line with each other, but they are not isolated from each other in different areas.

Figure 97:
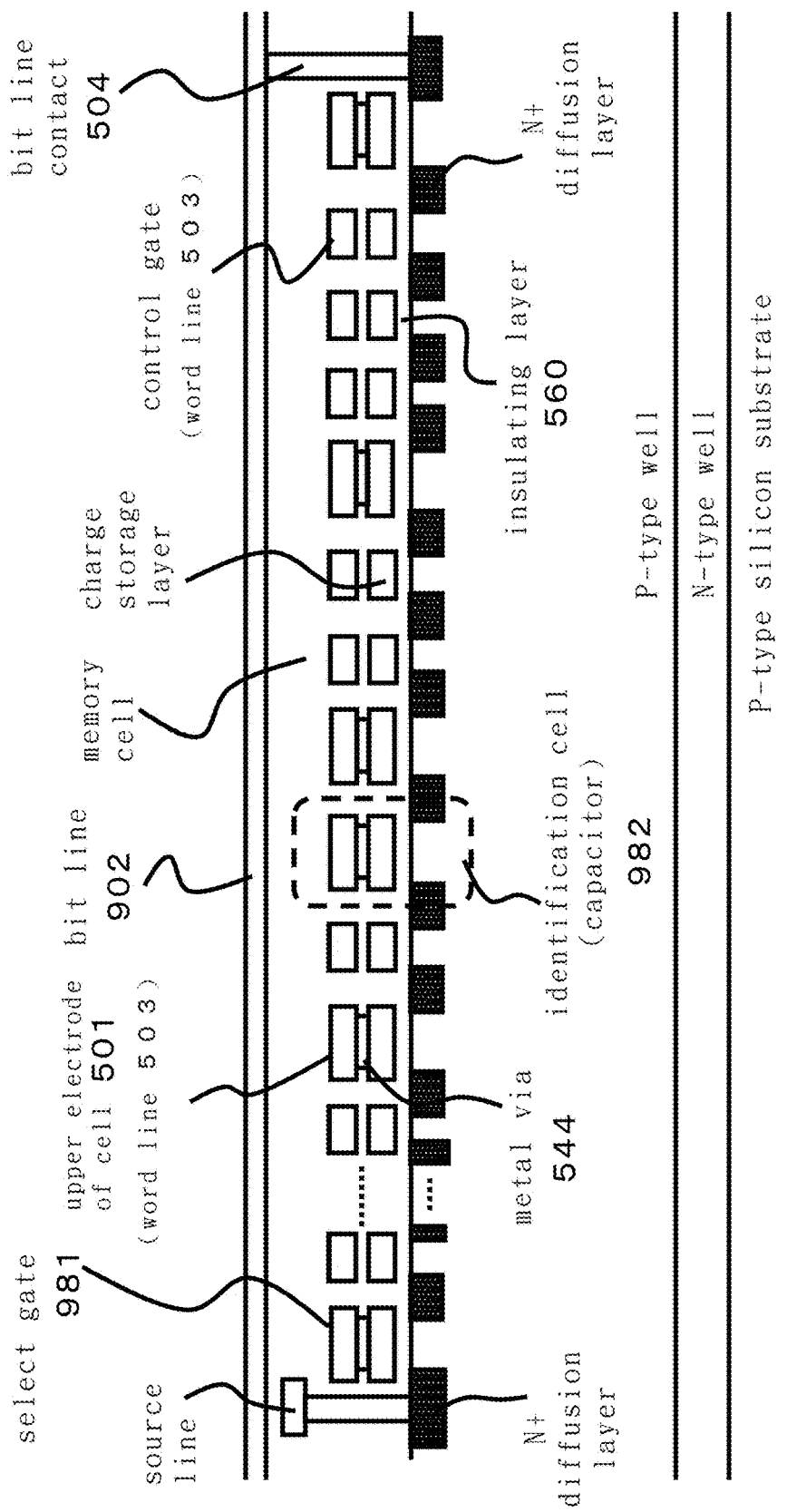
FIG. 97 illustrates an example of the method to embed the chip identification device and the memory system.
Figure 98:
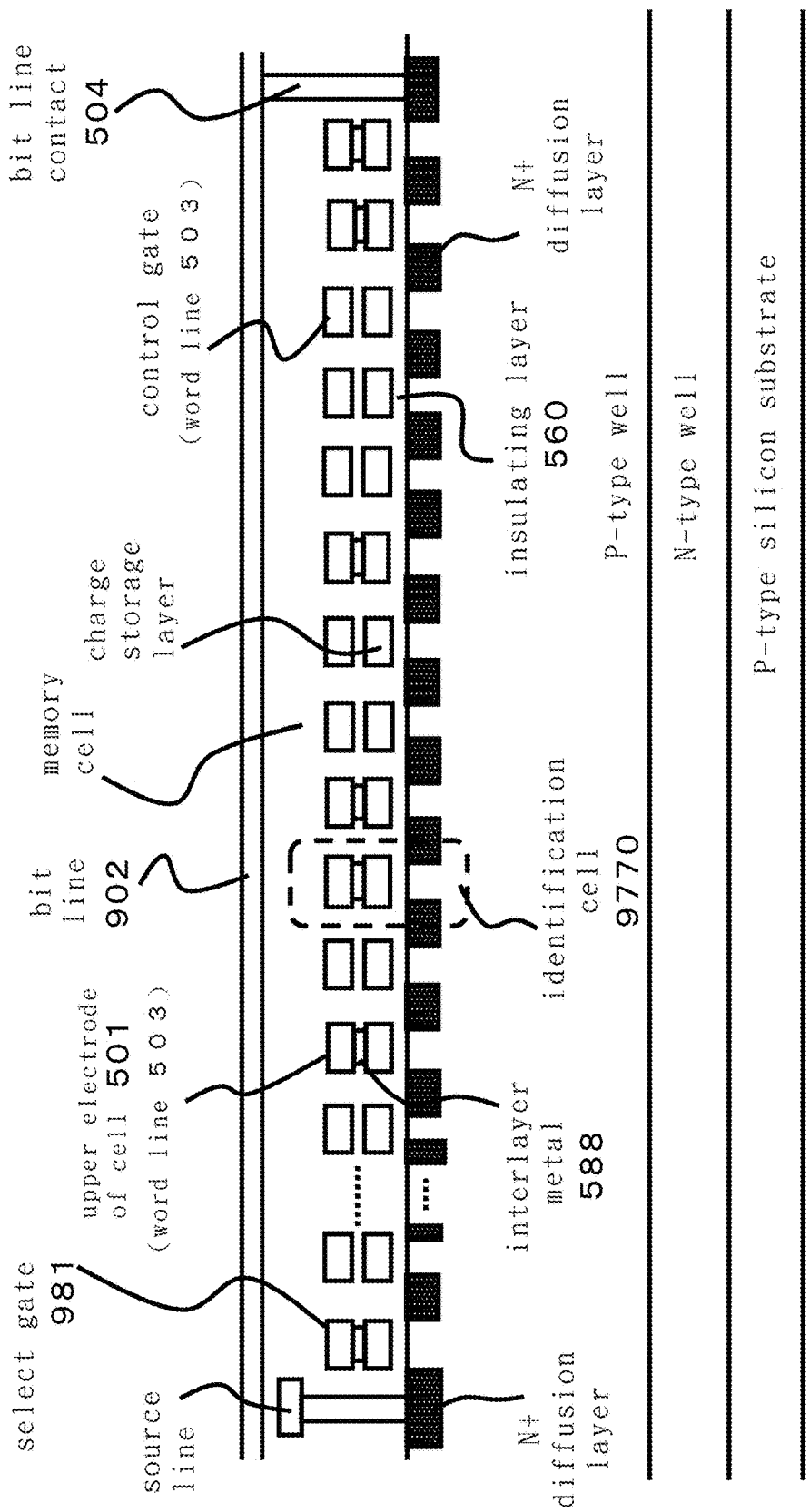
FIG. 98 illustrates an example of the method to embed the chip identification device and the memory system.

FIG. 98 is a similar example to FIG. 97. The gate length of the identification cell of FIG. 98 may be almost the same with that of the memory cells. In this way, if adopting the identification cell 9770 of FIG. 88, then it may not be necessary to design the gate length of the memory cells in a value larger than the design rule.

Figure 99:
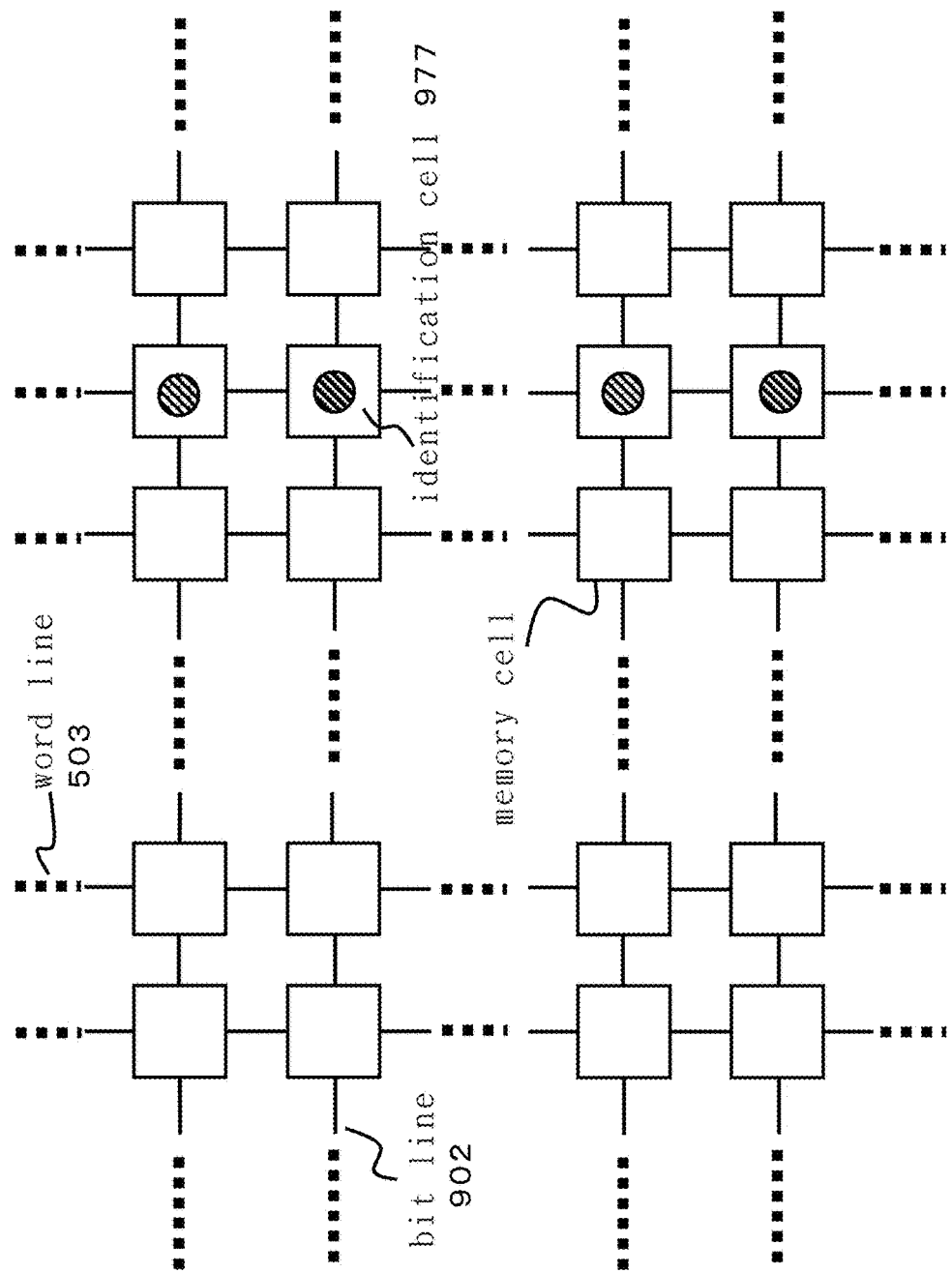
FIG. 99 illustrates an example of the method to embed the chip identification device and the memory system.

FIG. 99 is an example in which the identification cells 977 (e.g., the identification cells 9770, the capacitors 982, etc.) are collected to the addresses associated with a certain word line. This is another version of the example of FIG. 97.

Figure 100:
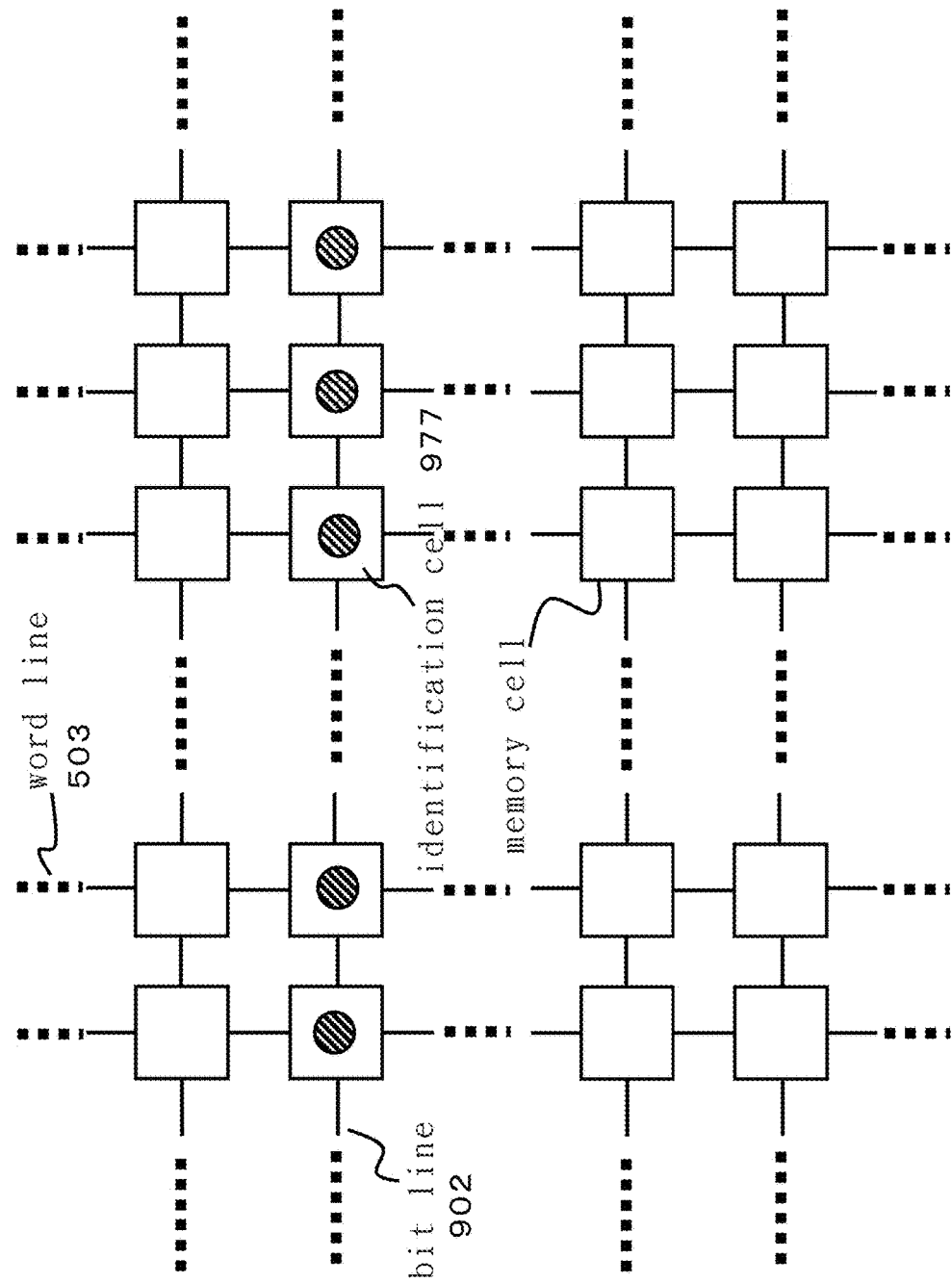
FIG. 100 illustrates an example of the method to embed the chip identification and the memory system.

FIG. 100 is an example in which the identification cells 977 (e.g., the identification cells 9770, the capacitors 982, etc.) are collected to the addresses associated with a certain bit line.

Figure 101:
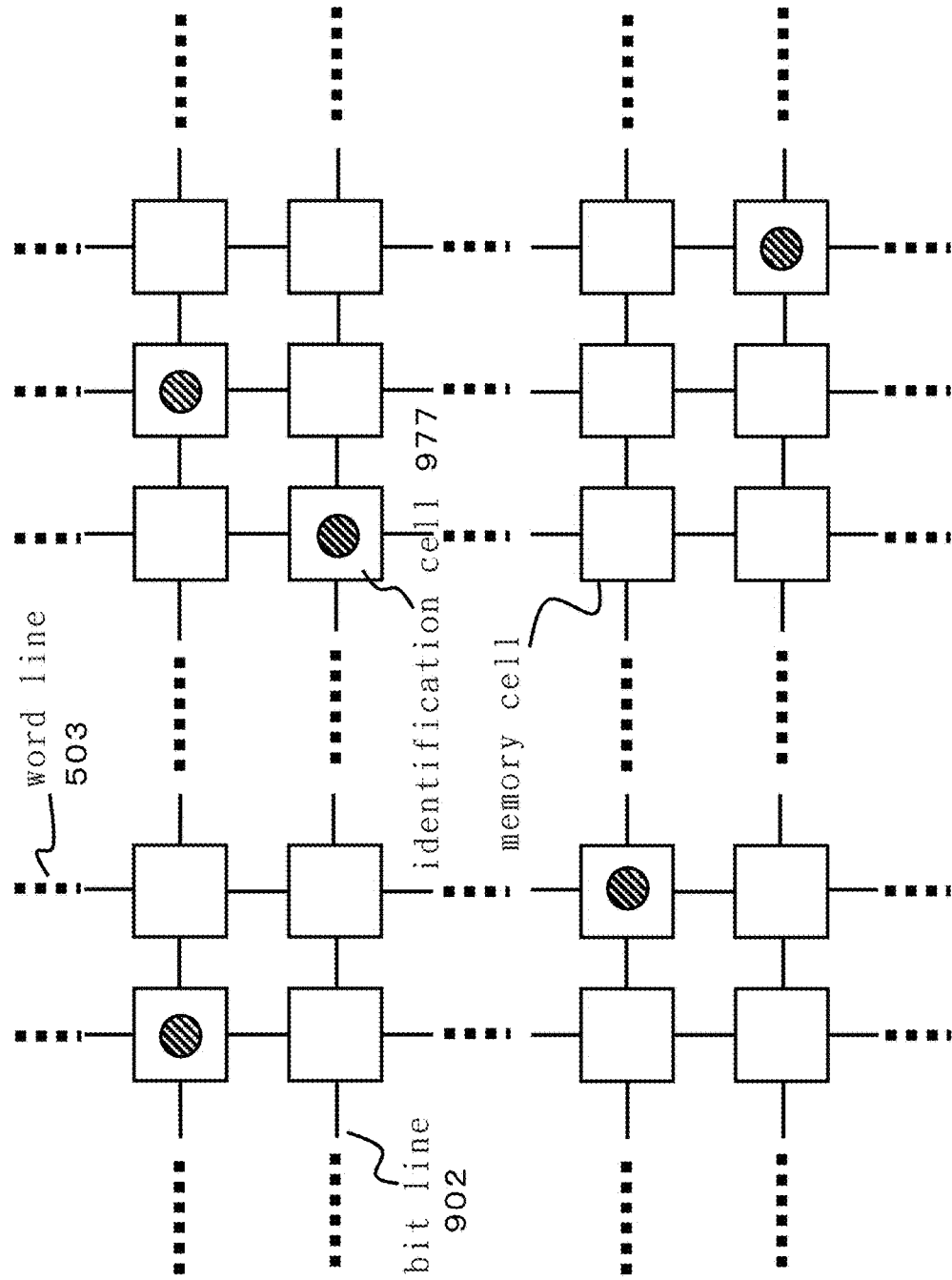
FIG. 101 illustrates an example of the method to embed the chip identification and the memory system.

FIG. 101 is an example in which the identification cells 977 (e.g., the identification cells 9770, the capacitors 982, etc.) and the memory cells are arranged randomly. In this way, the effect of the present invention may be available even without a certain rule.

Figure 102:
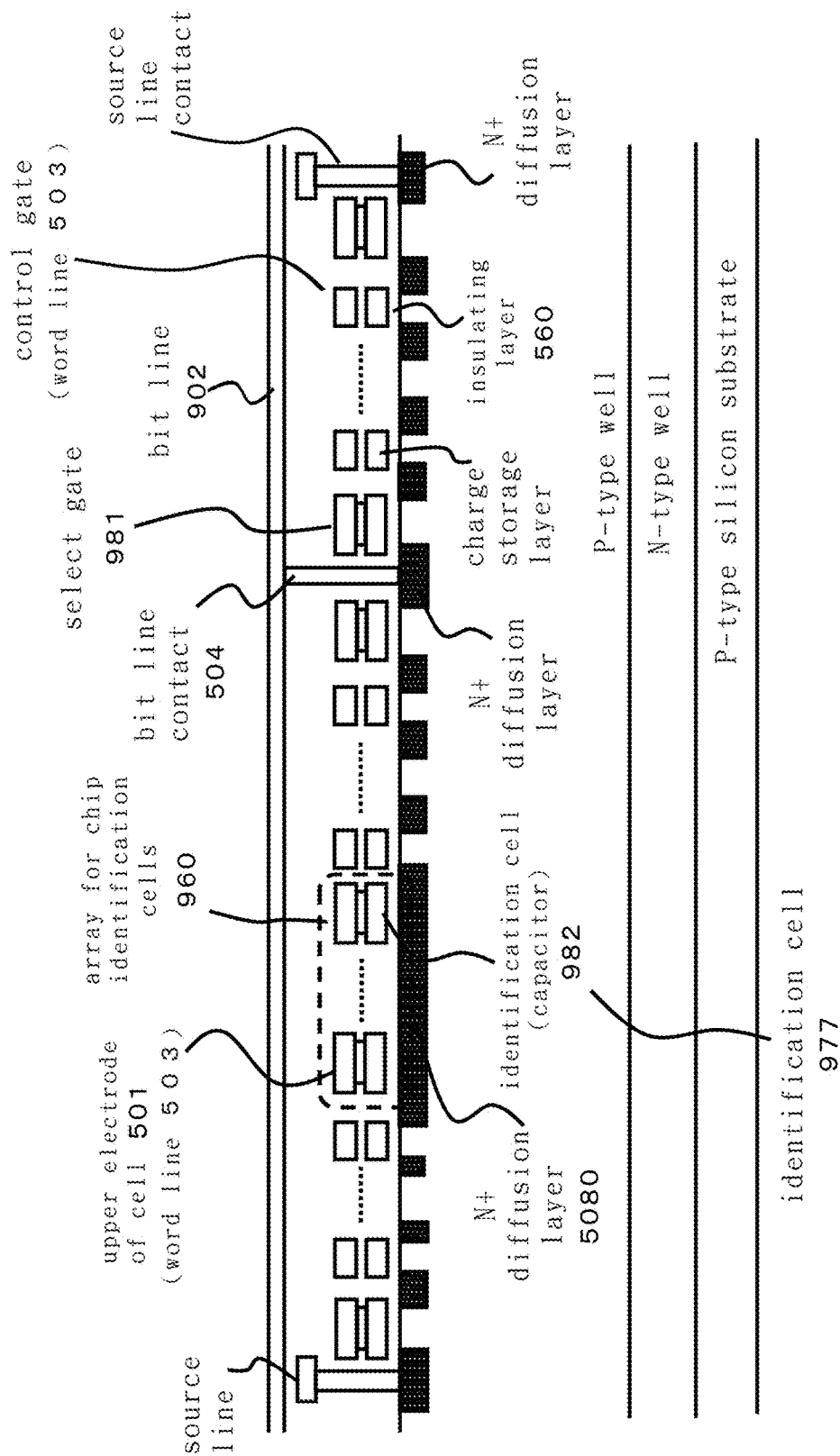
FIG. 102 illustrates an example of the method to embed the chip identification and the memory system.
Figure 103:
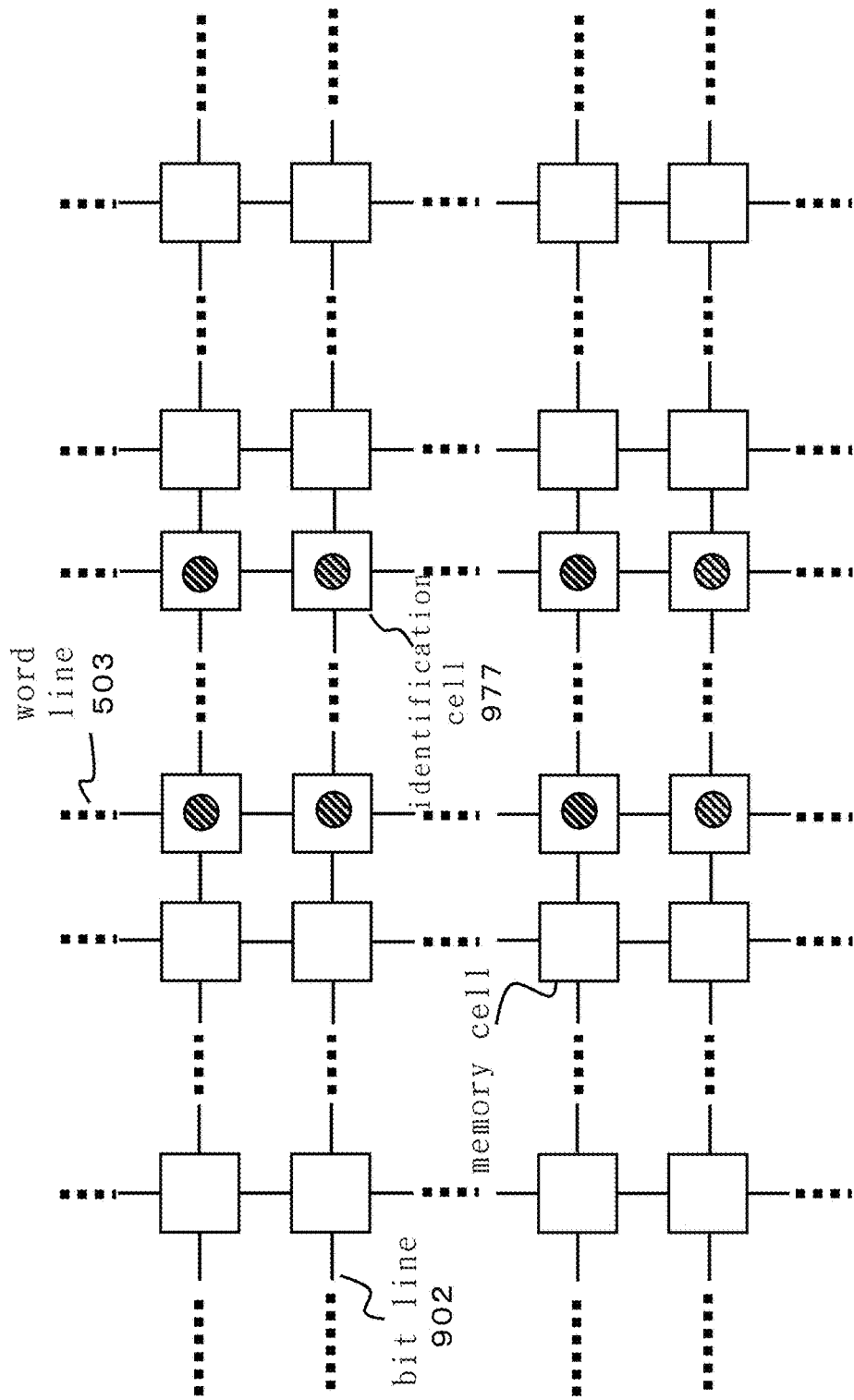
FIG. 103 illustrates an example of the method to embed the chip identification and the memory system.

FIG. 102 and FIG. 103 are examples in which the identification cells 977 (e.g., the identification cells 9770, the capacitors 982, etc.) are allocated to the addresses connected to a plurality of adjoining word lines in one block of the memory cell array.

The twenty-first embodiment is discussed herein.

Figure 104:
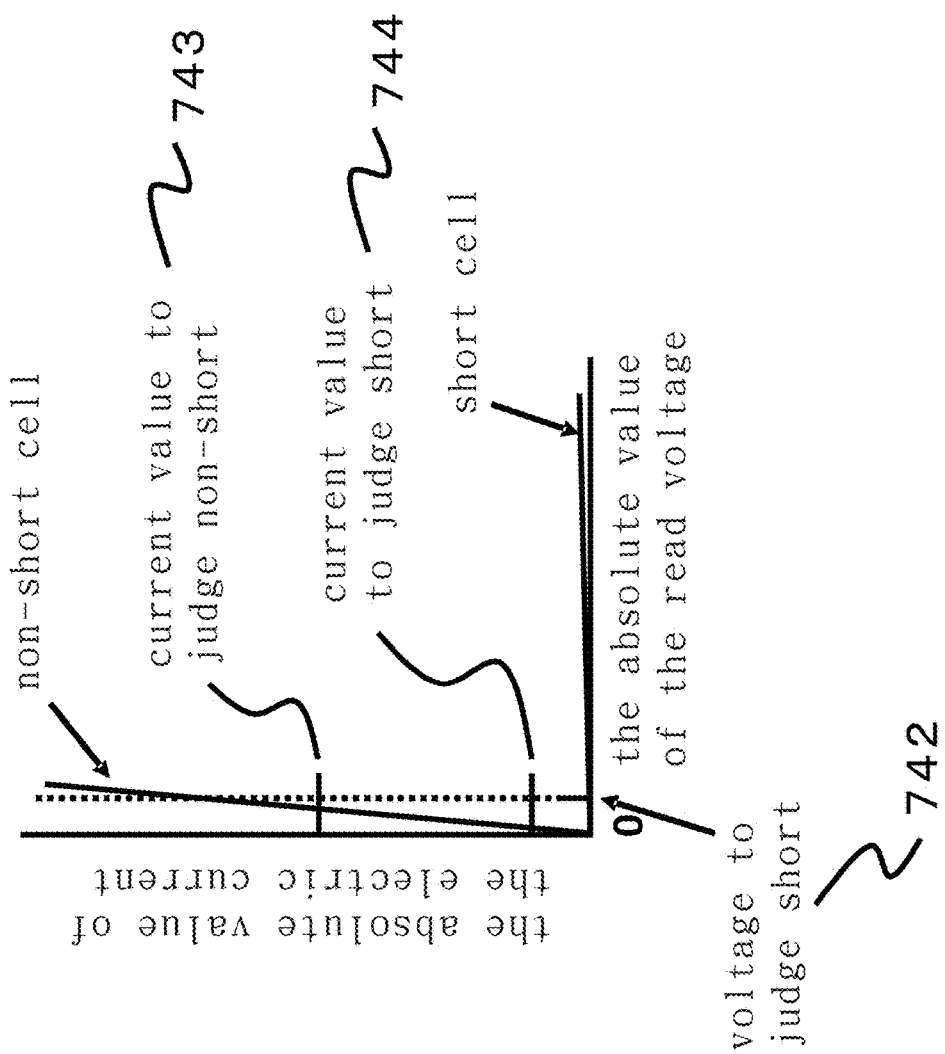
FIG. 104 illustrates an example of the method to inspect the state of short/non-short of the cells realizing the chip identification device.

In the case that the identification cell has the structure corresponding to FIG. 76 and FIG. 77, as mentioned above, there may probabilistically be two states of a "connection state (non-short state)" in which the electric current may flow by applying a read voltage to the identification cell, and a "short state" in which the electric current may not flow even by applying a read voltage, thanks to the manufacturing variance of the via depth. In a similar way, in the case that the identification cell has the structure corresponding to FIG. 79, the "short state" may occur occasionally, since the manufacturing process closest to the miniaturization limit degrades the reliability of thin wires to some amount. For example, the thickness of the thin wire may be fluctuated to cells. If the target thickness of the thin wires is too small, a part of a plurality of the thin wires to be manufactured simultaneously may be too thin and then short. Alternately, some of the thin wires may be made short by the process to wrap those thin wires with an insulating film. It is unpredictable which cell may be short, and then this may be physically random. However, it may be possible to roughly tune the ratio of short cells and non-short cells by controlling the designed depth and the target thickness of the thin wires, the material quality of the insulating film wrapping the thin wires, the process condition to form the insulating film to wrap the thin wires, and so on. In a similar way, there may probabilistically be two states of a "connection state (non-short)" in which the electric current may flow by applying a read voltage to the identification cell and a "short state" in which the electric current may not flow even with a read voltage. In this way, in the identification cells having the structure corresponding to FIG. 76, FIG. 77, and FIG. 79, the output data corresponding to "1" and "0" in terms of the semiconductor memories may be physically random even without electrical stressing. FIG. 104 illustrates the method to read the data in this event. For example, FIG. 104 illustrates the current-voltage characteristics (IV-characteristics) at the states of short and non-short. The horizontal axis is the absolute value of the read voltage to be applied to the conductive junction element 970 to read the data, and the vertical axis is the absolute value of the electric current flowing to the conductive junction element 970 with regard to the read voltage. In non-short cells, the very high electric current may flow even at a low read voltage. On the other hand, in short cells, the electric current may hardly flow even at a high read voltage. To distinguish this difference, the current value to judge the non-short 743 and the current value to judge the short 744 at the voltage value to judge the short 742 may be proposed. That is, when the read voltage, the absolute value of which is equivalent to the voltage value to judge the short 742, is applied to the conductive junction element 970, if the absolute value of the electric current flowing through the conductive junction element 970 is higher than the current value to judge the non-short 743, then the corresponding cell may be regarded as being non-short. If the absolute value of this electric current is lower than the current value to judge the short 744, then the corresponding cell may be regarded as being short. It is noted here that there is a certain gap between the current value to judge the non-short 743 and the current value to judge the short 744. Accordingly, the cells, the read current of which is inside this gap, may be regarded as being neither short nor non-short. Those cells may be labeled as "X" since they cannot correspond to neither "0" nor "1" in terms of the semiconductor memories. In this event, FIG. 82 illustrates an example of the configuration of the addresses of the cells on the cell array and data of the corresponding cells. There are "1", "1", "0", "1", "X", "0", "0", "1". . . "0" from the left. In this way, the data of the fifth cell is "X". In the example of the present embodiment, the ratio of the cells of "X" may be less than that in the case with the electromigration. However, as similar to the embodiments mentioned above, the procedure to remove "X" may be necessary to generate the pattern like FIG. 22. This procedure to deal with "X" may be similar to that mentioned above, and the detailed description may be omitted here.

In this way, the configuration of the address and data like FIG. 84 may be obtained using the cell array comprising a plurality of identification cells 977 which may correspond to FIGS. 74-79.

The twenty-second embodiment is discussed herein.

The embodiment to apply electrical stress is explained in the case that the identification cell 977 may equip the conductive junction element 970 (FIG. 76, FIG. 77, and FIG. 79). As mentioned above repeatedly, it is difficult to artificially control which one of the electromigration or insulation breakdown occurs more frequently than the other one, but the following contrivance may be possible. If the ratio of the short cells is higher than that of the non-short cells even while considering an anticipated error, then a part or the entire of the identification cells of the short state may be selected to be electrically stressed. In this way, some of the identification cells of the short state may be transited to the non-short state. On the contrary, if the ratio of the non-short cells is higher than that of the short cells even while considering an anticipated error, then a part or the entire of the identification cells of the non-short state may be selected to be electrically stressed. In this way, some of the identification cells of the non-short may be transited to the short state. It is noted that a state of short may involve not only short by the electromigration but also short by the manufacturing variance without any electrical stress.

As mentioned above repeatedly, there may be a plurality of origins to physical randomness. However, the origins in one identification cell may form a serial connection while the origins existing across a plurality of identification cells may form a parallel connection to each other. For example, in the identification cell 977 of FIG. 53, the metal via 544 and the diode element 502 (or 5020) may be the origins. Thereby, there may be two origins in each identification cell. If either of them is in a state of short (disconnection), then the identification cell 977 itself may be in a state of short (disconnection). Otherwise (both are non-short), the identification cell 977 may be in a state of non-short (connection). That is, in terms of the logic circuit, the origins involved in one identification cell may form a negative OR (NOR).

As for the metal via, as mentioned above, there may be at least two modes of the origin of physical randomness, which may be the conductivity breakdown attributable to the electromigration and the uncontrollable disconnection in manufacturing. As for the diode element, as mentioned above, there may be at least three modes of the origin of physical randomness, which may be the insulation breakdown, the PN junction breakdown, and the Schottkey junction breakdown. That is, at least two types of the origins and at least five types of the breakdown modes may be applicable to an identification cell. Since those modes of breakdown and connection may form a negative OR, as mentioned above, the corresponding identification cell may be in a state of short if one of them is in a state of short.

As mentioned above, to maximize the physical randomness, it may be preferable that the ratio of short and non-short is made about 50%. Accordingly, the method to apply the electrical stress may be contrived to make the ratio of short and non-short about 50% taking into account that any two of the breakdown modes of connections form a negative OR. In the present invention, such contrivances may be proposed according to the concrete embodiments.

The twenty-third embodiment is described herein.

In general, the number of the chips configuring the electronic appliance is not necessary one. It may be regarded that any of the first, the second . . . , and the fifth peripheral devices which may configure an example of the network shown in FIG. 14 may comprise at least one chip. As an example, in FIG. 114, the peripheral device 140 may comprise the first chip 110, the second chip 120 . . . the N-th chip 130. It is not necessary that all of them are equipped with the chip identification device. In the example of FIG. 114, only the first chip 110 equips the chip identification device 60.

As for the metal via, if the target thickness in manufacturing is insufficient, then the electromigration may easily occur, which may be adopted as a factor to physical randomness. On the contrary, if the target thickness of the metal via is sufficient, then the metal via stably connects with two conductive layers. In this event, the metal via may not be adopted as the origin of the physical randomness.

As mentioned above, it may be preferable that the ratio of "0" and "1" corresponding to FIG. 22 is made about 50%. This may be for maximizing the entropy of physical randomness as possible according to the idea of the Shannon's entropy. It may be preferable that the error is about 10% to the target being 50%. However, the present invention may be available even while the error cannot be limited within 10%. In this event, to increase the entropy of the physical randomness, the number of elements, that is, the number of the identification cells composing the chip identification device may be increased. The target 50% (error being +/−10%) is required to reduce the chip area to be occupied by the chip identification device and not beyond. It may not be indispensable to realize the essence of the present invention while disregarding the chip area.

According to the present invention, the network of electronic appliances may be divided into peripheral devices and stem servers to manage the registration status of those peripheral devices. The stem servers may be under the central control by software, whereas the physical chip identification devices may be equipped into those peripheral devices out of the central control. By sharing the security of the entire system between the software and hardware, it may be effective in preventing the peripheral devices from remote attacks. It is noted here that the network may connect any electronic appliance by the above mentioned authentication communication regardless of being inside or outside of a certain system.

Moreover, the technical field of the present invention may not be limited to the above mentioned embodiments, and various modifications may be added without departing from the scope of the aim of the present invention. In particular, it may be effective to the business model like a SIM card of cellular phones.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A network unit of electronic appliances comprising:
   a stem server;
   a plurality of peripheral devices connected to the stem server;
   wherein the stem server comprises at least one passcode and at least one list of a plurality of registration codes, wherein each list is associated to a respective one of the at least one passcode, wherein each of the plurality of registration codes of one list associating to one passcode corresponds to a respective one of the plurality of peripheral devices connecting to the stem server;
   wherein each of the plurality of registration codes is generated in response to a respective one of the at least one passcode using physical randomness of a respective one of the plurality of peripheral devices in correspondence to the passcode, wherein the plurality of registration codes is stored in the stem server in advance in correspondence to the passcode;
   wherein each of the plurality of peripheral devices comprises a plurality of components, wherein at least one of the plurality of components is a chip including a chip identification device, wherein the chip identification devices of the plurality of peripheral devices are different from each other;
   wherein the chip identification device sends a different output signal to the stem server, wherein the output signal is generated using physical randomness of the chip identification device according to the respective one of the at least one passcode received from the stem server;
   wherein the stem server compares the output signal with the list of the plurality of registration codes, and then determines the validity of the peripheral device;
   wherein the chip identification device comprises a plurality of identification cells;
   wherein the plurality of identification cells is semiconductor device cells which are made simultaneously in a same manufacturing process with the chip;
   wherein the chip comprises at least one module area;

wherein the plurality of identification cells is distributed in one or more of the at least one module area;

wherein an address of each of the plurality of identification cells is defined by a first plurality of word lines and a first plurality of bit lines, wherein the first plurality of word lines and the first plurality of bit lines form the one or more of the at least one module area;

wherein each of the plurality of identification cells electrically outputs at least a first value and a second value in response to a predetermined electrical input, and comprises at least two terminals;

wherein when an electric current flowing between the at least two terminals with regard to a read voltage of the predetermined electrical input has a higher value than a value of a first threshold current, then the first value is regarded as being output, or when the electric current has a lower value than a value of a second threshold current, then the second value is regarded as being output;

wherein the value of the first threshold current is higher than the value of the second threshold current;

wherein when the electric current has a value higher than the value of the second threshold current and lower than the value of the first threshold current, then a third value is regarded as being output; and wherein the address of each of the plurality of identification cells outputting the third value is stored in a part of an inner memory of the peripheral device.

2. The network unit of electronic appliances of claim 1 comprising, one of the plurality of identification cells, wherein the one identification cell comprises a first conductor region, a second conductor region, and an insulating film sandwiched between the first and second conductor regions;

wherein at least one of the first and second conductor regions is connected to one of the first plurality of word lines and one of the first plurality of bit lines to define an address of the one identification cell;

wherein the insulating film of the one identification cell of the chip identification device is probabilistically broken by applying a pulse voltage at least one time to either of the first and second conductor regions, which connects to at least one of the first plurality of word lines and the first plurality of bit lines; and wherein an electrical property of the one identification cell of the chip identification device is made physically random.

3. The network unit of electronic appliances of claim 1 comprising, one of the plurality of identification cells, wherein the one identification cell comprises a first conductor region, a second conductor region, and a diode region sandwiched between the first and second conductor regions;

wherein at least one of the first and second conductor regions is connected to one of the first plurality of word lines and one of the first plurality of bit lines to define an address of the one identification cell;

wherein the diode region of the one identification cell of the chip identification device is probabilistically broken by applying a pulse voltage at least one time to either of the first and second conductor regions, which connects to at least one of the first plurality of word lines and the first plurality of bit lines;

wherein an electrical property of the one identification cell of the chip identification device is made physically random;

wherein the diode region comprises a junction including first and second conductive regions having different electrical properties from each other;

wherein a first conductive region forming the junction is a first conductive type semiconductor; and wherein a second conductive region forming the junction is either a second conductive type semiconductor or a metal type conductor.

4. The network unit of electronic appliances of claim 1 comprising, one of the plurality of identification cells, wherein the one identification cell comprises a first conductor region, a second conductor region, an insulating film sandwiched between the first and second conductor regions, and a conductive junction element piercing through the insulating film from the first conductor region to the second conductor region;

wherein at least one of the first and second conductor regions is connected to one of the first plurality of word lines and one of the first plurality of bit lines to define an address of the one identification cell;

wherein the conductive junction element of the one identification cell of the chip identification device is probabilistically broken by applying a pulse voltage at least one time to either of the first and second conductor regions, which connects to at least one of the first plurality of word lines and the first plurality of bit lines; and wherein an electrical property of the one identification cell of the chip identification device is made physically random.

5. The network unit of electronic appliances of claim 1 comprising, one of the plurality of identification cells, wherein the one identification cell comprises a first conductor region, a second conductor region, an insulating film sandwiched between the first and second conductor regions, and a conductor tip extending from either of the first and second conductor regions into the insulating film;

wherein at least one of the first and second conductor regions is connected to one of the first plurality of word lines and one of the first plurality of bit lines to define an address of the one identification cell;

wherein the insulating film of the one identification cell of the chip identification device is probabilistically broken around the conductor tip by applying a pulse voltage at least one time to either of the first and second conductor regions, which connects to at least one of the first plurality of word lines and the first plurality of bit lines; and wherein an electrical property of the one identification cell of the chip identification device is made physically random.

6. The network unit of electronic appliances of claim 1 comprising, one of the plurality of identification cells, wherein the one identification cell comprises a first conductor region, a second conductor region, an insulating film sandwiched between the first and second conductor regions, and a metal via formed by a hole forming step and a conductive material filling step;

wherein the hole forming step comprises forming a hole penetrating the insulating film from the first conductor region to the second conductor region, and the conductive material filling step comprises filling the hole with a conductive material;

wherein at least one of the first and second conductor regions is connected to one of the first plurality of word lines and one of the first plurality of bit lines to define an address of the one identification cell;

wherein a manufacturing target value of a length of the metal via equals to a distance between the first and second conductor regions;

wherein the length of the metal via formed by the hole forming step and the conductive material filling step is probabilistically larger or smaller than the distance between the first and second conductor regions; and wherein an electrical property of the one identification cell of the chip identification device is made physically random.

7. The network unit of electronic appliances of claim 1 comprising, one of the plurality of identification cells, wherein the one identification cell comprises a first conductor region, a second conductor region, a conductive thin wire bridging the first and second conductor regions, and an insulating film sandwiched between the first and second conductor regions and covering the conductive thin wire;

wherein at least one of the first and second conductor regions is connected to one of the first plurality of word lines and one of the first plurality of bit lines to define an address of the one identification cell;

wherein the conductive thin wire is probabilistically broken with regard to a manufacturing fluctuation occurring in a manufacturing process of the conductive thin wire or a manufacturing process of the insulating film covering the conductive thin wire, in order to make an electric property of the one identification cell forming the chip identification device physically random.

8. The network unit of electronic appliances of claim 1 comprising, one of the plurality of identification cells, wherein the one identification cell is arrayed with a memory cell area inside one or more of the at least one module area: and wherein an address of the one identification cell is defined with one of the first plurality of word lines and one of the first plurality of bit lines, wherein the first plurality of word lines and the first plurality of bit lines are used jointly by the one identification cell and the memory cell areas in the one or more of the at least one module area.

9. The network unit of electronic appliances of claim 1 comprising: the plurality of identification cells, wherein when a ratio of the plurality of identification cells in a first state outputting the first value is higher than a ratio of the plurality of identification cells in a second state outputting the second value, wherein a part of or all of the plurality of identification cells in the first state is being selected and applied with an electrical stress; and wherein when the ratio of the plurality of identification cells in the first state is lower than the ratio of the plurality of identification cells in the second state, then a part of or all of the plurality of identification cells in the second state is being selected and applied with the electrical stress.

10. The network unit of electronic appliances of claim 1 comprising: the chip identification device, wherein the chip identification device comprises an aggregate of the plurality of identification cells disposed at cross-points of the first plurality of word lines and the first plurality of bit lines;

wherein an external input generates data that selects at least one of the first plurality of word lines;

wherein an aggregate of data read by the first plurality of bit lines in correspondence to the one or more word lines selected from the at least one word line is output as an output code;

wherein an input code is a permutation of column numbers of the one or more word lines selected in order by the external input;

wherein a column data of the plurality of identification cells associated with the one or more word lines selected in order in correspondence to the input code is arranged according to row numbers thereof; and wherein the output code is the aggregate of data of the column data that is further arranged according to column numbers of the one or more word lines selected in order in correspondence to the input code.

11. A network of electronic appliances comprising:

a plurality of network units of the electronic appliances comprising a first network unit and a plurality of second network units, wherein the first network unit is connected to at least one of the plurality of second network units in a topology;

wherein each of the plurality of network units comprises a stem server and a plurality of peripheral devices connected to the stem server;

wherein, in the first network unit, the stem server comprises at least one passcode and at least one list of a plurality of registration codes, wherein each list is associated to a respective one of the at least one passcode, wherein each of the plurality of registration codes of one list associating to one passcode corresponds to a respective one of the plurality of peripheral devices connecting to the stem server;

wherein, in the first network unit, each of the plurality of registration codes is generated in response to a respective one of the at least one passcode using physical randomness of a respective one of the plurality of peripheral devices in correspondence to the passcode, wherein the plurality of registration codes is stored in the stem server in advance in correspondence to the at least one passcode;

wherein, in the first network unit, each of the plurality of peripheral devices comprises a plurality of components, wherein at least one of the plurality of components is a chip including a chip identification device, wherein the chip identification devices of the plurality of peripheral devices are different from each other;

wherein, in the first network unit, the chip identification device sends a different output signal to the stem server, wherein the output signal is generated using physical randomness of the chip identification device according to the respective one of the at least one passcode received from the stem server;

wherein, in the first network unit, the stem server compares the output signal with the list of the plurality of registration codes, and then determines the validity of the peripheral device;

wherein, in the first network unit, the chip identification device comprises a plurality of identification cells;

wherein, in the first network unit, the plurality of identification cells is semiconductor device cells which are made simultaneously in a same manufacturing process with the chip;

wherein, in the first network unit, the chip comprises at least one module area;

wherein, in the first network unit, the plurality of identification cells is distributed in one or more of the at least one module area;

wherein, in the first network unit, an address of each of the plurality of identification cells is defined by a first plurality of word lines and a first plurality of bit lines, wherein the first plurality of word lines and the first plurality of bit lines form the one or more of the at least one module area;

wherein, in the first network unit, each of the plurality of identification cells electrically outputs at least a first value and a second value in response to a predetermined electrical input, and comprises at least two terminals;

wherein, in the first network unit, when an electric current flowing between the at least two terminals with regard to a read voltage of the predetermined electrical input has a higher value than a value of a first threshold current, then the first value is regarded as being output, or when the electric current has a lower value than a value of a second threshold current, then the second value is regarded as being output;

wherein, in the first network unit, the value of the first threshold current is higher than the value of the second threshold current;

wherein, in the first network unit, when the electric current has a value higher than the value of the second threshold current and lower than the value of the first threshold current, then a third value is regarded as being output; and wherein, in the first network unit, the address of each of the plurality of identification cells outputting the third value is stored in a part of an inner memory of the peripheral device.

12. The network of electronic appliances as claimed in claim 11, wherein a topology comprises the stem server of the first network unit, wherein the stem server of the first network unit connects to one or more of the stem servers of the plurality of second network units.

13. The network of electronic appliances as claimed in claim 11, wherein a topology comprises at least one of the plurality of peripheral devices of the first network unit, wherein each of the at least one of the plurality of peripheral devices of the first network unit connects to one or more of the stem servers of the plurality of second network units.

14. The network of electronic appliances as claimed in claim 11, wherein the topology comprises the stem server of the first network unit and at least one of the plurality of peripheral devices of the first network unit, wherein the stem server of the first network unit connects to one or more of the stem servers of the plurality of second network units, and wherein each of the at least one of the plurality of peripheral devices of the first network unit connects to one or more of the stem servers of the plurality of second network units.

15. The network of electronic appliances as claimed in claim 11, wherein the at least one passcode includes a plurality of passcodes, wherein the chip identification device generates a signal using physical randomness in response to an input signal, receives the plurality of passcodes from the stem servers, wherein the plurality of passcodes are different from each other, outputs a plurality of different signals in response to the plurality of passcodes, and respectively returns the plurality of different signals to the stem servers; and wherein at least one of the stem servers which is connected to the plurality of peripheral devices monitors input signals that each of the plurality of peripheral devices receives from arbitrary media and controls the access of each of the plurality of peripheral devices and the media.

16. The network of electronic appliances as claimed in claim 11 comprising: one of the plurality of identification cells, wherein the one identification cell comprises a first conductor region, a second conductor region, and an insulating film sandwiched between the first and second conductor regions;

wherein at least one of the first and second conductor regions is connected to one of the first plurality of word lines and one of the first plurality of bit lines to define the address of the one identification cell;

wherein the insulating film of the one identification cell of the chip identification device is probabilistically broken by applying a pulse voltage at least one time to either of the first and second conductor regions, which connects to at least one of the first plurality of word lines and the first plurality of bit lines; and wherein an electrical property of the one identification cell of the chip identification device is made physically random.

17. The network of electronic appliances as claimed in claim 11 comprising: one of the plurality of identification cells, wherein the one identification cell comprises a first conductor region, a second conductor region, and a diode region sandwiched between the first and second conductor regions;

wherein at least one of the first and second conductor regions is connected to one of the first plurality of word lines and one of the first plurality of bit lines to define the address of the one identification Cell;

wherein the diode region of the one identification cell of the chip identification device is probabilistically broken by applying a pulse voltage at least one time to either of the first and second conductor regions, which connects to at least one of the first plurality of word lines and the first plurality of bit lines;

wherein an electrical property of the one identification cell of the chip identification device is made physically random;

wherein the diode region comprises a junction including first and second conductive regions having different electrical properties from each other;

wherein a first conductive region forming the junction is a first conductive type semiconductor; and wherein a second conductive region forming the junction is either a second conductive type semiconductor or a metal type conductor.

18. The network of electronic appliances as claimed in claim 11 comprising: one of the plurality of the identification cells, wherein the one identification cell comprises a first conductor region, a second conductor region, an insulating film sandwiched between the first and second conductor regions, and a conductive junction element piercing through the insulating film from the first conductor region to the second conductor region;

wherein at least one of the first and second conductor regions is connected to one of the first plurality of word lines and one of the first plurality of bit lines to define an address of the one identification cell;

wherein the conductive junction element of the one identification cell of the chip identification device is probabilistically broken by applying a pulse voltage at least one time to either of the first and second conductor regions, which connects to at least one of the first plurality of word lines and the first plurality of bit lines; and wherein an electrical property of the one identification cell of the chip identification device is made physically random.

19. The network electronic appliances as claimed in claim 11 comprising: one of the plurality of the identification cells, wherein the one identification cell comprises a first conductor region, a second conductor region, an insulating film sandwiched between the first and second conductor regions, and a conductor tip extending from either of the first and second conductor regions into the insulating film;
  wherein at least one of the first and second conductor regions is connected to one of the first plurality of word lines and one of the first plurality of bit lines defining an address of the one identification cell;
  wherein the insulating film of the one identification cell of the chip identification device is probabilistically broken around the conductor tip by applying a pulse voltage at least one time to either of the first and second conductor regions, which connects to at least one of the first plurality of word lines and the first plurality of bit lines; and
  wherein an electrical property of the one identification cell of the chip identification device is made physically random.

20. The network of electronic appliances as claimed in claim 11 comprising: one of the plurality of the identification cells, wherein the one identification cell comprises a first conductor region, a second conductor region, an insulating film sandwiched between the first and second conductor regions, and a metal via formed by a hole forming step and a conductive material filling step;
  wherein the hole forming step comprises forming a hole penetrating the insulating film from the first conductor region to the second conductor region, and the conductive material filling step comprises filling the hole with a conductive material;
  wherein at least one of the first and second conductor regions is connected to one of the first plurality of word lines and one of the first plurality of bit lines to define the address of the one identification cell;
  wherein a manufacturing target value of a length of the metal via equals to a distance between the first and second conductor regions;
  wherein the length of the metal via formed by the hole forming step and the conductive material filling step is probabilistically larger or smaller than the distance between the first and second conductor regions; and
  wherein an electrical property of the one identification cell of the chip identification device is made physically random.

21. The network of electronic appliances as claimed in claim 11 comprising: one of the plurality of the identification cells, wherein the one identification cell comprises a first conductor region, a second conductor region, a conductive thin wire bridging the first and second conductor regions, and an insulating film sandwiched between the first and second conductor regions and covering the conductive thin wire;
  wherein at least one of the first and second conductor regions is connected to one of the first plurality of word lines and one of the first plurality of bit lines defining the address of the one identification cell;
  wherein the conductive thin wire is probabilistically broken with regard to a manufacturing fluctuation occurring in a manufacturing process of the conductive thin wire or a manufacturing process of the insulating film covering the conductive thin wire, in order to make an electric property of the one identification cell forming the chip identification device physically random.

22. The network of electronic appliances as claimed in claim 11 comprising: one of the plurality of the identification cells, wherein the one identification cell is arrayed with a memory cell area inside one or more of the at least one module area; and
  wherein an address of the one identification cell is defined with one of the first plurality of word lines and one of the first plurality of bit lines, wherein the first plurality of word lines and the first plurality of bit lines are used jointly by the one identification cell and the memory cell areas in the one or more of the at least one module area.

23. The network of electronic appliances as claimed in claim 11 comprising: the plurality of identification cells, wherein when a ratio of the plurality of identification cells in a first state outputting the first value is higher than a ratio of the plurality of identification cells in a second state outputting the second value, wherein a part of or all of the plurality of identification cells in the first state is being selected and applied with an electrical stress; and
  wherein when the ratio of the plurality of identification cells in the first state is lower than the ratio of the plurality of identification cells in the second state,
then a part of or all of the plurality of identification cells in the second state is being selected and applied with the electrical stress.

24. The network of electronic appliances as claimed in claim 11 comprising: the chip identification device, wherein the chip identification device comprises an aggregate of the plurality of identification cells disposed at cross-points of the first plurality of word lines and the first plurality of bit lines;
  wherein an external input generates data that selects at least one of the first plurality of word lines;
  wherein an aggregate of data read by the first plurality of bit lines in correspondence to the one or more word lines selected from the at least one word line is output as an output code;
  wherein an input code is a permutation of column numbers of the one or more word lines selected in order by the external input;
  wherein a column data of the plurality of identification cells associated with the one or more word lines selected in order in correspondence to the input code is arranged according to row numbers thereof; and
  wherein the output code is the aggregate of data of the column data that is further arranged according to column numbers of the one or more word lines selected in order in correspondence to the input code.

25. The network of electronic appliances as claimed in claim 11 comprising: an inspection process performed by each of the plurality of stem servers of the plurality of network units, wherein each of the plurality of network units comprises a stem server and a plurality of peripheral devices connected to the stem server, wherein the stem server comprises at least one passcode and at least one list of a plurality of registration codes, wherein each list is associated to a respective one of the at least one passcode, wherein each of the plurality of registration codes of one list associating with one pass code corresponds to a respective one of the plurality of peripheral devices, wherein the inspection process comprises:
  reading an inner memory of each of the plurality of peripheral device:
  comparing the read data with the at least one pass code stored in the stem server;
  determining whether the compared result is inconsistent; and checking whether the read data is different from each of the plurality of registration codes in one of the at least one list lists stored in the stem server when the determined result is inconsistent, wherein the peripheral device is regarded as being certified when the checked result is inconsistent.

* * * * *